United States Patent [19]

Ono

[11] Patent Number: 5,619,593
[45] Date of Patent: Apr. 8, 1997

[54] METHOD FOR EXTRACTING OBJECT IMAGES AND METHOD FOR DETECTING MOVEMENTS THEREOF

[75] Inventor: Shuji Ono, Kanagawa-ken, Japan

[73] Assignee: Fuji Photo Film Co., Ltd., Kanagawa, Japan

[21] Appl. No.: 944,850

[22] Filed: Sep. 14, 1992

[30] Foreign Application Priority Data

| Sep. 12, 1991 | [JP] | Japan | 3-233213 |
| Dec. 6, 1991 | [JP] | Japan | 3-323342 |
| Dec. 6, 1991 | [JP] | Japan | 3-323343 |
| Dec. 6, 1991 | [JP] | Japan | 3-323344 |
| Jan. 28, 1992 | [JP] | Japan | 4-013092 |
| Jan. 28, 1992 | [JP] | Japan | 4-013093 |
| Jan. 28, 1992 | [JP] | Japan | 4-013094 |
| Jan. 28, 1992 | [JP] | Japan | 4-013095 |
| Jan. 28, 1992 | [JP] | Japan | 4-013096 |
| Jan. 28, 1992 | [JP] | Japan | 4-013097 |

[51] Int. Cl.$^6$ .................................... G06K 9/48
[52] U.S. Cl. .................. 382/199; 382/203; 382/157; 382/291
[58] Field of Search ................ 382/22, 16, 14, 382/25, 26, 21, 199, 190, 156, 157, 158, 203, 204, 197, 103, 291; 358/105, 125, 126; 348/155, 172; 395/21, 62

[56] References Cited

U.S. PATENT DOCUMENTS

| 4,476,494 | 10/1984 | Tugayé | 358/126 |
| 4,959,714 | 9/1990 | Lo et al. | 358/125 |
| 5,103,484 | 4/1992 | Stafford et al. | 382/22 |
| 5,111,516 | 5/1992 | Nakano et al. | 382/156 |
| 5,259,038 | 11/1993 | Sakou et al. | 382/14 |

FOREIGN PATENT DOCUMENTS 2138677  5/1990  Japan .

OTHER PUBLICATIONS

Himes G.S. et al., "VSLI Implementable Neural Networks for Target Tracking", Proceedings of the SPIE Conference, Applications of Artificial Neural Networks II, vol. 1469, No. 2, 5 Apr. 1991, Orlando, Florida, U.S.A., pp. 671–682.

Mehanian C., Rak S.J., "Bi–Directional Log–Polar Mapping for Invariant Object Recognition", Proceedings of the SPIE Conference, Automatic Object Recognition, vol. 1471, 5 Apr. 1991, Orlando, Florida, U.S.A., pp. 200–209.

Gawronski R.R., Littlefield M.L., "Experrmental Optimization of the Neuronlike Network Applied for the Processing of Moving Images", Proceedings of the SPIE Conference, Applications of Artificial Intelligence VIII, vol. 1293, No. 2, 19 Apr. 1990, pp. 838–849.

Lee J.S.J., Lin C., "An Intelligent Real–Time Multiple Moving Object Tracker", Proceedings of the SPIE Conference, Applications of Artificial Intelligence VI, vol. 937, 6 Apr. 1988, Orlando, Florida, U.S.A., pp. 328–335.

(List continued on next page.)

Primary Examiner—Leo Boudreau
Assistant Examiner—Phuoc Tran
Attorney, Agent, or Firm—Sughrue, Mion, Zinn, Macpeak & Seas

[57] ABSTRACT

In a method for extracting an object image an extraction area for extraction of a candidate for a predetermined object image from an image is determined. The center point of a view window, which has a predetermined size, is caused to travel to the position of the candidate for the predetermined object image. The extraction area is determined in accordance with the size and/or the shape of the candidate for the predetermined object image, the center point of the view window being taken as a reference during the determination of the extraction area. The extraction of the candidate for the predetermined object image is carried out by using a neural network. Even if a plurality of object images, which are to be extracted, are embedded in a given image, the object images are extracted efficiently such that an object image, which has already been extracted, may not be extracted again.

100 Claims, 80 Drawing Sheets

OTHER PUBLICATIONS

Zhou Y.T., Chellappa R., "Computation of Optical Flow Using a Neural Network", IEEE International Conference on Neural Networks, 27 Jul. 1988, Sheraton Harbor Island, San Diego, California, U.S.A., pp. 71–78 XP00004347.

Weller G.A., Groen F.C.A., "A Gradient Comparison Method for Tracking and Focussing Purposes", Proceedings of the 3rd International Workshop, Time–Varying Image Processing and Moving Object Recognition 2, 31 May 1989, Florence, Italy, pp. 316–322.

Grattoni P., Pollastri F., "Contour Detection Algorithm Based on the Minimum Radial Inertia (MRI) Criterion", Computer Vision Graphics and Image Processing, vol. 43, No. 1, Jul. 1988, Duluth, MA, U.S.A., pp. 22–36.

"Neocognitron: A Neural Network Model for a Mechanism of Pattern Recognition Unaffected by Shift in Position," by Kunihiko Fukushima, Collected Papers of the Institute of Electronics and Communication Engineers of Japan, A, J62–A(10), pp. 658–665, Oct. 1979.

"Visual and Auditory Information Processing in Living Body System", by Kenji Hiwatashi, Information Processing, vol. 23, No. 5, pp. 451–459, 1982.

"Neural Net for Extracting Size Invariant Features," *Computrol*, No. 29, pp. 26–31, not dated.

"Structure and Function of Visual System," *Information Processing*, vol. 26, No. 2, pp. 108–116, 1985.

"Pattern Recognition Learning System," *Image Information* (*I*), 1987/1, pp. 31–37.

"Simulation of Saccadic Movement by Pseudo–Retina Mask," *Television Engineering Report*, vol. 14, No. 36, pp. 25–30, Jun. 1990.

"Neural Net for Specifying a Viewpoint," *Television Engineering Report*, vol. 14, No. 33, pp. 25–30, Jun. 1990.

"Integration of Distributed Cortical Systems by Reentry: A Computer Simulation of Interactive Functionally Segregated Visual Areas," *JONS*, vol. 9, No. 9, pp. 3188–3208, 1989.

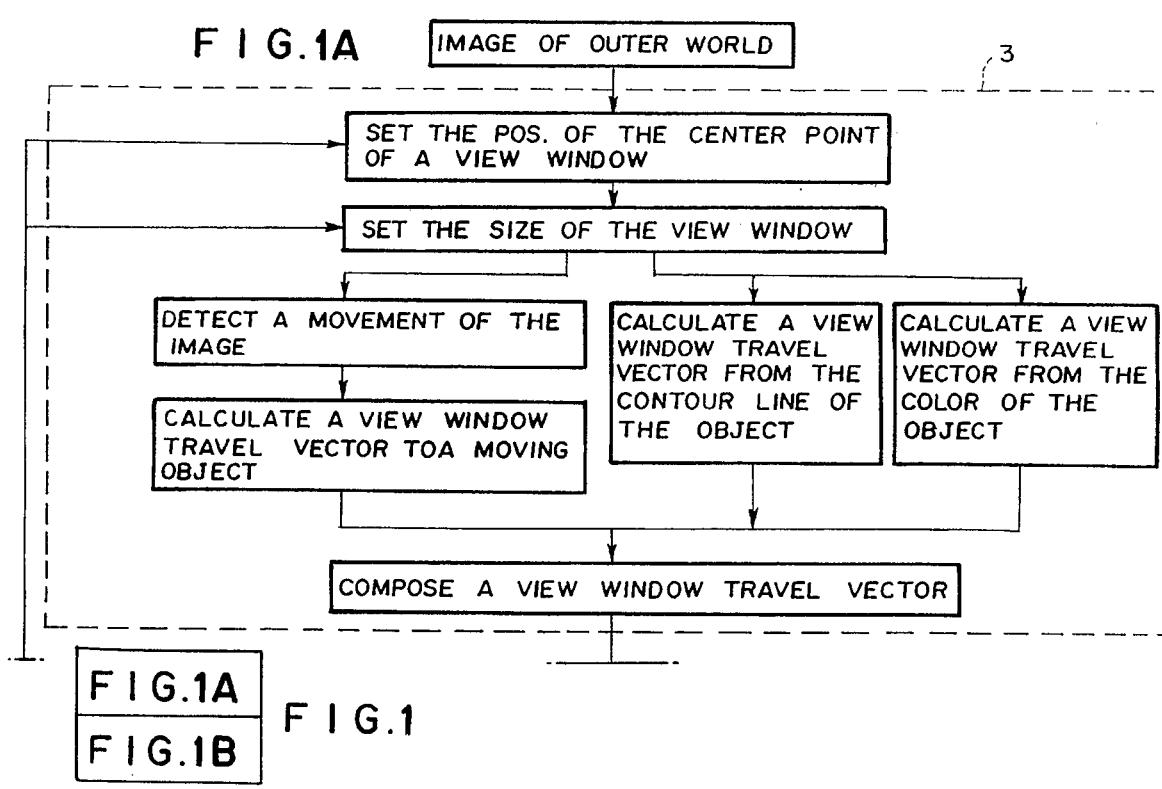

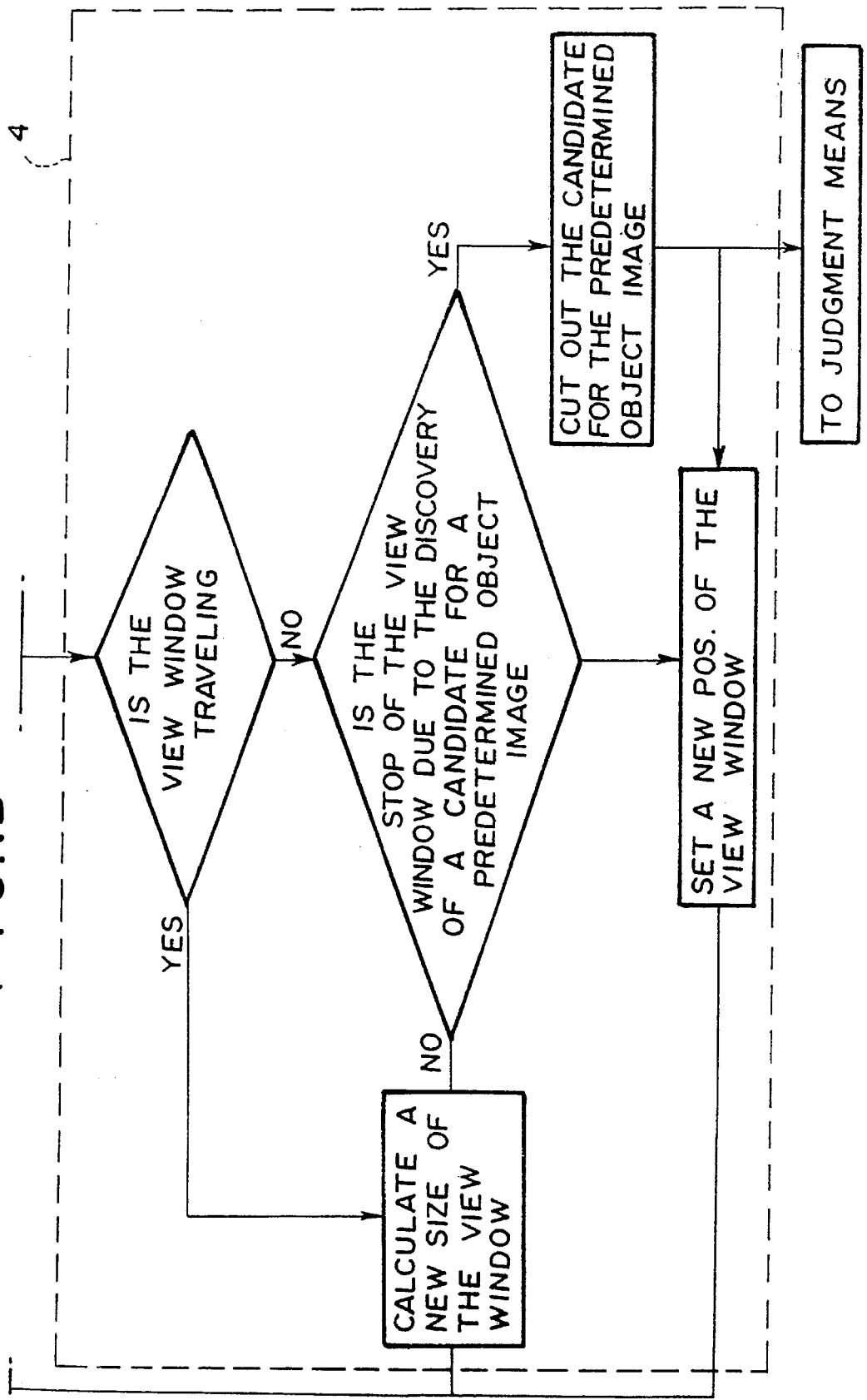

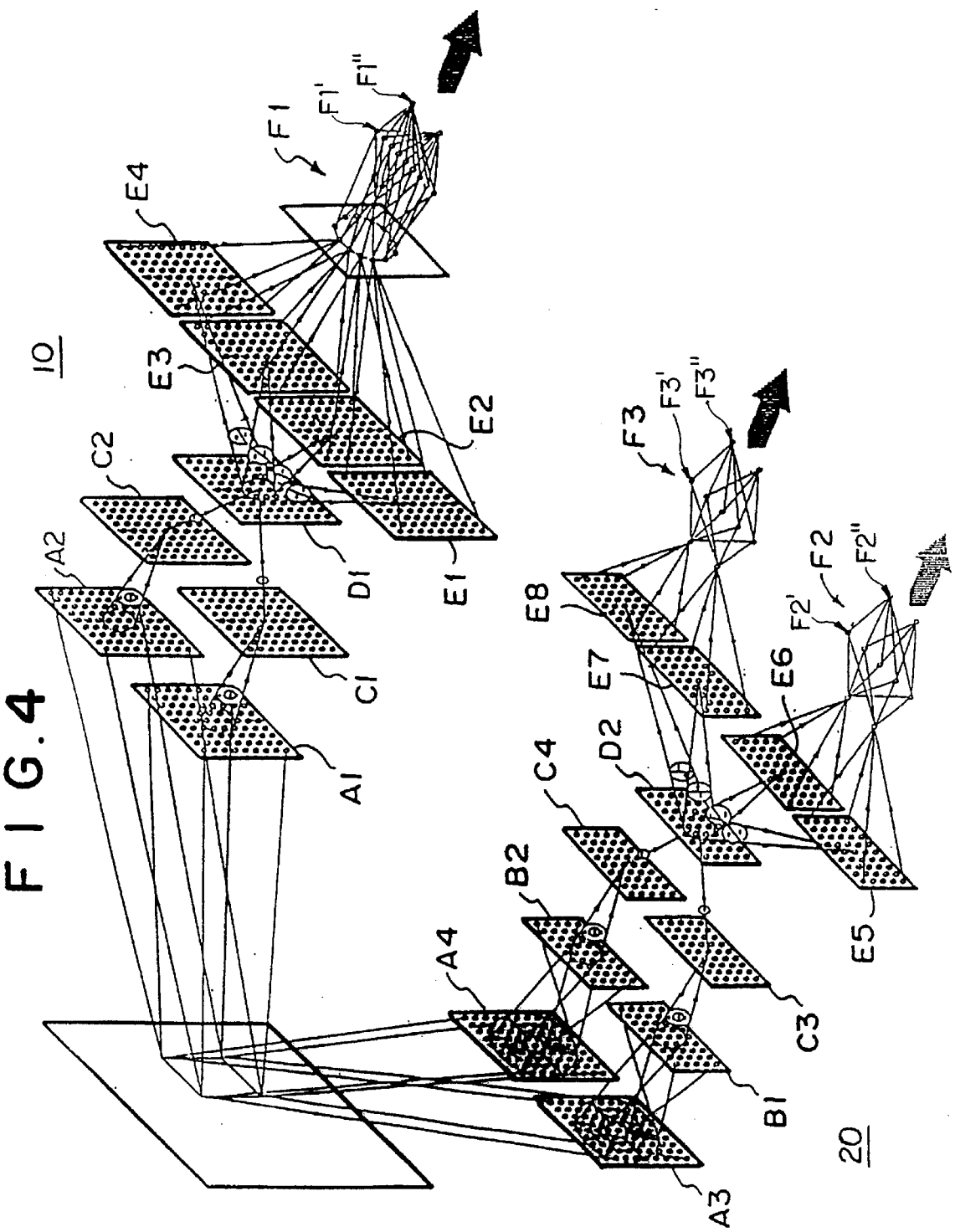

F I G.11A 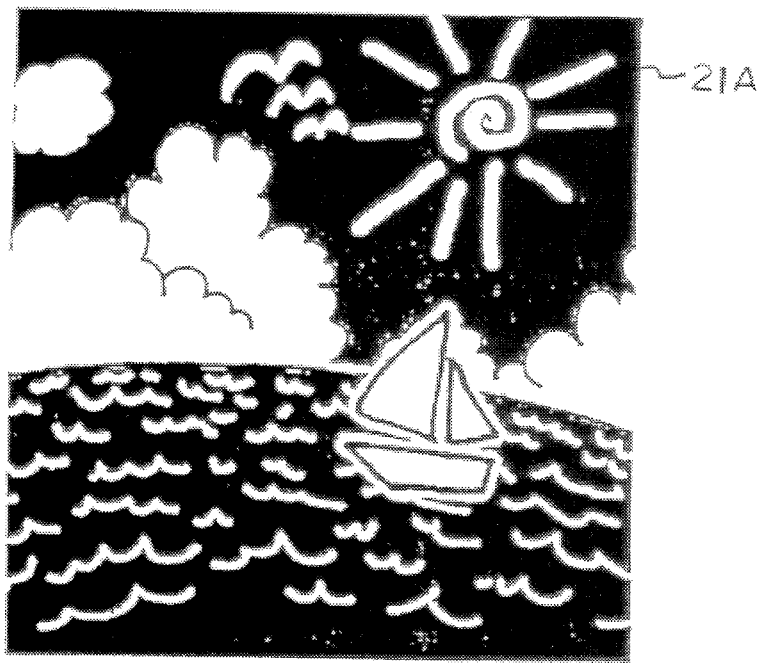
F I G.11B 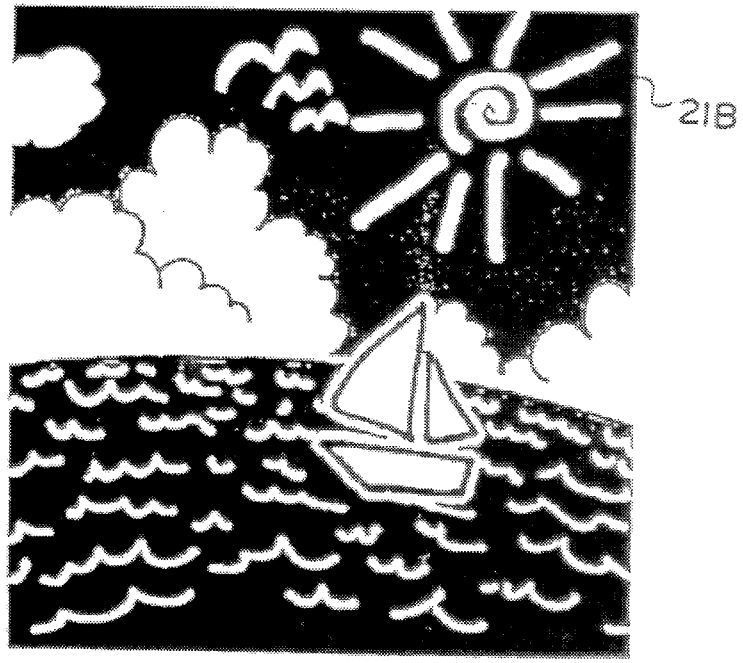

F I G. 14A
F I G. 14B

F I G. 19A
F I G. 19B
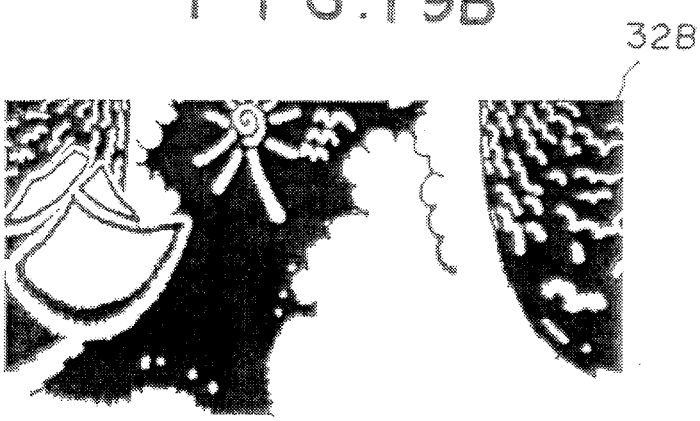

F I G. 21
F I G.22
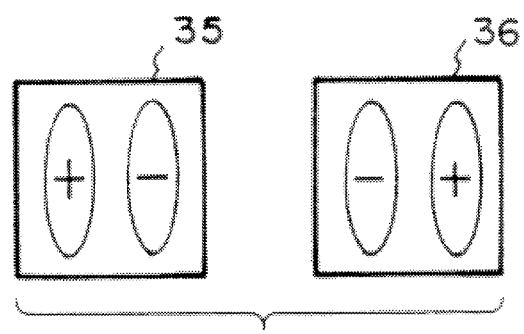

FIG.27

```
┌─────────────────────────────────────┐
│ NARROW THE CANDIDATES FOR THE       │
│ PREDETERMINED OBJECT IMAGE          │
│ DOWN                                │
└─────────────────────────────────────┘
                  │
                  ▼
┌─────────────────────────────────────┐
│ DETECT A SHIFT IN POS. BETWEEN      │
│ THE VIEW WINDOW AND THE             │
│ CANDIDATE FOR THE PREDETERMINED     │
│ OBJECT IMAGE, AND CALCULATE THE     │
│ AMOUNT OF TRAVEL OF THE             │
│ VIEW WINDOW                         │
└─────────────────────────────────────┘
```

FIG.29A  FIG.29B
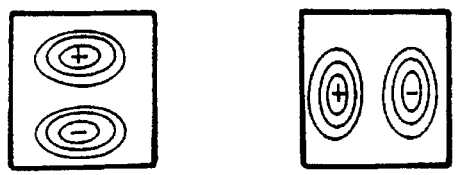
FIG.30A
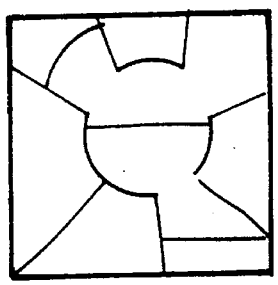
FIG.30B                FIG.30C
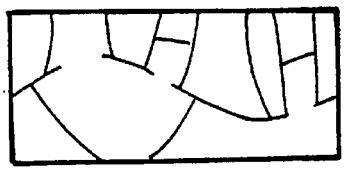   
FIG.30D                FIG.30E
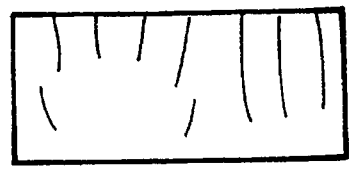   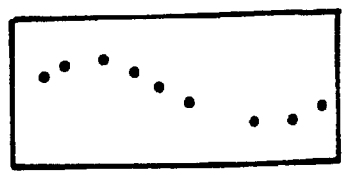
FIG.30F                FIG.30G
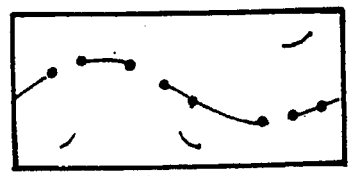   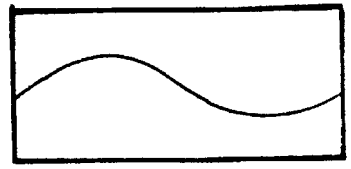

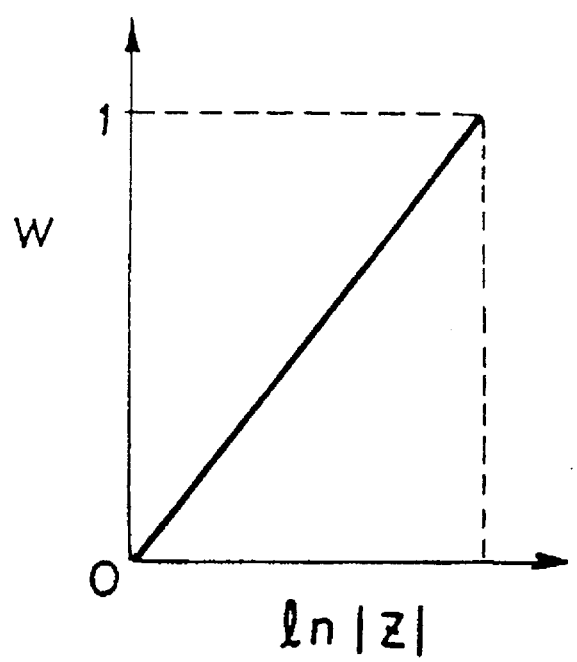
F I G. 37

F I G. 41
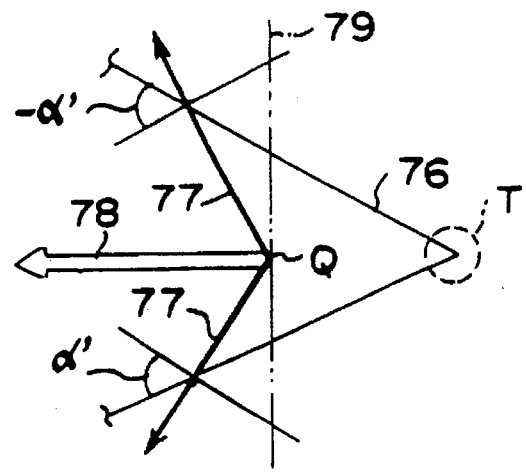
F I G. 42
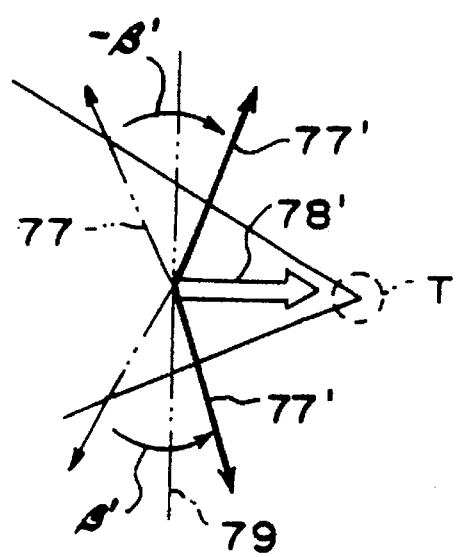

F I G. 52
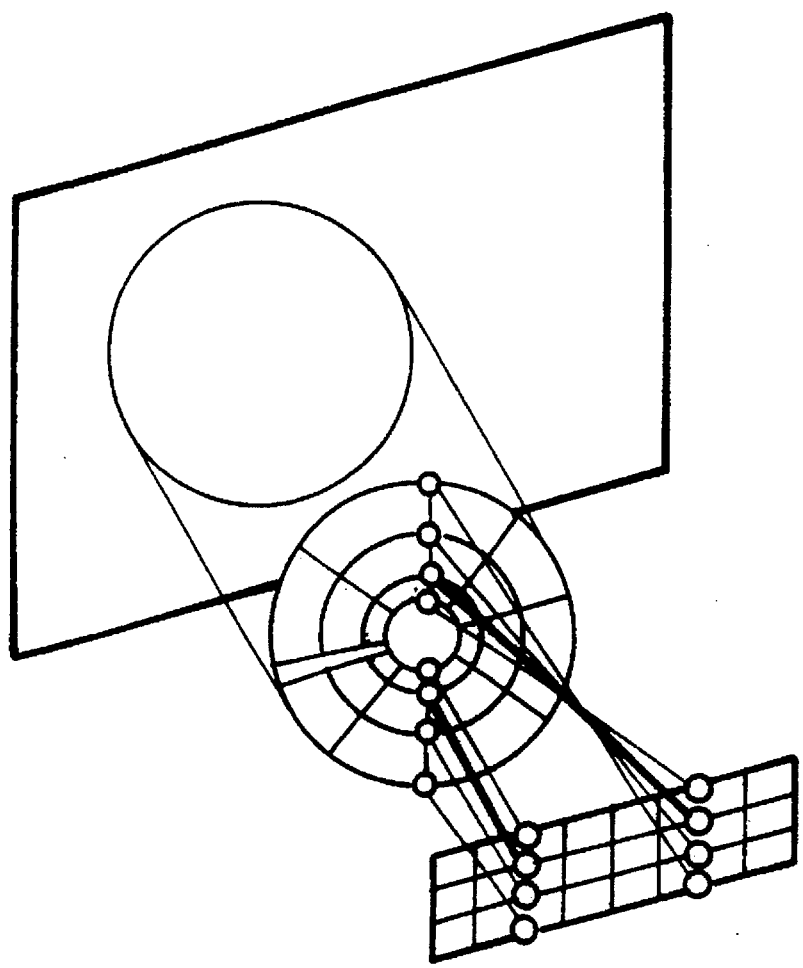

F I G.53A  F I G.53B
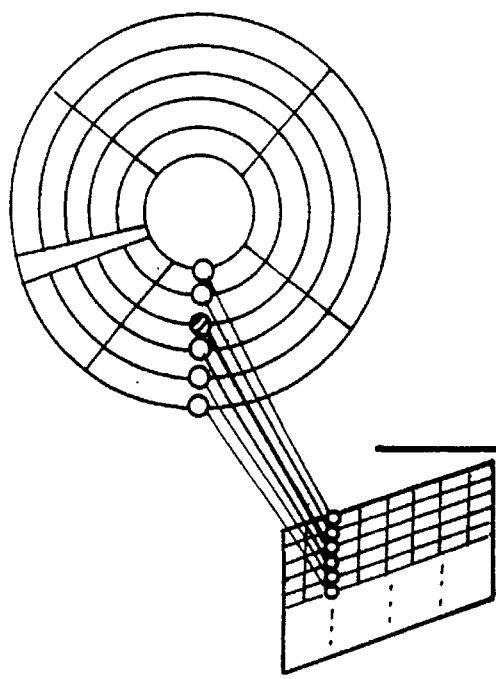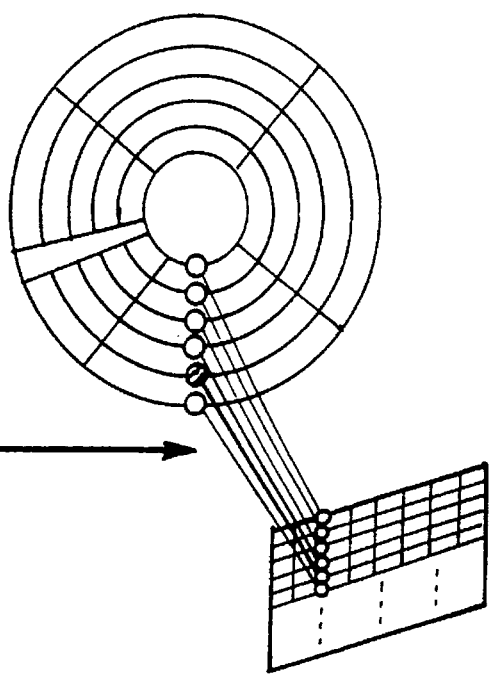
F I G.54A  F I G.54B
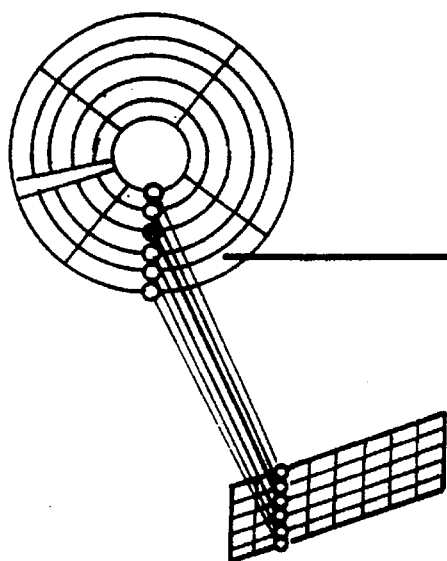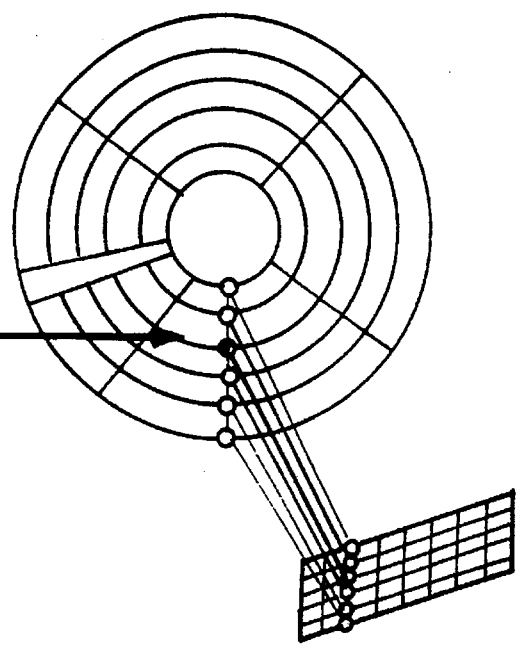

TO RETINAL
NEURON LAYER

F I G. 61A 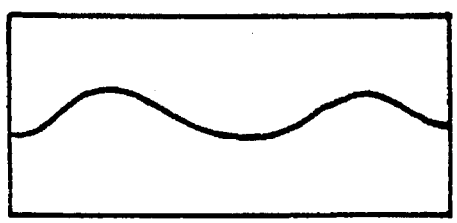  F I G. 61B 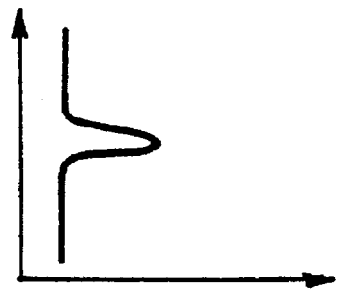

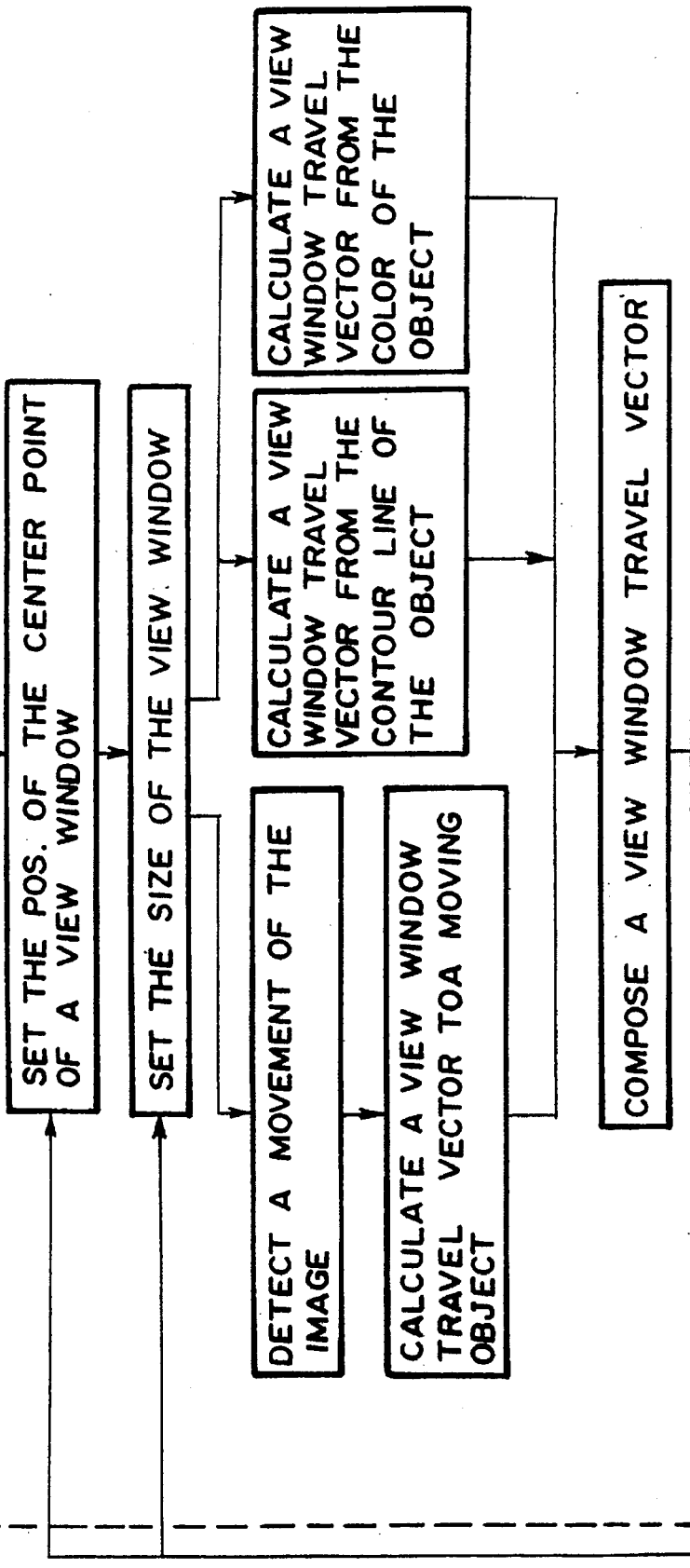

FIG.69A
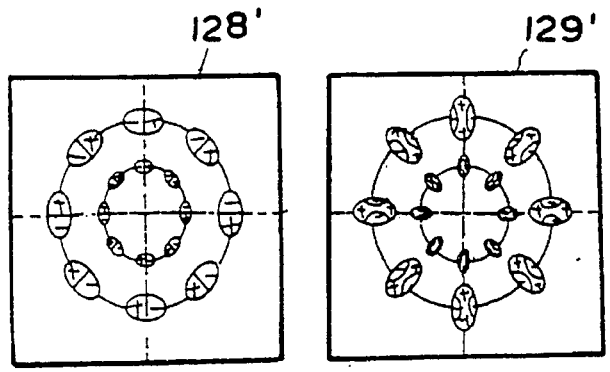
FIG.69B
FIG.69C
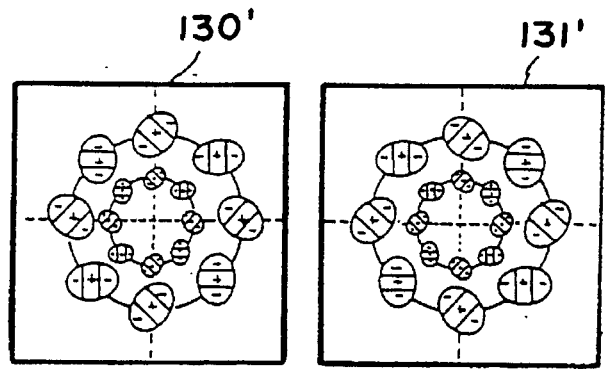
FIG.69D
FIG.70A
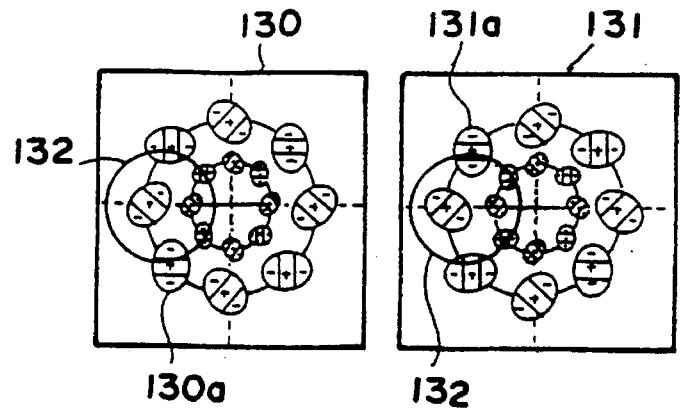
FIG.70B F I G. 76
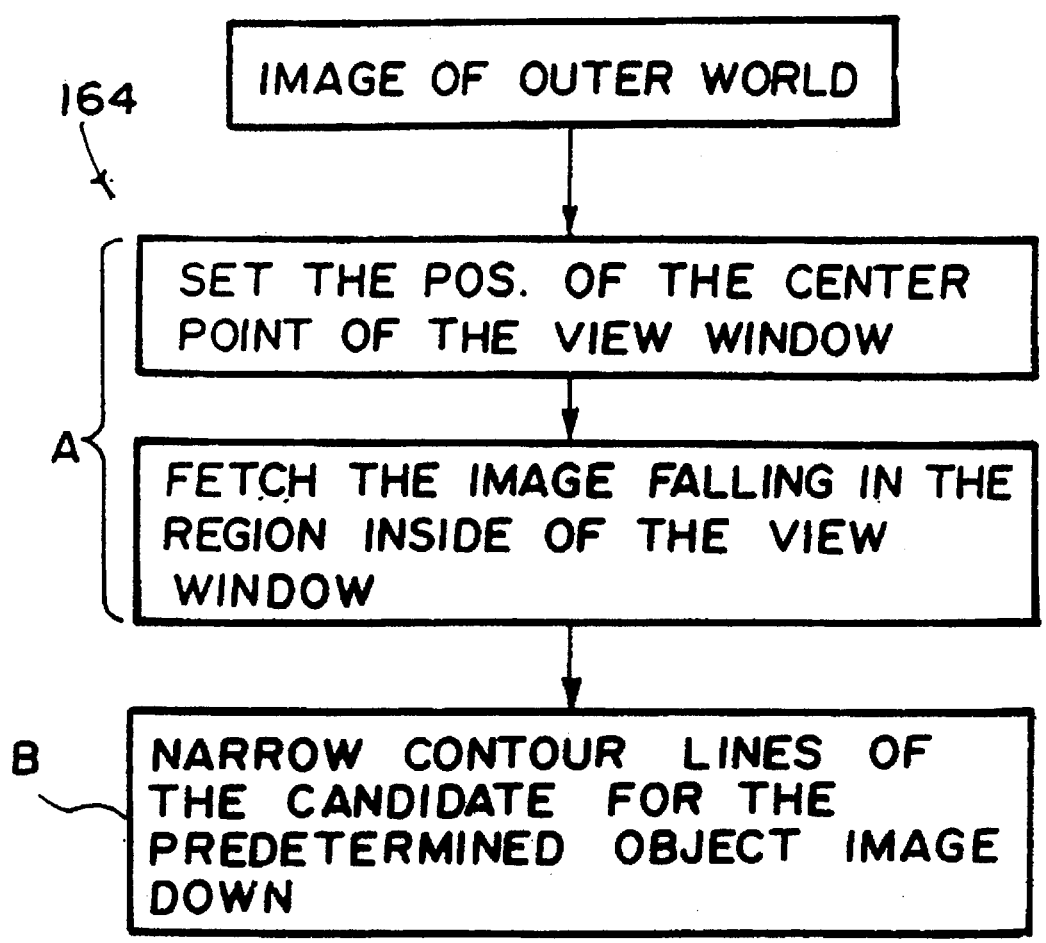

FIG. 81A
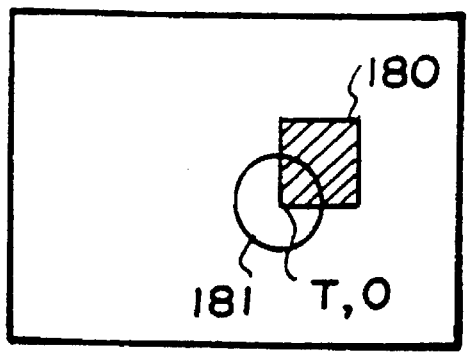  
FIG. 81B
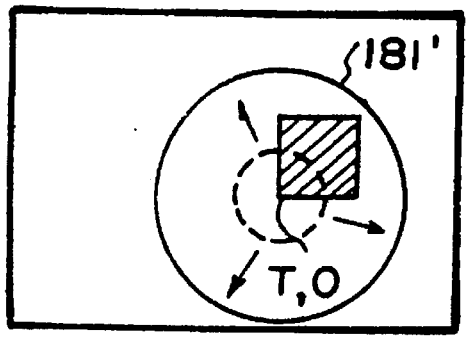  
FIG. 81C
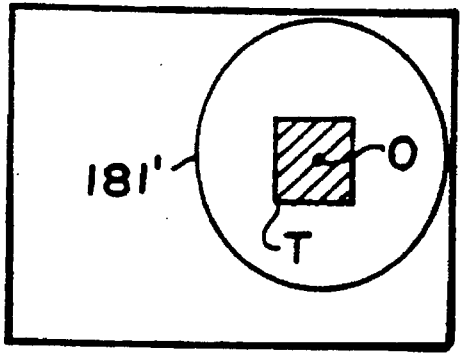 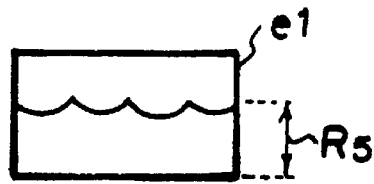 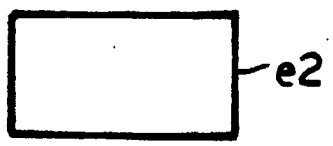
FIG. 81D
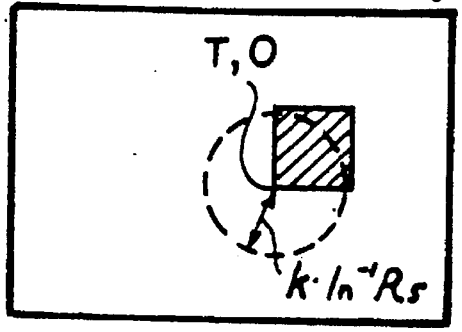

FIG. 87A 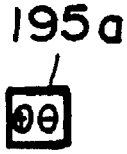 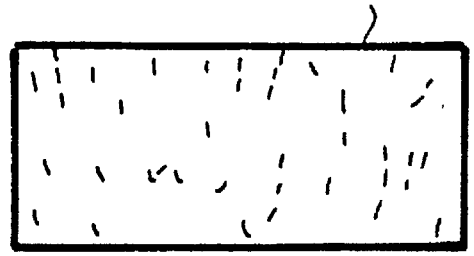
FIG. 87B  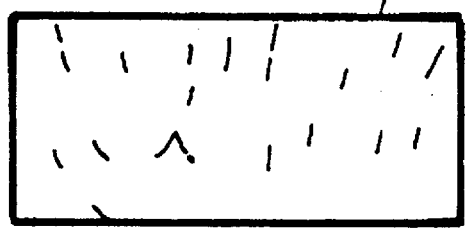
FIG. 87C 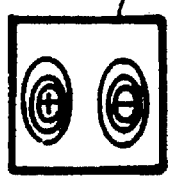 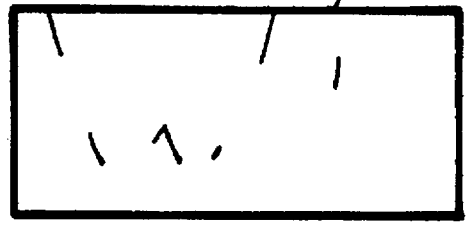

FIG. 88A  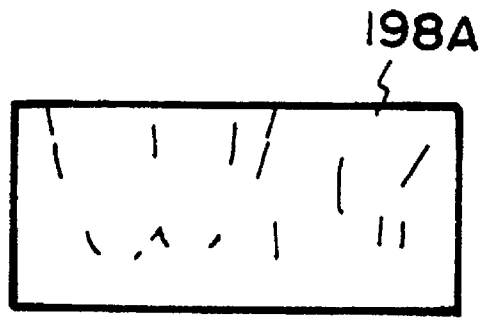
FIG. 88B 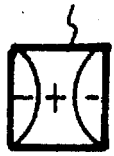 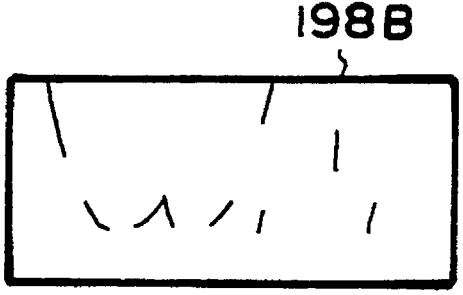
FIG. 88C 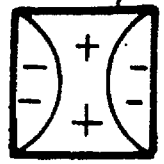 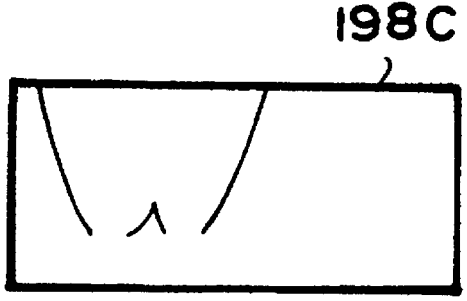

F I G. 89
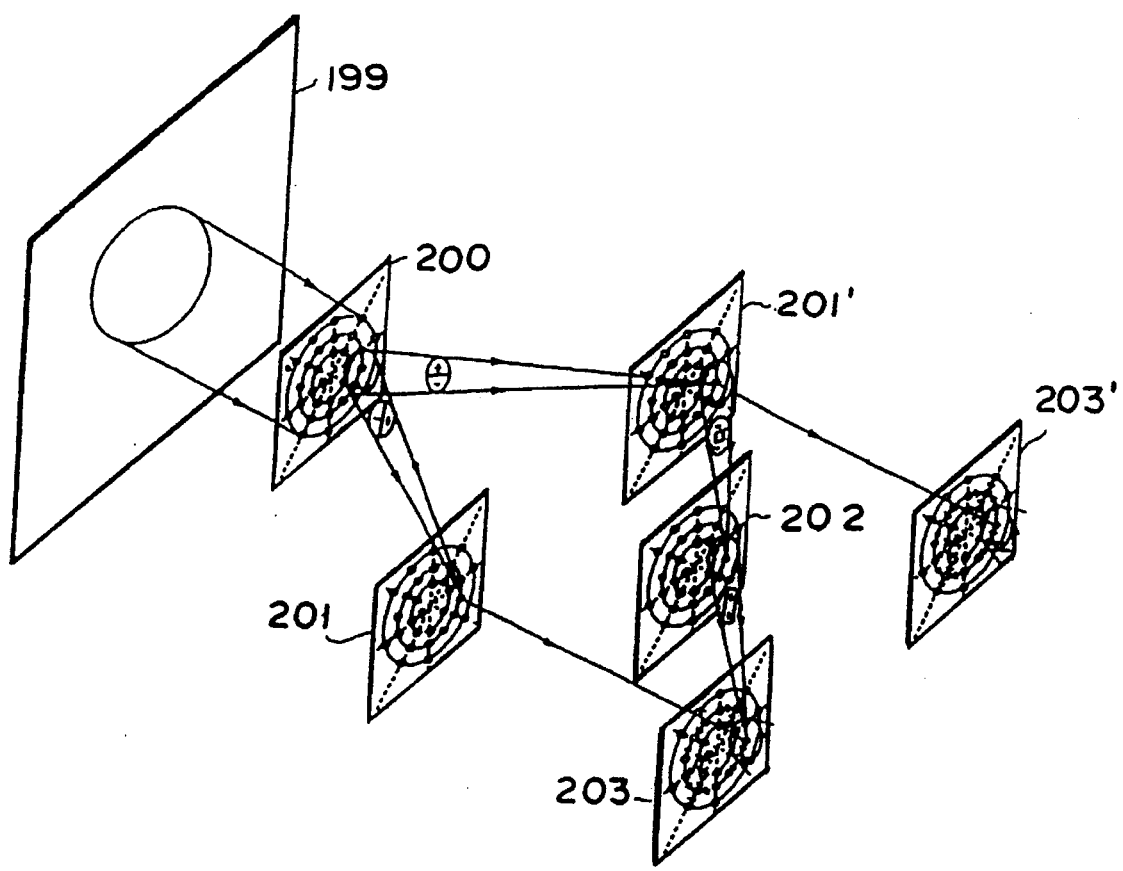

FIG. 91
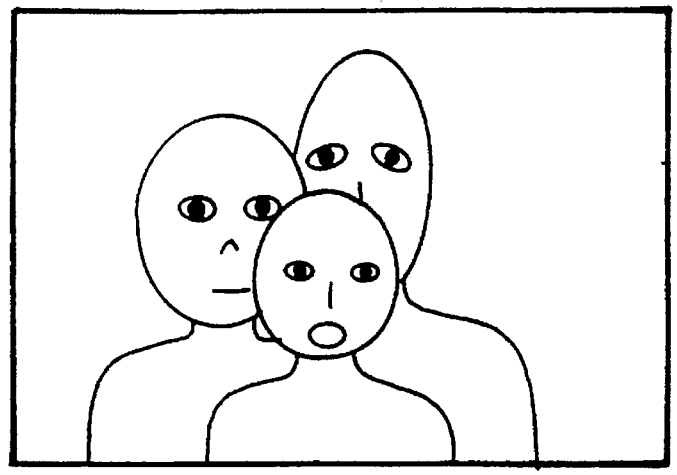
FIG. 92A
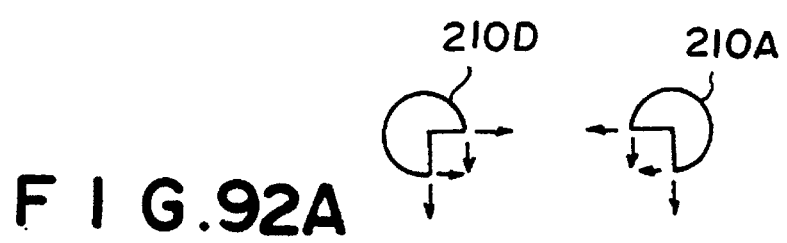
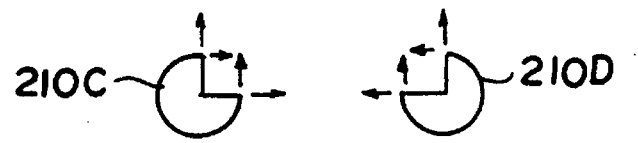
FIG. 92B
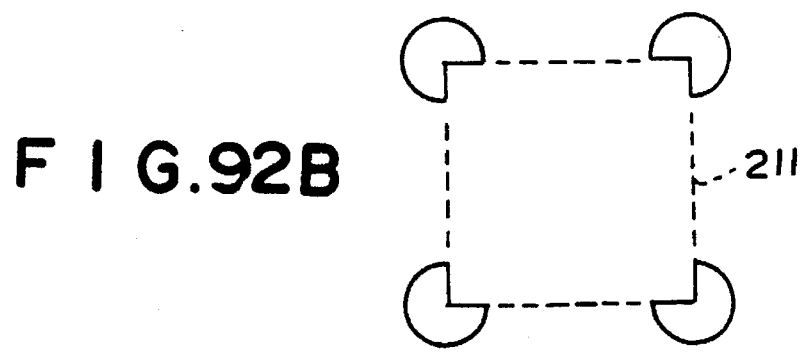

METHOD FOR EXTRACTING OBJECT IMAGES AND METHOD FOR DETECTING MOVEMENTS THEREOF

BACKGROUND OF THE INVENTION

1. Field of the Invention

This invention relates to a method for extracting an object image, wherein a predetermined object image is extracted from an image during processing of image information. This invention also relates to a method for detecting a gradient of a contour line field, wherein a gradient of a field is detected from a contour line of an object image, which is embedded in an image. This invention further relates to a method for extracting a contour line of an object image, wherein a contour line of a predetermined object image is extracted from an image. This invention still further relates to a method for detecting a gradient of an object image color field wherein, during processing of image information, information concerning a gradient of an object image field is detected, which field occurs from a color, a size, and a shape of the object image located in the vicinity of the region of view. This invention also relates to a method for detecting a movement of an image wherein, during processing of image information, a movement of an image occurring from a travel of an image input device (or a viewpoint) is detected, in particular, a method for detecting a movement of an entire image due to a travel of a viewpoint, which travel accompanies a movement of a human being or his eyeballs, or due to a travel of an image input device.

2. Description of the Prior Art

A human being views an image and recognizes what the thing embedded in the image is. It is known that this action can be divided into two steps. A first step is to carry out "discovery and extraction" by moving the viewpoint, setting a target of recognition at the center point of the visual field, and at the same time finding the size of the object. A second step is to make a judgment from a memory and a knowledge of the human being as to what the object present at the viewpoint is. Ordinarily, human beings iterate the two steps and thereby acquire information about the outer world.

On the other hand, in conventional techniques for recognizing a pattern by carrying out image processing, typically in pattern matching techniques, importance is attached only to the second step. Therefore, various limitations are imposed on the first step for "discovery and extraction." For example, it is necessary for a human being to intervene in order to cut out a target and normalize the size of the target. Also, as in the cases of automatic reading machines for postal code numbers, it is necessary for a target object to be placed at a predetermined position. As pattern recognizing techniques unaffected by a change in size and position of a target, various techniques have been proposed wherein a judgment is made from an invariable quantity. For example, a method utilizing a central moment, a method utilizing a Fourier description element, and a method utilizing a mean square error have been proposed. With such methods, for the purposes of recognition, it is necessary to carry out complicated integrating operations or coordinate transformation. Therefore, extremely large amounts of calculations are necessary in cases where it is unknown where a target object is located or in cases where a large image is processed. Also, with these methods, in cases where a plurality of objects are embedded in an image, there is the risk that their coexistence causes a noise to occur and causes errors to occur in recognizing the objects. Thus these methods are not satisfactory in practice.

As a model for recognizing a target object, which model is unaffected by the size of a target object or by a shift in position of a target object, a model utilizing a neocognitron, which is one of techniques for neural networks, has been proposed. The neocognitron is described by Fukushima in "Neocognitron: A Neural Network Model for a Mechanism of Pattern Recognition Unaffected by Shift in Position," Collected Papers of The Institute of Electronics and Communication Engineers of Japan, A, J62-A(10), pp. 658–565, October 1979. The neocognitron is based on the principle that pattern matching is carried out on a small part of a target object, a shift in position is assimilated at several stages with a layered architecture, and the shift in position is thereby tolerated. However, with such a principle, a limitation is naturally imposed on achievement of both the accurate recognition and the assimilation of the shift in position. It has been reported, for example, by Nagano in "Neural Net for Extracting Size Invariant Features," Computrol, No. 29, pp. 26–31, that the neocognitron can ordinarily tolerate only approximately four times of fluctuation in size. As for the shift in position, the neocognitron can tolerate only approximately two or three times the size of a target object. The tolerance capacity remains the same also in a recently proposed neocognitron model which is provided with a selective attention mechanism.

How the visual function of a human being carries out the first step has not yet been clarified. On the other hand, how the viewpoint moves has been clarified to some extent as described, for example, by Okewatari in "Visual and Auditory Information Processing in Living Body System," Information Processing, Vol. 23, No. 5, pp. 451–459, 1982, or by Sotoyama in "Structure and Function of Visual System", Information Processing, Vol. 26, No. 2, pp. 108–116, 1985. It is known that eyeball movements include a saccadic movement, a follow-up movement, and involuntary movement. Several models that simulate these eye movements have been proposed. For example, a model in which the viewpoint is moved to the side of a larger differential value of an image is proposed, for example, by Nakano in "Pattern Recognition Learning System," Image Information (I), 1987/1, pp. 31–37, or by Shiratori, et al. in "Simulation of Saccadic Movement by Pseudo-Retina Mask," Television Engineering Report, ITEJ Tec. Rep. Vol. 14, No. 36, pp. 25–30, ICS' 90-54, AIPS' 90-46, June 1990. Also, a model in which the viewpoint is moved to the side of a higher lightness is proposed, for example, by Hirahara, et al. in "Neural Net for Specifying a Viewpoint," Television Engineering Report, ITEJ Tec. Rep. Vol. 14, No. 33, pp. 25–30, VAI' 90-28, June 1990. Additionally, a model in which the viewpoint is moved to a point of a contour having a large curvature is proposed, for example, by Inui, et al. in Japanese Unexamined Patent Publication No. 2(1990)-138677. However, these proposed models are rather simple and do not well simulate the human visual function.

Also, for the purposes of finding a target of recognition and extracting a region including the whole target, instead of adhering only to local features of the target object, it is necessary that the movement of the viewpoint becomes stable (stationary) at the center point of the whole target. However, with the aforesaid conventional models, such an operation for stabilizing the viewpoint cannot be carried out. For example, with the model proposed by Shiratori, et al. wherein the pseudo-retina mask is utilized, the viewpoint moves forward and backward around the contour line of an object and does not become stable. Also, with the model proposed by Inui, et al., the viewpoint can ultimately catch only a feature point at a certain limited pert of en object. Additionally, most of the aforesaid conventional models requires, as a tacit precondition, that the background of an object is simple. Thus most of the aforesaid conventional models cannot be applied to natural images, such as ordinary photographic images.

As described above, various techniques have been proposed which enables satisfactory recognition of a target in cases where a human being intervenes in order to assimilate a shift in position of the target or a change in the size of the target or in cases where the position and the size of the target are normalized in advance. However, no excellent technique has yet been proposed, with which the entire target object image can be extracted from an image for the purposes of recognizing the object image.

In the field of techniques for extracting a predetermined object image from an image in accordance with contour lines of the object image, which is embedded in the image, and making judgments from the extracted object image as to the state of the image, attempts have heretofore been made to analyze in detail the relationship among many contour lines contained in the image, to compare the results of the analysis with knowledge given in advance, and to determine or discriminate, based on many combinations of contour lines, what contour lines of what object are contained in the image. In this manner, it becomes possible to know what thing is represented by a portion of the image.

Recently, there has been proposed the concept that, when an image is considered from points of view of various features, such as contour lines, luminance distributions, colors, end shapes, the so-called "field" of the image based on the features exists. Such concept is described in, for example, Japanese Patent Application No. 3(1991)-323344 for the invention, which is made by Ono and concerns extraction of a candidate for an object image with a map of a potential field.

From the point of view of contour lines of an object image, it may be considered that the so-called "contour line field" exists conceptually. As one example of the "contour line field," a conical field may be considered in which the field sinks towards the center point of an object surrounded by contour lines. As another example of the "contour line field," a conical field may be considered in which the field sinks towards the positions of contour lines themselves.

If information concerning a gradient of a contour line field is obtained, even if the total shape of the contour lines of the image is unknown, the information can be utilized in various fields of image processing. For example, the information concerning the gradient of the contour line field can be utilized in order to predict the direction towards the center point of an object, which is surrounded by a contour line, or to predict the direction along a contour line of an object. Also, the magnitude of a gradient value corresponds to the amount of image information at a corresponding position in the image. Therefore, the information concerning the gradient of the contour line field can be utilized during compression of the image information, or the like. Thus the information concerning the gradient of the contour line field is the image information capable of being utilized for a wide variety of purposes.

Only when many lines, which form an outer shape of an object image embedded in an image, are located with a significant positional relationship, it can be regarded that the lines constitute contour lines of a single object or a plurality of objects. In general, an image has contour lines of an object image and very many other lines. Lines other than the contour lines of an object image also occur due to a shadow of an object, which shadow is formed due to a slight influence of light, creases on the surface of an object, a pattern on the surface of an object, or the like. Selecting only the lines, which constitute contour lines, from the lines embedded in an image and eliminating the other lines are very important as techniques for pre-processing in various image processing steps. With one of typical methods for selecting the lines, which constitute contour lines, the relationship among many lines contained in an image is analyzed in detail. The results of the analysis are then compared with knowledge given in advance. Based on many combinations of lines, it is determined or discriminated what contour lines of what object are contained in the image.

Also, a method has been proposed wherein end points of contour lines are detected from a given image, and it is predicted that a contour of a target will be present in directions in which the end points and the contour lines intersect perpendicularly with each other. Such a method is proposed by, for example, Finkel L. H., et al. in "Integration of Distributed Cortical Systems by Reentry: A Computer Simulation of Interactive Functionally Segregated Visual Areas," JONS (1989), Vol. 9, No. 9, pp. 3188–3208. With the proposed method, even if an object recorded in a given image merges into the background, or even if the contrast of the image is low and contour lines of an object cannot be recognized, contour lines are formed from end points of contour lines embedded in the image, and the target is thereby extracted from the image. For example, as illustrated in FIG. 92A, in cases where objects 210A, 210B, 210C, and 210D are embedded in an image, the end points of these objects are extended. In this manner, as illustrated in FIG. 92B, contour lines of an object 211 are formed.

As described above, human beings extract an appropriate size of a target of recognition from an image of the outer world and thereafter efficiently carry out recognition processing. On the other hand, with the conventional methods, an attempt is made to recognize a target in an image of the outer world only with a single processing system. Therefore, problems occur in that very complicated procedures and a very long time are required. Also, problems occur in that it is necessary for a human being to intervene in the extraction of the target, or it is necessary for the background of the image to be simple. Accordingly, the conventional methods are not satisfactory in practice. These problems occur because no efficient method has heretofore been available for extracting a target object, which is to be recognized, from an image of the outer world, and the structure of the recognition system is such that a heavy burden is imposed on a judgment means of the recognition system.

Also, with the conventional methods described above, in cases where a plurality of target object images are embedded in an image, it often occurs that an object image, which has already been extracted, is again extracted. Such re-extraction of the object image, which has already been extracted, adversely affects the extraction of a target object image, which has not yet been extracted. Therefore, the efficiency, with which the extraction is carried out, cannot be kept high.

Additionally, with the conventional methods which simulate travel of the viewpoint, it often occurs that the viewpoint stops not only at a position, at which the viewpoint finds a target object, but also at a position, at which no target object is located. In such cases, it is necessary for a person to intervene such that the viewpoint may get away from the stop state at the position, at which no target object is located. Such problems also render the conventional methods unsatisfactory in practice.

Further, with the conventional methods described above, in cases where a small object different from a target object is encountered when the viewpoint travels over a given image towards the target object, it often occurs that the different object is recognized as the target object by mistake. In such cases, the viewpoint stops at the position of the different object end cannot travel towards the target object any more.

The aforesaid methods, wherein an object image is extracted from an image for the purposes of obtaining information concerning a gradient of a contour line field, have the drawbacks in that very large amounts of calculations are required. Also, if contour lines have missing parts, or if the shapes of the contour lines are incomplete, comparison with knowledge given in advance cannot be carried out appropriately. Consequently, the determination or discrimination about what contour lines of what object are contained in the image cannot be effected. Additionally, if a failure in discrimination occurs, the problems occur in that even information concerning parts of contour lines cannot be obtained.

Also, with the aforesaid models which simulate travel of the human viewpoint, importance is merely attached to portions of an image, at which differential values of the image are large or curvetures of contour lines are large. Such processes are too simple, and it is difficult to detect a contour line field with such processes.

The aforesaid methods, wherein only the lines, which constitute contour lines, are selected from lines embedded in an image, and the other lines are eliminated, have the drawbacks in that, as the number of the lines embedded in the image becomes large, enormous amounts of calculations are required for combinations of the lines. Also, if the lines have missing parts, or if the relationship between the lines is incomplete, an inconsistency will occur between the lines and the knowledge given in advance, and therefore comparison with the knowledge given in advance cannot be carried out appropriately. Consequently, the determinetion or discrimination of contour lines cannot be effected.

Additionally, it often occurs that a plurality of object images are embedded in a given image. For example, as in the cases of an image of a human face with a mask and a human face image recorded on the foreground side of a signpost image, a small object image may be located on the foreground side of a large object image and may overlap upon the large object image, or portions of object images may overlap one upon the other. In such cases, with the conventional methods described above, it is difficult to make a judgment as to which object image is to be taken as the target of extraction of contour lines. It is also difficult to extract the contour lines of both target object images independently of one another.

With the aforesaid method proposed by Finkel, et al., wherein end points of contour lines are detected, as indicated by the arrows in FIG. 92A, detecting operations are carried out on end points of contour lines, which end points may be located at all positions in all directions in an image from one end point of each of the objects 210A, 210B, 210C, and 210D. Also, the proposed method aims at predicting a contour line in every direction. Therefore, with the proposed method, in cases where a complicated image is given, prediction must be carried out on a wide variety of contour lines, and the contour lines of a target object cannot be accurately predicted and extracted.

SUMMARY OF THE INVENTION

The primary object of the present invention is to provide a method for extracting an object image, wherein a predetermined object image is extracted accurately and appropriately from a given image.

Another object of the present invention is to provide a method for extracting an object image wherein, even if a plurality of object images, which are to be extracted, are embedded in a given image, the object images are extracted efficiently such that an object image, which has already been extracted, may not be extracted again.

A further object of the present invention is to provide a method for extracting an object image, wherein a predetermined object image serving as a target object is extracted accurately and appropriately from a given image, the time required for operations is kept short and, even if a viewpoint stops, the viewpoint can get away from the stop state.

A still further object of the present invention is to provide a method for extracting an object image, wherein burden to steps next to an extraction step, such as a judgment step, in which a judgment is made as to whether an extracted candidate for a predetermined object image is or is not the predetermined object image, and a learning step is kept markedly light, and the performance of a processing system utilizing the method for extracting an object image in accordance with the present invention is thereby kept good.

Another object of the present invention is to provide a method for extracting an object image, wherein extracting operations are carried out only on a limited region inside of a view window, i.e., only on a candidate for a predetermined object image, and the scale of operations is thereby kept small even for an image having a large size.

A further object of the present invention is to provide a method for extracting an object image wherein, in a system in which an image input device, such as a camera, itself moves, a view window is caused to travel towards an object, which is embedded in an image and show a movement different from the movement of a background, end the object is thereby extracted from the image.

A still further object of the present invention is to provide a method for extracting an object image, wherein a candidate for a predetermined object image is extracted accurately from an image, the center point of a view window is prevented from stopping when the center point of the view window is likely to stop at the position of an object, which is different from the candidate for the predetermined object image, during travel of the center point of the view window over the image towards the candidate for the predetermined object image, and the center point of the view window is thereby caused to travel efficiently such that the candidate for the predetermined object image may be extracted efficiently.

Another object of the present invention is to provide a method for extracting an object image, wherein a neural network is employed in order to extract a candidate for a predetermined object image and to prevent the center point of a view window from stopping (e.g., with an annealing process or the addition of an inertia term), the candidate for the predetermined object image is thereby extracted more accurately, and the performance of a processing system utilizing the method for extracting an object image in accordance with the present invention is thereby kept good.

A further object of the present invention is to provide a method for extracting an object image, wherein types of directions, to which a view window is to travel, are set, the respective directions are detected independently of each other, outputs of a neural network for causing the view window to travel towards the respective directions are utilized in a well balanced manner, and extraction of an object image ie thereby carried out with a high degree of freedom in accordance with the purposes, such as discrimination or learning operations, for which the extrateed object image is to be utilized.

A still further object of the present invention is to provide a method for extracting an object image, wherein a map of a potential field is created from gradients of the potential field over the entire area of an image, a minimum point of the potential field, i.e., the center point of a candidate for a predetermined object image, is easily and quickly found from the map of the potential field, the candidate for the predetermined object image is extracted in accordance with the size and/or the shape of the candidate for the predetermined object image by taking the minimum point as a reference, and the extraction of the candidate for the predetermined object image is thereby carried out very efficiently.

Another object of the present invention is to provide a method for detecting a gradient of a contour line field, wherein pieces of information representing portions of a contour line of an object image, which is embedded in an image, are detected efficiently, the relationships among positions of the portions of the contour line represented by the detected pieces of information are utilized together, and information concerning the gradient of a contour line field is thereby obtained with a very simple architecture.

A further object of the present invention is to provide a method for detecting a gradient of a contour line field, with which the burden to a process for extracting an object image by predicting the direction towards the center point of the object image, a process for predicting the direction along a contour line of an object image, a process for compressing image information, or the like, is kept markedly light, the time required for operations is kept short, and the performance of a processing system utilizing the method for detecting a gradient of a contour line field in accordance with the present invention is thereby kept good.

A still further object of the present invention is to provide a method for extracting a contour line of an object image, wherein a contour line of a predetermined object image is extracted accurately and appropriately from a given image, the extracted line being capable of being utilized for travel of a view window, detection of a gradient of a field of the image, or extraction of an object image, and the time required for operations is kept short.

Another object of the present invention is to provide a method for extracting a contour line of an object image wherein, even if a contour line of a candidate for a predetermined object image is unclear, contour lines detected for the candidate for the predetermined object image are narrowed down by detecting end points of radial lines, which are blocked by the candidate for the predetermined object image, and the contour line of the candidate for the predetermined object image is thereby accurately extracted from the given image.

A further object of the present invention is to provide a method for extracting a contour line of an object image wherein, even from an image in which a plurality of candidates for predetermined object images are embedded such that at least portions of the candidates overlap one upon another, all of the contour lines of the candidates for the predetermined object images are extracted accurately and independently of one another.

A still further object of the present invention is to provide a method for extracting a contour line of an object image, wherein contour lines of candidates for predetermined object images having different sizes end/or shapes are extracted as those having approximately identical sizes and/or shapes, burden to a step, which is carried out after the extraction of the contour line of the object image in order to move a view window or to detect a gradient of a field, is thereby kept light, and appropriate travel of the view window or appropriate detection of the gradient of the field are enabled.

Another object of the present invention is to provide a method for detecting a gradient of an object image color field, wherein a concept of an "object color field" formed by a color of an object and the shape and the size of the color region is utilized, a gradient of the "object color field" is detected and wherein, even if a plurality of important color regions or objects are present, an object considered as being most important is selected, and a gradient of the "object color field" directed towards the selected object is detected.

A further object of the present invention is to provide a method for detecting a movement of an image, wherein a movement of an image is detected from the moving image, and a movement of a background is compensated for in accordance with information representing the movement of the image.

The present invention provides a first method for extracting an object image, in which an extraction area for extraction of a candidate for a predetermined object image from an image is determined, the method for extracting an object image comprising the steps of:
   i) causing the center point of a view window, which has a predetermined size, to travel to the position of the candidate for the predetermined object image, and
   ii) determining the extraction area in accordance with the size and/or the shape of the candidate for the predetermined object image, the center point of the view window being taken as a reference during the determination of the extraction area.

The present invention also provides a second method for extracting an object image, in which an extraction area for extraction of a candidate for a predetermined object image from an image is determined, the method for extracting an object image comprising the steps of:
   a) cutting out an image, which falls in the region inside of a view window having a predetermined size, from the image,
   b) finding azimuths and intensities of components, such as a color and contour lines, of the candidate for the predetermined object image with respect to the center point of the view window, the azimuths and the intensities being found as azimuth vectors from a movement of the whole cut-out image or of a whole complex-log mapped image, which is obtained from transformation of the cut-out image with complex-log mapping, the color of the candidate for the predetermined object image included in the cut-out image, and/or tilts of the contour lines of the candidate for the predetermined object image included in the cut-out image,
   c) composing a vector from the azimuth vectors, a vector for a travel of the view window being thereby determined,
   d) causing the center point of the view window to travel in accordance with the vector for the travel of the view window, and
   e) determining the extraction area in accordance with the size and/or the shape of the candidate for the predetermined object image, the center point of the view window being taken as a reference during the determination of the extraction area.

As an embodiment of the second method for extracting an object image in accordance with the present invention, the present invention further provides a third method for extracting an object image wherein, after a plurality of contour lines are detected from the cut-out image, of the plurality of the contour lines thus detected, contour lines having a high level of continuity in approximately the same direction as a predetermined direction and/or contour lines having a high intensity are caused to cooperate with one another and are thereby emphasized, the contour lines having a high level of continuity and/or the contour lines having a high intensity and contour lines having a low level of continuity in approximately the same direction as the predetermined direction and/or contour lines having a low intensity are caused to compete with each other, whereby the contour lines having a low level of continuity and/or the contour lines having a low intensity are erased, from en emphasized contour line, which has been formed by the emphasis of the contour lines having a high level of continuity and/or the contour lines having a high intensity, all of components of the emphasized contour line, which are tilted at a predetermined angle with respect to circumferential directions of concentric circles surrounding the center point of the view window, are extracted, of a plurality of regions approximately coinciding in color with the candidate for the predetermined object image, regions, which exhibit a high degree of coincidence in color with the candidate for the predetermined object image and are located at positions close to one another, are caused to cooperate with each other and are thereby emphasized, a region, which exhibits a high degree of coincidence in color with the candidate for the predetermined object image, and a region, which exhibits a low degree of coincidence in color with the candidate for the predetermined object image and is located at a position spaced apart from the region exhibiting a high degree of coincidence in color with the candidate for the predetermined object image, are caused to compete with each other, the region, which exhibits a low degree of coincidence in color with the candidate for the predetermined object image, being thereby erased, regions, which exhibit a high degree of coincidence in color with the candidate for the predetermined object image and are located at positions spaced apart from each other, are caused to compete with each other, a region exhibiting a high degree of coincidence in color with the candidate for the predetermined object image, which region has a size and a shape appropriate for the region to be selected, is kept unerased, whereas a region exhibiting a high degree of coincidence in color with the candidate for the predetermined object image, which region has a size and a shape inappropriate for the region to be selected, is erased, whereby a region, which is most appropriate in the region inside of the view window, is selected as a predetermined object image region, and an azimuth and a distance of the selected object image region are detected with respect to the center point of the view window.

The present invention still further provides a fourth method for extracting an object image, wherein thermal fluctuations are added to the vector for the travel of the view window by using an annealing process for a neural network, or the like, whereby the center point of the view window is prevented from stopping at a position other than the position of the candidate for the predetermined object image on the image during the travel of the center point of the view window towards the position of the candidate for the predetermined object image on the image.

With the annealing process, when a certain neuron in the neural network receives an input signal and generates an output, the input-out transfer characteristics of the neuron are modified such that the neuron may not generate an output in accordance with the function of the original input-out transfer characteristics of the neuron, but may generate an output containing thermal fluctuations, i.e., an output containing noise. The level of noise contained in the output is represented by the level of temperature. By the increase or decrease of the temperature, the state of the system of the neural network is prevented from falling into a stable state and is shifted to a different stable state. For example, in cases where the input-output transfer characteristics of a neuron are represented by a sigmoid function, if the thermal fluctuations are zero, the input-output transfer characteristics of the neuron will be indicated by a curve shown in FIG. 93A. If the thermal fluctuations are added to the output of the neuron, the input-output transfer characteristics of the neuron are obtained, which include errors as shown in FIG. 93B. Specifically, the output of the neuron can be caused to fluctuate probabilistically within the range indicated by the hatching in FIG. 93B. The process for increasing the amounts of the thermal fluctuations, i.e., the process for increasing the temperature and then decreasing it little by little, is similar to the annealing process, with which metal material, or the like, is heated and then cooled little by little for the purposes of removing internal defects. Therefore, the process for adding the thermal fluctuations to the output of a neuron is referred to as annealing process. When the amounts of thermal fluctuations are large, i.e., when the temperature is set at a high temperature, the output of the neuron contains errors. Therefore, by virtue of errors, the neural network can get away from the stable The present invention also provides a fifth method for extracting an object image wherein, after the candidate for the predetermined object image has been extracted, a process for preventing re-extraction of the candidate for the predetermined object image, such as a masking process, is carried out on a region in the image, from which region the candidate for the predetermined object image has been extracted.

The present invention further provides a sixth method for extracting an object image wherein an image, which falls in a region inside of a view window having a predetermined size, is cut out from an image, a vector for a travel of the view window is composed from the cut-out image, the center point of the view window is caused to travel in accordance with the vector for the travel of the view window, when the center point of the view window stopped, a judgment is made as to whether a candidate for a predetermined object image is or is not contained in the image falling within the region inside of the view window, and the candidate for the predetermined object image is extracted in cases where it is judged that the candidate for the predetermined object image is contained in the image falling within the region inside of the view window, the method for extracting an object image comprising the steps of:

i) transferring the center point of the view window to a different position on the image after the candidate for the predetermined object image has been extracted or in cases where it is judged that no candidate for the predetermined object image is contained in the image falling within the region inside of the view window, and ii) thereafter, from the position to which the center point of the view window has been transferred, iterating the cutting out, the composition of the vector for the travel of the view window, the travel of the center point of the view window, and the judgment.

Also, in an embodiment of the method for extracting an object image in accordance with the present invention, each of steps for carrying out the extraction is carried out by using a neural network.

The present invention still further provides a seventh method for extracting an object image, in which an extraction area for extraction of a candidate for a predetermined object image from an image is determined, the method for extracting an object image comprising the steps of:

i) creating a map of a potential field of the whole area of the image, and ii) determining the extraction area in accordance with the size and/or the shape of the candidate for the predetermined object image, a minimum point of the potential in the map being taken as a reference during the determination of the extraction area.

The present invention also provides an eighth method for extracting an object image, in which an extraction area for extraction of a candidate for a predetermined object image from an image is determined, the method for extracting an object image comprising the steps of:

i) taking the vectors for the travel of the view window, which are determined with, for example, the aforesaid first method for extracting an object image in accordance with the present invention, as gradient vectors of a potential field, recording the gradient vectors of the potential field on the whole image, and thereby creating a map of the potential field, and ii) determining the extraction area in accordance with the size and/or the shape of the candidate for the predetermined object image, a minimum point of the potential in the map being taken as a reference during the determination of the extraction area.

What the term "potential field" as used herein means will be described hereinbelow. When a human being views an image, he will look around the image and will move him viewpoint to a predetermined object image embedded in the image (e.g., to a face image in cases where an image constituted of a human face image and a background representing the sky is viewed). Thereafter, he will recognize that the thing present at the viewpoint is the face image. When the viewpoint is currently located at a position spaced apart from the predetermined object image, it is necessary for the viewpoint to be moved a long distance towards the predetermined object image on the image. When the viewpoint is currently located at a position near the predetermined object image, the viewpoint need to travel only a short distance in order to reach the predetermined object image. At the position of the predetermined object image, the viewpoint becomes stable. Specifically, if the direction and the amount in which the viewpoint is to travel is expressed as a vector for the travel of the viewpoint, the vector for the travel of the viewpoint will represent the direction of the viewpoint stabilizing point and the amount of travel thereto, which are taken from the current position of the viewpoint. At the viewpoint stabilizing point, i.e., at the center point of the predetermined object image, the vector for the travel of the viewpoint is zero. If it is considered that the image has a "field" of stability of the viewpoint, the "field" is flat at the viewpoint stabilizing point and is gradient at a point, at which the viewpoint is unstable and from which the viewpoint is required to travel in order to become stable. As described above, it can be regarded that the vector for the travel of the viewpoint represents the gradient of the "field." Also, it can be regarded that the travel of the viewpoint is equivalent to the movement to the side of a lower potential in the "field." The "field" of stability of the viewpoint is herein referred to as the "potential field."

As described above, the map of the potential field over the whole image is created from gradient vectors of the potential field, which are calculated at respective positions of the whole image. Specifically, the vectors for the travel of the human viewpoint are taken as the gradient vectors of the potential field, and it is regarded that the potential field is inclined to the direction, to which each gradient vector of the potential field is directed. The gradients of the field are recorded on the whole image such that the gradient vector of the potential field may be zero, i.e., the potential field may be minimum, at the center point of the candidate for the predetermined object image. From the map created in this manner, it can be understood easily which path the viewpoint at a current position on the image will follow in order to fall into the minimum point of the potential field. The extraction area is determined in accordance with the size and/or the shape of the candidate for the predetermined object image by taking the minimum point of the potential as a reference.

The method for extracting an object image in accordance with the present invention may be embodied in various ways as defined in Claims 2 through 145, and reference should herein be made thereto.

The present invention further provides a method for detecting a gradient of a contour line field, wherein a vector is composed from azimuth vectors, which have been detected with one of the aforesaid methods for extracting an object image in accordance with the present invention, the composed vector thus obtained being taken as a gradient vector of a contour line field. Embodiments for detecting the azimuth vectors in the method for detecting a gradient of a contour line field in accordance with the present invention are defined in Claims 146 through 153 and are the same as the steps for detecting the azimuth vectors in the aforesaid methods for extracting an object image in accordance with the present invention.

The present invention still further provides a method for extracting a contour line of an object image wherein, as in the aforesaid third method for extracting an object image in accordance with the present invention, detected contour lines, i.e., lines formed by an object image embedded in an image, are subjected to competition and cooperation, and a contour line which has thus been emphasized is taken as a contour line of a candidate for a predetermined object image and is extracted.

The present invention also provides a method for extracting a contour line of an object image, wherein the detection of the contour lines in the aforesaid third method for extracting an object image in accordance with the present invention, i.e., the detection of lines formed by an object image embedded in an image, is carried out with each of a plurality of synoptic weights patterns for detecting contour lines, which patterns have sizes differing stepwise, by carrying out a convolution on the cut-out image by use of each of the plurality of the synaptic weights patterns for detecting contour lines, and the emphasis and erasing of the detected lines are carried out by the steps of:

a) carrying out a convolution on each of groups of the lines, which groups have been detected with the respective synaptic weights patterns for detecting contour lines, by use of each of a plurality of synaptic weights patterns for competition and cooperation, which patterns have sizes corresponding to the sizes of the synaptic weights patterns for detecting contour lines, and b) causing groups of lines, each of which groups has been emphasized with each of the synaptic weights patterns for competition and cooperation, to compete and cooperate with one another.

The present invention further provides a method for extracting a contour line of an object image, wherein a contour line of a candidate for a predetermined object image is extracted from an image, the method for extracting a contour line of an object image comprising the steps of:

i) cutting out an image, which falls in a region inside of a view window having a predetermined size, from the image, ii) detecting lines, which extend in a radial direction and/or in an annular direction with respect to the center point of the view window, from the cut-out image, iii) detecting end points of the detected lines, which extend in the radial direction, and iv) forming a contour line of the candidate for the predetermined object image, which line extends in the annular direction, in accordance with the detected end points.

The present invention still further provides a method for extracting a contour line of an object image, wherein contour lines of a plurality of candidates for predetermined object images are extracted from an image, in which the plurality of the candidates for predetermined object images are embedded such that at least portions of the plurality of the candidates for predetermined object images may overlap one upon another, the method for extracting a contour line of an object image comprising the steps of:

i) cutting out an image, which falls in a region inside of a view window having a predetermined size, from the image, ii) detecting lines, which extend in a predetermined direction with respect to the center point of the view window, from the cut-out image, iii) of the lines which have thus been detected, causing lines having a high level of continuity in approximately the same direction as the predetermined direction and/or lines having a high intensity to cooperate with one another, whereby the lines having a high level of continuity and/or the lines having a high intensity are emphasized, causing the lines having a high level of continuity and/or the lines having a high intensity and lines having a low level of continuity in approximately the same direction as the predetermined direction and/or lines having a low intensity to compete with each other, whereby the lines having a low level of continuity and/or the lines having a low intensity are erased, a contour line of s single candidate for a predetermined object image among the plurality of the candidates for predetermined object images being thereby extracted, iv) carrying out a process for preventing re-extraction on the extracted contour line of the single candidate for the predetermined object image, and v) iterating extraction of a new contour line of a new candidate for a predetermined object image, which contour line is different from the extracted contour line of the single candidate for the predetermined object image, the extraction being carried out by emphasizing lines, which are different from the emphasized lines, and a process for preventing re-extraction, which process is carried out on the new extracted contour line of the new candidate for the predetermined object image, until contour lines of all of the plurality of the candidates for predetermined object images are extracted.

The present invention also provides a method for extracting a contour line of an object image, wherein a contour line of a candidate for a predetermined object image is extracted from an image, the method for extracting a contour line of an object image comprising the steps of:

i) normalizing the size and/or the shape of the candidate for the predetermined object image by taking the center point of m view window, which has a predetermined size, and a contour line of the candidate for the predetermined object image as reference, and ii) thereafter extracting a contour line of the normalized candidate for the predetermined object image.

The method for extracting a contour line of an object image in accordance with the present invention may be embodied in various ways as defined in Claims 154 through 169, and reference should herein be made thereto.

The present invention further provides a method for detecting a gradient of an object image color field, wherein a gradient vector of an object image color field is detected from an azimuth and a distance of a region, which is detected in accordance with the degree of coincidence in color in the aforesaid method for extracting an object image in accordance with the present invention.

The present invention still further provides a method for detecting a movement of an image, which is characterized by the steps for detecting the movement of the image in the aforesaid method for extracting an object image in accordance with the present invention.

With the method for extracting an object image, in which an extraction area for extraction of a candidate for a predetermined object image from an image is determined, the center point of the view window, which has a predetermined size, is caused to travel to the position of the candidate for the predetermined object image, and the extraction area ie determined in accordance with the size and/or the shape of the candidate for the predetermined object image. During the determination of the extraction area, the center point of the view window is taken as a reference. Therefore, not only a specific object image but also a predetermined object image having any shape can be extracted. Also, even if the background of the candidate for the predetermined object image in the given image is complicated, the candidate for the predetermined object image can be extracted appropriately.

Alternatively, an image, which falls in the region inside of the view window having a predetermined size, may be cut out from the image, and a contour line of the candidate for the predetermined object image may be detected from the cut-out image. Thereafter, contour line components, which are tilted at a predetermined angle with respect to circumferential directions of concentric circles surrounding the center point of the view window, are extracted from the contour line of the candidate for the predetermined object image. Azimuth vectors are detected from these contour line components. If necessary, phase shifts at predetermined angles or weights are applied to the azimuth vectors. A vector is then composed from the azimuth vectors, and a vector for the travel of the view window is thereby determined. In this manner, the direction, to which the center point of the view window should travel, is determined. The extraction area is then determined in accordance with the size and/or the shape of the candidate for the predetermined object image, the center point of the view window being taken as a reference during the determination of the extraction area. In cases where the cut-out image is transformed with the complex-log mapping, the candidate for the predetermined object image can be extracted in the same manner as that when the extraction of the candidate for the predetermined object image is carried out in the Cartesian plane. Also, processing need be carried out only for a limited pert of the image, in which the candidate for the predetermined object image is embedded, and therefore the operation time can be kept short.

As another alternative, after a plurality of contour lines of the candidate for the predetermined object image are detected, of the plurality of the contour lines thus detected, contour lines having a high level of continuity in approximately the same direction as a predetermined direction and/or contour lines having a high intensity may be caused to cooperate with one another and may thereby be emphasized. The contour lines having a high level of continuity and/or the contour lines having a high intensity and contour lines having a low level of continuity in approximately the same direction as the predetermined direction and/or contour lines having a low intensity are caused to compete with each other. In this manner, the contour lines having a low level of continuity and/or contour lines having a low intensity are erased. From an emphasized contour line, which has been formed by the emphasis of the contour lines having a high level of continuity and/or the contour lines having a high intensity, all of components of the emphasized contour line, which are tilted at a predetermined angle with respect to circumferential directions of concentric circles surrounding the center point of the view window, are extracted. In such cases, the candidate for the predetermined object image can be extracted more easily.

As a further alternative, the extraction of the candidate for the predetermined object image may be carried out by cutting out an image, which falls in the region inside of the view window having a predetermined size, from the image, and detecting a region, which approximately coincides in color with the candidate for the predetermined object image, from the cut-out image. A vector for the travel of the view window is then detected from an azimuth and a distance of the detected region. In this manner, the direction, to which the center point of the view window should travel, is determined. The extraction area is then determined in accordance with the size and/or the shape of the candidate for the predetermined object image, the center point of the view window being taken as a reference during the determination of the extraction area.

The term "approximately coinciding in color with a candidate for a predetermined object image" as used herein means that the distance on a chromaticity diagram shown in FIG. 94 between a chromaticity value of the candidate for the predetermined object image and a chromaticity value at an arbitrary point of the cut-out image, which falls in the region inside of the view window having a predetermined size, is smaller than a certain threshold value. Specifically, in cases where chromaticity values at certain points of the cut-out image are spaced a distance larger than the predetermined threshold value on the chromaticity diagram from the chromaticity value of the candidate for the predetermined object image, the region constituted of these points is not extracted. In cases where chromaticity values at certain points of the cut-out image are spaced a distance smaller than the predetermined threshold value on the chromaticity diagram from the chromaticity value of the candidate for the predetermined object image, the region constituted of these points is extracted.

With the aforesaid further alternative, in cases where the cut-out image is transformed with the complex-log mapping, the candidate for the predetermined object image can be extracted in the same manner as that when the extraction of the candidate for the predetermined object image is carried out in the Cartesian plane.

Also, in the aforesaid another alternative, after a plurality of the regions are extracted, of the extracted regions, regions, which exhibit a high degree of coincidence in color with the candidate for the predetermined object image and which are located at positions close to one another, should preferably be caused to cooperate with each other and thereby emphasized. Also, a region, which exhibits a high degree of coincidence in color with the candidate for the predetermined object image, and a region, which exhibits a low degree of coincidence in color with the candidate for the predetermined object image and which is located at a position spaced apart from the region exhibiting a high degree of coincidence in color with the candidate for the predetermined object image, should preferably be caused to compete with each other, whereby the region, which exhibits a low degree of coincidence in color with the candidate for the predetermined object image, is erased. Also, regions, which exhibit a high degree of coincidence in color with the candidate for the predetermined object image and which are located at positions spaced apart from each other, should preferably be caused to compete with each other. In this manner, a region exhibiting a high degree of coincidence in color with the candidate for the predetermined object image, which region has a size and a shape appropriate for the region to be selected, is kept unerased. Also, a region exhibiting a high degree of coincidence in color with the candidate for the predetermined object image, which region has a size and a shape inappropriate for the region to be selected, is erased. Thus a region, which is most appropriate in the region inside of the view window, is selected as a target object image region. The azimuth end the distance of the selected region in the complex-log mapped plane are detected as the vector for the travel of the view window. In such cases, the region, which exhibits a high degree of coincidence in color with the candidate for the predetermined object image, can be extracted easily.

When the candidate for the predetermined object image is extracted in the manner described above, it is possible to extract not only a candidate for a specific object image but also a candidate for a predetermined object image having any shere. Also, even if the background of the candidate for the predetermined object image in the image is complicated, the candidate for the predetermined object image can be extracted appropriately. Additionally, processing need be carried out only for a limited part of the image, in which the candidate for the predetermined object image is embedded, and therefore the operation time can be kept short.

As a still further alternative, the extraction of the candidate for the predetermined object image may be carried out by cutting out a plurality of images, which fall in the region inside of the view window, at a plurality of times having a predetermined time difference therebetween, calculating the difference between contour lines of object images embedded in the plurality of the cut-out images, and detecting a movement of a background in an in-plane parallel direction in the region inside of the view window, the movement being detected from the calculated difference. At the same time, the images, which fall in the region inside of the view window, are transformed with the complex-log mapping into complex-log mapped images. The difference between contour lines of object images, which lines extend in the radial direction, is calculated from the complex-log mapped images, and a movement of the background in an in-plane rotating direction is thereby detected. Also, the difference between contour lines of object images, which lines extend in the annular direction, is calculated from the complex-log mapped images, and a movement of the background in the radial direction is thereby detected. Thereafter, the movement of the background is compensated for in accordance with the detected movement of the background in the in-plane parallel direction, in the in-plane rotating direction, and/or in the radial direction. A contour line of an object, which shows a movement different from the movement of the background, is detected from the image, in which the movement of the background has been compensated for. Azimuth vectors are then detected from components of the contour line, which are tilted at a predetermined angle with respect to the annular direction in the complex-log mapped plane. If necessary, phase shifts at predetermined angles or weights are applied to the azimuth vectors. A vector is then composed from the azimuth vectors, and a vector for the travel of the view window is thereby determined. In this manner, the direction, to which the center point of the view window should travel, is determined. The extraction area for the extraction of the candidate for the predetermined object image is then determined in accordance with the site and/or the shape of the object, the center point of the view window being taken as a reference during the determination of the extraction area.

In the manner described above, only the candidate for the predetermined object image can be extracted in cases where the candidate for the predetermined object image is moving in the region inside of the view window and in cases where the whole image, i.e., the background, is moving. Also, it is possible to follow up a candidate for the predetermined object image, which moves every moment, to find the candidate for the predetermined object image at the center point of the view window, and thereby to extract the candidate for the predetermined object image. Additionally, even if the background of the candidate for the predetermined object image in the image is complicated, the candidate for the predetermined object image can be extracted appropriately. Further, processing need be carried out only for a limited part of the image, in which the candidate for the predetermined object image is embedded, and therefore the operation time can be kept short.

With the aforesaid still further alternative, in cases where the cut-out image is transformed with the complex-log mapping, the candidate for the predetermined object image can be extracted in the same manner as that when the extraction of the candidate for the predetermined object image is carried out in the Cartesian plane.

Also, in cases where the extraction of the candidate for the predetermined object image in accordance with its contour line and the extraction of the candidate for the predetermined object image in accordance with its color are carried out simultaneously in the manner described above, the candidate for the predetermined object image can be extracted more accurately.

The extraction of the candidate for the predetermined object image in accordance with its contour line, the extraction of the candidate for the predetermined object image in accordance with its color, and the extraction of the candidate for the predetermined object image in accordance with the movement should preferably be carried out simultaneously. In such cases, the candidate for the predetermined object image can be extracted even more accurately.

Additionally, when a vector for the travel of the view window is composed, thermal fluctuations or an inertia term may be added to the vector for the travel of the view window. In such cases, the center point of the view window can be prevented from stopping when the center point of the view window is likely to stop at a position other than the position of the candidate for the predetermined object image, e.g., at the position of an object, which is different from the candidate for the predetermined object image, during the travel of the center point of the view window over the given image towards the candidate for the predetermined object image.

Further, in cases where a neural network is utilized and thermal fluctuations are given to the output of the neural network by using the annealing process, the candidate for the predetermined object image can be extracted efficiently through parallel operations of a plurality of neurons. Therefore, the performance of the system, in which the method for extracting an object image in accordance with the present invention is employed, can be kept high.

Also, the size of the view window may be changed in accordance with the position of the contour line of the candidate for the predetermined object image, which position is taken in the radial direction with respect to the center point of the view window. In such cases, even if a plurality of candidates for predetermined object images having markedly different sizes are embedded in the image, all of the candidates for predetermined object images can be extracted appropriately.

Additionally, the magnitude of the vector for the travel of the view window may be changed in accordance with the position of the contour line of the candidate for the predetermined object image, which position is taken in the radial direction with respect to the center point of the view window. In such cases, the view window can travel quickly to the position of the candidate for the predetermined object image. Also, when the view window comes near the candidate for the predetermined object image, the view window can be caused to travel slowly. Therefore, the extraction of the candidate for the predetermined object image can be carried out more efficiently.

Further, after the candidate for the predetermined object image is extracted from the image with one of the methods for extracting an object image in accordance with the present invention, the process for preventing the extracted candidate for the predetermined object image from being extracted again maybe carried out on the image region, from which the candidate for the predetermined object image was extracted. In such cases, even if a plurality of candidates for predetermined object images are embedded in a single image, a candidate for a predetermined object image, which has already been extracted, can be prevented from being extracted again.

The process for preventing re-extraction may be carried out with a masking process or by introducing a term of fatigue into the neural network. In this manner, an object, which has already been extracted, can be prevented from being extracted again.

With the sixth method for extracting an object image in accordance with the present invention, an image, which falls in the region inside of the view window having a predetermined size, is cut out from a given image. A vector for the travel of the view window is composed from the cut-out image, and the center point of the view window is caused to travel in accordance with the vector for the travel of the view window. When the center point of the view window stopped, a judgment is made as to whether a candidate for a predetermined object image is or is not contained in the image falling within the region inside of the view window. The candidate for the predetermined object image is extracted in cases where it is judged that the candidate for the predetermined object image is contained in the image falling within the region inside of the view window. After the candidate for the predetermined object image has been extracted or in cases where it is judged that no candidate for the predetermined object image is contained in the image falling within the region inside of the view window, the center point of the view window is transferred to a different position on the given image. Thereafter, the center point of the view window is again caused to travel from the position to which the center point of the view window has been transferred. Therefore, even if the center point of the view window has stopped, it can get rid of the stop state and can again search a candidate for a predetermined object image.

Also, in cases where the center point of the view window stopped at a position on the image, at which no candidate for a predetermined object image is present, the center point of the view window can then be transferred to an arbitrary direction and can again search a new candidate for a predetermined object image. Further, in cases where the center point of the view window stopped on a contour line of a candidate for a predetermined object image, the center point of the view window should preferably be transferred along the contour line, on which it stopped. In this manner, the center point of the view window can be caused to travel to a point of intersection of contour lines, or the like, which point constitutes one of feature points of the candidate for the predetermined object image, and the candidate for the predetermined object image can thereby be extracted.

Additionally, the process for preventing re-extraction may be carried out on the region, from which the candidate for the predetermined object image has been extracted. In such cases, when the center point of the view window is transferred, the candidate for the predetermined object image, which candidate has already been extracted, is not again extracted. Therefore, the extraction of candidates for predetermined object images can be carried out more efficiently.

Neural networks may be employed in order to carry out the extraction of the candidate for the predetermined object image, the compensation for the movement of the background, the process for preventing re-extraction, the transfer of the center point of the view window, and the like. In such cases, the candidate for the predetermined object image can be extracted efficiently through parallel operations of a plurality of neurons. Therefore, the performance of the system, in which the method for extracting an object image in accordance with the present invention is employed, can be kept high.

With the eighth method for extracting an object image, the vectors for the travel of the view window, which are determined with one of the aforesaid methods for extracting an object image in accordance with the present invention, are taken as gradient vectors of a potential field. The gradient vectors of the potential field are recorded on the whole image, and a map of the potential field is thereby created. The extraction area is then determined in accordance with the size and/or the shape of the candidate for the predetermined object image, a minimum point of the potential in the map being taken as a reference during the determination of the extraction area. Therefore, as in the aforesaid methods for extracting an object image in accordance with the present invention, it is possible to extract not only a candidate for a specific object image but also a candidate for a predetermined object image having any shape. Also, even if the background of the candidate for the predetermined object image in the image is complicated, the candidate for the predetermined object image can be extracted appropriately. The same effects can be obtained also with the seventh method for extracting an object image in accordance with the present invention.

With the method for detecting a gradient of a contour line field, a vector is composed from azimuth vectors, which have been detected with one of the aforesaid methods for extracting an object image in accordance with the present invention, and the composed vector thus obtained is taken as the gradient of the contour line field. Therefore, from the information representing the gradient of the field constituted of the contour line, the direction towards the center point of the predetermined object image can be detected in accordance with the contour line of the predetermined object image. Also, in accordance with the detected direction towards the center point of the predetermined object image, travel of the view window can be iterated, and the view window can be brought to the center point of the predetermined object image. Additionally, the direction along the contour line can be detected by finding the direction, which intersects perpendicularly to the direction of the gradient of the contour line field. In this manner, the view window can be caused to travel such that it follows up the contour line. Further, the magnitude of the value of the gradient of the contour line field is proportional to the amount of image information, which is present at the corresponding position. Therefore, only the necessary information can be selectively detected from the image in accordance with the information representing the gradient of the field, which is formed by an object surrounded by the contour line. The necessary information thus detected can then be compressed such that it may be utilized efficiently or may be transmitted quickly. Moreover, processing need be carried out only for a limited part of the image, and therefore the operation time can be kept short.

With the first-mentioned method for extracting a contour line of an object image in accordance with the present invention, as in the aforesaid third method for extracting an object image in accordance with the present invention, an image, which falls in the region inside of the view window having a predetermined site, is cut out from the given image. Lines, which extend in a predetermined direction, are then detected from the cut-out image. Of the lines which have then been detected, lines having a high level of continuity in approximately the same direction as the predetermined direction and/or lines having a high intensity are caused to cooperate with one another and are thereby emphasized. Also, the lines having a high level of continuity and/or the lines having a high intensity and lines having a low level of continuity in approximately the same direction as the predetermined direction and/or lines having a low intensity are caused to compete with each other, and the lines having a low level of continuity and/or the lines having a low intensity are thereby erased. In this manner, the contour line of the candidate for predetermined object image is extracted. By the iteration of the emphasis and the erasing, the lines, which constitute the contour line of the candidate for the predetermined object image, are selected, whereas the lines, which do not constitute the contour line of the candidate for the predetermined object image, are erased. Even if the lines have missing portions, the missing portions are filled up through the competition and the cooperation. Therefore, it is possible to extract not only a contour line of a candidate for a specific object image but also a contour line of a candidate for a predetermined object image having any shape. Also, even if the background of the candidate for the predetermined object image in the image is complicated, the contour line of the candidate for the predetermined object image can be extracted appropriately. Additionally, processing need be carried out only for a limited part of the image, and therefore the operation time can be kept short.

With the second-mentioned method for extracting a contour line of an object image in accordance with the present invention, the detection of lines formed by an object image embedded in an image is carried out with each of a plurality of synaptic weights patterns for detecting contour lines, which patterns have sizes differing stepwise, by carrying out a convolution on the cut-out image by use of each of the plurality of the synaptic weights patterns for detecting contour lines. The emphasis and erasing of the detected lines are carried out by carrying out a convolution on each of groups of the lines, which groups have been detected with the respective synaptic weights patterns for detecting contour lines, by use of each of a plurality of synaptic weights patterns for competition and cooperation, which patterns have sizes corresponding to the sizes of the synaptic weights patterns for detecting contour lines. Thereafter, groups of lines, each of which groups has been emphasised with each of the synaptic weights patterns for competition and cooperation, are caused to compete and cooperate with one another. In this manner, a contour line, which is more close to the true contour line of The candidate for the predetermined object image, can be selected from information representing a plurality of contour lines. Also, the extraction of the contour line of the candidate for the predetermined object image can be carried out appropriately and accurately.

With the third-mentioned method for extracting a contour line of an object image, an image, which falls in a region inside of a view window having a predetermined size, is cut out from a given image. Lines, which extend in the radial direction with respect to the center point of the view window, are detected from the cut-out image. End points of the detected lines, which extend in the radial direction, are then detected, and a contour line of the candidate for the predetermined object image, which line extends in the annular direction, is formed in accordance with the detected and points. Also, in a different method for extracting a contour line of an object image, an image, which falls in a region inside of a view window having a predetermined size, is out out from a given image, and lines, which extend in the annular direction and in the radial direction with respect to the center point of the view window, are detected from the cut-out image. End points of the detected lines, which extend in the radial direction, are then detected. Thereafter, a contour line of the candidate for the predetermined object image, which line extends in the annular direction, is emphasized in accordance with the detected and points. In this manner, the contour line of the candidate for the predetermined object image is extracted.

Therefore, even if the candidate for the predetermined object image merges into the background in the given image, the contour line of the candidate for the predetermined object image can be narrowed down by detecting the end points of the radial lines of the background, which has a strong probability of being blocked by the candidate for the predetermined object image, and predicting the contour line of the candidate for the predetermined object image along the annular direction in accordance with the detected end points. In this manner, the contour line of the object image, which has a strong probability of being the predetermined object image, can be extracted. Also, processing need be carried out only for a limited part of the image, and therefore the operation time can be kept short.

With the fourth-mentioned method for extracting a contour line of an object image, an image, which falls in a region inside of a view window having a predetermined size, is cut out from a given image, in which a plurality of candidates for predetermined object images are embedded such that at least portions of the plurality of the candidates for predetermined object images may overlap one upon another. Lines, which extend in a predetermined direction with respect to the center point of the view window, are then detected from the cut-out image. Of the lines which have thus been detected, lines having a high level of continuity in approximately the same direction as the predetermined direction and/or lines having a high intensity are caused to cooperate with one another and are thereby emphasised. Also, the lines having a high level of continuity and/or the lines having a high intensity and lines having a low level of continuity in approximately the same direction as the predetermined direction and/or lines having a low intensity are caused to compete with each other. The lines having a low level of continuity and/or the lines having a low intensity are thus erased. In this manner, a contour line of a single candidate for a predetermined object image among the plurality of the candidates for predetermined object images is extracted. A process for preventing re-extraction is then carried out on the extracted contour line of the candidate for the predetermined object image. Thereafter, extraction of a new contour line of a new candidate for a predetermined object image, which contour line is different from the extracted contour line of the candidate for the predetermined object image, the extraction being carried out by emphasizing lines, which are different from the emphasized lines, and a process for preventing re-extraction, which process is carried out on the new extracted contour line of the new candidate for the predetermined object image, are iterated until contour lines of all of the plurality of the candidates for predetermined object images are extracted. Therefore, even from an image in which a plurality of candidates for predetermined object images are embedded such that at least portions of the candidates overlap one upon another, all of the contour lines of the candidates for the predetermined object images can be extracted accurately and independently of one another.

With the fifth-mentioned method for extracting a contour line of an object image, the size and/or the shape of the candidate for the predetermined object image is normalized by taking the center point of a view window, which has a predetermined size, and a contour line of the candidate for the predetermined object image as reference. Thereafter, a contour line of the normalized candidate for the predetermined object image is extracted. Therefore, contour lines of candidates for predetermined object images having different sizes and/or shapes are extracted as those having approximately identical sizes and/or shapes. Accordingly, burden to a step, such as a discrimination step or a learning step, which is carried out after the extraction of the contour line of the object image, can be kept light. Also, the step following the extraction, such as a step for discriminating the predetermined object image or a step for carrying out learning operations, can be carried our appropriately.

With the method for detecting a gradient of an object image color field in accordance with the present invention, the gradient vector of the object image color field is detected from the azimuth and the distance of the candidate for the predetermined object image, which is detected in accordance with the color by the aforesaid method for extracting an object image in accordance with the present invention. Therefore, from the information representing the gradient of the field constituted of the color, the direction towards the center point of the predetermined object image can be detected in accordance with the color of the predetermined object image. Also, in accordance with the detected direction towards the center point of the predetermined object image, travel of the view window can be iterated, and the view window can be brought to the center point of the predetermined object image. Additionally, the direction along the periphery of the region surrounded by the color can be detected by finding the direction, which intersects perpendicularly to the direction of the gradient of the color field. In this manner, the view window can be caused to travel such that it may follow up the contour line. Further, the magnitude of the gradient vector of the color field is proportional to the amount of image information, which is present at the corresponding position. Therefore, only the necessary information can be selectively detected from the image in accordance with the information representing the gradient of the field, which is formed by the region constituted of the color. The necessary information thus detected can then be compressed such that it may be utilized efficiently or may be transmitted quickly. Moreover, processing need be carried out only for a limited part of the image, and therefore the operation time can be kept short.

With the method for detecting a movement of en image in accordance with the present invention, the difference between contour lines of object images, which are embedded in a plurality of images of the same object having a background, is calculated. The movement of the image in the in-plane parallel direction is detected from the difference. At the some time, the images are transformed with the complex-log mapping into complex-log mapped images. The difference between contour lines of object images, which lines extend in the radial direction, is calculated from the complex-log mapped images, and a movement of the image in an in-plane rotating direction is thereby detected. Also, the difference between contour lines of object images, which lines extend in the annular direction, is calculated from the complex-log mapped images, and a movement of the image in the radial direction is thereby detected. Thereafter, the movement of the whole image is detected in accordance with the detected movement of the image in the in-plane parallel direction, in the in-plane rotating direction, and/or in the radial direction.

In the manner described above, the movement of the image can be detected in cases where only a predetermined object image present in the image is moving and in cases where the whole image is moving. By the utilization of the information concerning the movement of the image, components of the background in the image can be compensated for. In this manner, in cases where an object image showing a movement different from the movement of the background is present in the image, only the movement of the object image can be detected.

Also, from the information representing the movement of the object image, the direction towards the center point of the object image can be detected. In accordance with the detected direction towards the center point of the object image, travel of the image input device, i.e., the view window having a predetermined size, can be iterated, and the view window can be brought to the center point of the object image. Additionally, the direction along the periphery of the object image can be detected by finding the direction, which intersects perpendicularly to the direction towards the center point of the object image. In this manner, the view window can be caused to travel such that it may follow up the contour line. Further, in many cases, moving object images carry effective image information. Therefore, only the necessary information, i.e., only the information concerning the moving object image, can be selectively detected from the image. The necessary information thus detected can then be compressed such that it may be utilized efficiently or may be transmitted quickly.

BRIEF DESCRIPTION OF THE DRAWINGS

FIG. 1 is a block diagram showing the fundamental concept behind a first embodiment of the method for extracting an object image in accordance with the present invention, FIG. 4 is an explanatory view showing part of a neural network, which pert detects a movement of a background in an image, the neural network being employed to extract a candidate for a predetermined object image in accordance with a movement of the candidate for the predetermined object image in the first embodiment of the method for extracting an object image in accordance with the present invention, FIGS. 11A and 11B are diagrams showing images at the time t and the time t+α, FIGS. 14A and 14B are diagrams showing contour lines in the images, which have been obtained by transforming the images at the time t and the time t+α with complex-log mapping, FIGS. 19A and 19B are diagrams showing images, which are obtained by transforming the images at the time t and the time t+α with complex-log mapping, FIG. 21 is a diagram showing the difference between the contour lines in the images, which have been obtained by transforming the images at the time t and the time t+α with complex-log mapping, FIG. 22 is an explanatory view showing a synaptic weights pattern for extracting components in a clockwise rotating direction and a synaptic weights pattern for extracting components in a counter-clockwise rotating direction, FIG. 27 is a block diagram showing the fundamental concept behind the extraction of a candidate for the predetermined object image, FIGS. 29A and 29B are explanatory views showing synaptic weights patterns for extracting lines in c1- and c2-layers, FIGS. 30A through 30G are explanatory views showing how a line extending in the annular direction is emphasized from the image having been out out in an a-layer, FIGS. 31A and 31B are explanatory views showing synaptic weights patterns for detecting and points of lines extending in the radial direction in the d-layer, FIG. 37 is a graph showing weights applied to outputs of neurons, FIG. 41 is an explanatory view showing how the direction of travel of a view window is determined in cases where the center point of the view window travels from the side inward from a candidate for a predetermined object image to a point of intersection of contour lines of the candidate for the predetermined object image, FIG. 42 is an explanatory view showing how the direction of travel of a view window ie determined by applying a phase shift, FIG. 52 is an explanatory view showing how a difference in sensitivity to the size of a candidate for a predetermined object image is given to a neural network, FIGS. 53A and 53B are explanatory views showing how the size of a view window is changed by changing weights of synaptic connections, FIGS. 54A and 54B are explanatory views showing how the size of a view window is changed by changing synaptic connections, FIGS. 61A and 61B are explanatory views showing how the results of competition and cooperation with respect to the annular direction in an e1-layer are investigated and a probability density function in the radial direction is created, FIGS. 69A, 69B, 69C, and 69D are explanatory views showing weights of synaptic connections between layers of the neural network, which is employed for causing the center point of a view window to travel towards a point of intersection of contour lines of a candidate for a predetermined object image in the third embodiment of the method for extracting an object image in accordance with the present invention, FIGS. 70A and 70B are explanatory views showing how a difference in position between the center point of a view window and a candidate for a predetermined object image is detected in the third embodiment of the method for extracting an object image in accordance with the present invention, FIG. 75 is a block diagram showing a fundamental concept behind the method for extracting a contour line of an object image in accordance with the present invention, FIGS. 81A, 81B, 81C, and 81D are explanatory views showing how a contour line of a candidate for a predetermined object image is extracted in the first embodiment of the method for extracting a contour line of an object image in accordance with the present invention in cases where a view window stopped at a point of intersection of contour lines of the candidate for the predetermined object image, FIGS. 87A, 87E, and 87C are explanatory views showing how lines are extracted in a c2-layer in the second embodiment of the method for extracting a contour line of an object image in accordance with the present invention, FIGS. 88A, 88B, and 88C are explanatory views showing how the lines compete and cooperate with one another in an e2-layer in the second embodiment of the method for extracting a contour line of an object image in accordance with the present invention, FIG. 89 is an explanatory view showing an example of a neural network for extracting a contour line of a candidate for a predetermined object image in a third embodiment of the method for extracting a contour line of an object image in accordance with the present invention, FIG. 91 is an explanatory view showing an image in which three human body images are embedded, FIGS. 92A and 92B explanatory views showing how a contour line of an object is formed with the Finkel's method.

DESCRIPTION OF THE PREFERRED EMBODIMENTS

Figure 2A:
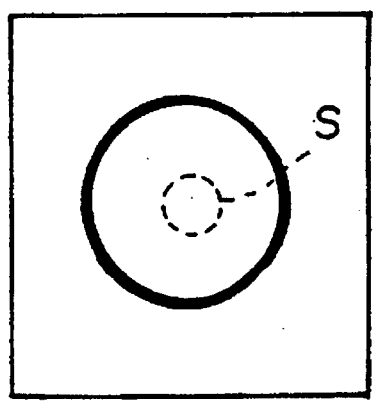
FIGS. 2A and 2B are explanatory views showing at what parts of a figure the human viewpoint stabilizes.

The present invention will hereinbelow be described in further detail with reference to the accompanying drawings.

FIG. 1 is a block diagram showing a fundamental concept behind a first embodiment of the method for extracting an object image in accordance with the present invention. In this embodiment, the extraction of a candidate for a predetermined object image is carried out by causing the center point of a view window, which has a predetermined size, to travel to the position of the candidate for the predetermined object image in accordance with contour lines, the color, and the movement of the candidate for the predetermined object image, and determining an extraction area in accordance with the size and/or the shape of the candidate for the predetermined object image, the center point of the view window being taken as a reference during the determination of the extraction area. A neural network is utilized for the extraction of the candidate for the predetermined object image.

As illustrated in FIG. 1, this embodiment comprises a neural network processing unit 3 for search and a processing unit 4 for judgment as to the stop state of the view window. The neural network processing unit 3 for search iterates the travel of the view window and searches a candidate for the predetermined object image by utilizing a neural network. The processing unit 4 for judgment as to the stop state of the view window investigates the state of the travel of the view window. When the view window stops, the processing unit 4 makes a judgment as to whether the stop of the view window is or is not caused by the discovery of a candidate for the predetermined object image. When necessary, the processing unit 4 extracts the candidate for the predetermined object image.

Specifically, in the neural network processing unit 3 for search, the position of the center point of the view window and the size of the view window are set in the image, and part of the image falling in the region inside of the view window is fetched from the image. Thereafter, vectors for the travel of the view window are calculated from the movement, the contour lines, and the color of the candidate for the predetermined object image. The vectors for the travel of the view window are combined with one another, and a composite vector for the travel of the view window is thereby determined. The view window is then caused to travel on the image in accordance with the composite vector for the travel of the view window. In the processing unit 4 for judgment as to the stop state of the view window, the amount of travel of the view window is investigated. In cases where it is found that the view window is traveling, a signal for instructing a further travel of the view window is fed into the neural network processing unit 3 for search. In cases where it is found that the view window has stopped, a judgment is made as to the stop state of the view window. Specifically, a judgment is made as to whether the stop of the view window on the image is or is not caused by the discovery of a candidate for the predetermined object image. In cases where the stop of the view window is not caused by the discovery of a candidate for the predetermined object image, it is not necessary for the view window to stay at the current stop position, and therefore a signal for setting a new position and a size of the view window is fed into the neural network processing unit 3 for search. Upon receiving this signal, the neural network processing unit 3 for search again causes the view window to travel. In cases where the stop of the view window is caused by the discovery of a candidate for the predetermined object image, the discovered candidate for tho predetermined object image is cut out, i.e. is extracted. A signal representing the extracted candidate for the predetermined object image is transferred to a judgment means, which is shown in FIG. 1 and which makes a judgment as to whether the extracted candidate for the predetermined object image is or is not the predetermined object image.

Figure 2B:
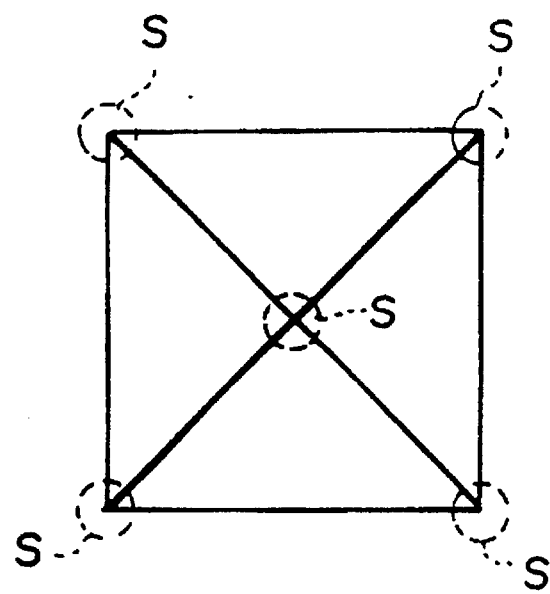

In the neural network processing unit 3 for search, the neural network is constructed such that the view window may travel in the same manner as that of the movement of the human viewpoint. It has been reported from past studies that, in cases where a human being watches a figure shown in FIG. 2A or 2B, his viewpoint stays for a long time at a contour or an end point of the object. In the case of FIG. 2B, the human viewpoint stays at parts S surrounded by the broken lines. Also, experience has shown that, at the instant at which a human being recognizes an object as a single mass, hie viewpoint is not on the contour line of the object, but stays at the center part surrounded by the contour line. For example, when a human being watches the figure shown in FIG. 2A, his viewpoint stays at a part S surrounded by the broken line. Specifically, it can be said that the human viewpoint becomes stable at the center point of an object surrounded by a contour line, at the point of intersection of lines, or at a vertex of a polygon. Therefore, the neural network should be provided with functions such that, in cases where an object image is present only at a peripheral region of the view window, the view window may be moved to a position closer to the object image, and thereafter the center point of the view window may be moved to the center point, a vertex, or the like, of the object image, the view window being thereby rendered stable.

How the vector for the travel of the view window is calculated from a contour line of an object in the neural network processing unit 3 for search will be described hereinbelow.

Figure 28:
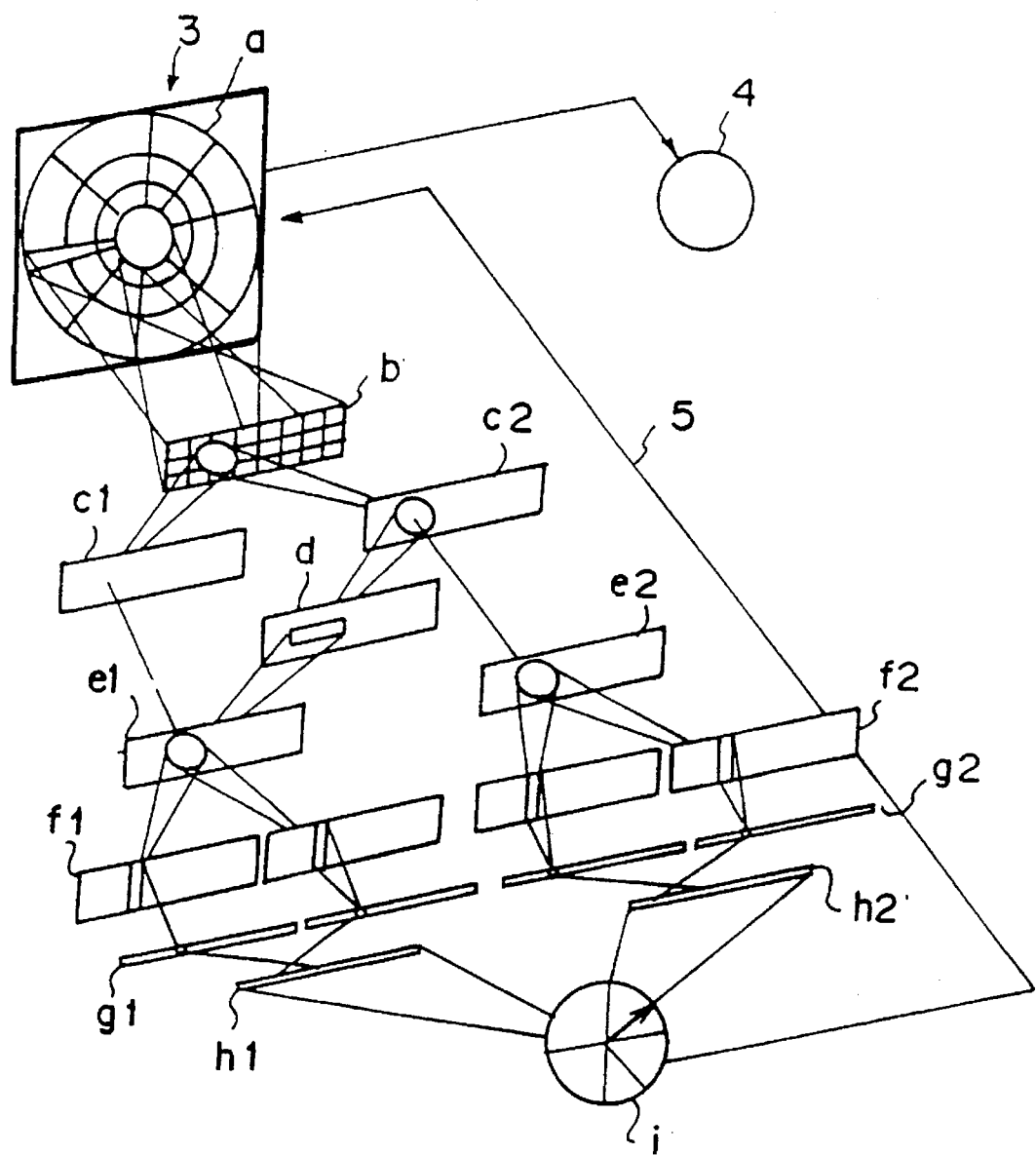
FIG. 28 is an explanatory view showing an example of a neural network for extracting a candidate for the predetermined object image in an embodiment of the method for extracting an object image in accordance with the present invention, wherein a vector for the travel of a view window is calculated from a contour line of the candidate for the predetermined object image.
Figure 3I:
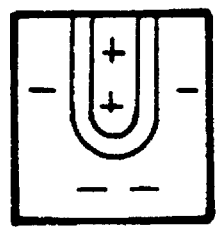
Figure 3I:
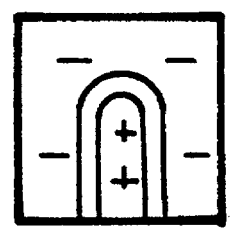

FIG. 28 is an explanatory view showing an example of a neural network for calculating the vector for the travel of the view window in accordance with the contour line of the candidate for the predetermined object image. A signal, which represents a still image of the outer world fed through the view window at the time t, is fed into the neural network. Also, the output obtained from the neural network represents the amount and the direction in which the view window is to be moved. The output is considered as a two-dimensional vector and is hereinbelow referred to as the vector for the travel of the view window. The magnitude of the vector for the travel of the view window represents the level of instability at the center point of the view window. The direction of the vector for the travel of the view window represents the direction in which the view window should travel in order to become more stable.

The basic structure of the neural network employed in this embodiment is of the layered type. However, the neurons in each of e1- and e2-layers are connected with each other in an intermotive manner. Therefore, the neural network may also be referred to as a complex type. Also, in a back propagation model, which is popular as the layered type, every neuron in each layer is connected to every neuron in the adjacent layer. In contrast to the back propagation model, the neural network employed in this embodiment is of a local area limited connection type, in which the connections are effected only between those neurons which are located at corresponding positions in adjacent layers or between the neurons located in the vicinity of these corresponding neurons. Therefore, the number of the synapses between the layers can be reduced markedly, and the operation time can be kept short. Additionally, connections between the neurons in each interactive connection layer are effected only between those neurons the positions of which are close to one another. Such a local area limited connection structure is similar to the structure of the nervous circuit ranging from the retina of the human eye to the primary visual area of the brain.

The layers of the neural network employed in this embodiment have the functions described below. This neural network is constituted of an a-layer for feeding a signal representing the image into the neural network, and a b-layer for transforming the input image with the complex-log mapping (logarithmic polar coordinate transformation). The neural network is also constituted of a c1-layer for detecting contour lines, which extend in the annular direction, and a c2-layer for detecting contour lines, which extend in the radial direction. The neural network is also constituted of a d-layer for detecting the end points of the contour lines extending in the radial direction, the e1-layer which is an interactive connection circuitry layer for selecting a contour line extending in the annular direction, and the e2-layer which is an interactive connection circuitry layer for selecting a contour line extending in the radial direction. The neural network is additionally constituted of an f1-layer for detecting the differences in position between components of the contour line of the candidate for the predetermined object image, which line extends in the annular direction, and the center point of the view window, and an f2-layer for detecting the differences in position between components of the contour line of the candidate for the predetermined object image, which line extends in the radial direction, and the center point of the view window. The neural network is further constituted of a g1-layer for detecting the azimuth vectors of the candidate for the predetermined object image with respect to the annular direction, and a g2-layer for detecting the azimuth vectors of the candidate for the predetermined object image with respect to the radial direction. The neural network is also constituted of an h1-layer for combining the detected azimuth vectors with respect to the annular direction, an h2-layer for combining the detected azimuth vectors with respect to the radial direction, and an i-layer for generating an output representing a vector for the travel of the view window. In the neural network employed in this embodiment, the synaptic connections between adjacent ones among the b-layer and those that follow are space invariant. Also, the synaptic connections in each interactive connection layer are space invariant. The space invariance is adopted in order to facilitate the model simulation and parallel processing, and the synaptic connections need not necessarily be space invariant. However, in cases where the synaptic connections are space invariant, the output of each neuron becomes equivalent to an output obtained when the result of an operation of convolution (i.e., matching with a synaptic weights pattern) of the synaptic connection matrix and the preceding neuron layer matrix is passed through a nonlinear function. Therefore, computational processing becomes markedly easy when simulation of the neural network is carried out with a computer.

First, the signal representing the image is fed into the neural network. In the b-layer, the input image is transformed with the complex-log mapping by taking the center point of the view window as the pole of mapping. Because the image ie thus transformed with the complex-log mapping in the b-layer, the operations in the b-layer and the layers that follow in the neural network can be processed computationally as the convolution between the arrangement of the image information and a space invariant synaptic connection information arrangement.

Figures 13A, 13B, 13C:
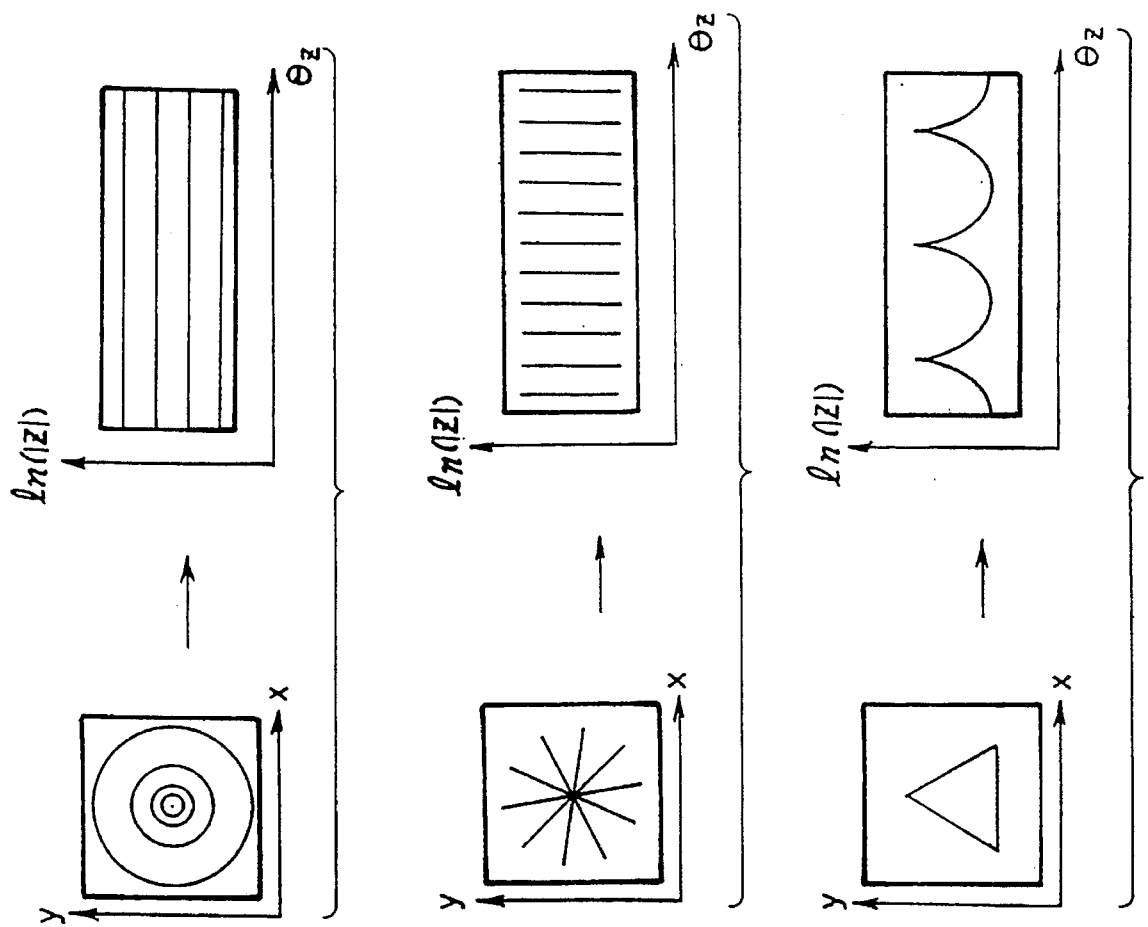
FIGS. 13A, 13B, and 13C are explanatory views showing the results of transformation of various figures with the complex-log mapping.

FIGS. 13A, 13B, and 13C show the results of transformation of various figures with the complex-log mapping. With the complex-log mapping, in cases where the pole of mapping, i.e., the center point of the view window, is present at the center point of a candidate for the predetermined object image, concentric circle-like curved lines known in FIG. 13A are transformed into horizontal straight lines. Also, radial lines shown in FIG. 13B are transformed into vertical straight lines, and a triangle is transformed into the pattern shown in FIG. 13C.

When a point W(x,y) in the Cartesian plane before being transformed is mathematically expressed with a complex number as $$z = x + iy \quad (1)$$

a complex-log mapped point W' is represented by the formula $$W' = \ln(z) = \ln(|z|) + j\theta_z \quad (2)$$

where $$z = (x^2 + y^2)^{1/2} \quad (3)$$

$$\theta_z = \tan^{-1}(y/x) \quad (4)$$

Specifically, with the complex-log mapping, transformation is carried out such that the distance axis of the complex-log mapped plane may represent the logarithmic value of the distance from the center point of the view window, and the azimuth axis may represent the angle around the center point of the view window.

The information representing the complex-log mapped image is fed into the c1-layer and the c2-layer. In the c1-layer and the c2-layer, contour lines extending in the annular direction and in the radial direction are extracted respectively in the complex-log mapped plane. In the c1-layer, the complex-log mapped image is transmitted as a signal weighted by a synaptic weights pattern shown in FIG. 29A, and the contour lines extending in the annular direction are thereby extracted. Also, in the c2-layer, the complex-log mapped image is transmitted as a signal weighted by a synaptic weights pattern shown in FIg. 29B, and the contour lines extending in the radial direction are thereby extracted.

The term "an annular direction in a complex-log mapped plane" as used herein means the direction along the azimuth axis of the complex-log mapped plane. Specifically, the azimuth axis of the complex-log mapped plane represents the angle made around the origin of the Cartesian plane (i.e., around the center point of the view window in the present invention). A circle having its center point at the origin in the Cartesian plane is expressed as a straight line, which is parallel to the azimuth axis, in the complex-log mapped plane. Therefore, the direction along the azimuth axis of the complex-log mapped plane is referred to as the annular direction. Also, the distance axis of the complex-log mapped plane represents the distance from the origin of the Cartesian plane. A radial straight line, which passes through the origin, in the Cartesian plane is expressed as a straight line, which is parallel to distance axis, in the complex-log mapped plane. Therefore, the direction along the distance axis of the complex-log mapped plane is referred to as the radial direction.

In cases where a candidate for the predetermined object image is blocked by a different body, which is located on the foreground side, end points of the contour lines extending in the radial direction occur at the boundary between the candidate for the predetermined object image and the different body located on the foreground side. In the d-layer, such and points of the contour lines extending in the radial direction are extracted from the pattern received from the c2-layer, in which the contour lines extending in the radial direction have been extracted.

How the end points of the contour lines extending in the radial direction are detected will be described hereinbelow.

By way of example, a signal representing an image shown in FIG. 30A is fed into the a-layer. In the input image, contour lines of an approximately circular candidate for a predetermined object image and a background constituted of lines, which extend in the radial direction and are blocked by the candidate for the predetermined object image, are embedded. In such cases, in the b-layer, the input image is transformed with the complex-log mapping, and a complex-log mapped image shown in FIG. 30B is thereby obtained. In the c1- and c2-layers, respectively, contour lines extending in the annular direction and contour lines extending in the radial direction are detected from the complex-log mapped image, and patterns shown in FIGS. 30C and 30D are thereby obtained. Thereafter, in the d-layer, end points of the contour lines extending in the radial direction, which lines are shown in FIG. 30D and have been detected in the c2-layer, are detected, and an end points pattern shown in FIG. 30E is thereby obtained. The contour lines pattern having been obtained in the c2-layer, is transmitted as a signal weighted by synaptic weights patterns shown in FIGS. 31A and 31B, and the end points are thereby detected. In this case, the end points of the contour lines heading towards the center point of the view window are detected by the synaptic weights pattern shown in FIG. 31A. Also, the end points of the contour lines heading away from the center point of the view window are detected by the synaptic weights pattern shown in FIG. 31B. A signal representing the pattern of the end points of the contour lines extending in the radial direction, which end points have been detected in the d-layer in the manner described above, is fed into the e1-layer, and a pattern shown in FIG. 30F is thereby obtained. The e1-layer and the e2-layer are the interactive connection layers having the local area limited, interactive weighted connections such that a contour line extending in the annular direction and a contour line extending in the radial direction, respectively, may be emphasized. In the e1-layer, in accordance with the contour lines extending in the annular direction, which have been detected by the c1-layer and are shown in FIG. 30C, and the end points of the contour lines extending in the radial direction, which have been detected in the d-layer and are shown in FIG. 30E, contour lines having a high level of continuity in the annular direction and contour lines having a high intensity are emphasized, whereas independent or weak contour lines are erased. In this manner, a pattern representing a contour line shown in FIG. 30G is obtained. In cases where the background is blocked by the candidate for the predetermined object image, the end points of the contour lines extending in the radial direction appear along the contour line of the candidate for the predetermined object image. Therefore, An the e1-layer, the contour line can be selected by more strongly emphasizing the contour lines, which extend in the annular direction and have a strong probability of being portions of the contour line of the candidate for the predetermined object image, in accordance with a signal representing the positions of the end points of the contour lines extending in the radial direction, which end points have been detected in the d-layer. As the end points are detected in this manner, the contour line of the candidate for the predetermined object image can be extracted more accurately.

How the e1-layer works will hereinbelow be described in more detail.

If the position of a neuron A in the complex-log mapped plane is expressed as (Xa,Ya) and the position of a neuron B in the complex-log mapped plane is expressed as (Xb, Yb), the values of the weights of interactive neuron connections in the e1-layer will be given by the formula $$Wab = (1.0 - 4.0 \times Dx \times (1.0 - Dy \times Mc)^2) \times \exp(-2.0 \times Dx \times (1.0 - Dy \times Mc)^2) \times \exp(-2.0 \times Dy^3) \quad (5)$$

where $$Dx = Kx \times |Xa - Xb|$$

$$Dy = Ky \times |Ya - Yb|$$

wherein each of Kx and Ky represents an appropriate positive factor, and Mc represents an appropriate factor. Formula (5) indicates that the neurons are connected with cooperative weights, i.e., with positive weights, with respect to the annular direction, and are connected with inhibitory weights, i.e., with negative weights, with respect to the radial direction. Formula (5) also indicates that the strength of each connection depends on the distance between the neurons. Specifically, neurons, which are located at positions closer to each other, are connected with a heavier weight to each other, and neurons, which are located at positions remoter from each other, are connected with a lighter weight to each other. Such internal connections are of the so-called local area limited, interactive connection type. In the e1-layer having such interactive connections, the emphasis and the erasing of the contour lines are carried out in the manner described below.

Figure 32:
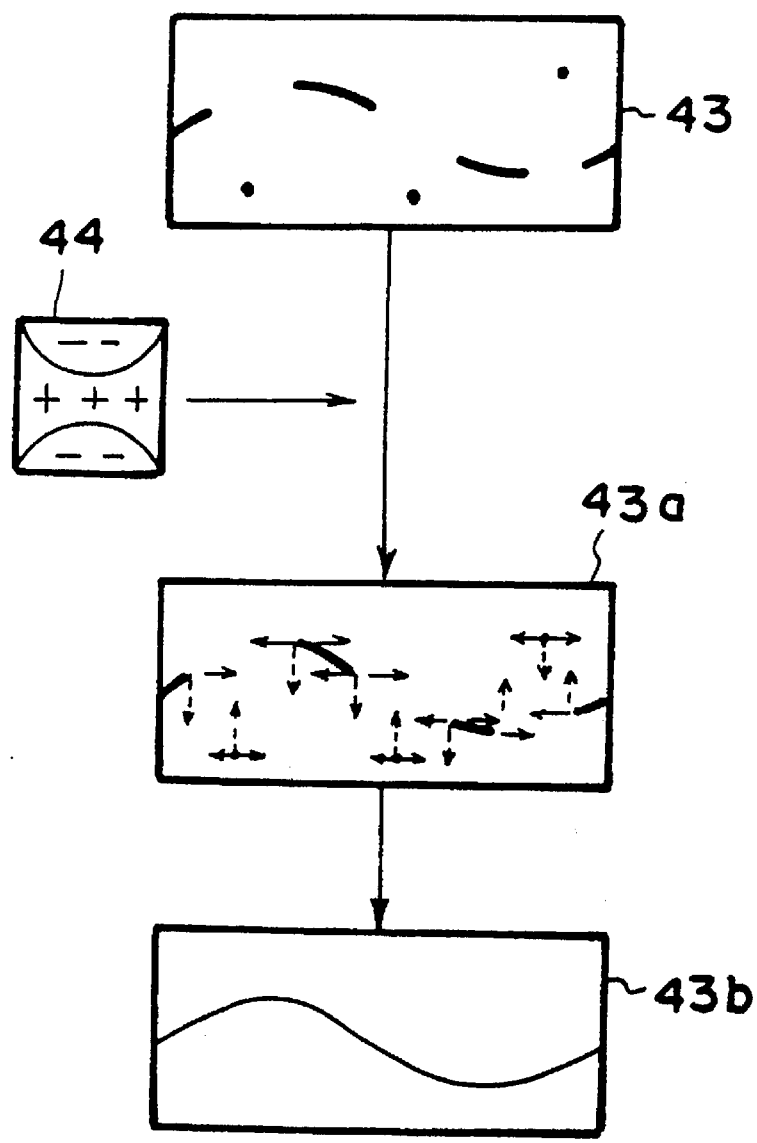
FIG. 32 is en explanatory view showing how contour lines, which have been extracted in the c1-layer, compete and cooperated with one another.

By way of example, in the image fed from the a-layer, the contour lines of the candidate for the predetermined object image are broken, or the background is complicated. Therefore, as indicated by a pattern 43 shown in FIG. 32, the contour lines, which have been extracted in the c1-layer and fed into the e1-layer, are broken. Of the neurons corresponding to the pattern 43, those neurons which are excited strongly in as continuous a pattern as possible with respect to the annular direction substantially represent a region, which has a strong probability of appearing as a single object in the Cartesian plane. The neurons of the e1-layer, which correspond to the single image, are connected such that they may be interactive with one another. Therefore, when the pattern 43 is transmitted as a signal weighted by a synaptic weights pattern 44 for competition and cooperation, the neurons corresponding to the end points of the broken contour lines cooperate with one another in the annular direction so as to connect the excited regions through iteration of recurrent signals in the e1-layer. As a result, neurons, which are adjacent to the neurons corresponding to the end points of the broken contour lines are excited sequentially in the directions indicated by the solid line arrows in a pattern 43a. In this manner, the broken contour lines becomes continuous little by little. Also, the synaptic weights pattern 44 for competition and cooperation has a specific geometry such that contour lines, which are tilted slightly with respect to the annular direction, can be connected with each other. Accordingly, a contour line, which is continuous in the annular direction, can be obtained ultimately. On the other hand, of the neurons corresponding to the pattern 43, those neurons which are excited only weakly in a pattern having a low level of continuity with respect to the annular direction (i.e., the neurons corresponding to dots in the pattern 43) represent regions, which have little probability of appearing as a single object in the Cartesian plane. As described above, the neurons in the e1-layer are connected with one another in the interactive manner such that they may cooperate with one another with respect to the annular direction, but may compete with one another with respect to the radial direction. Therefore, the neurons corresponding to the dots in the pattern 43 compete with the neurons, which correspond to the contour lines extending in the annular direction and which are excited strongly. In this manner, the neurons corresponding to the dots in the pattern 43 are inhibited and erased by signals, which are generated by the neurons corresponding to the contour lines extending in the annular direction and having been excited strongly and which are inhibitory with respect to the radial direction (i.e., with respect to the directions indicated by the broken line arrows). As a result, a pattern 43b representing only the contour line, which is continuous in the annular direction, is obtained from the pattern 43 fed into the e1-layer.

Figure 33:
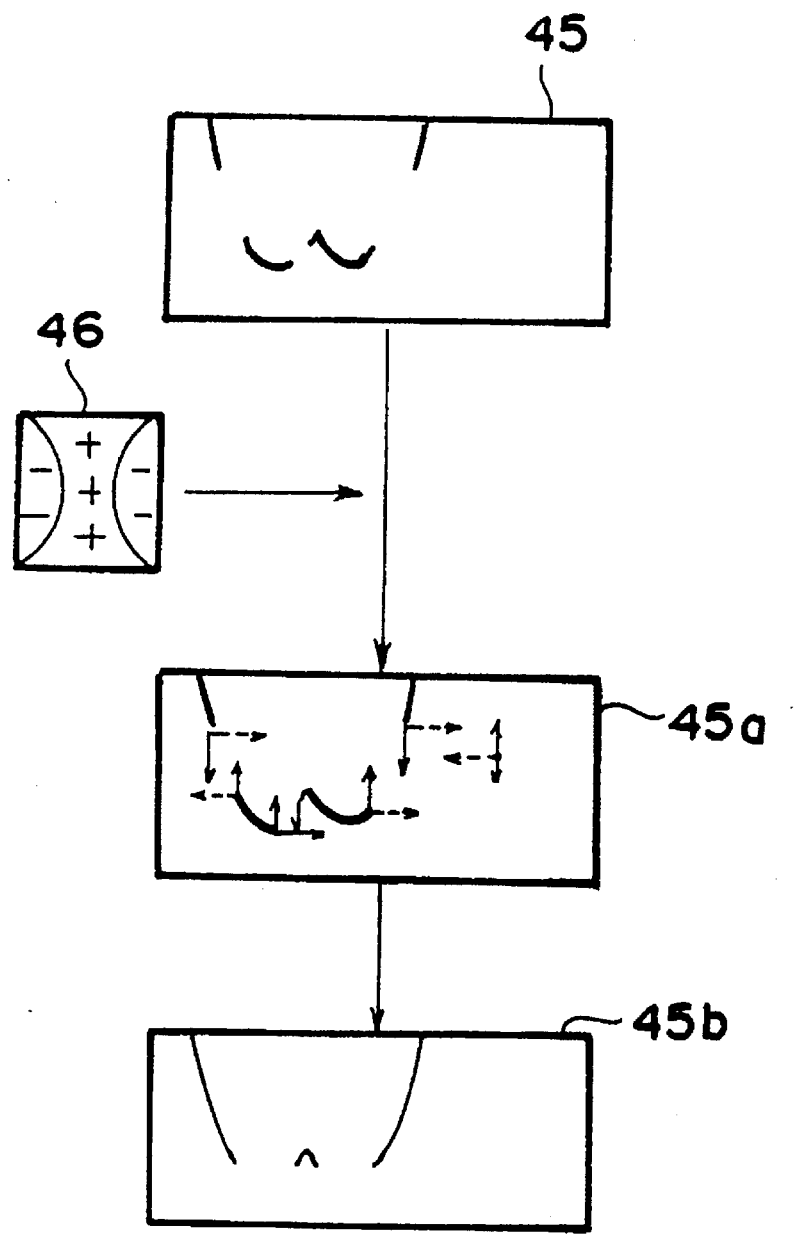
FIG. 33 is an explanatory view showing how contour lines, which have bean extracted in the c2-layer, compete and cooperated with one another.

In the e2-layer, of the contour lines extending in the radial direction, which have been detected by the c2-layer, contour lines having a high level of continuity in the radial direction and contour lines having a high intensity are emphasized, whereas independent or weak contour lines are erased. The weights of interactive neuron connections in the e2-layer are represented by a formula, which is obtained by interchanging x and y with each other in Formula (5). The neurons in the e2-layer are connected to one another with competitive weights with respect to the annular direction and are connected to one another with cooperative weights with respect to the radial direction. Therefore, when a pattern 45 shown in FIG. 33, which pattern has been extracted in the c2-layer, is transmitted as a signal weighted by a synaptic weights pattern 46 for competition and cooperation, of the neurons corresponding to the pattern 45, those neurons which are excited strongly in a pattern having a high level of continuity with respect to the radial direction cooperate with one another. As a result, neurons, which are adjacent to the neurons our responding to the end points of the broken contour lines are excited sequentially in the directions indicated by the solid line arrows in a pattern 45a. In this manner, the broken contour lines becomes continuous little by little. On the other hand, of the neurons corresponding to the pattern 45, those neurone which are excited only weakly in a pattern having a low level of continuity with respect to the radial direction (i.e., the neurons corresponding to dots in the pattern 45) compete with the neurons, which correspond to the contour lines extending in the radial direction and which are excited strongly. In this manner, the neurons corresponding to the dots in the pattern 45 are inhibited and erased by signals, which are generated by the neurons corresponding to the contour lines extending in the radial direction and having been excited strongly and which are inhibitory with respect to the annular direction (i.e., with respect to the directions indicated by the broken line arrows). As a result, a pattern 45b representing only the contour line, which is continuous in the radial direction, is obtained from the pattern 45 fed into the e2-layer.

Figure 34:
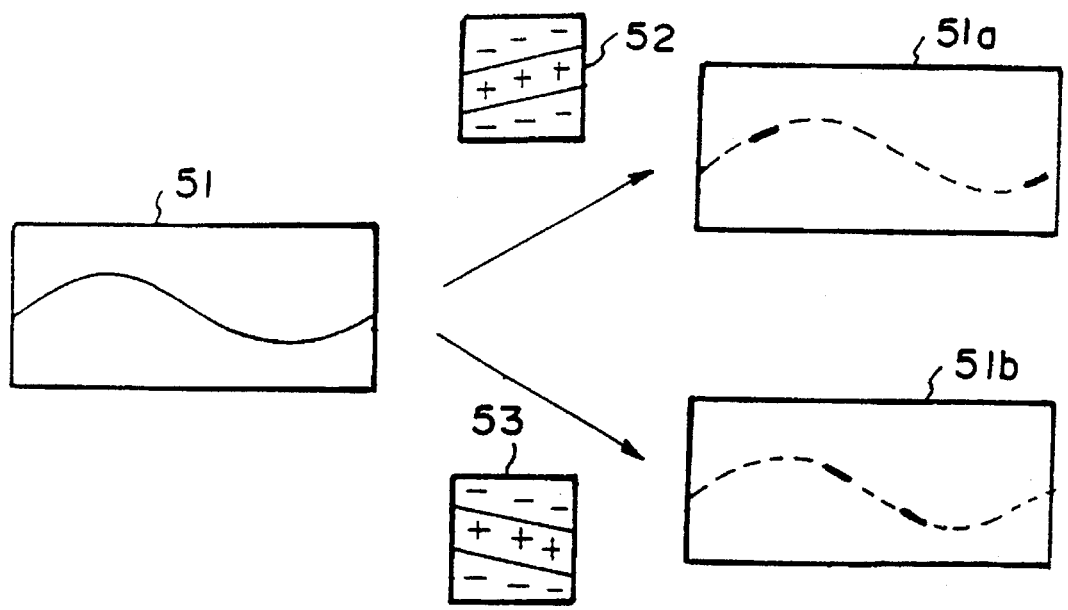
FIG. 34 is an explanatory view showing how components, which are tilted at predetermined angles with respect to an annular direction, are extracted from a contour line extending in the annular direction.

Thereafter, in the f1-layer, components, which are tilted at predetermined angles with respect to the annular direction, are extracted from the contour line extending in the annular direction, which has been selected by the e1-layer taking on the form of the interactive connection layer. Specifically, as illustrated in FIG. 34, a contour line 51 extending in the annular direction is transmitted as a signal weighted with a synaptic weights pattern 52 for extracting the components, which are tilted upwards to the right, and a synaptic weights pattern 53 for extracting the components, which are tilted upwards to the left. The synaptic weights patterns 52 and 53 for extracting the tilted components strengthen parts of the contour line extending in the direction, along which the "+" components are arrayed, and cancel parts of the contour line covering both the "+" and "−" components. Therefore, when the contour line 51 extending in the annular direction is transmitted as a signal weighted with the synaptic weights patterns 52 and 53, components 51a of the contour line 51, which are tilted upwards to the right, and components 51b of the contour line 51, which are tilted upwards to the left, are extracted. In this embodiment, the components of the contour line extending in the annular direction, which are tilted at angles ranging from 20 to 30 degrees with respect to the annular direction in the complex-log mapped plane, are extracted by the synaptic weights patterns 52 and 53 for extracting the tilted components.

Figure 35:
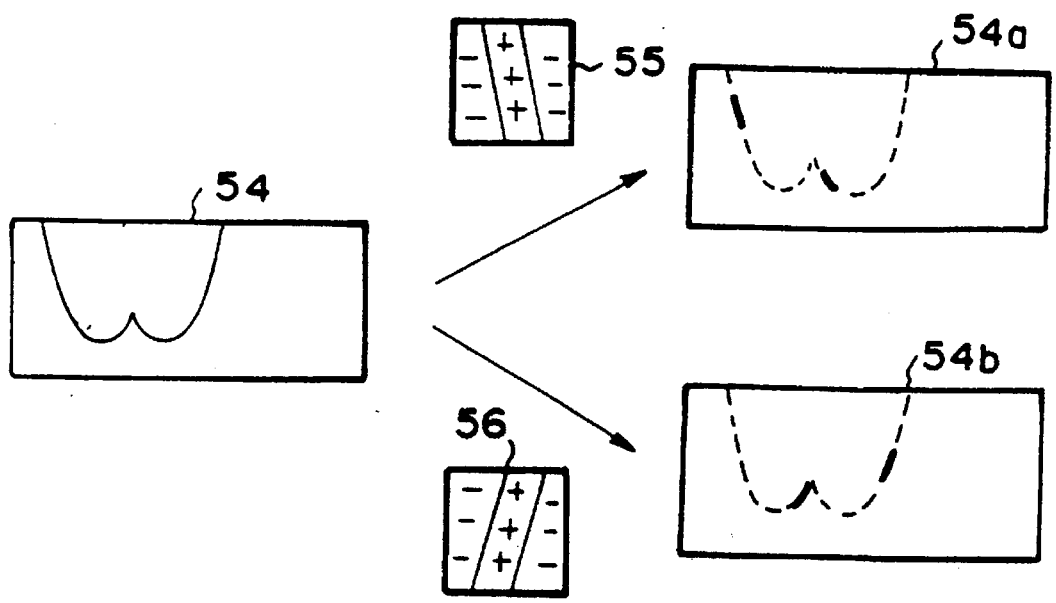
FIG. 35 is an explanatory view showing how components, which are tilted at predetermined angles with respect to the annular direction, are extracted from a contour line extending in the radial direction.

Also, in the f2-layer, components, which are tilted at predetermined angles with respect to the annular direction, are extracted from the contour line extending in the radial direction, which has been selected by the e2-layer taking on the form of the interactive connection layer. Specifically, as illustrated in FIG. 35, a contour line 54 extending in the radial direction is transmitted as a signal weighted with a synaptic weights pattern 55 for extracting the components, which are tilted upwards to the left, and a synaptic weights pattern 56 for extracting the components, which are tilted upwards to the right. Components 54a of the contour line 54, which are tilted upwards to the left, and components 54b of the contour line 54, which are tilted upwards to the right, are thereby extracted. In this embodiment, the components of the contour line extending in the radial direction, which are tilted at angles ranging from 60 to 70 degrees with respect to the annular direction in the complex-log mapped plane, are extracted by the synaptic weights patterns 55 and 56 for extracting the tilted components.

How the vector for the travel of the view window is determined from the components of the contour lines, which have been detected in the manner described above, will be described hereinbelow. As an aid in facilitating the explanation, how the vector for the travel of the view window is composed by operations in the e1-layer and those that follow will be described hereinbelow.

Figure 36:
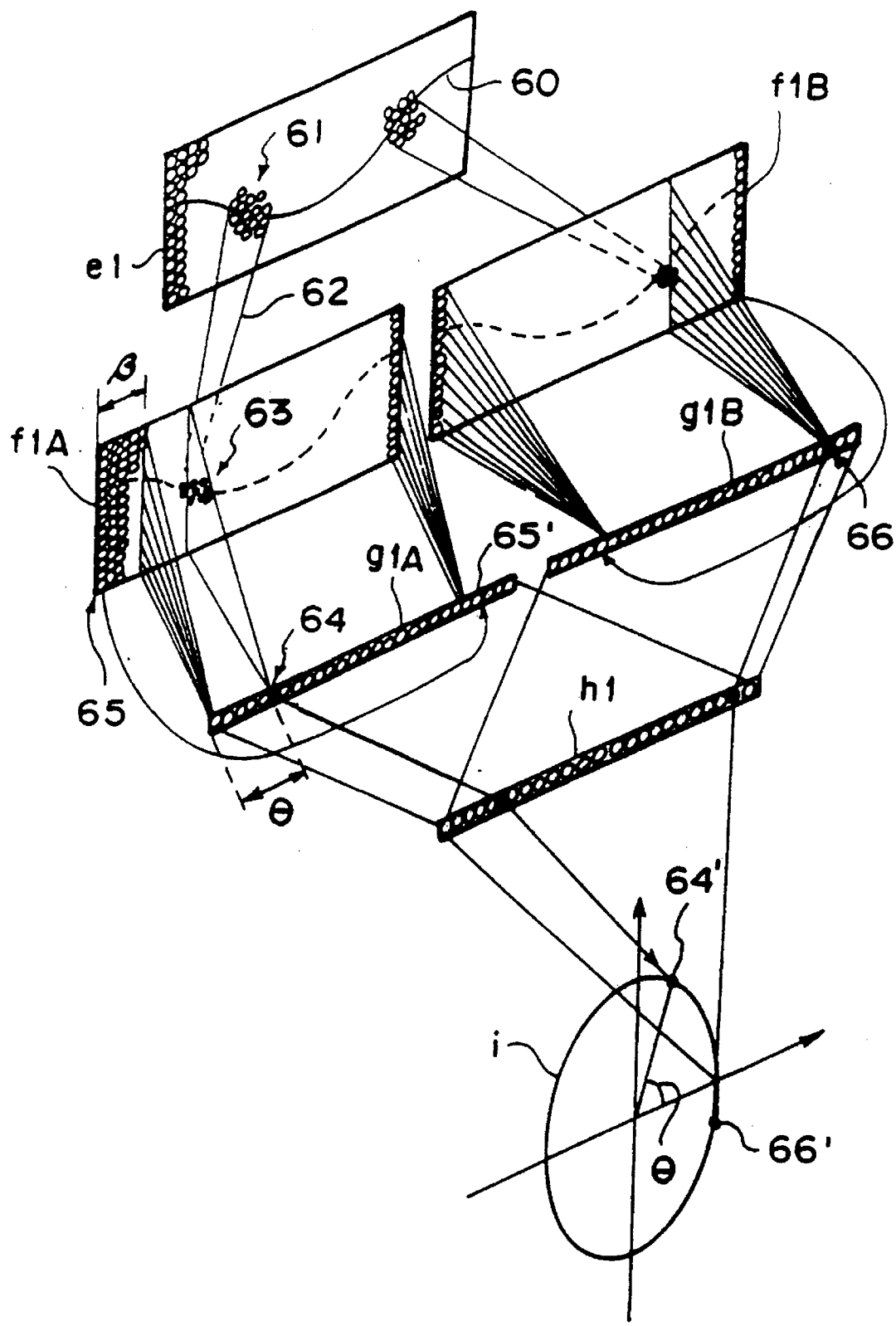
FIG. 36 is an explanatory view showing an e1-layer, an f1-layer, a g1-layer, an h1-layer, and an i-layer of the neural network shown in FIG. 28, which is employed in the first embodiment of the method for extracting an object image in accordance with the present invention.

FIG. 36 is an explanatory view showing in more detail the e1-layer, the f1-layer (constituted of f1A- and f1B-layers), the g1-layer (constituted of g1A- and g1B-layers), the h1-layer, and the i-layer of the neural network shown in FIG. 28, which is employed in the embodiment of the method for extracting an object image in accordance with the present invention.

As illustrated in FIG. 36, the respective layers are connected to one another through synaptic connections. The e1-layer and the f1-layer have the neurons arrayed two-dimensionally. The distribution of excited neurons in the e1-layer correspond to the components of the contour line of the candidate for the predetermined object image, which line extends in the annular direction and which has been selected by the interactive synaptic connections in the e1-layer.

Weight factors of synaptic connections 62, through which the excitetory signals are transmitted from the e1-layer to the f1A-layer, are set such that, of the distribution of excitation in the e1-layer, only the components 61, which are tilted upwards to the left, may be transmitted easily. Therefore, in FIG. 36, in the f1A-layer, only a group of neurons 63, which correspond to the positions of the tilted components 61, are excited. Thereafter, in order for an azimuth vector to be detected, excitetory signals are transmitted from the f1A-layer to the g1A-layer. The g1A-layer is constituted of one-dimensionally arrayed neurons and is connected to the f1A-layer through synaptic connections so as to receive the signals from the group of neurons, which are present in the same azimuth in the f1A-layer. As a result, in the g1A-layer, a neuron 64, which corresponds to the azimuth of the group of the neurons 63, is excited. The azimuth of the neuron 64 and the intensity of its excitation represent an azimuth vector. The f1A-layer and the g1A-layer should preferably be connected to each other such that the azimuth of the group of the neurons 63 and the azimuth of the neuron 64 may shift at a predetermined angle β from each other, i.e., the phases of the group of the neurons 63 and the neuron 64 may shift from each other. Alternatively, as illustrated in FIG. 37, weights W may be applied to the connections between the f1A-layer and the g1A-layer such that the weights of the connections from the neurons of the f1A-layer, which neurons correspond to positions remote from the view window, may be larger then the weights of the connections from the neurons of the f1A-layer, which neurons correspond to position closer to the view window. Both the phase shift and the weights W should more preferably be employed together.

In the same manner as that described above, excitatory signals of the components 60 tilted upwards to the right are transmitted from the f1B-layer to the g1B-layer. In the g1B-layer, a neuron 66 representing an azimuth vector is excited. In this case, too, the phase shift β and/or the weights W should preferably be employed.

Thereafter, in the h1-layer, the azimuth vectors, which have been detected by the g1A-layer and the g1B-layer in the manner described above, are combined with each other. In the i-layer, the vector for the travel of the view window is determined. The composition of the vector for the travel of the view window may be carried out in the polar coordinate system or in the Cartesian plane. In FIG. 36, the vector for the travel of the view window is composed in the Cartesian plane. The excitatory signals coming from the neurons 64 and 66 are transformed inversely to the complex-log mapping and transmitted to the i-layer. In the i-layer, the center of gravity of each azimuth vector is found and is fed out as the vector for the travel of the view window. The inputs into the i-layer are described above with respect to the detection end composition of the azimuth vector directed to the center point of the major object image. However, actually, azimuth vectors directed to a point of concentration of the contour of the major object image are also entered into the i-layer and are combined appropriately as will be described later.

How the view window travels towards the candidate for the predetermined object image in accordance with the vector for the travel of the view window, which has been determined in accordance with the contour line of the candidate for the predetermined object image in the manner described above, will be described hereinbelow.

FIGS. 39A, 39B, 39C, and 39D are explanatory views showing complex-log mapped planes and corresponding Cartesian planes as an aid in explaining how the center point of a view window travels from the side outward from a candidate for a predetermined object image to the center point of the candidate for the predetermined object image. In this example, as an aid in facilitating the explanation, the candidate for the predetermined object image is circular, and the center point of the view window travels towards the circle.

Figure 39A:
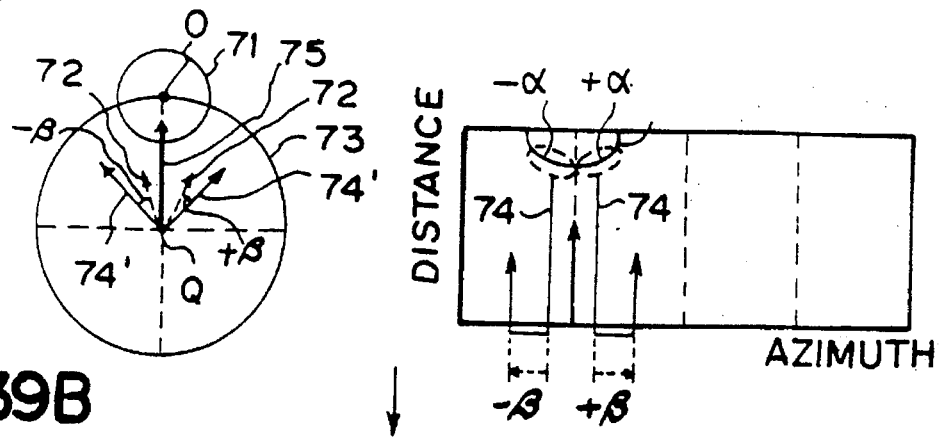
FIGS. 39A, 39B, 39C, and 39D are explanatory views showing complex-log mapped planes and corresponding Cartesian planes as an aid in explaining how a view window travels to the center point of a candidate for a predetermined object image.
Figure 39B:
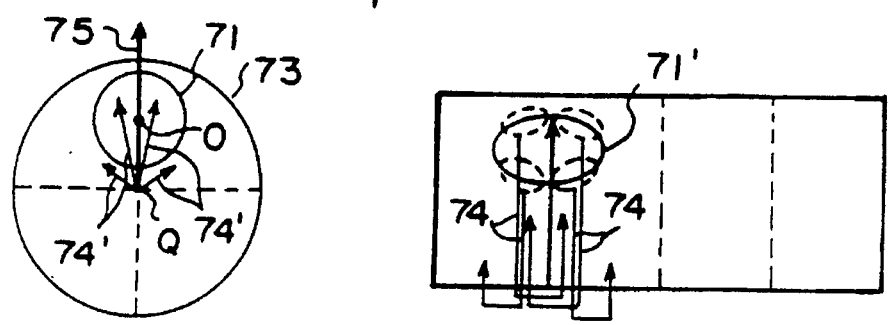

As illustrated in FIG. 39A, when part of a candidate 71 for the predetermined object image comes into a view window 73, components of a contour line of a complex-log mapped candidate 71' for the predetermined object image, which are tilted at predetermined angles +α and −α in the complex-log mapped plane shown in FIG. 39A, are detected by the f1-layer. The predetermined angles +α and −α are the angles of the tilted components of the contour line extending in the annular direction, which are extracted by the f1-layer, with respect to the annular direction. The angle of the tilt upward to the right with respect to the annular direction is taken as a positive angle, and the angle of the tilt upward to the left with respect to the annular direction is taken as a negative angle. The components tilted at the predetermined angles +α and −α are detected by the g1-layer as azimuth vectors 74, 74 (which correspond to azimuth vectors 72, 72 in the Cartesian plane). For the purposes of facilitating the travel of the center point Q of the view window 73 toward the center point O of the candidate 71 for the predetermined object image, a phase shift of +β is applied to the azimuth vector, which corresponds to the component tilted at the predetermined angle +α, and a phase shift of −β is applied to the azimuth vector, which corresponds to the component tilted at the predetermined angle −α. Also, weights in accordance with the distances between the center point of the view window and the components tilted st the predetermined angles +α and −α are applied to the azimuth vectors, which correspond to the components tilted at the predetermined angles +α and −α. In this manner, azimuth vectors 74', 74' in the Cartesian plane are obtained. In the h1-layer, a composite vector is obtained from the azimuth vectors 74', 74'. The composite vector is determined as a vector 75 for the travel of the view window 73. When the vector 75 for the travel of the view window 73 is thus determined, the view window 73 travels in accordance with the vector 75 for the travel of the view window 73. FIG. 39B shows the state of the view window 73 which has thus traveled.

Figure 39C:
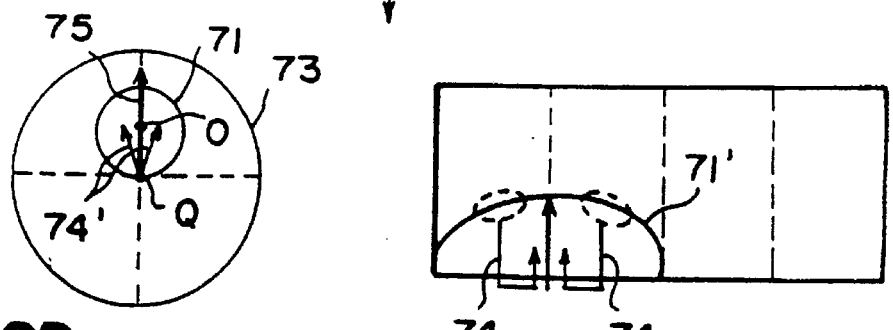

As illustrated in FIG. 39B, the center point Q of the view window 73 and the candidate 71 for the predetermined object image are brought to positons comparatively close to each other, and the whole candidate 71 for the predetermined object image comes into the region inside of the view window 73. In this state, two components tilted at the predetermined angle +α and two components tilted at the predetermined angle −α are detected. Therefore, four azimuth vectors 74, 74, 74, 74 are detected. In this case, as in the case shown in FIG. 39A, the phase shift of +β or −β and weights are applied to each azimuth vector, and a vector 75 for the travel of the view window 73 is thereby determined. The center point Q of the view window 73 travels in accordance with the vector 75 for the travel of the view window 73. FIG. 39C shows the state of the view window 73 which has thus traveled.

Figure 39D:
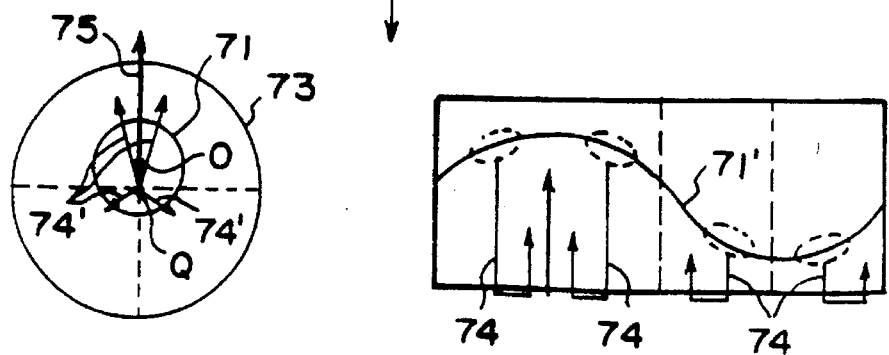

In the state shown in FIG. 39C, a vector 75 for the travel of the view window 73 is determined in the same manner as that described above, and the center point Q of the view window 73 travels in scootdance with the vector 75 for the travel of the view window 73 into the state shown in FIG. 39D. Ultimately, the position of the center point Q of the view window 73 coincides with the position of the center point O of the candidate 71 for the predetermined object image, and the center point Q of the view window 73 stops.

The value of β for the phase shift is set at a value, which falls within the range of 0 degree to less than 90–α degrees, such the the vector 75 for the travel of the view window 73 may be directed to the candidate 71 for the predetermined object image. (If the value of β for the phase Shift is larger than 90–αdegrees, the vector 75 for the travel of the view window 73 will be directed to the side opposite to the candidate 71 for the predetermined object image.)

The weights applied to the azimuth vectors 74 and 72 are set in accordance with the distances between the center point Q of the view window 73 end the components of the contour line tilted at the predetermined angles +α and −α. A larger weight is applied for a longer distance such that the vector 75 for the travel of the view window 73 may be directed to the canter point O of the candidate 71 for the predetermined object image.

As for the value of α for the aforesaid predetermined angle, in cases where the center point Q of the view window 73 is located in the region outside of the candidate 71 for the predetermined object image, the α point will certainly be present if α falls within the range of 0 degree to 90 degrees. (when α is 90 degrees, the azimuth vector comes into contact with the candidate 71 for the predetermined object image, and only a single α point is found.) Conversely, in cases where the center point Q of the view window 73 is located within the region inside of the candidate 71 for the predetermined object image, no α point will be present, depending on the distance between the center point Q of the view window 73 and the center point O of the candidate 71 for the predetermined object image and on the value of α. Experiments revealed that, in cases where the candidate 71 for the predetermined object image is circular as in this example, when α is 25 degrees, the α point becomes absent if the distance between the center point Q of the view window 73 and the center point O of the candidate 71 for the predetermined object image becomes equal to approximately 60% of the radius of the candidate 71 for the predetermined object image. When α is 45 degrees, the α point becomes absent if the distance between the center point Q of the view window 73 end the center point O of the candidate 71 for the predetermined object image becomes equal to approximately 80% of the radius of the candidate 71 for the predetermined object image. Therefore, when the value of a is small, the center point Q of the view window 73 can travel to the center point O of the candidate 71 for the predetermined object image. However, actually, the candidate for the predetermined object image is not a true circle but has one of various shapes. Accordingly, the value of α should preferably be sat in accordance with the candidate for the predetermined object image which is to be extracted. Experience shows that, as for a natural image, the value of α should preferably fall within the range of approximately 20 to 30 degrees.

In cases where the center point Q of the view window 73 and the center point O of the circular candidate 71 for the predetermined object image coincide with each other, as illustrated in FIG. 13A, the contour line of the candidate 71 for the predetermined object image, which line is included in the center part of the view window, is expressed as a straight line parallel to the annular direction in the complex-log mapped plane. Specifically, moving the center point of the view window to the center point of the candidate for the predetermined object image is equivalent to operating such that the contour line extending in the annular direction, which line is selected by the e1-layer, may be constituted of me many components parallel to the annular direction as possible.

How the vector for the travel of the view window is determined by the f2-, g2-, and h2-layers and how the view window travels in accordance with the vector for the travel of the view window will be described hereinbelow.

FIGS. 40A, 40B, 40C, and 40D are explanatory views showing complex-log mapped planes and corresponding Cartesian planes as an aid in explaining how a view window travels to a point of intersection of contour lines of a candidate for a predetermined object image.

Figure 40A:
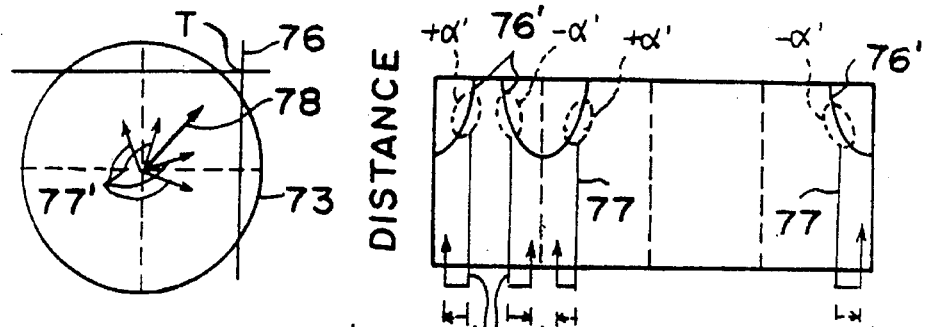
FIGS. 40A, 40B, 40C, and 40D are explanatory views showing complex-log mapped planes and corresponding Cartesian planes as an aid in explaining how a view window travels to a point of intersection of contour lines of a candidate for a predetermined object image.
Figure 40B:
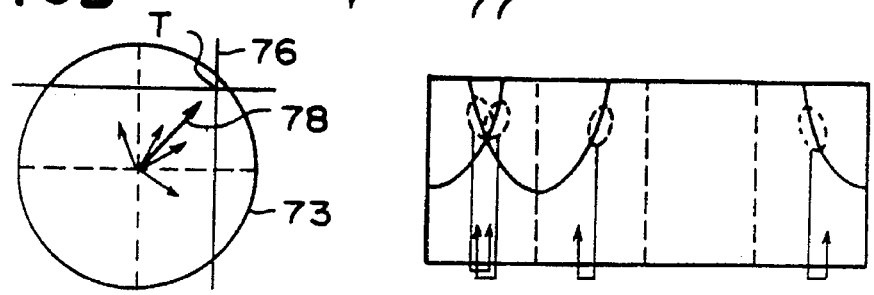

As illustrated in FIG. 40A, when part of a candidate 76 for the predetermined object image comes into a view window 73, components of a contour line of a complex-log mapped candidate 76' for the predetermined object image, which are tilted at predetermined angles +α' and −α' in the complex-log mapped plane shown in FIG. 40A, are detected by the f2-layer. The predetermined angles +α' and −α' are the angles of the tilted components of the contour line extending in the radial direction, which are extracted by the f2-layer, with respect to the annular direction. The angle of the tilt upward to the right with respect to the annular direction is taken as a positive angle, and the angle of the tilt upward to the left with respect to the annular direction is taken as a negative angle. The components tilted at the predetermined angles +α' and −α' are detected by the g2-layer as azimuth vectors 77, 77, 77, 77. For the purposes of facilitating the travel of the center point Q of the view window 73 toward the point of intersection T of the contour lines of the candidate 76 for the predetermined object image, a phase shift of +β is applied to the azimuth vector, which corresponds to the component tilted at the predetermined angle +α', and a phase shift of −β' is applied to the azimuth vector, which corresponds to the component tilted at the predetermined angle −α'. Also, weights are applied to the azimuth vectors, which correspond to the components tilted at the predetermined angles +α' and −α'. In this manner, azimuth vectors 77', 77', 77', 77' in the Cartesian plane are obtained. In the h2-layer, a composite vector is obtained from the azimuth vectors 77', 77', 77', 77'. The composite vector is determined as a vector 78 for the travel of the view window 73, and the information representing the composite vector is fed out from the i-layer. When the vector 78 for the travel of the view window 73 is thus determined, the view window 73 travels in accordance with the vector 78 for the travel of the view window 73. FIG. 40B shows the state of the view window 73 which has thus traveled.

Figure 40C:
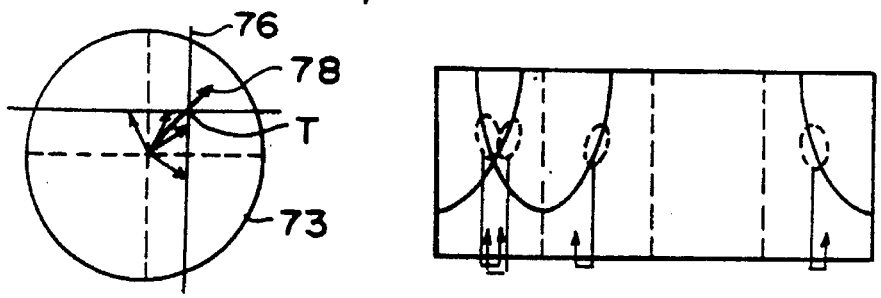
Figure 40D:
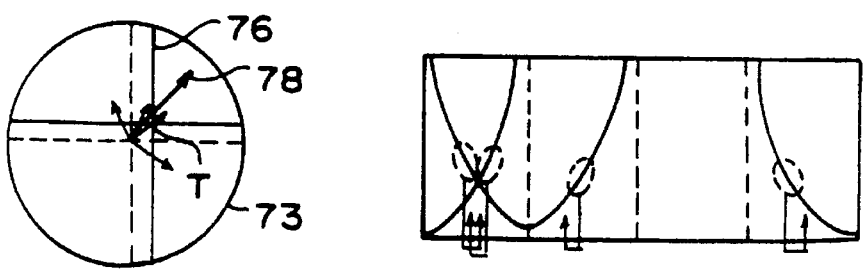

In the state shown in FIG. 40B, a vector 78 for the travel of the view window 73 is determined in the same manner as that described above, and the center point Q of the view window 73 travels in accordance with the vector 78 for the travel of the view window 73 into the state shown in FIG. 40C and the state shown in FIG. 40D. Ultimately, the position of the center point Q of the view window 73 coincides with the point of intersection T of the contour lines of the candidate 76 for the predetermined object image, and the center point Q of the view window 73 stops.

As for the value of α' for the predetermined angle, in cases where the angle of the vertex is small, and at the same time the value of α' is small, two +α' points and two −α' points are present. However, if the value of α' is larger than a certain value, only a single +α' point (and only a single −α' point) will be present. If the value of α' is less than 90 degrees, at least a single α' point will be present. Under such a condition that two α' points are present, a vector merely composed from the azimuth vectors directed from the center point of the view window 73 to the two α' points serves as the vector for the travel of the view window 73 towards the vertex. However, problems will occur if only a single α' point is present or if no such point is present. Experiments have shown that, if the value of α' for the predetermined angle is small, the α' point becomes absent as the vertex angle of the object image becomes larger. Therefore, in order to ensure that the view window 73 travels towards the vertex regardless of what value of angle the vertex may have, it is first necessary that the α' point is present. Accordingly, the value of α' for the predetermined angle should preferably be close to 90 degrees.

As illustrated in FIG. 41, in cases where the center point Q of the view window and the vertex lie on a single horizontal line, the vertex angle extends symmetrically upwards and downwards with respect to the horizontal line, and only a single α' point is present, the vector 78 for the travel of the view window, which vector is composed from the azimuth vectors 77, 77, is directed to the side opposite to the vertex. In order to eliminate such a problem, as illustrated in FIG. 42, phase shifts of +β and −β should be applied such that the vector 78 for the travel of the view window may be directed to the vertex. For this purpose, the phase shifts of +β and −β should be applied such that the azimuth vectors 77, 77 may be brought at least to the side rightward from a perpendicular 79, which passes through the center point Q of the view window. The value of β' is set so as to satisfy the conditions

β'>α'−C/2, and

0<β'<π° where C represents the value of the angle of the vertex to be detected and satisfies the condition of O<C<360°.

By the application of the appropriate phase shift and weighting, the center point Q of the view window 73 can be moved to the point of intersection of the contour lines of the candidate 76 for the predetermined object image regardless of at what angle the contour lines may intersect with each other.

In cases where the center point Q of the view window 73 and the vertex of the candidate 76 for the predetermined object image coincide with each other, as illustrated in FIG. 13B, the contour lines of the candidate 76 for the predetermined object image, which is cut out in accordance with the view window 73, are expressed as straight lines parallel to the radial direction in the complex-log mapped plane. Specifically, moving the center point of the view window to the vertex of the candidate for the predetermined object image is equivalent to operating such that the contour line extending in the radial direction, which line is selected by the e2-layer, may be constituted of as many components parallel to the radial direction as possible.

In the i-layer, the vector for the travel of the view window, which vector has been obtained in the h1-layer, and the vector for the travel of the view window, which vector has been obtained in the h2-layer, are combined appropriately. The Information representing the composite vector for the travel of the view window is fed out of the i-layer. How the i-layer functions will be described hereinbelow.

It often occurs that the vector for the travel of the view window, which vector has been obtained in the h1-layer, and the vector for the travel of the view window, which vector has been obtained in the h2-layer, become different from each other, depending on the circumstances. For example, in cases where the center point of the view window is located in the region outside of the predetermined object image, the aforesaid two types of the vectors for the travel of the view window are directed to the same direction. In cases where the center point of the view window is located in the immediate vicinity of the predetermined object image or in the region inside of the predetermined object image, the aforesaid two types of the vectors for the travel of the view window become different from each other. Therefore, when the outputs of the neural network, which are determined by the h1- and h2-layers, are utilized in a well-balanced manner, the view window can be moved in accordance with a desired predetermined object image. For example, in cases where a characteristic shape of part of a predetermined object image is to be detected and utilized for learning operations, or the like, much importance may be attached in the i-layer to the output obtained from the h2-layer. In cases where the whole predetermined object image is to be found, much importance may be attached in the i-layer to the output obtained from the h1-layer.

At the same time as when the vector for the travel of the view window is calculated from the contour line of the candidate for the predetermined object image in the manner described above, a vector for the travel of the view window is also calculated from a movement of the candidate for the predetermined object image.

In the case of a moving image, there is a strong probability that a moving object with respect to the background will constitutes a candidate for the predetermined object image. Therefore, the candidate for the predetermined object image can be extracted accurately by canceling the background, extracting only the moving object, and causing the view window to travel.

How the vector for the travel of the view window is calculated from the movement of an object in the neural network processing unit 3 for search will be described hereinbelow.

Figure 3:
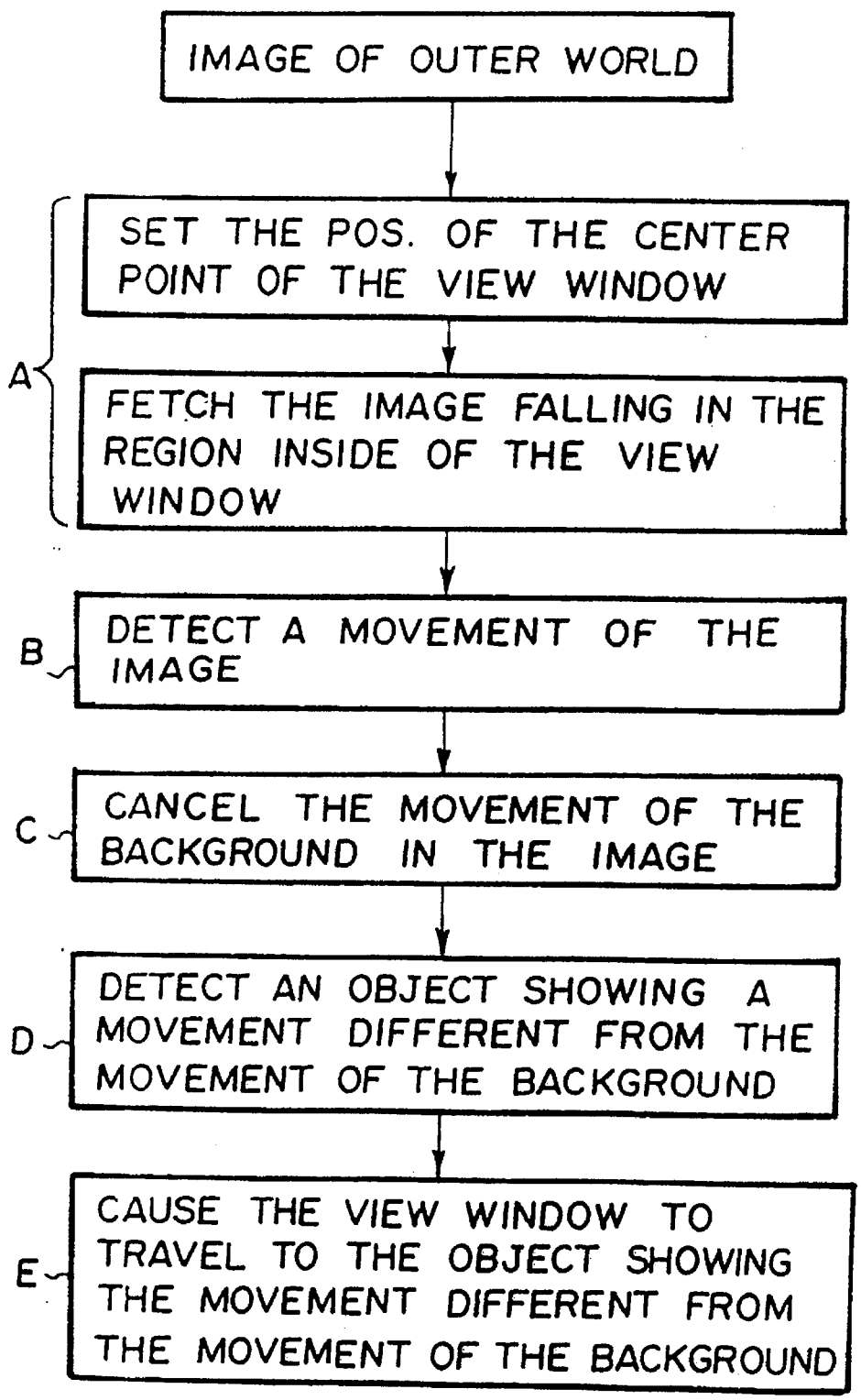
FIG. 3 is a block diagram showing a fundamental concept behind the calculation of a vector for the travel of the view window from the movement of an object in the first embodiment of the method for extracting an object image in accordance with the present invention.

FIG. 3 is a block diagram showing a fundamental concept behind the calculation of a vector for the travel of the view window from the movement of an object. In this embodiment, a neural network is utilized in order to extract a candidate for a yacht image, which serves as a candidate for the predetermined object image, from an image.

As illustrated in FIG. 3, in this embodiment, in a step A in the neural network, the position of the center point of the view window is set in the image, and part of the image falling in the region inside of the view window is fetched from the image. Thereafter, in a step B, a movement of the image, i.e., a movement of the image in an in-plane parallel direction, an in-plane rotating direction, and/or a radial direction, ie detected. In a step C, the movement of the background is canceled (compensated for). Thereafter. in a step D, an object, which exhibits a movement different from the movement of the background. i.e., a candidate for the predetermined object image, is detected. In a step E, the view window is caused to travel to the object that exhibits the different movement.

Movements of an image correspond to the three types of movements described below.

(1) A movement, which is parallel to the image plane, in a plane, which is normal to the line of vision. (This movement corresponds to an eyeball movement or a movement of an image input device, such as a camera, in a direction which is normal to the line of vision.)

(2) A movement of enlargement or reduction around viewpoint. (This movement corresponds to a movement of an image input device in a direction heading to or away from the outer world along the line of vision.)

(3) A clockwise or counter-clockwise rotation movement around the line of vision. (This movement corresponds to a rotation movement of an image input device around the line of vision.) Any movement can be classified into one of these three movements.

FIG. 4 is an explanatory view showing an example of a neural network for detecting the movement of the image.

A signal, which represents part of an image of the outer world and which is obtained through the view window having a predetermined size, is fed into the neural network. Also, a signal representing the direction, in which the image moves, is fed out of the neural network. The aforesaid parallel movement is space invariant in Cartesian plane. Therefore, the detection of the parallel movement should preferably be carried out in the Cartesian plane. On the other hand, the enlargement or reduction movement and the rotation movement are space variant in the Cartesian plane but can be processed as being space invariant after being transformed with the complex-log mapping. Therefore, the detection of the enlargement or reduction movement and the rotation movement should preferably be carried out in the complex-log mapped plane.

The layers of the neural network employed in this embodiment have the functions described below. This neural network is divided into a neural network 10, which detects a parallel movement of the image, and a neural network 20, which detects an enlargement or reduction movement and a rotation movement. The basic structure of the neural network, which is employed in this embodiment, is of the layered type. The neural network 10 for detecting a parallel movement of the image is constituted of an A1-layer provided with the view window having a predetermined size, in which layer the image is cut out with the size of the view window and fed into the neural network, and an A2-layer for imparting a time lag to the cut-out image. The neural network 10 is also constituted of a C1-layer for detecting the contour lines of an object image, which is embedded in the image having been out out in the A1-layer, and a C2-layer for detecting the contour lines of the object image, which is embedded in the image having been imparted with the time lag in the A2-layer. The neural network 10 is additionally constituted of a D1-layer for finding the difference between the image, which has been obtained the detection of the contour lines in the C1-layer, and the image, which has been obtained from the detection of the contour lines in the C2-layer. The neural network 10 is further constituted of E1-, E2-, E3-, and E4-layers for extracting only the components in predetermined directions from the difference, which has been found in the D1-layer. The neural network 10 is also constituted an F1-layer for generating an output, which represents the movement of the image as the azimuth of a parallel movement, from the components of the contour lined having been extracted in the E1-, E2-, E3-, and E4-layers.

On The other hand, the neural network 20 is constituted of an A3-layer provided with the view window having a predetermined size, in which layer the image is cut out with the size of the view window and is fed into the neural network, and an A4-layer for imparting a time lag to the cut-out image. The neural network 20 is also constituted of a B1-layer for transforming the image, which has been cut out in the A3-layer, with the complex-log mapping, and a B2-layer for transforming the image, which has been imparted with the time lag in the A4-layer, with the complex-log mapping. The neural network 20 is additionally constituted of a C3-layer for detecting the contour lined of an object image, which is embedded in the complex-log mapped image obtained in the B1-layer, and a C4-layer for detecting the contour lines of the object image, which is embedded in the complex-log mapped image obtained in the B2-layer. the neural network 20 is further constituted of a D2-layer for finding the difference between the image, which has been obtained from the detection of the contour lines in the C3-layer, and the image, which has been obtained from the detection of the contour lines in the C4-layer. The neural network 20 also has E5- and E6-layers for extracting only the components in the radial direction from the difference having been found in the D2-layer. The neural network 20 additionally has E7- and E8-layers for extracting only the components in the annular direction from the difference having been found in the D2-layer. The neural network 20 further has an F2-layer for generating an output, which represents the movement of the image as the enlargement or reduction movement, i.e., as the azimuth of a radial movement, from the components of the contour lines having been extracted in the E5- and E6-layers. The neural network 20 also has an F3-layer for generating an output, which represents the movement of the image as the azimuth of a rotation movement, from the components of the contour lines having been extracted in the E7- and E8-layers.

In the neural network employed in this embodiment, the synaptic connections between adjacent ones among the B-layer and those that follow are space invariant. Also, the synaptic connections in each of these layers are space invariant. The space invariance is adopted in order to facilitate the model simulation and parallel processing, and the synaptic connections need not necessarily be space invariant. Mowever, in cases where the synaptic connections are space invariant, the output of each neuron becomes equivalent to an output obtained when the result of an operation of convolution (i.e., matching with a synaptic weights pattern) of the synaptic connection matrix and the preceding neuron layer matrix is passed through a nonlinear function. Therefore, computational processing becomes markedly easy when simulation of the neural network is carried out with a computer. In the neural network employed in this embodiment, positive neuron signals and positive and negative synaptic connections are used. Specifically, when a positive signal is transmitted through a positive connection, it is transmitted as a positive excitatory signal. When a positive signal is transmitted through a negative connection, it is transmitted as a negative excitatory signal. However, the neuron signals are not limited to positive signals, and a neuron model may be employed wherein neuron signals include positive and negative excitatory signals, synaptic connections include positive and negative connections and wherein, when a negative signal passes through a negative connection, it is transmitted as a positive excitatory signal.

The neural network 10 has the functions described below. First, in the A1-layer, an image 11A at the time t, which is shown in FIG. 8A and which falls in the region inside of the view window having a predetermined size, is cut out. Also, in the A2-layer, en image 11B at the time t+α, which is shown in FIG. 5B and which falls in the region inside of the view window having the predetermined size, is cut out. To the image 11B at the time t+α, a movement has been added which is parallel to the image plane and which is reverse to a movement of an image input device, such as a camera. As compared with the image 11A, the image 11B has moved upwardly (the image input device has moved downwerdly).

Figure 5A:
FIGS. 5A and 5B are diagrams showing images at the time t and the time t+α.
Figure 5B:
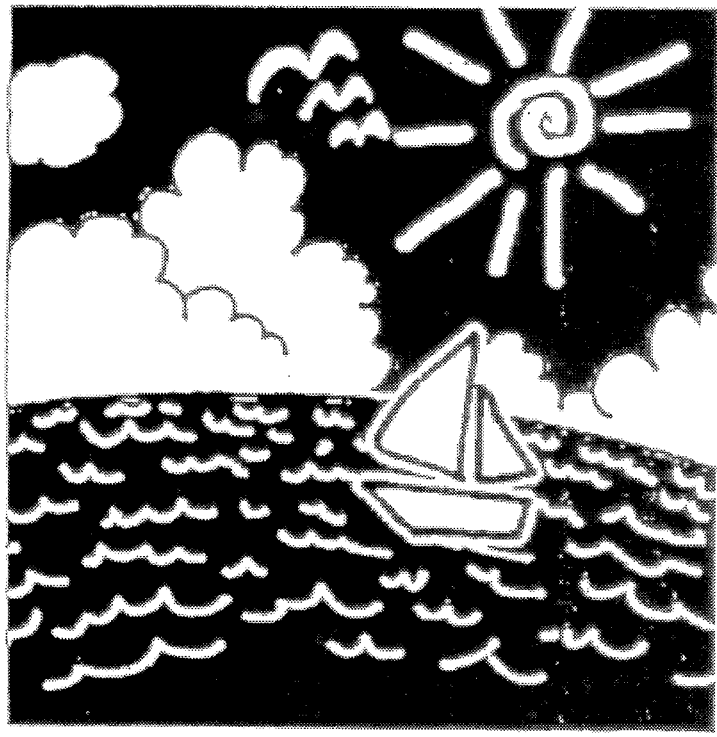
Figure 6:
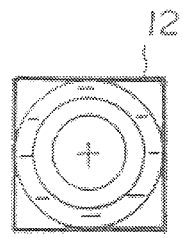
FIG. 6 is an explanatory view showing a synaptic weights pattern for extracting the contour lines.
Figure 7A:
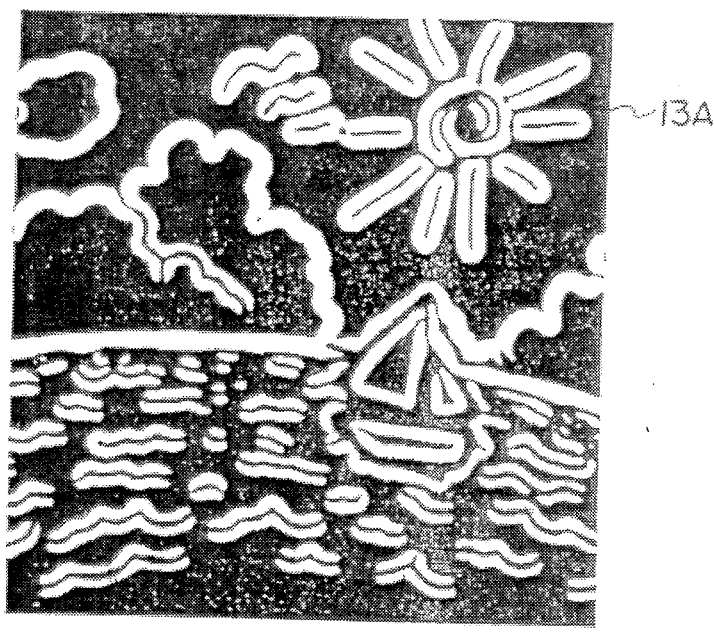
FIGS. 7A and 7B are diagrams showing contour lines in the images at the time t and the time t+α.
Figure 7B:
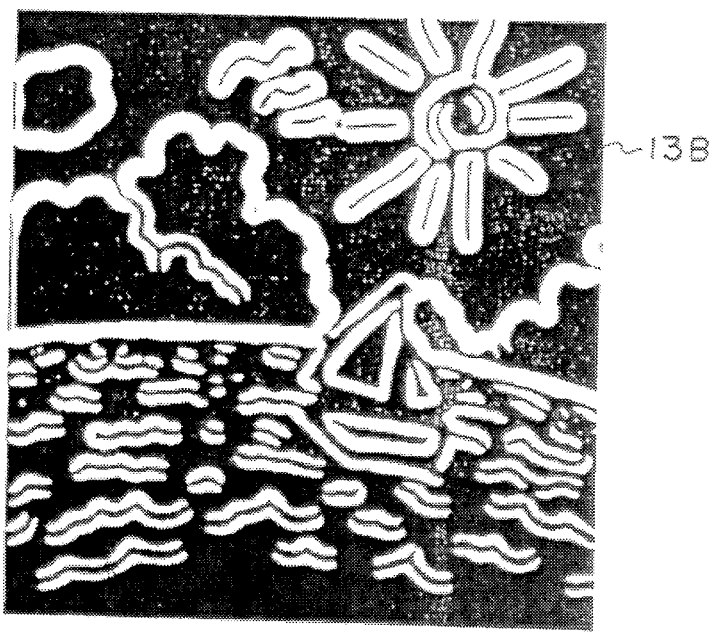

In FIGS. 5A and 5B, the white parts in each image represent that the signal intensity is high, and black parts in each image represent that the signal intensity is low. Thereafter, in the C1- and C2-layers, contour lines of object images, which are embedded in the images 11A and 11B having been out out in the A1- and A2-layers, are detected. Specifically, the images 11A and 11b are transmitted as signals weighted with a synaptic weights pattern 12 for extracting the contour lines, which is shown in FIG. 6. In this manner, the contour lines in the images 11A and 11B are detected, which contour lines are indicated by images 13A and 13B shown in FIGS. 7A and 7B.

Figure 8:
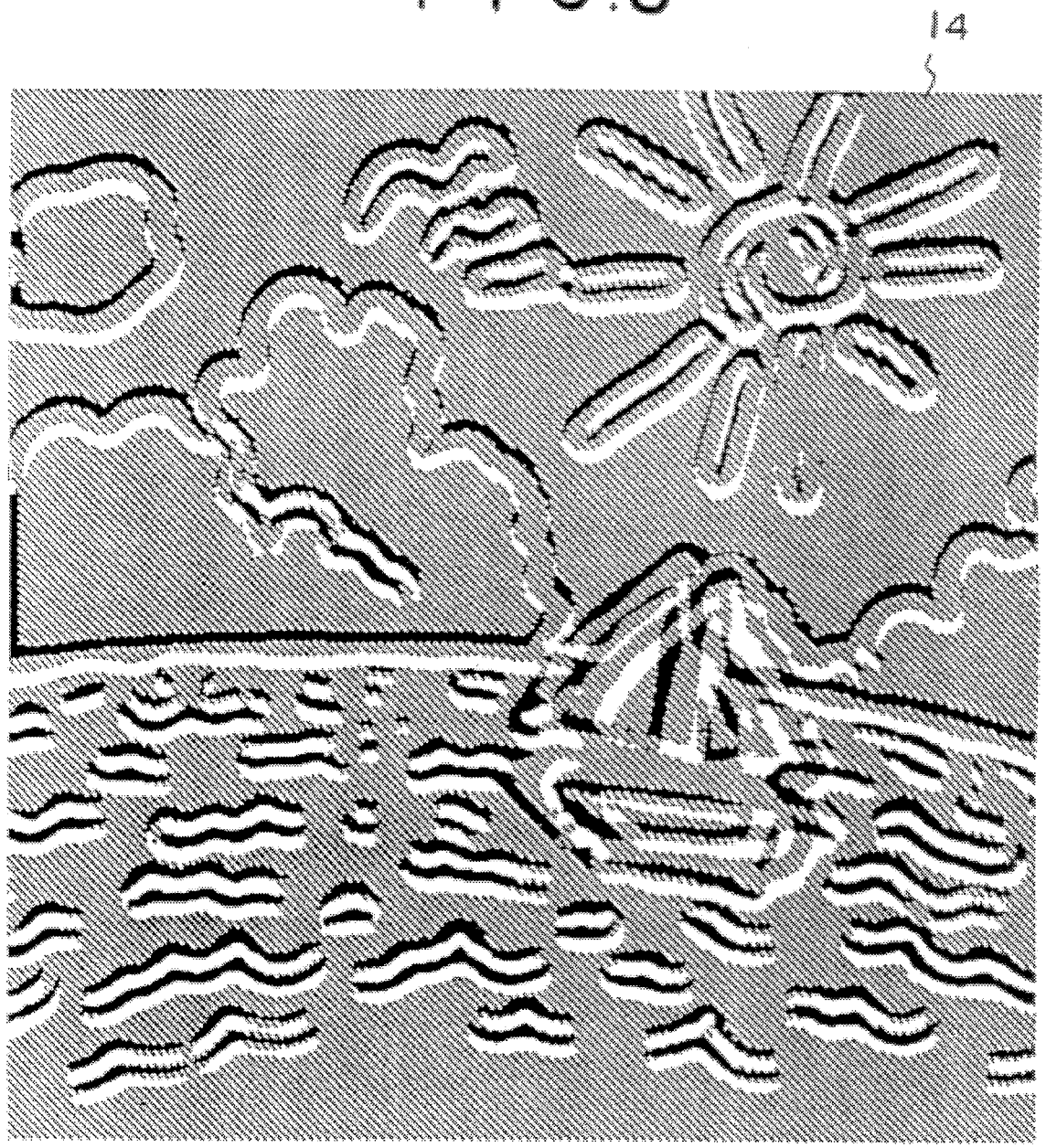
FIG. 8 is a diagram showing the difference between the contour lines in the images at the time t and the time t+α.
Figure 9:
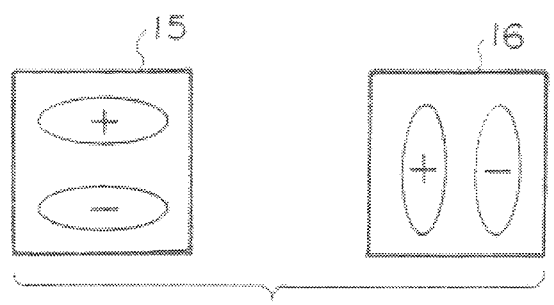
FIG. 9 is an explanatory view showing a synaptic weights pattern for extracting upward movement components and a synaptic weights pattern for extracting leftward movement components.
Figure 10A:
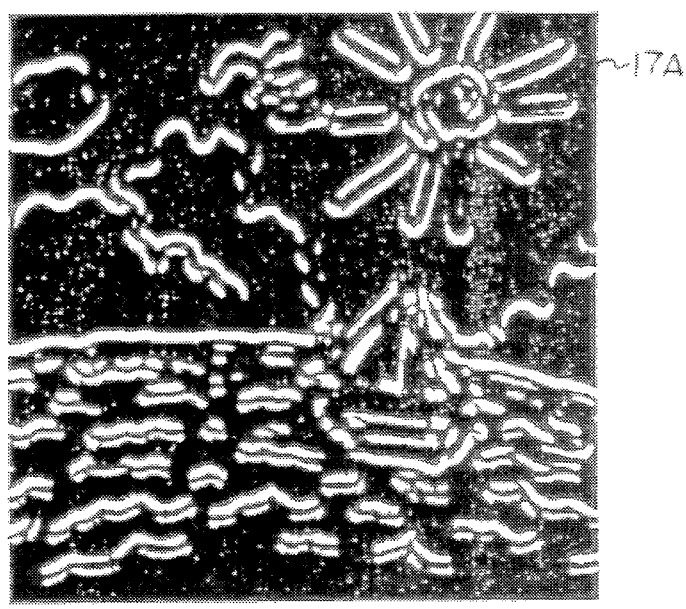
FIGS. 10A and 10B are diagrams showing images, in which the movement components of contour lines in a parallel direction have been extracted.
Figure 10B:
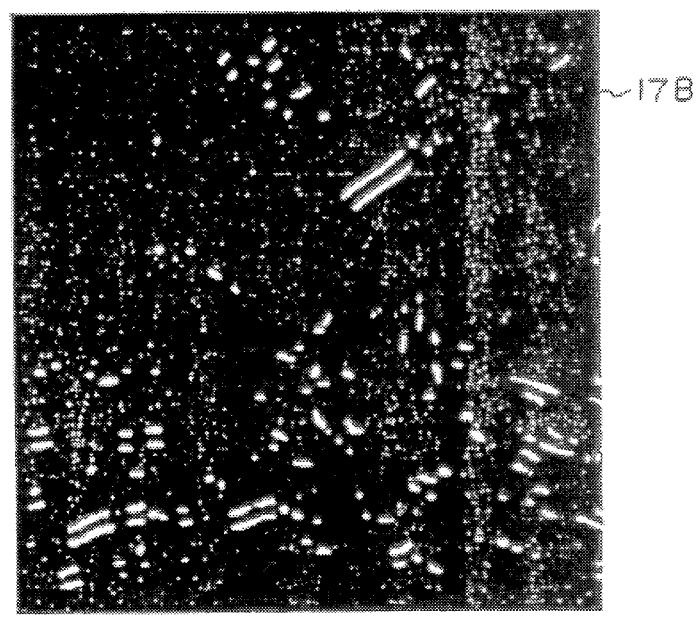

Thereafter, in the D1-layer, an operation is carried out in order to find the difference between the image 13A, which has been obtained from the detection of the contour lines in the C1-layer, and the image 13B, which has been obtained from the detection of the contour lines in the C2-layer. Specifically, the operation expressed as (image 13A–image 13B) is carried out. In this manner, an image 14 shown in FIG. 8 is obtained. Specifically, the D1-layer receives neuron signals with positive weights from the C1-layer and receives neuron signals with negative weights from the C5-layer. The hatched parts in FIG. 8 indicate that the signal value is zero. Thereafter, in the E1-, E2-, E3-, and E4-layers, the image 14 is transmitted as 2 signal weighted with synaptic weights patterns for detecting movements parallel to the image plane, and components representing the respective directions of the movements are extracted. As an aid in facilitating the explanation, in this example, only two types of components of movements, i.e., the components in the upward direction and the components in the leftward direction, are extracted by using a synaptic weights pattern 15 for extracting the upward components and a synaptic weights pattern 16 for extracting the leftward components, which patterns are shown in FIG. 9. An image 17A shown in FIG. 10A and an image 17B shown in FIG. 10B respectively indicate the results of the transmission of the image 14 as the signal weighted by the synaptic weights pattern 15 and the synaptic weights pattern 16. Information representing the components of the movements of the contour lines, which components have been extracted in the E1-, E2-, E3-, and E4-layers, is fed into the F1-layer. Thereafter, the portion of the neural network constituted of F1-, F1'-, and F"-layers detects which direction of movement components were extracted more, and an output is generated which represents the azimuth of the movement in the direction parallel to the image plane. Specifically, in this embodiment, as indicated by the image 17A shown in FIG. 10A, the upward components have the highest signal intensity. Therefore, a signal having a high intensity is fed out from a neuron which represents that the upward movement occurred, and no signal is fed out from a neuron which represents that the leftward movement occurred.

The neural network 20 has the functions described below.

First, how the neural network 20 works when an image input device, such as a camera, moves towards the image and cuts out the image will be described hereinbelow.

Figure 12A:
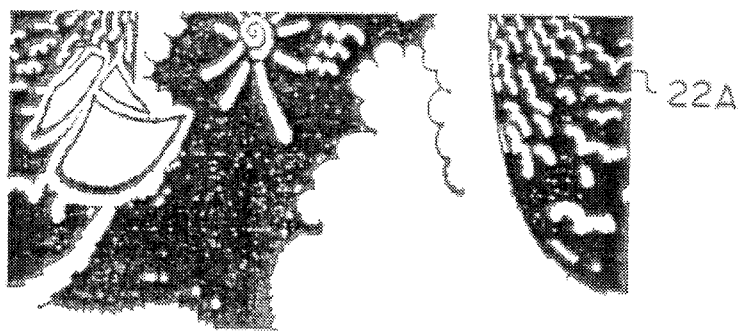
FIGS. 12A and 12B are diagrams showing images, which are obtained by transforming the images at the time t and the time t+α with complex-log mapping.
Figure 12B:
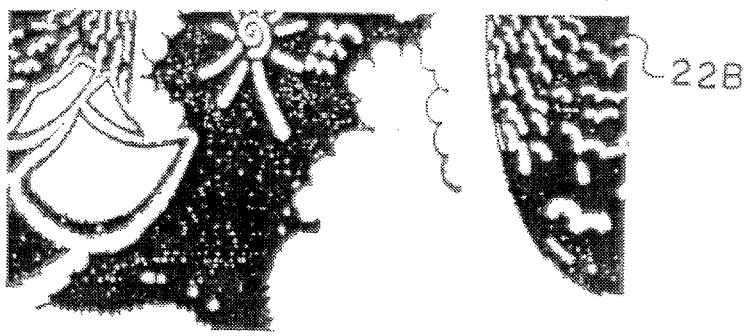

First, in the A3-layer, an image 21A at the time t, which is shown in FIG. 11A and which falls in the region inside of the view window having a predetermined size, is cut out. Also, in the A4-layer, an image 21B at the time t+α, which is shown in FIG. 11B and which falls in the region inside of the view window having the predetermined size, is cut out. To the image 21B at the time t+α, a movement causing the image to enlarge has been added by the movement of an image input device, such as a camera, towards the outer world. As compared with the image 21A, the image 21B has been enlarged. Thereafter, in the B1- and B2-layers, the images 21A and 21B having been cut out in the A3- and A4-layers are transformed with the complex-log mapping. In this manner, images 22A and 22B shown in FIGS. 12A and 12B are obtained.

Thereafter, in the C3- and C4-layers, contour lines of object images, which are embedded in the images 22A and 22B obtained from the transformation with the complex-log mapping in the B1- and B2-layers, are detected. Specifically, the images 22A and 22B are transmitted as signals weighted by the synaptic weights pattern 12 for extracting the contour lines, which is shown in FIG. 6. In this manner, the contour lines in the images 22A and 22B are detected, which contour lines are indicated by images 23A and 23B shown in FIGS. 14A and 14B.

Figure 15:
FIG. 15 is a diagram showing the difference between the contour lines in the images, which have been obtained by transforming the images at the time t and the time t+α with complex-log mapping.
Figure 16:
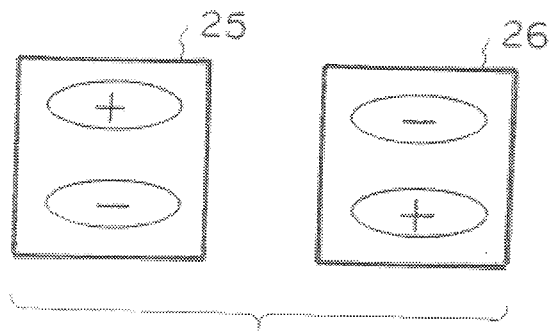
FIG. 16 is an explanatory view showing a synaptic weights pattern for extracting components in an enlarging direction and a synaptic weights pattern for extracting components in a reducing direction.
Figure 17A:
FIGS. 17A and 17B are diagrams showing images, in which the movement components of the contour lines in the radial direction have been extracted.
Figure 17B:
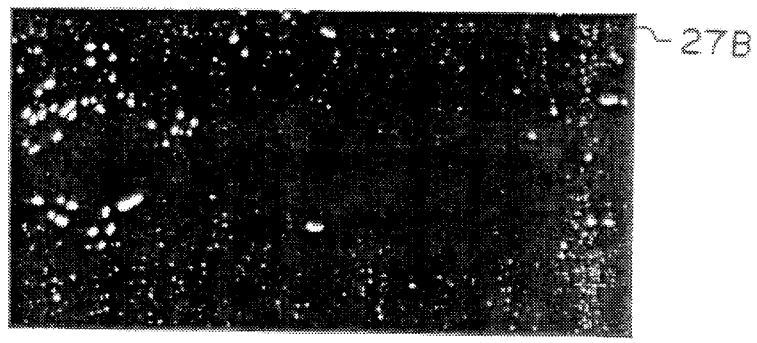

Thereafter, in the D2-layer, an operation is carried out in order to find the difference between the image 23A, which has been obtained from the detection of the contour lines in the C3-layer, and the image 23B, which has been obtained from the detection of the contour lines in the C4-layer. Specifically, the operation expressed as (image 23A–image 23B) is carried out. In this manner, an image 24 shown in FIG. 15 is obtained. Thereafter, in the E5- and E6-layers, the image 24 is transmitted as a signal weighted by synaptic weights patterns for detecting movements in the radial direction, and components representing the respective directions of the movements are extracted. Specifically, components of the movements of the image in the radial direction, which movements are due to the enlargement and reduction, are extracted by using a synaptic weights pattern 25 for extracting the components in the enlarging direction and a synaptic weights pattern 26 for extracting the components in the reducing direction, which patterns are shown in FIG. 16. An image 27A shown in FIG. 17A and an image 27B shown in FIG. 17B respectively indicate the results of the transmission of the image 24 as the signal weighted by the synaptic weights pattern 25 and the synaptic weights pattern 26. Information representing the components of the movements of the contour lines, which components have been extracted in the E5- and E6-layers, is fed into the F2-layer. Thereafter, the portion of the neural network constituted of F2-, F2'-, and F2"-layers detects which direction of movement components were extracted more, and an output is generated which represents the azimuth of the radial movement. Specifically, in this embodiment, as indicated by the image 27A shown in FIG. 17A and the image 27B shown in FIG. 17B, the intensities of the components in the enlarging direction are high, whereas the intensities of the components in the reducing direction are low. Therefore, a signal having a high intensity is fed out from a neuron which represents that the movement in the enlarging direction occurred, and no signal is fed out from a neuron which represents that the movement in the reducing direction occurred.

How the neural network 20 works when an image input device, such as a camera, rotates around the center point of its view window and fetches the image will be described hereinbelow.

Figure 18A:
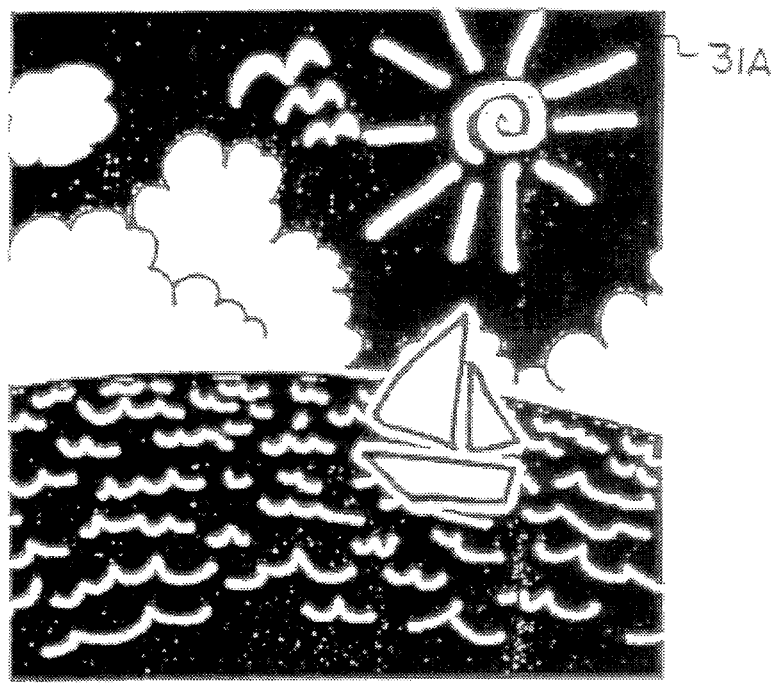
FIGS. 18A and 18B are diagrams showing images at the time t and the time t+α.
Figure 18B:
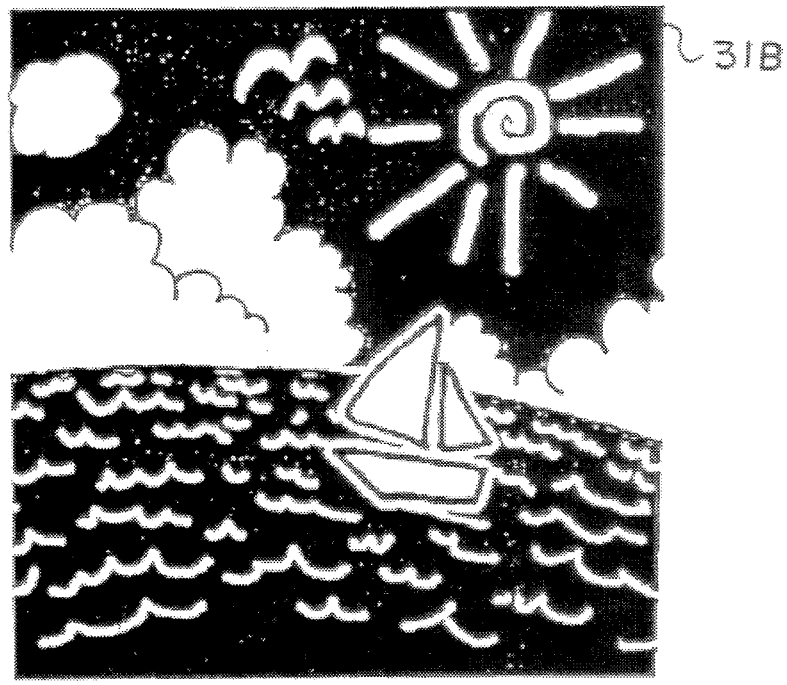
Figure 20A:
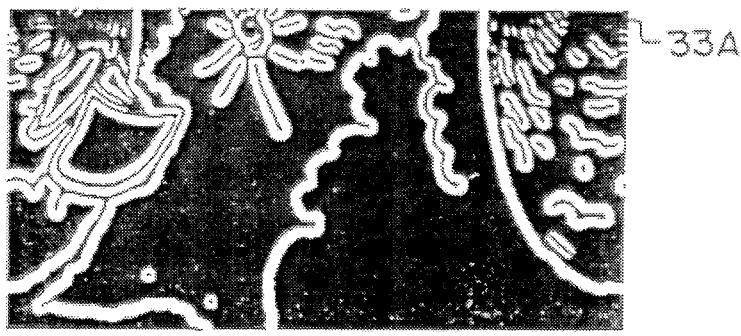
FIGS. 20A and 20B are diagrams showing contour lines in the images, which have been obtained by transforming the images at the time t and the time t+α with complex-log mapping.
Figure 20B:
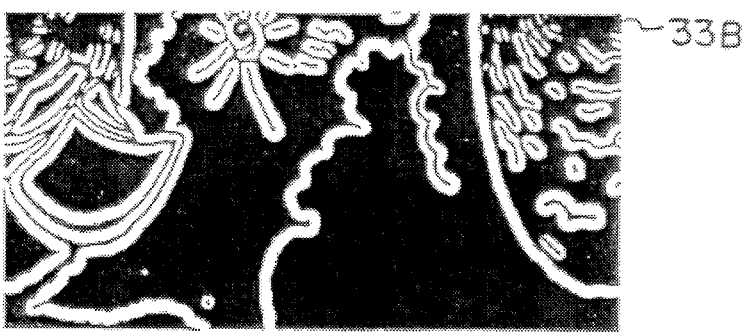

First, in the A3-layer, an image 31A at the time t, which ie shown in FIG. 18A and which falls in the region inside of the view window having a predetermined size, is cut out. Also, in the A4-layer, an image 31B at the time t+α, which is shown in FIG. 18B and which falls in the region inside of the view window having the predetermined size, is cut out. To the image 31B at the tame t+α, a rotation movement has been added by the rotation movement of an image input device, such as a camera. As compared with the image 31A, the image 31B has been rotated clockwise around the center point of the view window. Thereafter, in the B1- and B2-layers, the images 31A and 31B having been cut out in the A3- and A4-layers are transformed with the complex-log mapping. In this manner, images 32A and 32B shown in FIGS. 19A and 19B are obtained. Thereafter, in the C3- and C4-layers, contour lines of object images, which are embedded in the images 32A and 32B obtained from the transformation with the complex-log mapping in the B1- and B2-layers, are detected. Specifically, the images 32A and 32B are transmitted as signals weighted by the synaptic weights pattern 12 for extracting the contour lines, which 18 shown in FIG. 6. In this manner, the contour lines in the images 32A and 32B are detected, which contour lines are indicated by images 33A and 33B shown in FIGS. 20A and 20B.

Figure 23A:
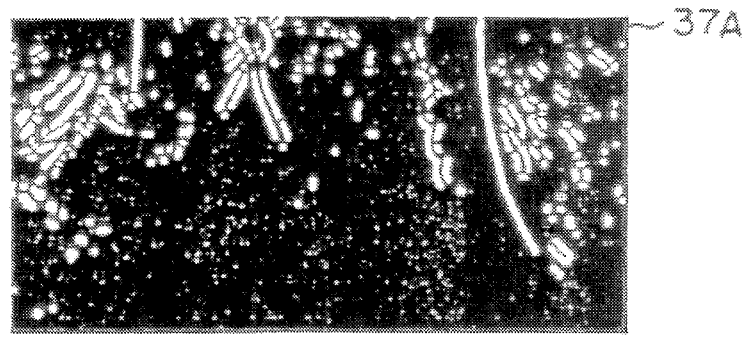
FIGS. 23A and 23B are diagrams showing images, in which the movement components of the contour lines in the rotating direction have been extracted.
Figure 23B:
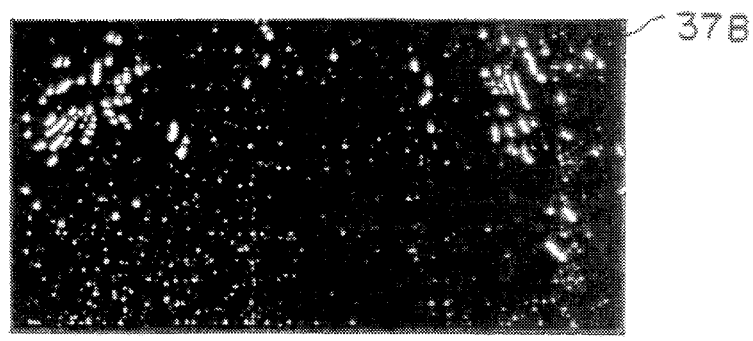

Thereafter, in the D2-layer, an operation is carried out in order to find the difference between the image 33A, which has been obtained from the detection of the contour lines in the C3-layer, and the image 33B, which has been obtained from the detection of the contour lines in the C4-layer. Specifically, the operation expressed as (image 33A–image 33B) is carried out. In this manner, an image 34 shown in FIG. 21 is obtained. Thereafter, in the E7- and E8-layers, the image 34 is transmitted as a signal weighted by synaptic weights patterns for detecting movements in the rotating direction, and components representing the respective rotating directions are extracted. Specifically, components of the rotation movements of the image in the clockwise and counter-clockwise directions are extracted by using a synaptic weights pattern 35 for extracting the components in the clockwise rotating direction and a synaptic weights pattern 36 for extracting the components in the counter-clockwise rotating direction, which patterns are shown in FIG. 22. An image 37A shown in FIG. 23A and an image 37B shown in FIG. 23B respectively indicate the results of the transmission of the image 34 as the signal weighted by the 4synaptic weights pattern 35 and the synaptic weights pattern 36. Information representing the components of the movements of the contour lines, which components have been extracted in the E7- and E8-layers, is fed into the F3-layer. Thereafter, the portion of the neural network constituted of F3-, F3'-, and F3"-layers detects which rotating direction of movement components were extracted more, and an output is generated which represents the azimuth of the movement in the in-plane rotating direction. Specifically, in this embodiment, as indicated by the image 37A shown in FIG. 23A and the image 37B shown in FIG. 23B, the intensities of the components in the clockwise rotating direction are high, whereas the intensities of the components in the counter-clockwise rotating direction are low. Therefore, a signal having a high intensity is fed out from a neuron which represents that the clockwise rotation movement occurred, and no signal is fed out from a neuron which represents that the counter-clockwise rotation movement occurred.

The detection of the movement of the image from the components of the difference contour lines in the F1-, F1'-, F1"-layers, the F2-, F2'-, F2"-layers and the F3-, F3'-, F3"-layers, can be achieved by repeatedly feeding inputs into a perception type of neural network, giving instructor signals, which represent correct results of judgment, to the neural network, and thereby carrying out leaning operations of the neural network. The neural network can thus caused to grow such that it can detect movements of images. In this manner, outputs representing correct results of detection of movements of images can be obtained from difference contour lines of various images.

Figure 24:
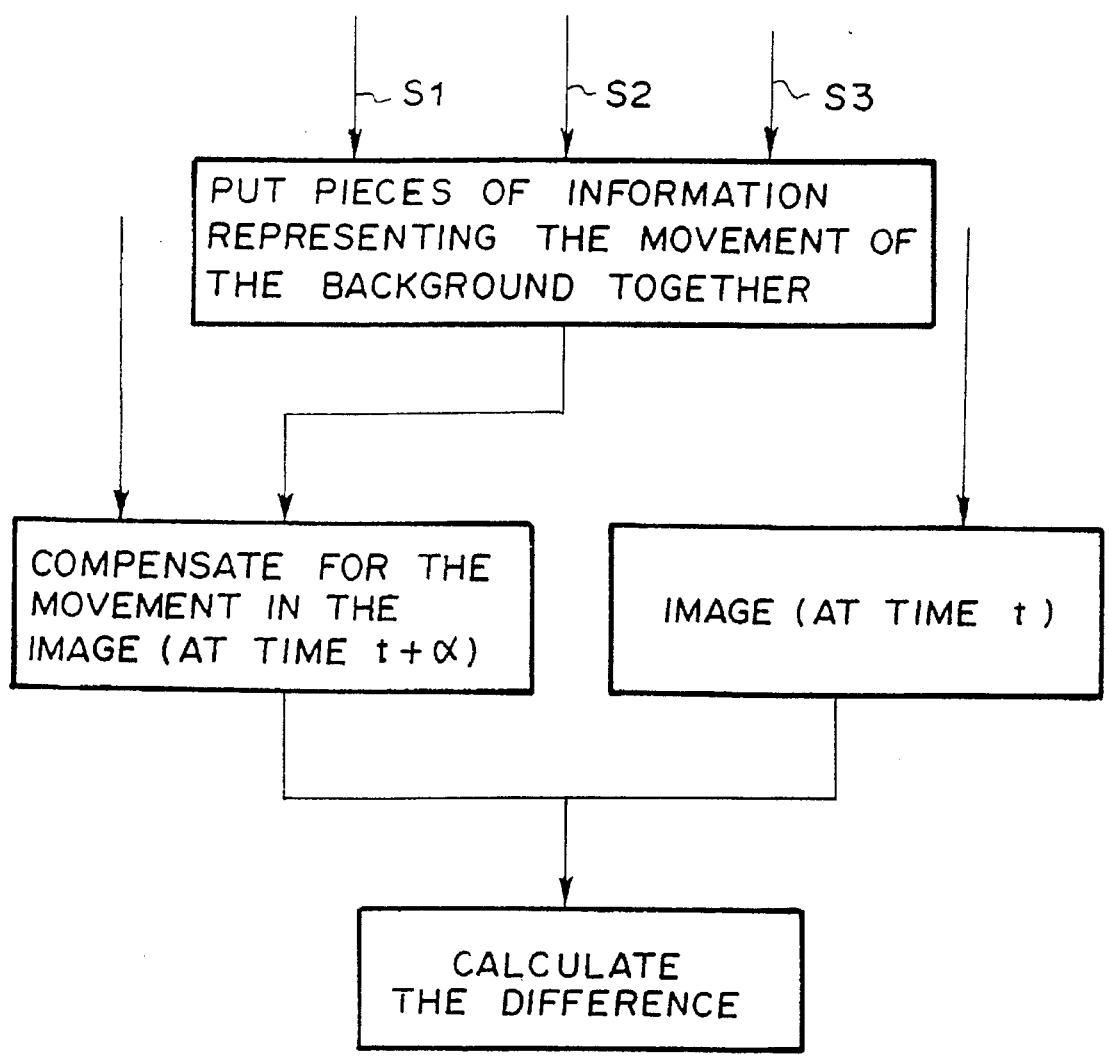
FIG. 24 is a flow chart showing a process for canceling the movement of the background in an image.

Thereafter, in the step C, the difference components representing the movement of the whole image, i.e., the background, between the two images taken up with the time difference α can be canceled (compensated for) in accordance with the movement of the whole image, which has been detected in the manner described above. Specifically, a movement reverse to the detected movement may be added in accordance with the direction and the amount of the detected image movement. FIG. 24 is a flow chart showing the process for canceling the movement of the background. For example, the signal S1, S2 or S3, which represents the results of the detection of the movement, is added in a direction, which is reverse to the direction of the detected movement, to the signal representing the image 11B, 21B, or 31B shown in FIGS. 5B, 11B, or 18B. In this manner, an image, wherein the movement of the whole image, i.e., the background, has been canceled, can be obtained from each image.

Figure 25A:
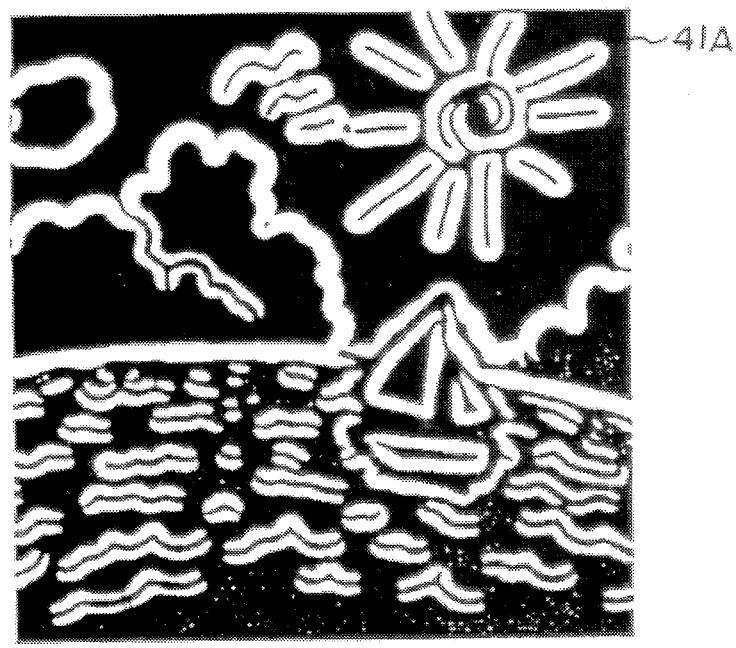
FIGS. 25A and 25B are diagrams showing images at the time t and the time t+α, in which the movement of the background has been canceled.
Figure 25B:
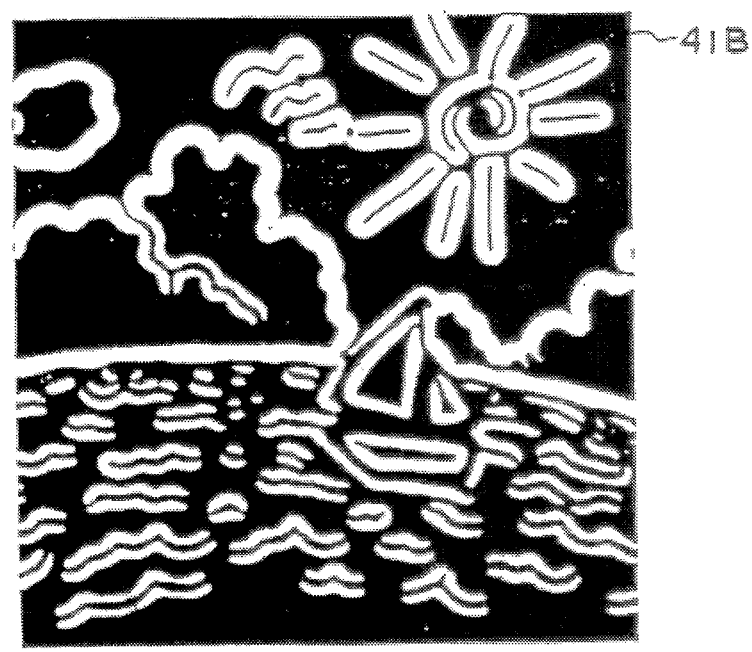
Figure 26:
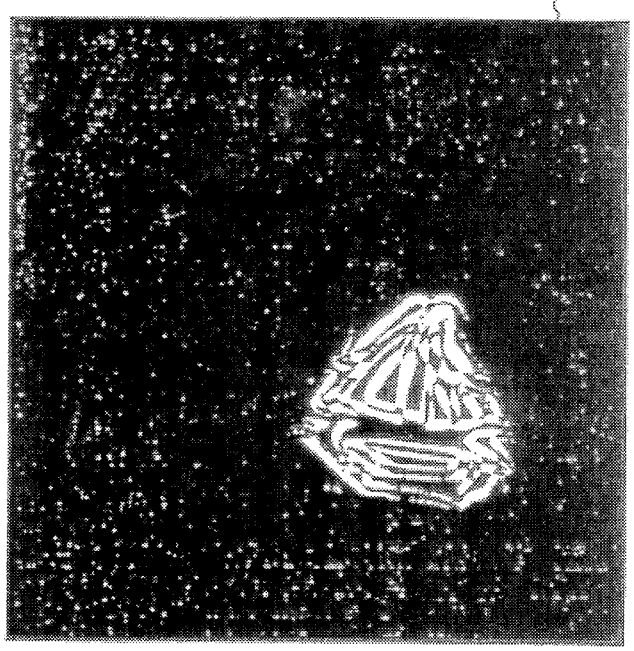
FIG. 26 is a diagram showing an image, in which the movement of the background has bean canceled.

Thereafter, in the step D, an operation is carried out to find the difference between the image at the time t+α, from which the movement of the whole image, i.e., the background, has been canceled in the step C, and the image at the time t. In this manner, only the object, which shows a movement different from the movement of the background, is extracted. Specifically, as illustrated in FIG. 25A, an image 41A is obtained by extracting the contour line components from the image at the time t, in which the movement of the background has been canceled. Also, as illustrated in FIG. 25B, an image 41B is obtained by extracting the contour line components from the image at the time t+α, in which the movement of the background has been canceled. The difference between the images 41A and 41B is found, and an image 42 shown in FIG. 26 is thereby obtained. The object embedded in the image 42, i.e., the yacht in the image in this embodiment, is the object showing a movement different from the movement of the background. This object is taken as the candidate for the predetermined object image.

Thereafter, in the step E, the view window is caused to travel towards the candidate for the predetermined object image, which candidate shows the movement different from the movement of the background. FIG. 27 is a flow chart showing the process for carrying out the travel of the view window in the step E. In the step E, in cases where a plurality of objects different from the background, i.e., a plurality of candidates for the predetermined object image, have been detected in the step D, they are narrowed down, and a candidate for the predetermined object image, which is most likely to be the predetermined object image, is thereby selected. Thereafter, the view window is caused to travel towards the selected candidate for the predetermined object image.

Figure 38:
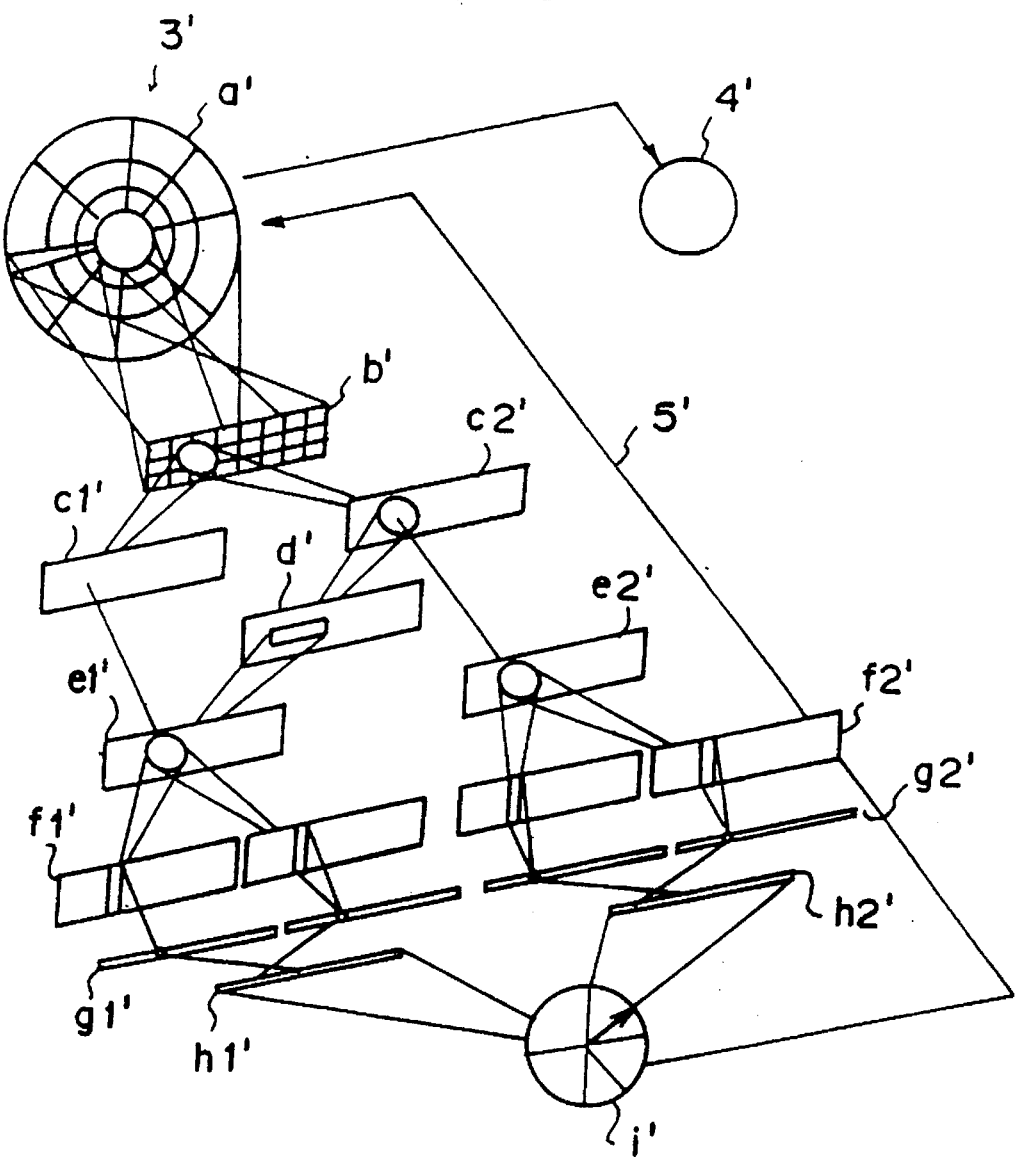
FIG. 38 is an explanatory view showing an example of a neural network for determining a vector for the travel of the view window from a contour line of a candidate for a predetermined object image.

FIG. 38 is an explanatory view showing an example of a neural network for calculating a vector for the travel of the view window from the contour line of the candidate for the predetermined object image. Elements constituting this neural network are equivalent to those constituting the neural network shown in FIG. 28, and are therefore numbered with corresponding primed reference numerals in FIG. 38. The signal, which represents the image 42 shown in FIG. 26, i.e., the image representing the contour lines of the object (the candidate for the predetermined object image) showing a movement different from the movement of the background, is fed into the neural network shown in FIG. 38. Also, the output obtained from the neural network represents the amount and the direction, in which the view window is to be moved, i.e., the vector for the travel of the view window.

At the same time as when the vectors for the travel of the view window are calculated from the contour line of the candidate for the predetermined object image and the movement of the candidate for the predetermined object image in the manner described above, a vector for the travel of the view window is also calculated from the color of the candidate for the predetermined object image.

Figure 43:
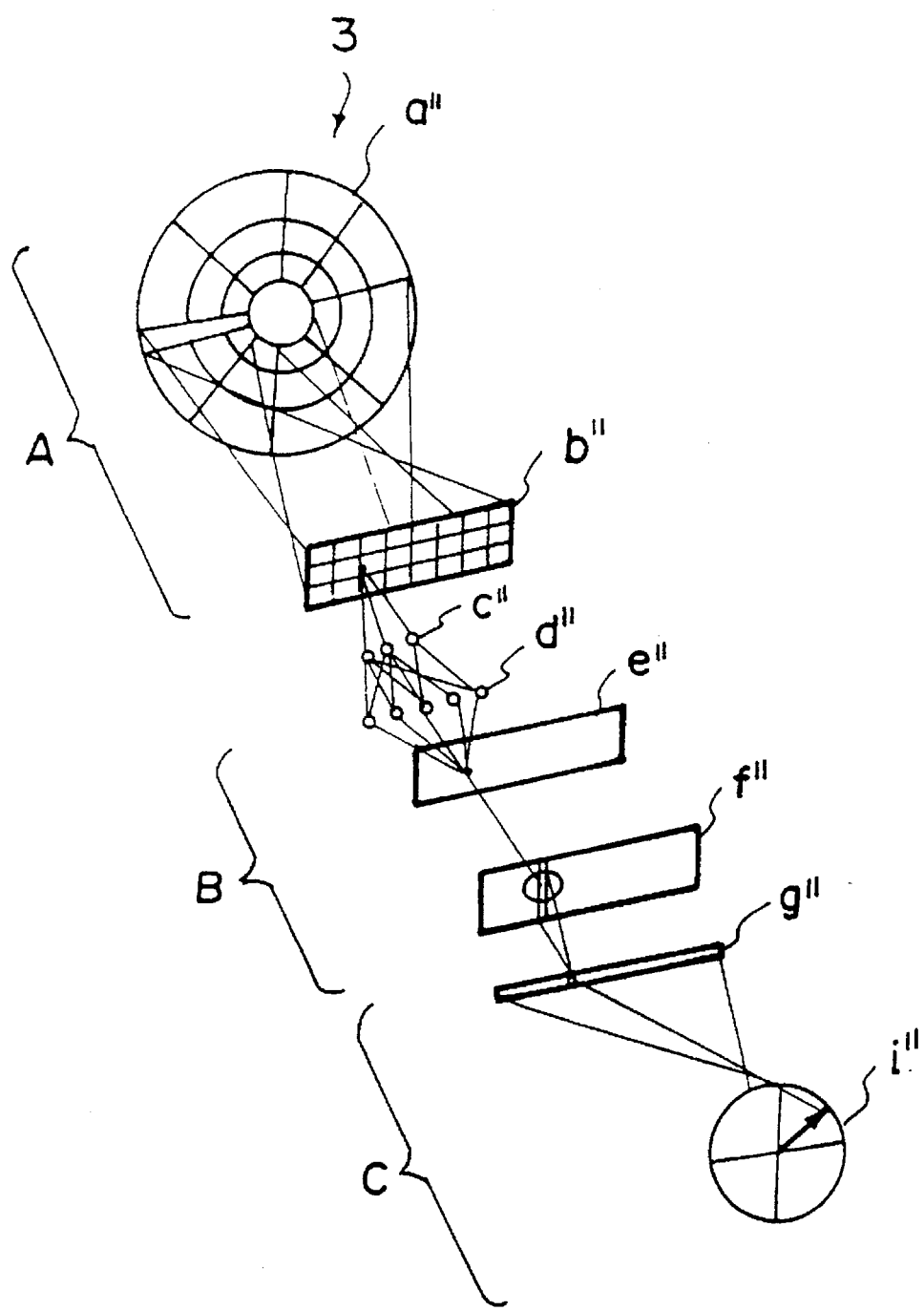
FIG. 43 is en explanatory view showing an example of a neural network for extracting a candidate for a predetermined object image in accordance with a color of the candidate for the predetermined object image in the first embodiment of the method for extracting an object image in accordance with the present invention.

FIG. 43 is an explanatory view showing an example of a neural network for determining a vector for the travel of a view window from the color of a candidate for a predetermined object image.

As in the embodiment of the method in accordance with the present invention wherein the vector for the travel of the view window is calculated from the contour line, a signal, which represents an image of the outer world at the time t and which is obtained through the view window having a predetermined size, is fed into the neural network. Also, the output obtained from the neural network represents the amount and the direction in which the view window is to be moved.

As in the neural network for calculating the vector for the travel of the view window from the movement of the candidate for the predetermined object image and the neural network for calculating the vector for the travel of the view window from the contour line of the candidate for the predetermined object image, the basic structure of the neural network in this embodiment is of the layered type. However, the neurons in an e"-layer are connected with each other in an interactive manner. Therefore, the neural network may also be referred to as a complex type.

The layers of the neural network employed in this embodiment have the functions described below. As in the embodiment, wherein the vector for the travel of the view window is calculated from the movement of the candidate for the predetermined object image, and the embodiment, wherein the vector for the travel of the view window is calculated from the contour line of the candidate for the predetermined object image, this neural network is divided into the three steps.

The step for setting the position of the center point of the view window in the image and fetching part of the image falling in the region inside of the view window is constituted of an a"-layer provided with the view window having a predetermined size, in which layer the image is cut out with the size of the view window and fed into the neural network, and a b"-layer for transforming the input image with the complex-log mapping (logarithmic polar coordinate transformation).

The step for narrowing a candidate for the predetermined object image down from the input image is constituted of c"-, d"-, and e"-layers for detecting neurons, which fall within a region approximately coinciding in color with the candidate for the predetermined object image, and detecting the degree of coincidence in color between the region and the candidate for the predetermined object image. The step is else constituted of an f"-layer, which is an interactive connection circuitry layer for selecting a region that exhibits a high degree of coincidence in color with the candidate for the predetermined object image and that is closer in the shape and the size to the predetermined object image.

The step for detecting a shift in position between the candidate for the predetermined object image and the view window and calculating the amount of travel of the view window is constituted of a g"-layer for detecting the azimuth and the distance of the region of the group of the neurons, which fall within a region approximately coinciding in color with the candidate for the predetermined object image, and an i"-layer for generating an output representing a vector for the travel of the view window in accordance with the detected azimuth and the detected distance. As in the aforesaid embodiments, in the neural network employed in this embodiment, the synaptic connections between adjacent ones among the b"-layer and those that follow are space invariant. Also, the synaptic connections in the interactive connection layer are space invariant.

First, in the a"-layer, part of the image falling within the region of the view window having the predetermined size is cut out. In the a"-layer, the density of the neurons provided is higher at part closer to the center point of the view window. In the b"-layer, the image, which has been fetched in the a"-layer, is transformed with the complex-log mapping by taking the center point of the view window as the pole of mapping. Because the image is thus transformed with the complex-log mapping in the b"-layer, the processes in the b"-layer and the layers that follow can be achieved by the convolution with a space invariant synaptic weights pattern.

Figure 44:
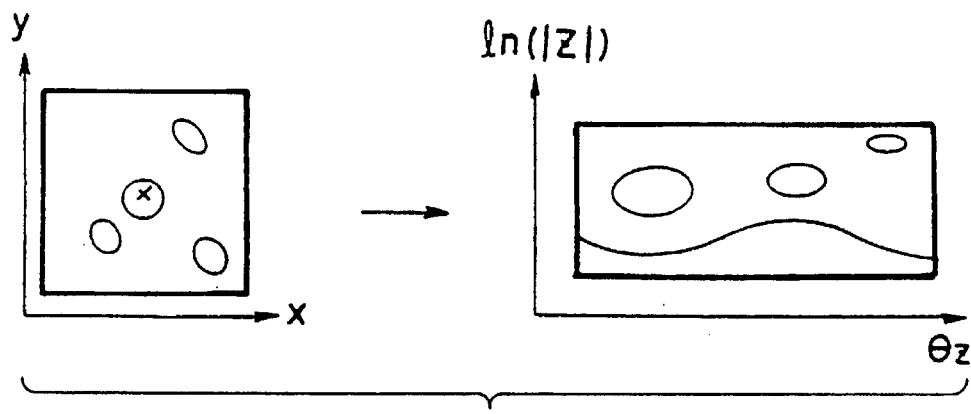
FIG. 44 is an explanatory view showing the results of transformation of various figures with the complex-log mapping.

FIG. 44 shows the results of transformation of various figures with the complex-log mapping, which is carried out in the b"-layer of the neural network shown in FIG. 43. With the complex-log mapping, in cases where a candidate for the predetermined object image is located near the pole of mapping, i.e., the center point of the view window, the candidate for the predetermined object image is transformed into a comparatively large size. In cases where a candidate for the predetermined object image is located at a position remote from the pole of mapping, i.e., the center point of the view window, the candidate for the predetermined object image is transformed into a comparatively small size. The neurons of the b"-layer are excited in accordance with the intensity of the transformed image pattern.

The portion of the neural network constituted of the c"-, d"-, and e"-layers, which portion represents an excitation pattern of the neurons corresponding to the complex-log mapped image, extracts the region approximately coinciding in color with the candidate for the predetermined object image, and detects the degree of coincidence in color between the extracted region and the candidate for predetermined object image. The neurons in the e"-layer are excited in accordance with the detected degree of coincidence in color. The synaptic connections for extracting the neurons falling within the region approximately coinciding in color with the candidate for the predetermined object image are determined through learning operations by a back propagation method, or the like.

In this embodiment, by way of example, a neural network having a three-layered structure may be employed as the portion of the aforesaid neural network for detecting the degree of coincidence in color with the candidate for the predetermined object image. Such an example will hereinbelow be described in detail.

Figure 95:
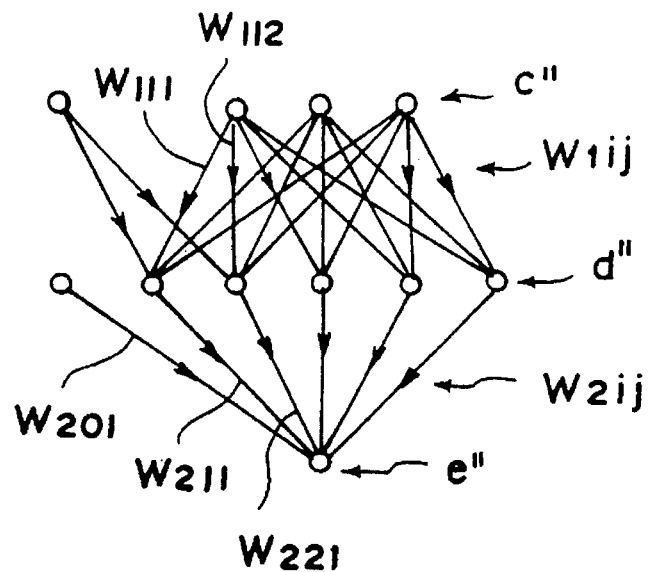
FIG. 95 is an explanatory view showing a neural network for detecting the degree of coincidence in color.

FIG. 95 is an explanatory view showing in more detail the c"-layer, the d"-layer, and the e"-layer of the neural network shown in FIG. 43, which is employed in the embodiment of the method for extracting an object image in accordance with the present invention.

The portion constituted of the c"-layer, the d"-layer, and the e"-layer may be regarded as a three-layered neural network, wherein the c"-layer serves as an input layer, the d"-layer serves as an intermediate layer, and the e"-layer serves as an output layer.

The signal fed into the c"-layer is the color information received from each of the neurons of the preceding neuron layer. In the c"-layer, the color information received from the preceding neuron layer is separated into the three primary colors of light (red, green, and blue), and a single neuron receives each piece of the color information. Therefore, in the c"-layer, three neurons are allocated to a single picture element. The signal fed into the c"-layer is weighted by the synaptic connections and transmitted to the d"-layer. The weights of the synaptic connections from the c"-layer to the d"-layer are represented by W1ij, where i represents the neurons of the c"-layer and j represents the neurons of the d"-layer.

The d"-layer is the neuron layer referred to as the intermediate layer. In general, the number of elements is selected appropriately in accordance with the level of complexity of the process to be carried out. In this example, five neurons are allocated to a single picture element. Therefore, the signal transmission from thee neurons to five neurons per picture element is carried out by 15 synaptic connections.

Signal transmission from the d"-layer to the e"-layer is then carried out. The e"-layer corresponds to the output layer of the three-layered neural network. This neural network detects the degree of coincidence in color with the candidate for the predetermined object image, and the degree of coincidence in color between a certain picture element and the candidate for the predetermined object image can be represented as the level of excitation of a single neuron. Therefore, a single neuron is allocated to each picture element. Accordingly, the signal transmission from the d"-layer to the e"-layer is carried out by five synaptic connections per picture element. The weights of the synaptic connections from the d"-layer to the e"-layer are represented by W2ij, where i represents the neurons of the d"-layer and j represents the neurons of the e"-layer.

Actually, the neurons and the synaptic connections are provided in accordance with the number of picture elements. The signal transmission from the c"-layer to the e"-layer can be carried out simultaneously for the respective picture elements. In this neural network, the processes to be carried out are identical for the respective picture elements. Therefore, the characteristics of the neurons and the weights of the synaptic connections are identical for the respective picture elements.

The synaptic connections for carrying out the operations for detecting the degree of coincidence in color with the candidate for the predetermined object image can be obtained through learning operations of the neural network. By way of example, Table 1 shows the values of synaptic weights, which may be employed in cases where the flesh color of a human face is taken as the color of the candidate for the predetermined object image and it is defined that the frequency distribution of the flesh color extracted from a certain population is proportional to the degree of coincidence in color.

TABLE 1

|  | j = 1 | 2 | 3 | 4 | 5 |
|---|---|---|---|---|---|
| $W_{11j}$ | | | | | |
| j = 0 | −5.974133e−01 | −3.722984e+00 | −3.099859e+00 | −3.255182e+00 | 5.682278e−01 |
| 1 | −1.301941e+01 | −3.950971e+00 | −6.120815e+01 | −7.632671e+01 | −2.353819e+01 |
| 2 | 2.101100e+01 | −7.874559e+01 | 1.327136e+02 | 9.696937e+01 | 2.372384e+01 |
| 3 | −8.922419e+00 | 8.247547e+01 | −6.871834e+01 | 6.977902e+01 | 1.007091e+01 |
| $W_{21j}$ | | | | | |
| j = 0 | 2.354928e+01 | | | | |
| 1 | −3.542386e+00 | | | | |
| 2 | −5.330564e+00 | | | | |
| 3 | −3.500605e+00 | | | | |
| 4 | −2.483954e+01 | | | | |
| 5 | 5.161126e+00 | | | | |

The learning operations can be carried out by using a back propagation method. First, signals representing three primary color values of various colors, including the flesh color, are employed as input signals. Also, signals representing the degrees of coincidence in color, which are determined from the frequency distribution of the flesh color, are employed as instructor signals. the input signals and the instructor signals are repeatedly given to the neural network. In accordance with differences between the instructor signals and actual outputs of the neural network, the weights of the synaptic connections are changed little by little such that the differences may become smaller. The learning operations are carried out in this manner until the neural network generates outputs identical with the instructor signals with respect to given inputs.

Figure 94:
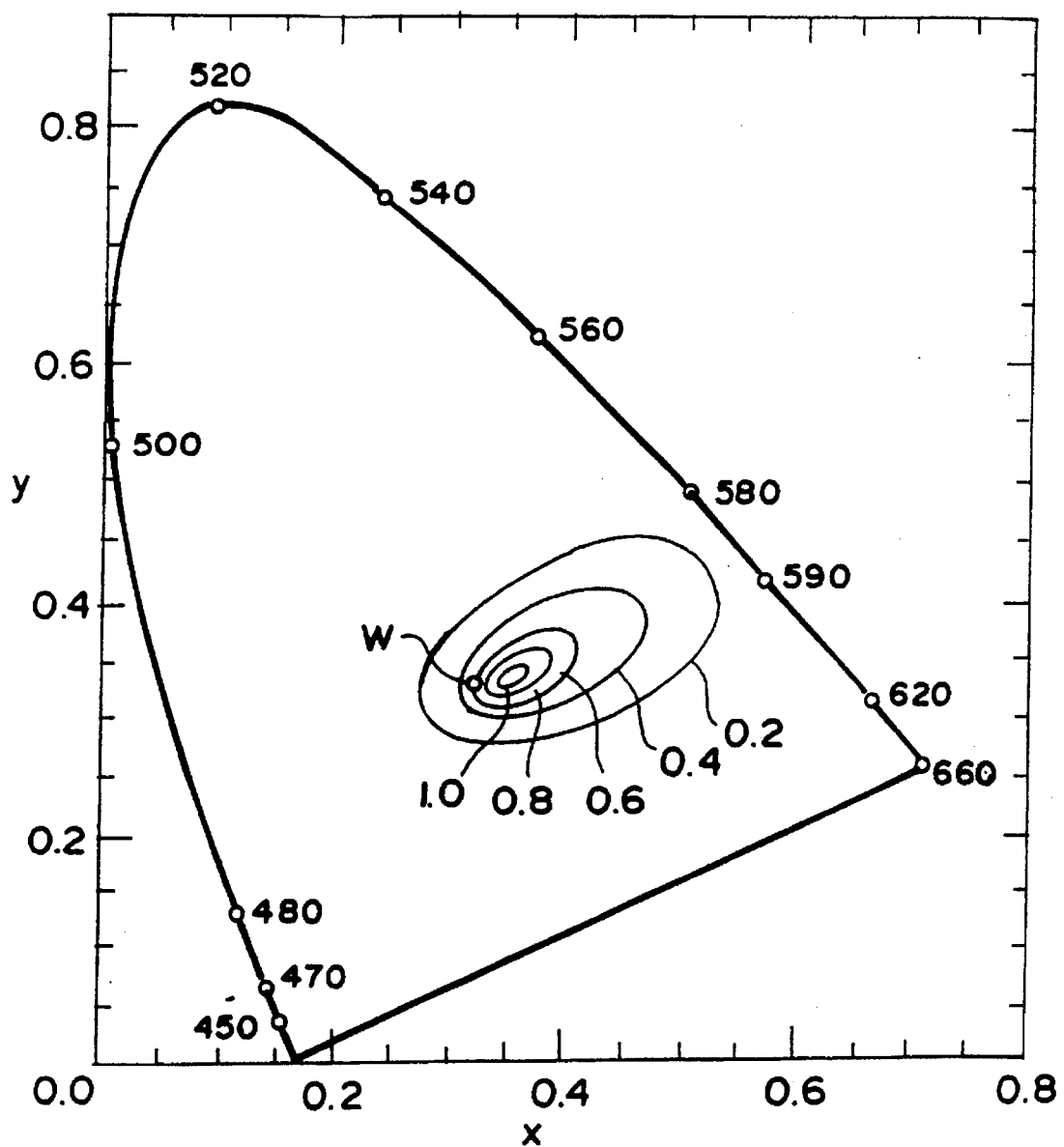
FIG. 94 is a graph showing a chromaticity diagram.

The degrees of coincidence with the flesh color, which were obtained in accordance with the outputs of this neural network, are indicated as color level lines in the chromaticity diagram illustrated in FIG. 94. The degree of coincidence in color is 1.0 for a color, which is closest to the flesh color. The degree of coincidence in color decreases as a color becomes different from the flesh color. Operations for expressing the information about the three primary color values of a color is represented as x and y coordinates on the chromaticity diagram are carried out with the formulas $$x=(1.1302+1.6387r/(r+g+b)+0.6215g/(r+g+b)/(6.7846-3.0157r/(r+g+b)-0.3857g/(r+g+b)$$

$$y=(0.0801+0.9399r/(r+g+b)+4.5306g/(r+g+b)/(6.7846-3.0157r/(r+g+b)-0.3857g/(r+g+b)$$

where r represents the red color value, g represents the green color value, and b represents the blue color value.

By use of the weights of the synaptic connections determined from the learning operations in the manner described above, the degree of coincidence in color between the extracted region and the candidate for the predetermined object image is detected by the portion of the neural network constituted of the c"-, d"-, and e"-layers. In this manner, the degree of coincidence in color can be detected as the level of excitation of the neuron of the e"-layer.

Figure 45:
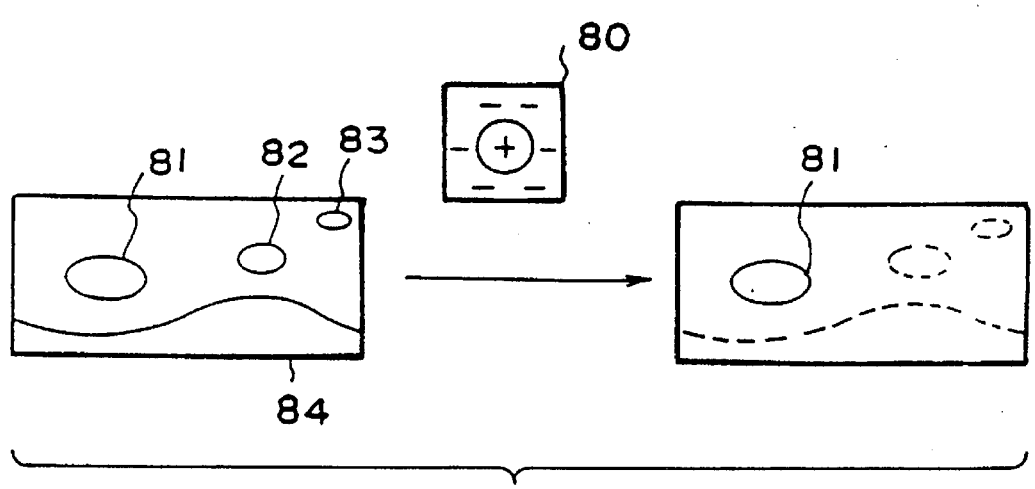
FIG. 45 is an explanatory view showing local area limited, interactive weighted connections for competition and cooperation, which are designed such that a region exhibiting a high degree of coincidence in color with a candidate for a predetermined object image may be selected.

The f"-layer is constituted of the interactive connection layer having local area limited, interactive weighted connections for composition and cooperation such that a region, which exhibits a high degree of coincidence in color with the candidate for the predetermined object image and which has a shape and a size most appropriate for the candidate for the predetermined object image, may be selected. As indicated by a synaptic weights pattern 80 shown in FIG. 45, each neuron in the f"-layer is synaptically connected with a positive weight to a nearby neuron and with a negative weight to a slightly remote neuron. Excitatory signals are transferred through such interactive connections in the f"-layer. As a result, in the f"-layer, of the neurons which have received signals from excited neurons in the e"-layer that represent high degrees of coincidence in color with the candidate for the predetermined object image, a region of a group of neurons having the predetermined shape and size and a high intensity of excitation, i.e., a high degree of coincidence in color, is selected and caused to fire, whereas neurons falling within an isolated region or a region exhibiting a low degree of coincidence in color with the candidate for the predetermined object image do not fire. By way of example, of regions 81, 82, and 83 extracted by the e"-layer, which are shown in FIG. 45, the degree of coincidence in color between the region 81 and the flesh color is assumed as being 1.0 in the aforesaid chromaticity diagram. Also, the degree of coincidence in color between the region 82 and the flesh color is assumed as being 0.9, and the degree of coincidence in color between the region 83 and the flesh color is assumed as being 0.2. In such cases, because the region 83 has a lower degree of coincidence in color with the flesh color than the regions 81 and 82, the region 83 is inhibited and erased when the region 83 and the regions 81, 82 are caused to compete with each other. Also, the region 82 has a lower degree of coincidence in color with the flesh color than the region 81, the region 82 is erased when the region 82 and the region 81 are caused to compete with each other. Additionally, because the region 81 has a high degree of coincidence in color with the flesh color, the neurons corresponding to the region 81 cooperate with one another, the level of excitation of these neurons becomes higher. Therefore, only the region 81 is selected as a result of the competition and cooperation carried out in the f"-layer.

In the f"-layer, in cases where the degrees of coincidence in color between the regions 81, 82, 83 and the flesh color are equal to one another, a region is selected which best conforms to the shape and the size of the synaptic weights pattern 80. For example, in cases where the shape and the size of the positive weight portion of the synaptic weights pattern 80 approximately coincide with the shape and the size of the region 81, the regions 82 and 83 are erased during the competition and the cooperation, and only the region 81 is selected.

Figure 96:
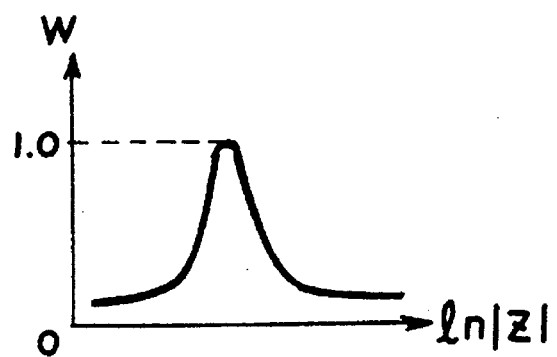
FIG. 96 is a graph showing weights applied to outputs of neurons.

Also, in the f"-layer, in cases where the degrees of coincidence in color between the regions 81, 82, 83 and the flesh color are equal to one another and the shapes and the sizes of these regions approximately coincide with one another, weights shown in FIG. 96 are given to the neurons of the f"-layer. Specifically, weights W are applied such that the weight of connection from a neuron, which falls in an area of approximately 30% to 40% of the radius of the view window, may be largest. By such application of the weights, of the regions 81, 82, and 83 located at the positions shown in FIG. 45, only the region 81 that is closest to the area of the largest weight is selected.

How a vector for the travel of the view window is determined from components of the firing region of the group of neurons exhibiting a high degree of coincidence in color with the candidate for the predetermined object image, which region has been selected in the manner described above, will be described hereinbelow.

Figure 46:
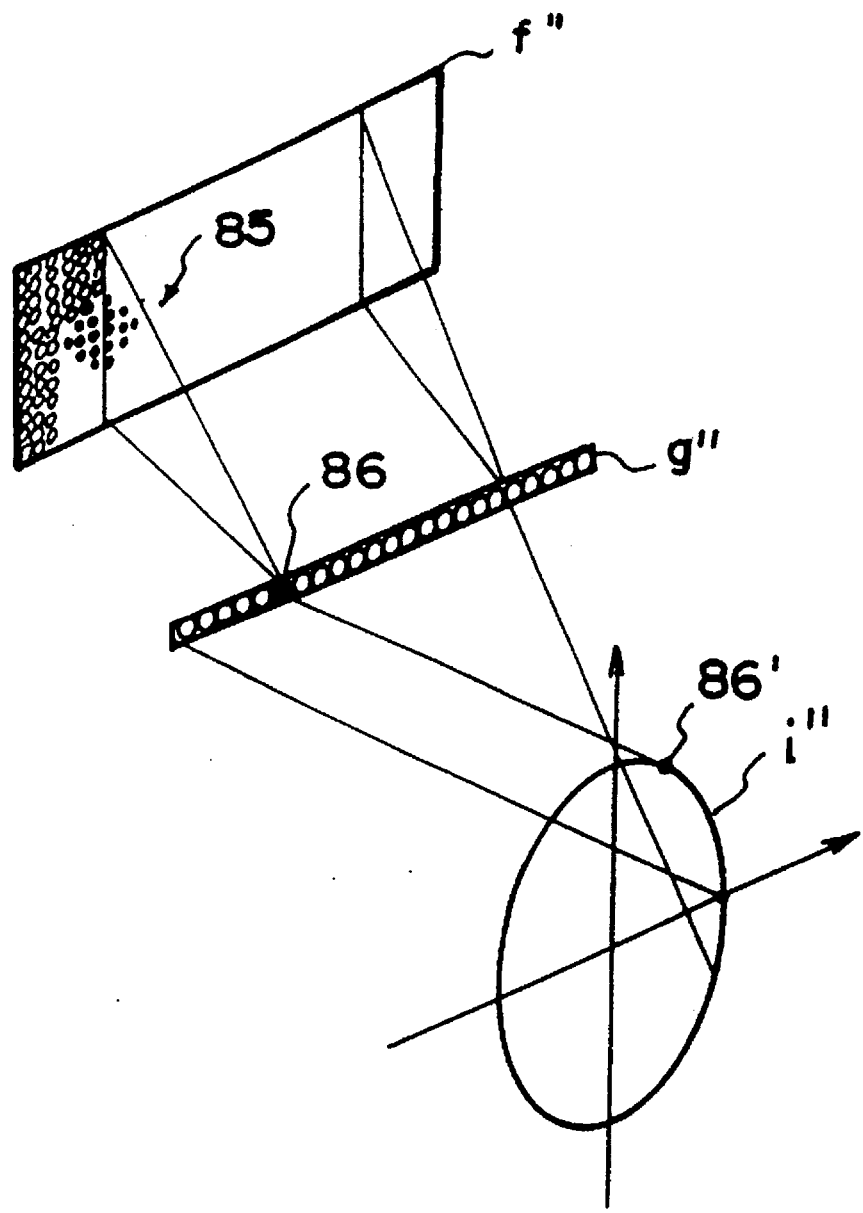
FIG. 46 is an explanatory view showing an f"-layer, a g"-layer, and an i"-layer of the neural network shown in FIG. 43, which is employed in the first embodiment of the method for extracting an object image in accordance with the present invention.

FIG. 46 is an explanatory view showing in more detail the f"-layer, the g"-layer, and the i"-layer of the neural network shown in FIG. 43, which is employed in this embodiment.

As illustrated in FIG. 46, the respective layers are connected to one another through synaptic connections. The f"-layer has the neurons arrayed two-dimensionally. The distribution of excited neurons in the f"-layer corresponds to the components of the region, which has a high degree of coincidence in color and has the shape and the size most appropriate for the candidate for the predetermined object image. This region has been selected by the interactive synaptic connections in the f"-layer.

In order for an azimuth vector to be detected, excitatory signals are transmitted from the f"-layer to the g"-layer. The g"-layer is constituted of one-dimensionally arrayed neurons and is connected to the f"-layer through synaptic connections so as to receive the signals from the group of neurons, which are present in the same azimuth in the f"-layer. As a result, in the g"-layer, a neuron 86, which corresponds to the azimuth and the distance of the group of the neurons 85, is excited. The azimuth of the neuron 86 and the intensity of its excitation represent the azimuth and the distance.

Thereafter, in the i"-layer, a vector is composed from the azimuth and the distance, which have been detected by the g"-layer in the manner described above, and the vector for the travel of the view window is thereby determined. The composition of the vector for the travel of the view window may be carried out in the polar coordinate system or in the Cartesian plane. In FIG. 46, the vector for the travel of the view window is composed in the Cartesian plane. The excitatory signal coming from the neuron 86 is transformed inversely to the complex-log mapping and transmitted to the i"-later. In the i"-layer, the center of gravity of each azimuth vector is found and is fed out as the vector for the travel of the view window.

In cases where the vector for the travel of the view window is to be determined with a neural network in which the aforesaid competition and the aforesaid cooperation are not carried out, it often occurs that a plurality of vectors are detected. In such cases, the weights shown in FIG. 96, i.e., the weights according to the distance from the center point of the view window, may be applied to the neurons of the f"-layer such that a single vector for the travel of the view window may be selected.

Also, in cases where the competition and the cooperation are carried out and a plurality of vectors are detected, the weights shown in FIG. 96 may be applied to the neurons of the f"-layer such that a single vector for the travel of the view window may be selected. In this manner, even if a plurality of vectors for the travel of the view window are detected, the vector for the travel of the view window towards the most appropriate candidate for the predetermined object image can be detected. In cases where only a single vector for the travel of the view window could be detected, if the distance between the view window and the candidate for the predetermined object image is large, the magnitude of the vector for the travel of the view window becomes small.

How the view window travels towards the candidate for the predetermined object image in accordance with the vector for the travel of the view window, which has been determined from the color of the candidate for the predetermined object image in the manner described above, will be described hereinbelow.

Figure 47:
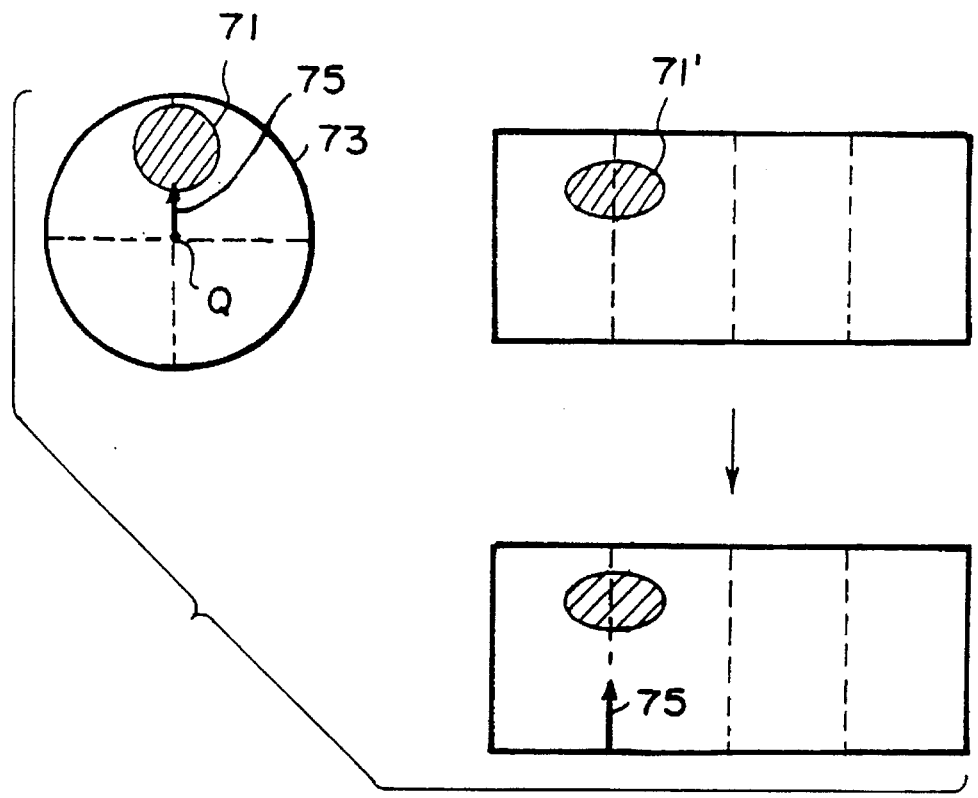
FIG. 47 is a first explanatory view showing complex-log mapped planes and a corresponding Cartesian plane as an aid in explaining how a view window travels the center point of a candidate for a predetermined object image.
Figure 48:
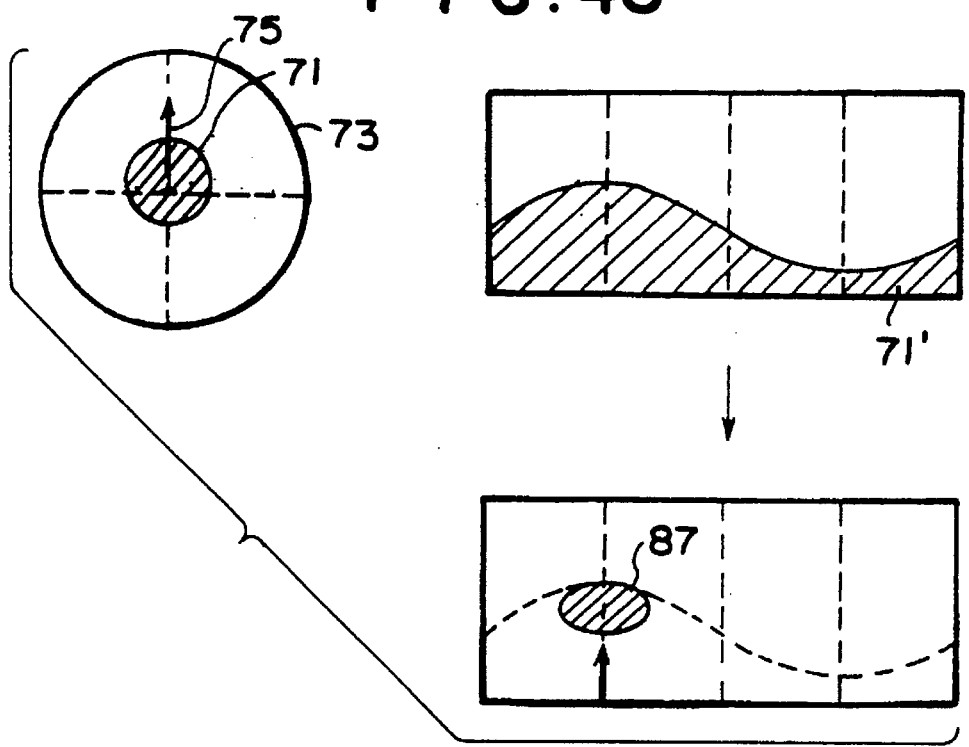
FIG. 48 is a second explanatory view showing complex-log mapped planes and a corresponding Cartesian plane as an aid in explaining how a view window travels to the center point of a candidate for a predetermined object image.
Figure 49:
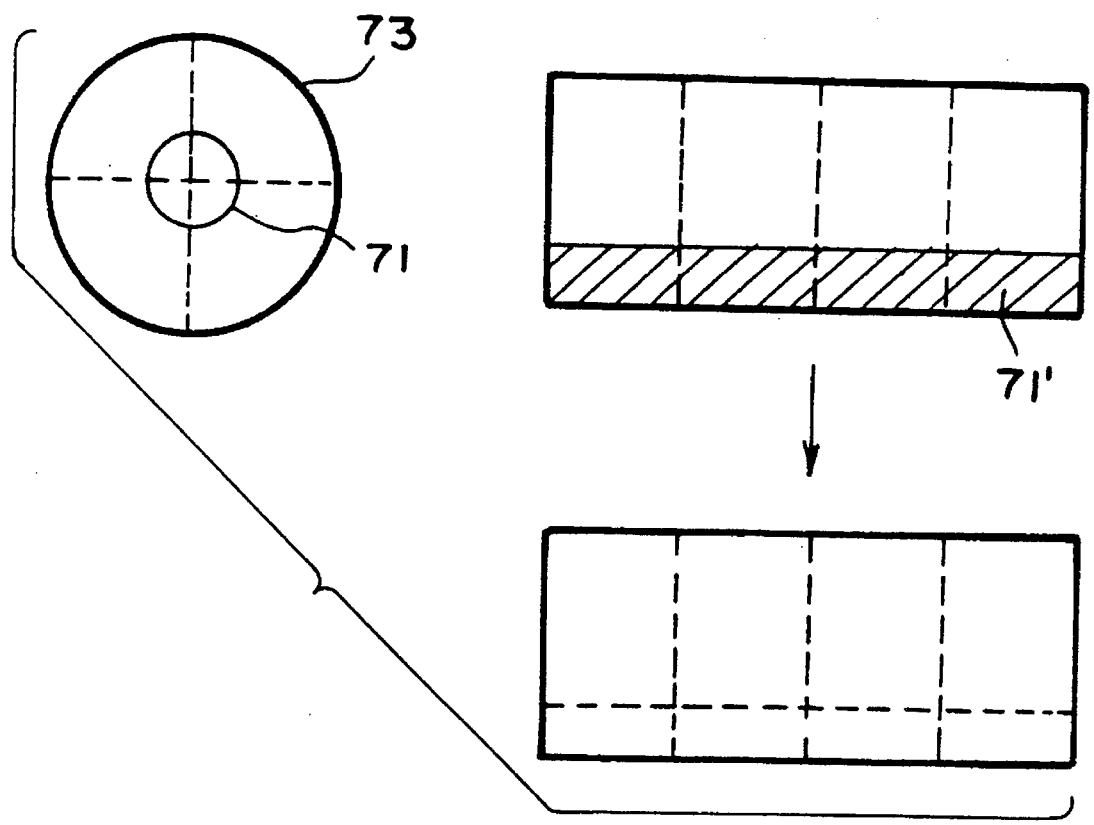
FIG. 49 is a third explanatory view showing complex-log mapped planes and a corresponding Cartesian plane as an aid in explaining how a view window travels to the center point of a candidate for a predetermined object image.

FIGS. 47, 48, and 49 are explanatory views showing complex-log mapped planes and corresponding Cartesian planes as an aid in explaining how the center point of a view window travels from the side outward from a candidate for a predetermined object image to the side inward from the candidate for the predetermined object image.

As illustrated in FIG. 47, in cases where a candidate 71 for the predetermined object image does not include the center point Q of a view window 73, the candidate 71 for the predetermined object image is transformed as a single mass with the complex-log mapping and is detected as a region, which has a high degree of coincidence in color with the candidate for the predetermined object image, in the complex-log mapped plane shown in FIG. 47. In the f"-layer, which is an interactive connection circuitry layer for competition and cooperation, an operation for narrowing a candidate 71' for the predetermined object image down is carried out. As a result, a single candidate region or a plurality of candidate regions, which exhibit a high degree of coincidence in color with the candidate for the predetermined object image and have an appropriate size, are selected. (In this embodiment, a single such candidate region is selected.) Thereafter, a vector is composed from the azimuth and the distance of the selected region, and a vector 75 for the travel of the view window 73 is thereby obtained. The vector 75 for the travel of the view window 73 is directed to the candidate 71 for the predetermined object image. Therefore, when the view window 73 is moved in accordance with the magnitude of the vector 75 for the travel of the view window 73, the center point Q of the view window 73 can approach the candidate 71 for the predetermined object image.

As illustrated in FIG. 48, the center point Q of the view window 73 and the candidate 71 for the predetermined object image are brought to positions which are comparatively close to each other, and the whole candidate 71 for the predetermined object image comes into the region inside of the view window 73. In such cases, the complex-log mapped candidate 71" for the predetermined object image is detected as a region, which extends in every azimuth and which has a high degree of coincidence in color with the candidate for the predetermined object image. In this state, the candidate 71' for the predetermined object image is narrowed down by the interactive connection circuitry for competition and cooperation. During the operation for narrowing the candidate 71' for the predetermined object image down, regions of the same candidate extending in all azimuths inhibit one another. As a result, only the group of neurons corresponding to the azimuths, in which the distance between the outer edge of the candidate 71' for the predetermined object image and the center point Q of the view window 73 is largest, can be excited. A region 87, which includes this group of neurons, is detected. Thereafter, the azimuth and the distance are detected from the azimuth and the intensity of excitation of the detected region 87. In this manner, a vector 75 for the travel of the view window 73 is obtained. The vector 75 for the travel of the view window 73 is directed to the center point of the candidate 71 for the predetermined object image. Therefore, when the view window 73 is moved in accordance with the magnitude of the vector 75 for the travel of the view window 73, the center point Q of the view window 73 can even further approach the candidate 71 for the predetermined object image.

Finally, as illustrated in FIG. 49, the center point Q of the view window 73 and the candidate 71 for the predetermined object image are brought to approximately the same position. In such cases, the complex-log mapped candidate 71' for the predetermined object image is detected as a region, which extends uniformly in every azimuth and which approximately coincides in color with the candidate for the predetermined object image. In this state, the candidate 71' for the predetermined object image is narrowed down by the interactive connection circuitry for competition and cooperation. During the operation for narrowing the candidate 71' for the predetermined object image down, regions of the same candidate extending uniformly in all azimuths compete with and inhibit one another. As a result, no region can be excited. Therefore, the magnitude and the distance detected next become zero. Also, the magnitude of the vector for the travel of the view window 73 becomes zero. In this case, during the operation for moving the view window 73 in accordance with the magnitude of the vector for the travel of the view window, the travel of the center point Q of the view window 73 stops at the center point of the candidate 71 for the predetermined object image.

The neural network employed in this embodiment iterates the operations described above and thereby causes the center point of the view window to travel towards the cantor point of the candidate for the predetermined object image. However, if the center point of the view window encounters an object, which is different from the candidate for the predetermined object image, during its travel, it will often occur that the center point of the view window stops at the position of the object. Specifically, when such a problem is considered with respect to a potential field of the image, the problem means that the center point of the view window is trapped at a minimum point of potential of the object, which is different from and smaller than the candidate for the predetermined object image.

Figure 50A:
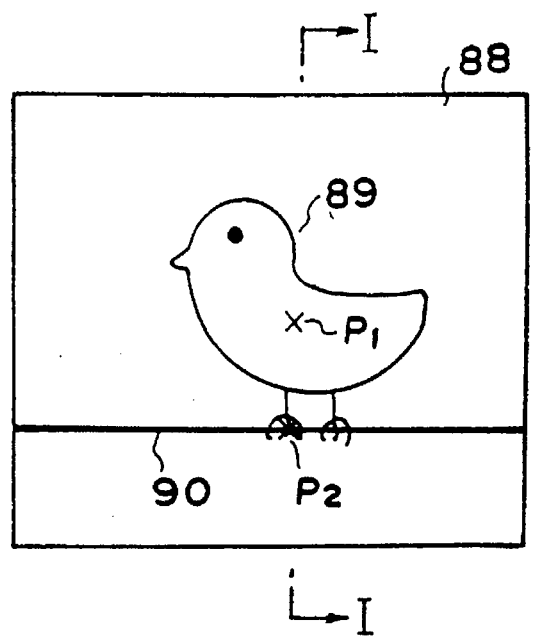
FIGS. 50A and 50B are explanatory views showing an image of a bird sitting on a cable and a graph showing the corresponding potential field.
Figure 50B:
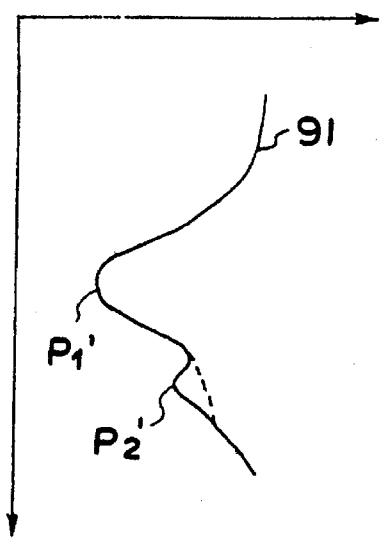

By way of example, FIG. 50A shows an image 88, in which a bird image 89 serving as a candidate for a predetermined object image and a cable image 90 are embedded. The bird image 89 rests on the cable image 90. FIG. 50B is a graph showing the potential field of the image 88. In FIG. 50B, a curve 91 indicates the potential field of the image 88 taken along line I—I of FIG. 50A. As indicated by the curve 91, the potential field of the image 88 taken along line I—I of FIG. 50A has a minimum point P1' at the position corresponding to a center point P1 of the bird image 89. When the center point of the view window travels over the image 88, it moves towards the center point P1 of the bird image 89. However, the potential field of the image 88 also has a minute minimum point P2' at the position corresponding to a point P2 in the cable image 90, which point lies on line I—I. Therefore, if the center point of the view window stops at the point P2 in the cable image 90, which point P2 lies on line I—I, during its travel towards the center point P1 of the bird image 89, the center point of the view window cannot reach the center point P1 of the bird image 89. Accordingly, it is necessary for the center point of the view window to be prevented from stopping at the point P2 An the cable image 90.

In the neural network employed in this embodiment, the so-called "annealing process" may be employed. With the annealing process, thermal fluctuations are imparted to the output of a neuron. The temperature is set at a high temperature and is then lowered little by little. In this manner, the center point of the view window can be prevented from stopping at the point P2 in the cable image 90.

For example, the input-output transfer characteristics of a neuron may be represented by the sigmoid function, which is expressed as $$f(x)=\text{sigmoid}(x) \tag{6}$$

Figure 93A:
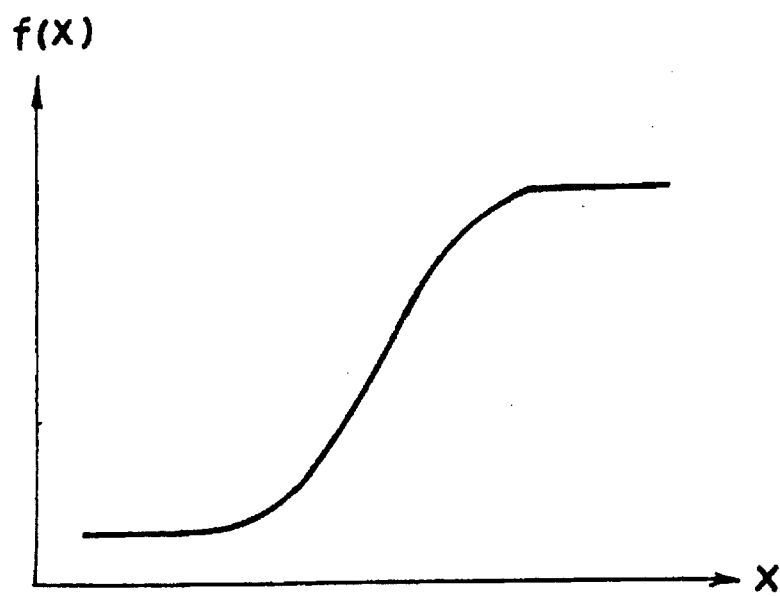
FIG. 93A is a graph showing input-output transfer characteristics of a neuron.
Figure 93B:
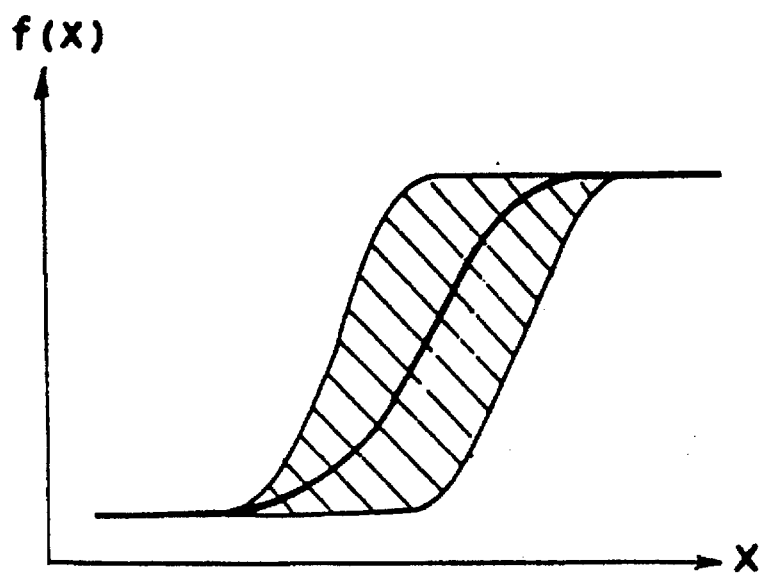
FIG. 93B is a graph showing the input-output transfer characteristics of a neuron, to which thermal fluctuations have been added with an annealing process.

In such cases, if the thermal fluctuations are zero, the input-output transfer characteristics of the neuron will follow the pattern shown in FIG. 93A. If the thermal fluctuations are imparted to the output of the neuron, the input-output transfer characteristics of the neuron can be expressed as $$f(x)=\text{sigmoid }(x+N\times\exp(-1/T)\times RND) \tag{7}$$

where N represents the noise component constant, T represents the temperature parameter, and RND represents a random function falling within the range of −1 to 1. By the impartation of the thermal fluctuations, the input-output transfer characteristics of the neuron can be obtained, which include errors as shown in FIG. 93B. Specifically, the output of the neuron can be caused to fluctuate probabilistically within the range indicated by the hatching in FIG. 93B. In this manner, when high-temperature thermal fluctuations are imparted to the output of the neuron, i.e., when the temperature is set at a high temperature, the output of the neuron containing errors can be obtained. Therefore, the annealing process may be applied to the outputs of, e.g., the f1- and f2-layers of the neural network employed in this embodiment. By virtue of large errors in the outputs of the f1- and f2-layers, when the center point of the view window is likely to stop at the minute minimum point P2' in the curve 91 shown in FIG. 50B, the center point of the view window can be prevented from stopping. Specifically, as indicated by the broken line in FIG. 50B, when the center point of the view window is likely to stop at the minute minimum point P2', i.e., when the neural network is likely to be trapped, the temperature is raised such that the center point of the view window can get over the "wall" of the minute minimum point P2' (i.e., the minute point of stability) by virtue of the thermal fluctuations in the outputs of the neurons. The temperature is then lowered (i.e., the neurons are annealed) such that the center point of the view window can get away from the minute minimum point P2' and can further travel in order to become more stable.

With the aforesaid annealing process, the thermal fluctuations are imparted only when the center point of the view window becomes likely to stop at the minute minimum point. Alternatively, thermal fluctuations may be imparted at all times to the outputs of neurons of an arbitrary layer of the neural network such that the center point of the view window can be prevented from stopping at a minute minimum point in the image in any situation.

Also, in the embodiment described above, the center point of the view window is prevented from stopping at the position of an object in the image, which object is different from the candidate for the predetermined object image, (i.e., et the minute minimum point of the potential field) by employing the annealing process in the neural network and imparting the thermal fluctuations to the outputs of neurons. Alternatively, the center point of the view window may be prevented from stopping at such a position by adding an inertia term to the vector for the travel of the view window.

In such cases, characteristics represented by Formula (8) are given to the vector for the travel of the view window, which vector is fed out from the i-layer of the neural network shown in FIG. 28.

$$m(t) = m_f(t) + \int_{i-t2}^{i-t1} k(t') \cdot m(t')dt' \quad (8)$$

where m(t) represents the vector for the travel of the view window, with which vector the center point of the view window is to be caused to travel actually at the time t, mf(t) represents the vector for the travel of the view window, which vector is calculated from the tilt of the field fed out from the neural network at the time t, k(t) represents the factor of attenuation with the passage of time, and each of t1 and t2 is an appropriate past time satisfying the condition t>t1>t2. In formula (8), the term of integration represents the inertia term (i.e., an inertia vector). With the inertia term, the vectors for the travel of the view window, with which the center point of the view window is to be caused to travel actually and which were fed out from the i-layer of the neural network during the period between the time t1 and the time t2 that go back from the time t to the past, are multiplied by the factor of attenuation with the passage of time. The products thus obtained are integrated from the time t1 to the time t2.

Figure 51:
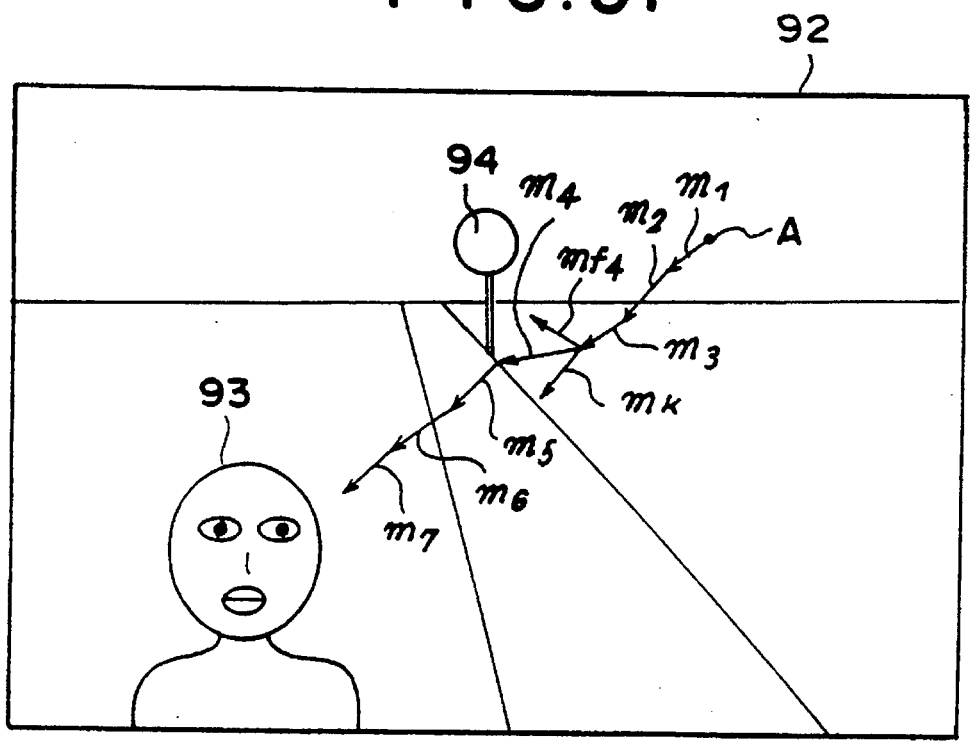
FIG. 51 is en explanatory view showing how an inertia term is added.

By way of example, as illustrated in FIG. 51, a center point Q of the view window is traveling towards a human face image 93, which serves as a candidate for a predetermined object image in an image 92. An object, which is different from the candidate for the predetermined object image, (in this case, a signpost image 94 located at the back of the human face image 93) is present in the vicinity of the path of the travel of the center point Q of the view window according to the vectors for the travel of the view window. In such oases, when the potential field of the image 92 is considered, the center point of the view window travels from its original position A in accordance with vectors m1, m2, and m3 for the travel of the view window. A next vector mf4 for the travel of the view window is directed to the signpost image 94. Therefore, the center point of the view window then travels towards the signpost image 94. If the center point of the view window then travels towards the signpost image 94, it cannot reach the human face image 93, which serves as the candidate for the predetermined object image. For the purposes of eliminating such problems, the vectors m1, m2, and m3 for the travel of the view window are multiplied by the factor of attenuation with the passage of time. The products thus obtained are integrated, and an inertia vector mk is thereby obtained. By the addition of the inertia vector mk, a vector m4 for the travel of the view window is obtained, which vector m4 is directed to the side closer to the face image 93 than the vector mf4 for the travel of the view window. Even if the center point of the view window becomes likely to travel towards the signpost image 94, the center point of the view window can be caused to travel towards the face image 93 in accordance with the vector m4 for the travel of the view window. Thereafter, the center point of the view window travels in accordance with vectors m5, m6, and m7 for the travel of the view window and ultimately stops at the center point of the face image 93.

In the manner described above, with the neural network employed in this embodiment, the center point of the view window is caused to travel over a given image towards the center point of the candidate for the predetermined object image such that the center point of the view window may not stop at the position of an object, which is different from the candidate for the predetermined object image. In the processing unit 4 for judgment as to the stop state of the view window, when the vector for the travel of the view window becomes zero, and the center point of the view window coincides with the center point of the candidate for the predetermined object image, the candidate for the predetermined object image is cut out (i.e., extracted). The information representing the candidate for the predetermined object image, which has thus been extracted, is fed into the judgment means.

In the method for extracting an object image in accordance with the present invention, the candidate for the predetermined object image can be cut out regardless of the size of the candidate for the predetermined object image and the positions of feature parts included in the candidate for the predetermined object image. However, such a way of cutting out the candidate for the predetermined object image results in a heavy burden to the next judgment step. Therefore, when a candidate for the predetermined object image is to be cut out, it should preferably be normalized such that the size of every candidate for the predetermined object image may become approximately the same and positions of feature parts may be approximately the same among the candidates for the predetermined object image. In this manner, burden to the judgment means, which makes a judgment as to what the candidate for the predetermined object image is, can be reduced. Also, the time required for the operation can be kept short.

Also, in the embodiment described above, the size of the view window and the magnitude of the vector for the travel of the view window may be changed in accordance with the size of the object, i.e., the candidate for the predetermined object image. For example, the position of the contour line extending in the annular direction, which line has been detected in the aforesaid e1-layer, with respect to the radial direction in the complex-log mapped plane may be detected. In this manner, the distance between the center point of the view window and the contour line of the candidate for the predetermined object image may be detected. Thereafter, the size of the view window and the magnitude of the vector for the travel of the view window may be changed in accordance with the detected distance.

How the size of the view window is changed will be described hereinbelow.

It is thought that, when a human being processes visual information obtained from the outer world, he can consciously or unconsciously concentrate attention on an object having a specific size and keeps or changes the size in accordance with the circumstances. The presence of such a mechanism is backed up by the experiential facts that a composition written with characters having discontinuous sizes is difficult to read, and figures extremely varying in sizes are difficult to recognize. In this embodiment, such a specific size, to which attention is given, corresponds to the size of the view window.

For the purposes of introducing a mechanism for changing the size of the view window into the neural network model for carrying out the method for extracting an object image in accordance with the present invention, a difference in the sensitivity to the size of an object is given characteristics of the neural network. Also, the difference in the sensitivity is controlled appropriately in accordance with an image, which is to be searched.

For example, the synaptic connections between the a- and b-layers of the neural network shown in FIG. 28 may be set in a manner favorable to a candidate for a predetermined object image, which candidate has a specific size. Specifically, as illustrated in FIG. 52, in cases where a candidate for a predetermined object image, which candidate is smaller than the size of the view window, is present in the region inside of the view window, the weights of the synaptic connections between the center portion of the a-layer and the b-layer may be set at large values (as indicated by the bold lines). Also, the weights of the synaptic connections between the peripheral portion of the a-layer and the b-layer may be set at small values (as indicated by the fine lines).

As a method for changing the size of the view window, as illustrated in FIGS. 53A and 53B, the physical state of connections between neuron layers may be kept unchanged, and the weights of the synaptic connections may be changed. For example, as illustrated in FIG. 53A, in cases where a small candidate for a predetermined object image is found in the region inside of the view window, the weights of the synaptic connections between the center portion of the a-layer and the b-layer may be set at large values. Also, as illustrated in FIG. 53B, in cases where a large candidate for a predetermined object image is found in the region inside of the view window, the weights of the synaptic connections between the peripheral portion of the a-layer and the b-layer may be set at large values.

As an alternative method for changing the size of the view window, as illustrated in FIGS. 54A and 54B, the state of connections between neuron layers may be changed. and the area of the unprocessed region may thereby be changed. Specifically, as illustrated in FIG. 54A, in cases where a small candidate for a predetermined object image is found in the region inside of the view window, the intervals between the neurons of the a-layer may be set at small values. Also, as illustrated in FIG. 54B, in cases where a large candidate for a predetermined object image is found in the region inside of the view window, the intervals between the neurons of the a-layer may be set at large values.

As another alternative method for changing the size of the view window, a zoom lens may be utilized in the input device for feeding an image into the a-layer, and the size of the input image itself may thereby be changed.

As a method for changing the magnitude of the vector for the travel of the view window, the vector for the travel of the view window, which vector has been obtained in the i-layer, may be multiplied by a certain gain. Specifically, in cases where the center point of the view window should travel quickly, the vector for the travel of the view window, which vector has been obtained in the i-layer, may be multiplied by a large gain. Also, in cases where the center point of the view window should travel only slightly or should not travel, the vector for the travel of the view window, which vector has been obtained in the i-layer, may be multiplied by a small gain or zero and may thus be reduced or made zero.

How the size of the view window and the magnitude of the vector for the travel of the view window are controlled will be described hereinbelow. The size of the candidate for the predetermined object image, which candidate is present in the region inside of the view window, is detected by the e1- or e1'-layer of the neural network described above. The size of the view window and the magnitude of the vector for the travel of the view window are changed in accordance with the detected size of the candidate for the predetermined object image. By way of example, for the purposes of detecting the size of the candidate for the predetermined object image, a probability density function may be created wherein the distance in the radial direction from the center point of the view window is plotted on the horizontal axis, and the level of excitation of each neuron ie plotted on the vertical axis. The probability density function may then be analyzed, and the size of the candidate for the predetermined object image may be detected from the results of the analysis of the probability density function.

Figure 55A:
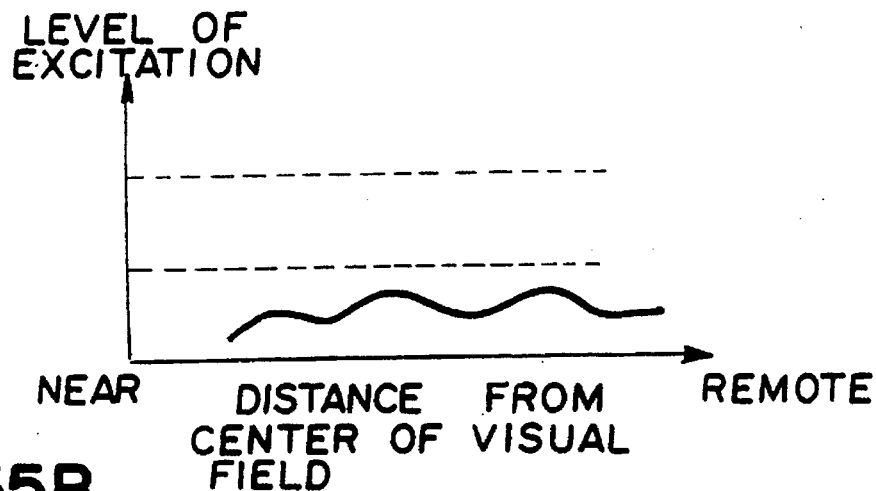
FIGS. 55A, 55B, 55C, and 55D are graphs showing probability density functions of the level of excitation of neurons as an aid in explaining how the size of a view window is controlled.

For example, in cases where a probability density function shown in FIG. 55A is obtained, the levels of excitation of the neurons are low as a whole, and therefore it is judged that no candidate for the predetermined object image is present in the region inside of the view window. In such cases, the size of the view window is enlarged little by little such that a larger image area may come into the region inside of the view window. By the enlargement of the size of the view window, a candidate for the predetermined object image, which candidate is present in the vicinity of the view window, can be found at an end of the view window, and the travel of the view window towards the candidate for the predetermined object image can be begun. Also, when the size of the view window is enlarged, the magnitude of the vector for the travel of the view window is set at zero such that the view window may not move.

Figure 55B:
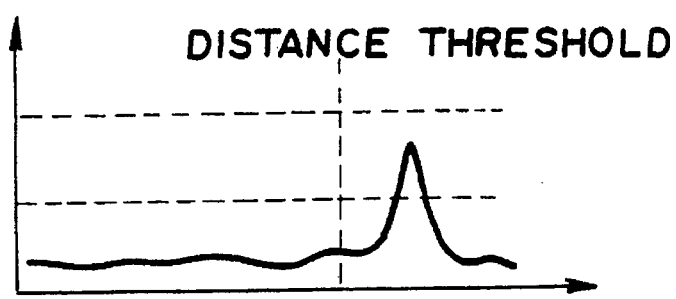

As illustrated in FIG. 55B, in cases where the probability density function has a peak at a position spaced from the center point of the view window, it is judged that a candidate for the predetermined object image is found at a peripheral part of the view window.

In such cases, the size of the view window is not changed, and the magnitude of the vector for the travel of the view window is set at a large value such that the view window may more quickly travel to the direction corresponding to the peek. In this manner, the view window can travel quickly towards the candidate for the predetermined object image.

Figure 55C:
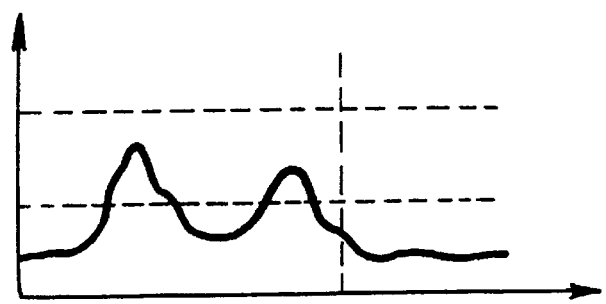

As illustrated in FIG. 55C, in cases where the probability density function has a slightly large peak at a position in the vicinity of the center point of the view window, it is judged that a candidate for the predetermined object image is found at the position in the vicinity of the center point of the view window, but the center point of the view window and the center point of the candidate for the predetermined object image are shifted from each other. In such cases, the size of the view window is changed such that it may match with the size of the candidate for the predetermined object image. Also, in such cases, the vector for the travel of the view window is not multiplied by a gain, and the view window is caused to travel at an ordinary travel speed.

Figure 55D:
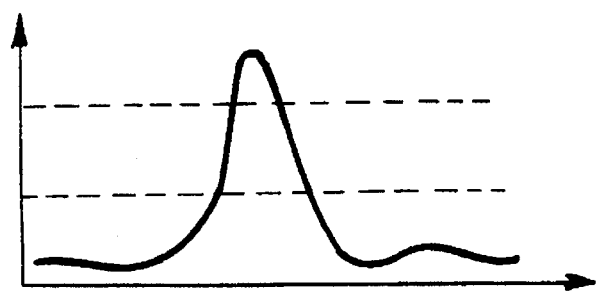

As illustrated in FIG. 55D, in cases where the probability density function has a very large peak, it is judged that the center point of the view window has reached approximately the center point of the candidate for the predetermined object image, and edges of the candidate for the predetermined object image are located at approximately equal distances from the center point of the view window. In such cases, the magnitude of the vector for the travel of the view window is set at a small value such that the center point of the candidate for the predetermined object image can be searched more accurately, and the size of the candidate for the predetermined object image and the size of the view window can be matched with each other more accurately. in this manner, the travel speed of the view window is set at a value lower than the ordinary speed, and the size of the view window is matched with the size of the candidate for the predetermined object image.

The size of the view window and the magnitude of the vector for the travel of the view window, i.e., the travel speed of the view window, are changed in the manner described above. In this manner, all of candidates for the predetermined object images can be extracted from an image, in which candidates for the predetermined object images having different sizes are embedded.

Figure 56:
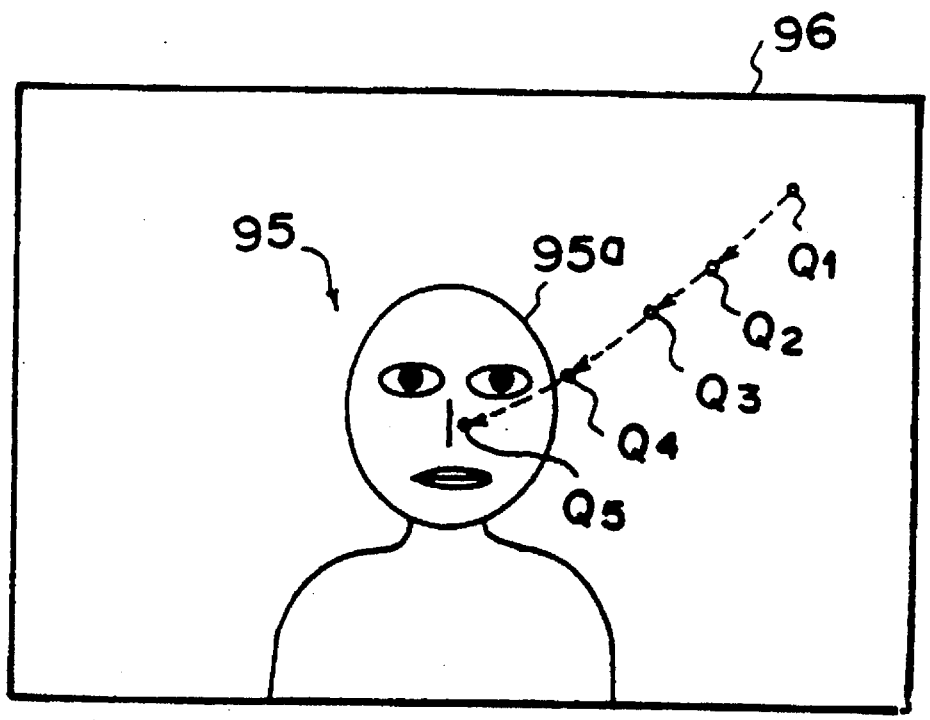
FIG. 56 is an explanatory view showing how the center point of a view window travels on an image, in which a human image is embedded.

By way of example, as illustrated in FIG. 56, in cases where a human body image 95 is to be extracted from an image 96, in which the human body image 95 is embedded, the center point of the view window is first located at a point Q1. Thereafter, the center point of the view window travels through points Q2, Q3, and Q4 towards the human body image 95. The center point of the view window then stops at a center point Q5 of a face pattern 95a of the human body image 95. The face pattern 95a is normalized and extracted by the processing unit 4 for judgment as to the stop state of the view window. The information representing the extracted face pattern 95a is fed into the judgment means. In such cases, the term "normalization of a face pattern 95a" means the process, with which the face patterns having various shapes (e.g., patterns of large faces, small faces, and long faces) are converted into circular face patterns having approximately the same size by compression or enlargement such that the positions of eye and mouth patterns serving as feature parts of the face patterns may become approximately the same among various face patterns.

With the neural network employed in this embodiment, after the candidate for the predetermined object image has been extracted in the manner described above, the view window is again caused to travel in order to extract a next candidate for the predetermined object image as will be described later. In such cases, it often occurs that the center point of the view window travels to the center point of the candidate for the predetermined object image, which candidate has already been extracted, and the same candidate for the predetermined object image is again extracted. For the purposes of preventing such re-extraction of the same candidate for the predetermined object image, a retinal neuron layer, which reflects a given image, is located in accordance with the range of the size of the given image before, for example, the a-layer of the neural network shown in FIG. 28. The characteristics represented by Formula (9) are given to the neurons of the retinal neuron layer.

$$o_i(t) = \text{sigmoid}\left( i_i(t) - k_i(t) \int_{t - t_f}^{i} o_i(t')dt' \right) \quad (9)$$

where oi(t) represents the output of an i-neuron at the time t, ii(t) represents the input to the i-neuron at the time t, ki(t)=0 when the i-neuron corresponds to a position on the side outward from the candidate for the predetermined object image, and ki(t)=1 when the i-neuron corresponds to a position on the side inward from the candidate for the predetermined object image.

Figure 57A:
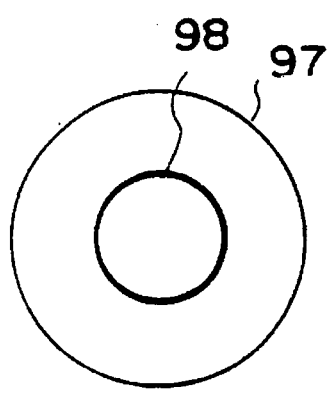
FIGS. 57A and 57B are explanatory views showing a contour line of a candidate for a predetermined object image, the center point of which coincides with the center point of a view window, on a Cartesien plane and a complex-log mapped plane.
Figure 57B:
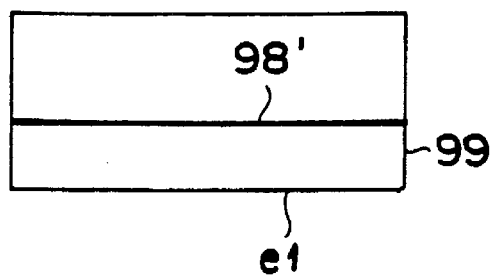
Figure 58:
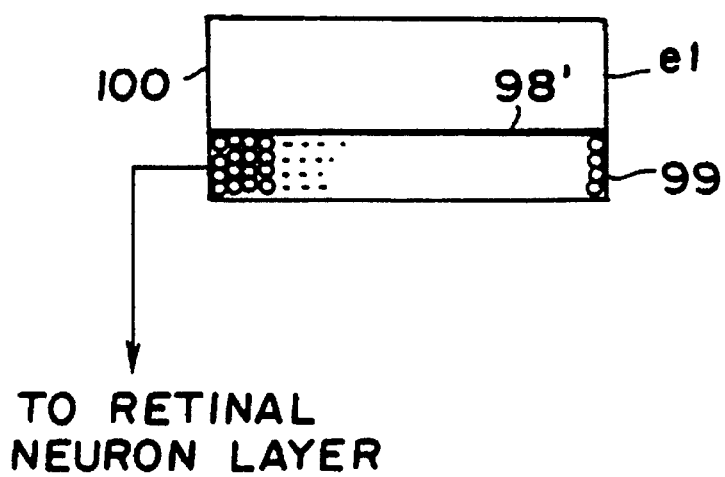
FIG. 58 is an explanatory view showing how a process for preventing re-extraction is carried out in the first embodiment of the method for extracting an object image in accordance with the present invention.

In Formula (9), the term of integration represents the term of accumulation of fatigue. With the term of integration, outputs of a certain neuron, which were generated within a predetermined period that goes back by the time tf from the time t, are integrated with respect to the time. As illustrated in FIG. 57A, in case a where the center point of the view window and the center point of the candidate for the predetermined object image coincide with each other, a view window 97 and the contour line of a candidate 98 for the predetermined object image constitute concentric circles on the Cartesian plane, As indicated in the e1-layer shown in FIG. 57B, when the contour line of the candidate 98 for the predetermined object image is transformed with the complex-log mapping, it appears as a single straight line 98', which extends approximately in the annular direction in the complex-log mapped plane. The neurons of the retinal neuron layer has the characteristics represented by Formula (9). As illustrated in FIG. 58, ki(t) is set at 1 for the neurons falling within a region 99 of the e1-layer, which region corresponds to the side inward from the contour line of the candidate 98 for the predetermined object image. Also, ki(t) is set at 0 for the neurons falling within a region of the e1-layer, which region corresponds to the side outward from the contour line of the candidate 98 for the predetermined object image. In this manner, fatigue accumulates only in the neurons of the retinal neuron layer, which fall in the region corresponding to the side inward from the face image serving as the candidate for the predetermined object image. Therefore, according to Formula (9), the neurons, which fall in the region corresponding to the side outward from the candidate for the predetermined object image, do not fatigue, and the inputs into these neurons can be directly taken as the outputs therefrom. However, the neurons, which fall in the region corresponding to the side inward from the candidate for the predetermined object image, accumulate their fatigue. Therefore, when the neurons, which fall in the region corresponding to the side inward from the candidate for the predetermined object image, receive inputs, the outputs of these neurons reduce due to the aforesaid term of fatigue. Because of the reduction in the outputs, signals from the neurons corresponding to the region inside of the candidate for the predetermined object image are not transmitted from the retinal neuron layer to the next layer. Therefore, the view window can travel to a next candidate for the predetermined object image, and the next candidate for the predetermined object image can thereby be extracted. As for the fatigue, by the appropriate setting of the values of ki(t) and tf, in cases where a certain neuron receives an input at all times, the output of this neuron repeats an increase and a decrease with the passage of time. If the value of tf is set at infinity, a neuron, which has once been excited, will not again be excited, and therefore the same candidate for the predetermined object image, which has once been extracted, will not again be extracted.

In the first embodiment described above, the process for preventing the re-extraction of the same candidate for the predetermined object image is carried out by introducing the term of fatigue into the neural network. Alternatively, any of other processes may be employed, with which the same candidate for the predetermined object image is prevented from being re-extracted. For example, outputs of the neurons corresponding to the region inside of the candidate for the predetermined object image, which has once been extracted, may be set at 0 or 1 and may thereby be masked. As another alternative, the retinal neuron layer and a masking frame may be superposed one upon the other. Values of signals in the region of the masking frame corresponding to the region of the retinal neuron layer, in which region the candidate for the predetermined object image is extracted, may then be set at 0 or 1. In this manner, the retinal neuron layer may be masked.

How a process is carried out when the center point of the view window stops due to, for example, the extraction of a candidate for the predetermined object image will be described hereinbelow.

Figure 59A:
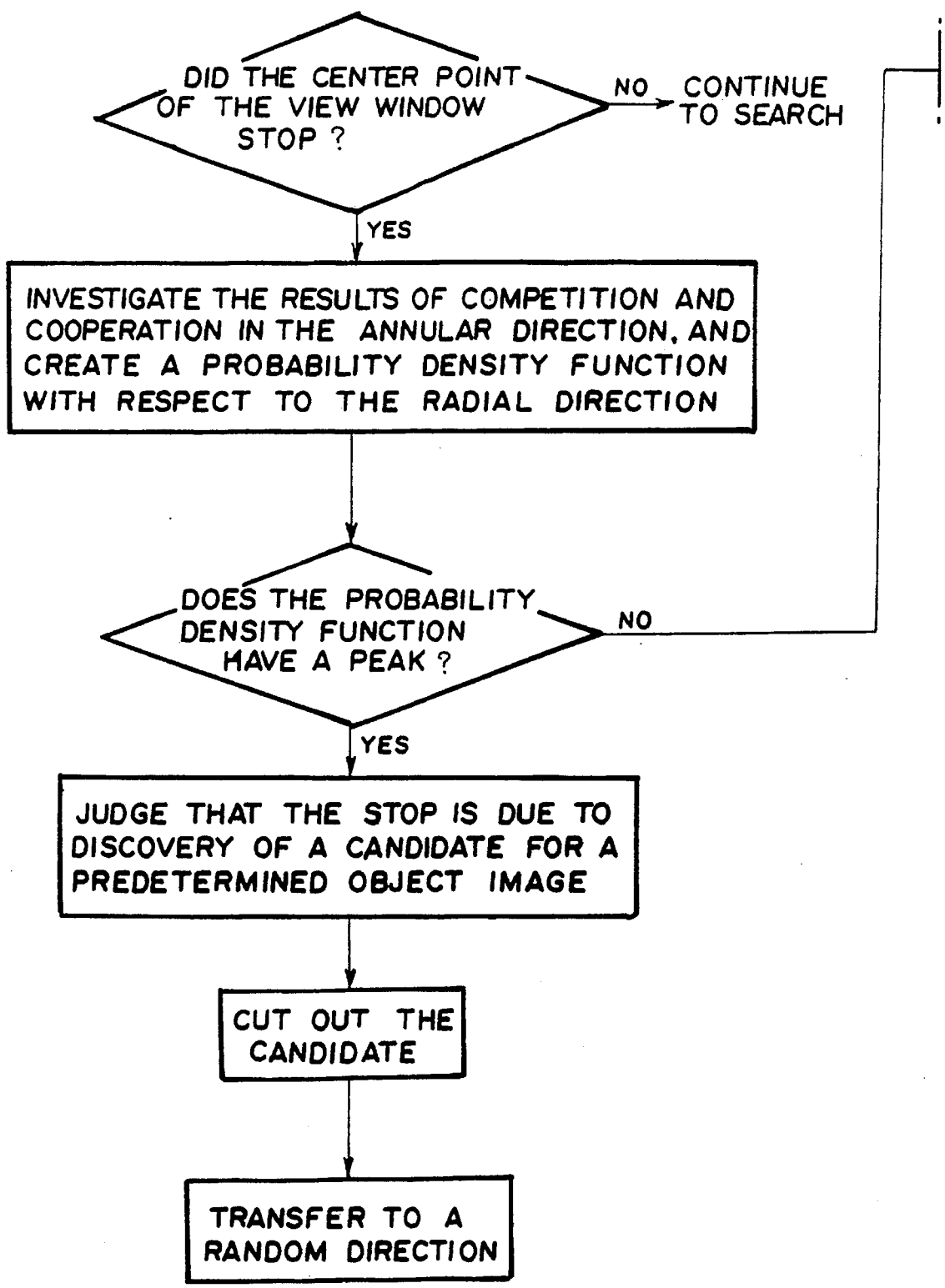
FIG. 59 is a flow chart showing how a view window is caused to transfer (or jump) in accordance with the stop state of the center point of a view window in the embodiment of the method for extracting an object image in accordance with the present invention.
Figure 59B:
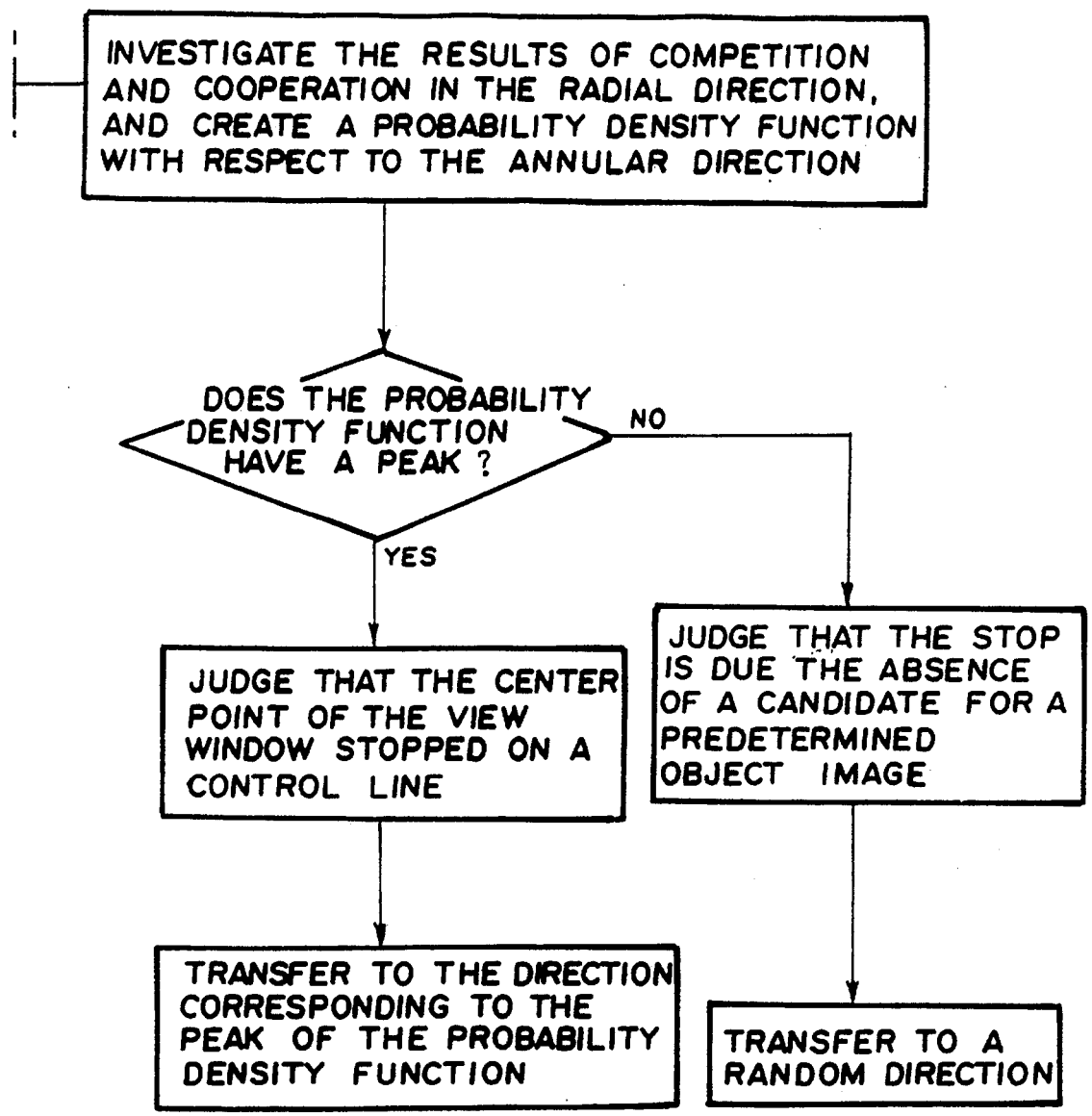
Figure 59:
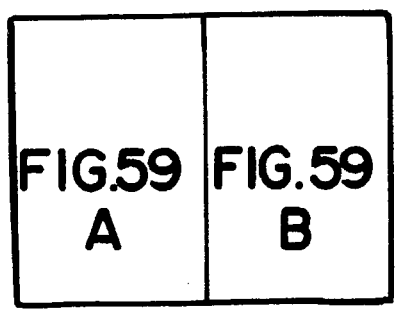

FIG. 59 is a flow chart showing how a process is carried out when the center point of the view window stops.

Figure 60:
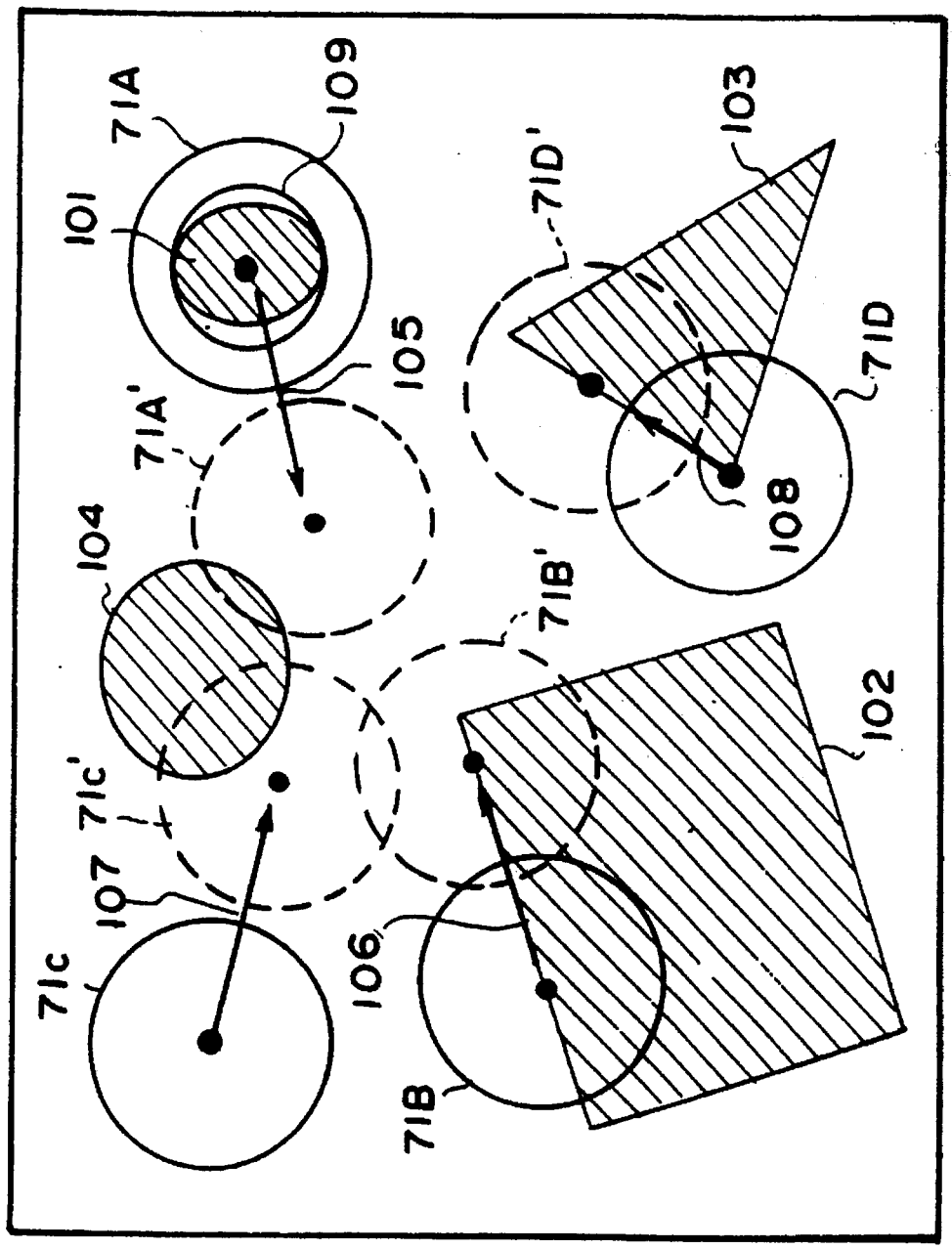
FIG. 60 is en explanatory view showing how a view window is caused to transfer (or jump) in accordance with the stop state of the center point of a view window in the embodiment of the method for extracting an object image in accordance with the present invention.

As illustrated in FIG. 59, the processing unit 4 for judgment as to the stop state of the view window makes a judgment as to whether the center point of the view window stopped or did not stop. In cases where it is judged that the center point of the view window did not stop, a signal, which represents that the center point of the view window did not stop, is fed into the neural network processing unit 3 for search, and the center point of the view window is caused to continue traveling. In cases where it is judged that the center point of the view window stopped, a probability density function with respect to the radial direction is created from the results obtained from the competition and the cooperation in the annular direction, which are carried out in each of the e1-, e1'-, and e1"-layers. The probability density function is analyzed, and a judgment is made from the results of the analysis of the probability density function as to whether the probability density function has or has not a peak. For example, in cases where, as shown in FIG. 60, the center point of a view window 71A stopped at the center point of a candidate 101 for a predetermined object image, which candidate is elliptic like a human face, the results shown in FIG. 61A are obtained from the competition and the cooperation, which are carried cut in the e1-layer. In FIG. 61A, the neurons are excited approximately in the annular direction. In this case, a probability density function shown in FIG. 61B is obtained, which has a peek at part corresponding to the excited neurons. Therefore, the processing unit 4 for judgment as to the stop state of the view window judges that the stop of the center point of the view window 71A is due to the discovery of the candidate 101 for the predetermined object image. The region surrounded by a circle 109 is then extracted as a candidate for the predetermined object image. A signal representing the extracted candidate 101 for the predetermined object image is transferred to the judgment means.

After the candidate 101 for the predetermined object image is extracted in the manner described above, the center point of the view window 71A remains stationary at the position of the extracted candidate 101 for the predetermined object image. If this state continues, a next candidate for a predetermined object image cannot be searched. Therefore, it is necessary for the center point of the view window 71A to be moved a long distance. Specifically, from the state in which the center point of the view window 71A stopped, i.e., from the stable state of the neurons, the view window 71A is transferred in a random direction (in this case, in the direction indicated by the arrow 105) to the position of a view window 71A'. As a result, a portion of a candidate 104 for a predetermined object image comes into the view window 71A'. Therefore, the center point of the view window 71A' then travels towards the center point of the candidate 104 for the predetermined object image.

Reverting to FIG. 59, in cases where it is judged that the probability density function, which has been created from the results of the competition and the cooperation in the annular direction, has no peak, the processing unit 4 for judgment as to the stop state of the view window creates a probability density function with respect to the annular direction from the results obtained from the competition and the cooperation in the radial direction, which are carried out in, for example, the e1-layer. The probability density function is analyzed, and a judgment is made from the results of the analysis of the probability density function as to whether the probability density function has or has not a peak. In cases where it is judged that the probability density function has a peak, the processing unit 4 for judgment as to the stop state of the view window judges that, as indicated by a view window 71B in FIG. 60, the center point of the view window 71B will be located on the contour line of a candidate 102 for a predetermined object image, or that, as indicated by a view window 71D in FIG. 60, the center point of the view window 71D will be located at a vertex of a candidate 103 for a predetermined object image. Therefore, the center point of the view window 71B or 71D is transferred to the direction corresponding to the peak in the probability density function, i.e., to the direction along the contour line of the candidate 102 or 103 for the predetermined object image. In this manner, the center point of the view window 71B or 71D is moved to the position of a view window 71B' or 71D'.

As described above, the center point of the view window 71B or 71D is transferred to the direction along the contour line (i.e., to the direction indicated by the arrow 106 or 108). This is because there is a strong probability that a point of intersection of contour lines, or the like, which serves as a feature point of the candidate 102 or 103 for the predetermined object image, will be present in the direction along the contour line.

As illustrated in FIG. 60, in cases where the center point of a view window 71C stopped at a position where no candidate for a predetermined object image is present, an object causing the neurons to be excited is not present in the region inside of the view window 71C, and therefore the center point of the view window 71C remains stationary in such a state. In this state, probability density functions, which are created from the results obtained from the competition and the cooperation, which are carried out in, for example, the e1- and e2-layers, have no peak. Therefore, as shown in FIG. 59, the processing unit 4 for judgment as to the stop state of the view window judges that the center point of the view window stopped because no candidate for a predetermined object image is present in the region inside of the view window 71C. The center point of the view window 71C is then transferred in a random direction (in this case, in the direction indicated by the arrow 107) to the position of a view window 71C'. As a result, a portion of the candidate 104 for the predetermined object image comes into the view window 71C'. Therefore, the center point of the view window 71C' then travels towards the center point of the candidate 104 for he predetermined object image.

In the embodiment described above, the transfer of the center point of the view window from the state, in which the center point of the view window stopped, is carried out in accordance with the judgment made by the processing unit 4 for judgment as to the stop state of the view window. Alternatively, for this purpose, an annealing process may be employed in the neural network.

As described above, with the annealing process, when a certain neuron in the neural network receives an input signal and generates an output, the input-out transfer characteristics of the neuron are modified such that the neuron may not generate an output in accordance with the function of the original input-out transfer characteristics of the neuron, but may generate an output containing thermal fluctuations, i.e., an output containing noise. The level of noise contained in the output is represented by the level of temperature. By the increase or decrease of the temperature, the state of the system of the neural network is prevented from falling into a stable state and is shifted to a different stable state.

Therefore, in oases where the input-output transfer characteristics of a neuron are represented by the sigmoid function, which is expressed as Formula (6), the input-output transfer characteristics represented by Formula (7) are given to the neuron. In this manner, the input-output transfer characteristics of the neuron can be obtained, which include errors as shown in FIG. 93B. Specifically, the output of the neuron can be caused to fluctuate probabilistically within the range indicated by the hatching in FIG. 93B. When the amounts of thermal fluctuations are large, i.e., when the temperature is set at a high temperature, the output of the neuron contains errors. Therefore, by virtue of errors, the neural network can get away from the stable state.

Alternatively, the term of fatigue may be introduced into the neural network such that it may get away from the stable state. In such cases, as described above, a retinal neuron layer, which reflects a given image, is located in accordance with the range of the size of the given image before, for example, the a-layer of the neural network shown in FIG. 28. The characteristics represented by Formula (9) are given to the neurons of the retinal neuron layer.

In cases where the center point of the view window did not travel within a predetermined period of time, the processing unit 4 for judgment as to the stop state of the view window judges that the center point of the view window stopped. In Formula (9), ki(t) is set at 1 for the neurons of the retinal neuron layer, which correspond to the region inside of the view window at the position at which the center point of the view window stopped. Also, ki(t) is set at 0 for the neurons of the retinal neuron layer, which correspond to the region outside of the view window. In this manner, fatigue accumulates only in the neurons of the retinal neuron layer, which correspond to the region inside of the view window. Therefore, according to Formula (9), the neurons, which correspond to the region outside of the view window, do not fatigue, and the inputs into these neurons can be directly taken as the outputs therefrom. However, the neurons, which correspond to the region inside of the view window, accumulate their fatigue. Therefore, when the neurons, which correspond to the region inside of the view window, receive inputs, the outputs of these neurons reduce due to the aforesaid term of fatigue. Because of the reduction in the outputs, signals from the neurons corresponding to the region inside of the view window are not transmitted from the retinal neuron layer to the next layer. Therefore, the center point of the view window can travel to a next candidate for the predetermined object image. As for the fatigue, by the appropriate setting of the values of ki(t) and tf, in cases where a certain neuron receives an input at all times, the output of this neuron repeats an increase and a decrease with the passage of time. If the value of tf is set at infinity, a neuron, which has once been excited, will not again be excited, and therefore the center point of the view window will not again stop at the position at which it has once stopped.

A second embodiment of the method for extracting an object image in accordance with the present invention will be described hereinbelow.

Figure 62B:
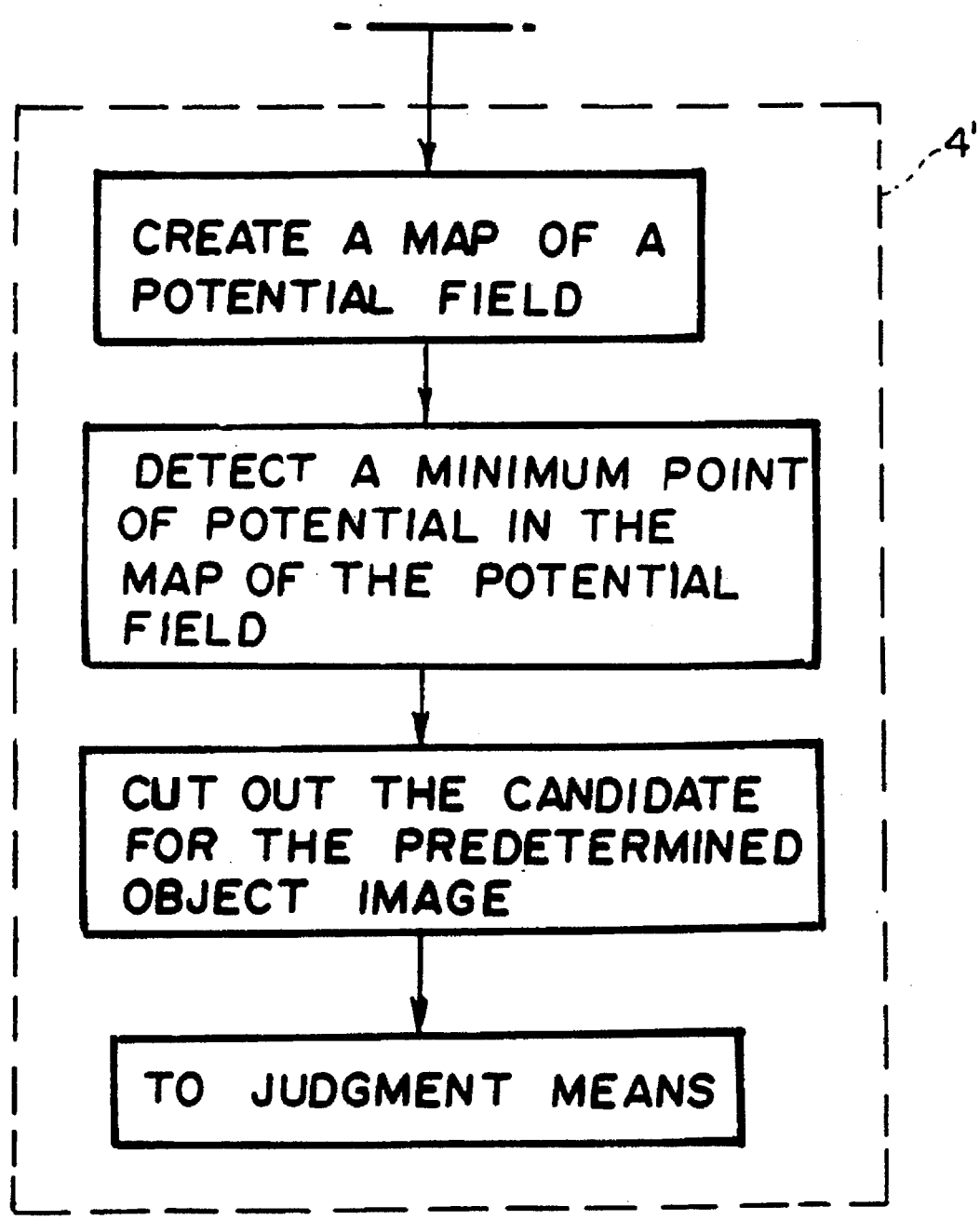
FIG. 62 is a block diagram showing the fundamental concept behind a second embodiment of the method for extracting an object image in accordance with the present invention.

FIG. 62 is a block diagram showing a fundamental concept behind the second embodiment of the method for extracting an object image in accordance with the present invention. As illustrated in FIG. 62, in this embodiment, the neural network processing unit 3 for search is employed which is the same as that employed in the first embodiment of the method for extracting an object image in accordance with the present invention shown in FIG. 1. Vectors for the travel of the view window, which have been determined by the neural network processing unit 3 for search, are taken as gradient vectors of a potential field. In a unit 4' for determining an extraction area, a map of the potential field of the entire area of the image is created from the gradient vectors of the potential field. Also, an extraction area is determined in accordance with the size and/or the shape of the candidate for the predetermined object image, a minimum point of the potential in the map being taken as a reference during the determination of the extraction area.

The map of the potential field of the image can be created by obtaining the gradient vectors of the potential field at respective points of the entire area of the image and recording the gradient vectors of the potential field on the image.

As described above, the potential field represents the field of a point, at which a viewpoint of human eyes is stable. When the potential field is considered with respect to the aforesaid neural network for extracting the candidate for the predetermined object image, the potential field can be regarded as the field of a point, at which the center point of the view window is stable. Specifically, the potential field can be regarded as being flat at the center point of the candidate for the predetermined object image, at which point the center point of the view window is stable. Also, the potential field can be regarded as being gradient at a point, at which the center point of the view window is unstable and from which the view window is required to travel. In such cases, the thing that expresses the gradient of the potential field is the direction of the gradient vector of the potential field, which vector is obtained in the aforesaid neural network for the extraction. Therefore, the map of the potential field of the image can be created by scanning the entire area of the given image with the view window of the aforesaid neural network and recording the gradient vectors of the potential field, which vectors are found at respective points in the image, on the image.

Figure 63:
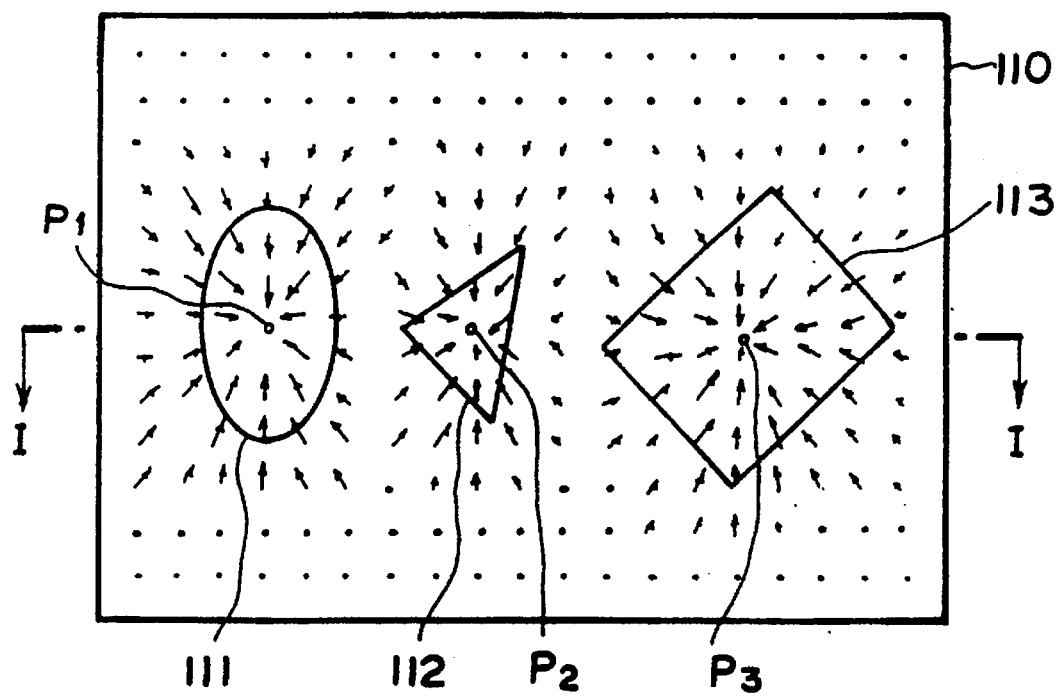
FIG. 63 is an explanatory view showing a map of a potential field of an image, in which an elliptic image, a triangular image, and a square image are embedded.

FIG. 63 is an explanatory view showing a map of a potential field created by recording the gradient vectors of the potential field, which have been found in the manner described above, on the image.

With reference to FIG. 63, an elliptic image 111, a triangular image 112, and a square image 113 are embedded in an image 110. Gradient vectors of the potential field over the entire area of the image 110 are calculated with the aforesaid neural network and are recorded at respective positions in the image 110, which correspond to the positions at which the gradient vectors of the potential field have been found. In this manner, a map of the potential field is obtained. In FIG. 63, the gradient vectors of the potential field are directed to center points P1, P2, and P3 of the elliptic image 111, the triangular image 112, and the square image 113. When the directions of the gradient vectors of the potential field are regarded as the gradients of the potential field, minimum points of the potential field can be found at the center points P1, P2, and P3 of the elliptic image 111, the triangular image 112, and the square image 113.

Figure 64:
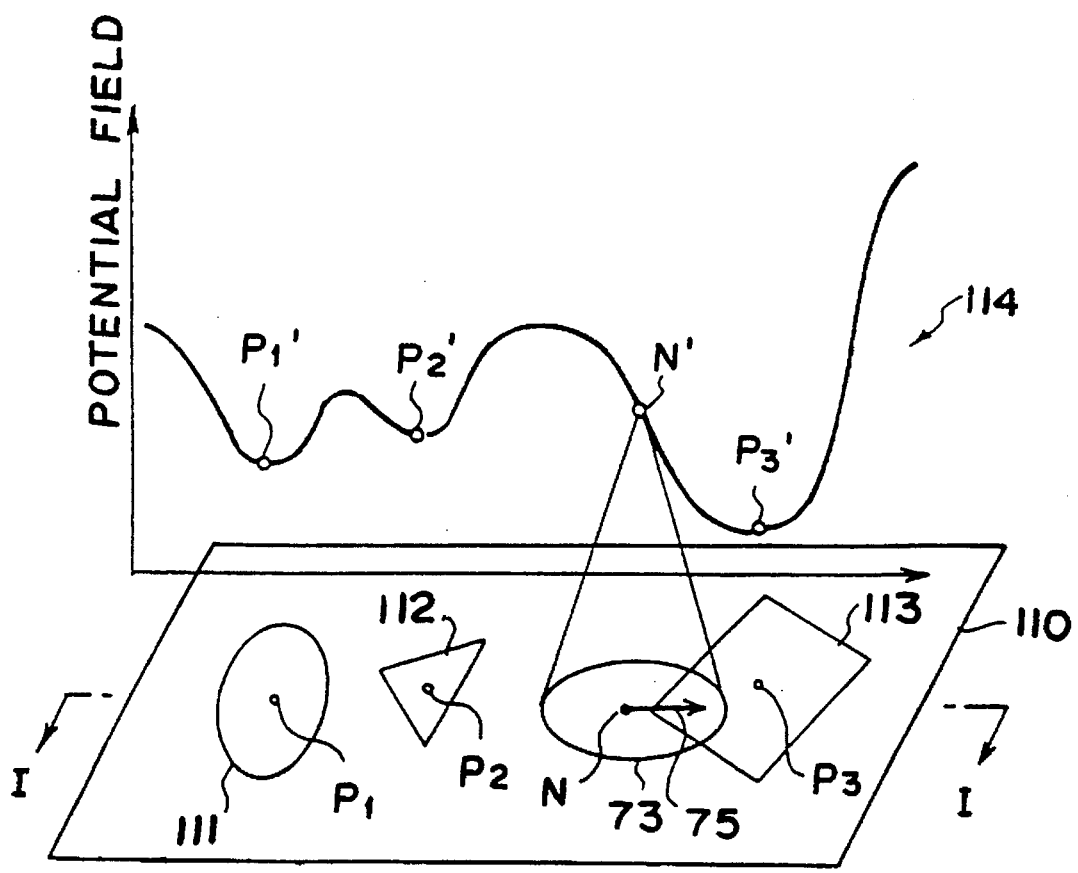
FIG. 64 is an explanatory view showing gradients of a potential field.

FIG. 64 is a graph showing the gradients of the potential field. In FIG. 64, the image 110 shown in FIG. 63 is scanned with a view window 73, and a gradient vector 75 of the potential field at a center point N of the view window 73 is being directed to the center point P3 of the square image 113.

A graph 114 at the upper part of FIG. 64 is a two-dimensional graph of the potential field obtained by finding the gradients of the potential field in the manner described above and taking a cross-section of the potential field along the line I—I of the image 110.

The graph 114 has three minimum points P1', P2', and P3', which correspond respectively to the center point P1 of the elliptic image 111, the center point P2 of the triangular image 112, and the center point P3 of the square image 113. Also, a point N' in the graph 114 corresponds to the center point N of the view window on the image 110. As the gradients of the potential field of the entire area of the image 110 are thus calculated and the map of the potential field is created, even if the view window is set at any point in the image, the view window can be caused to travel to the minimum points of the potential field, i.e., to the center points of candidates for the predetermined object images, by following shortest paths. Candidates for the predetermined object images are then extracted in accordance with the sizes and/or the shapes of the candidates for the predetermined object images by taking the minimum points of the potential field as references. In this manner, the extraction of the candidates for the predetermined object images can be carried out very efficiently. After a candidate for the predetermined object image has been extracted, the region of the map of the potential field, which region corresponds to the extracted candidate for the predetermined object image, may be masked. In this manner, the candidate for the predetermined object image, which candidate has once been extracted, can be prevented from being extracted again. For the purposes of masking the map of the potential field, the map of the potential field and a masking frame may be superposed one upon the other. Thereafter, values of signals in the region of the masking frame corresponding to the region of the map of the potential field, in which region the candidate for the predetermined object image is extracted, may be set at 0 or 1. In this manner, the map of the potential field can be masked, and the candidate for the predetermined object image, which candidate has once been extracted, can thereby be prevented from being extracted again.

A third embodiment of the method for extracting an object image in accordance with the present invention will be described hereinbelow.

With the third embodiment of the method for extracting an object image in accordance with the present invention, in the embodiment wherein the vector for the travel of the view window is calculated from the movement of the candidate for the predetermined object image, the extracted contour lines of the candidate for the predetermined object image, which candidate shows a movement different from the movement of the background, are not subjected to transformation with the complex-log mapping. and a vector for the travel of the view window is determined by using a neural network having a Cartesian plane-like neuron arrangement. Also, in the embodiments wherein the vectors for the travel of the view window are calculated from the contour line of the candidate for the predetermined object image and from the color of the candidate for the predetermined object image, the image at the time t, which image has been cut out and which falls within the region inside of the view window having the predetermined size, is not subjected to transformation with the complex-log mapping, and a vector for the travel of the view window is determined by using a neural network having a Cartesian plane-like neuron arrangement.

Figure 65:
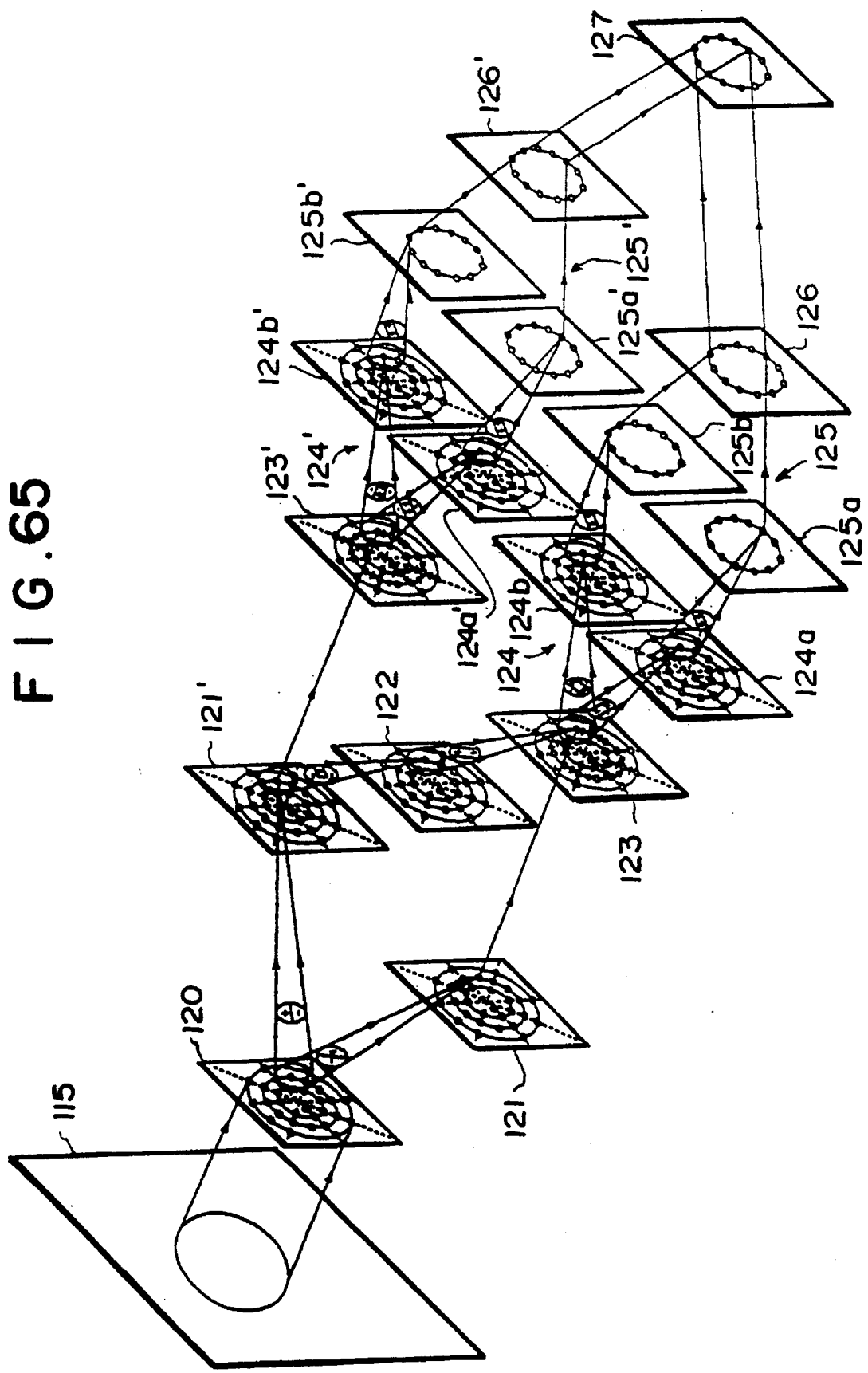
FIG. 65 is an explanatory view showing an example of a neural network for extracting a candidate for a predetermined object image by moving the center point of a view window to the center point of the candidate for the predetermined object image in a third embodiment of the method for extracting an object image in accordance with the present invention.

FIG. 65 is an explanatory view showing an example of a neural network for extracting a candidate for a predetermined object image by moving the center point of a view window to the center point of the candidate for the predetermined object image in the third embodiment of the method for extracting an object image in accordance with the present invention. First, a neural network will be described hereinbelow which fetches an image falling within the region inside of the view window in order to calculate a vector for the travel of the view window from the contour lines of the candidate for the predetermined object image, which shows a movement different from the movement of the background, the lines being found in the embodiment for calculating the vector for the travel of the view window from the movement of the candidate for the predetermined object image, or from the contour line of the candidate for the predetermined object image. The neural network employed in the third embodiment of the method for extracting an object image in accordance with the present invention is constituted of a plurality of neuron layers. Specifically, the neural network is constituted of an input layer 120 for cutting out an image part, which falls within the region inside of a view window having a predetermined size, from a given image 115. (In cases where a vector for the travel of the view window is calculated from the movement of the candidate for the predetermined object image, the signal representing the image 42 shown in FIG. 26, which represents the contour lines of the candidate for the predetermined object image showing a movement different from the movement of the background, is fed into the input layer 120.) The neural network is also constituted of a contour line detecting layer 121 for detecting circular arc-like contour lines of a candidate for a predetermined object image from the image, which has been cut out (or which has been fed into the input layer 120), and a contour line detecting layer 121' for detecting radial contour lines of the candidate for the predetermined object image from the image, which has been cut out. The neural network is additionally constituted of an and point detecting layer 122 for detecting the and points of the radial contour lines, an interactive connection layer 123 for selecting a continuous circular arc-like contour line, and an interactive connection layer 123' for selecting a continuous radial contour line. The neural network is further constituted of a tilted component extracting layer 124 for extracting all of contour line components, which are tilted at a predetermined angle with respect to circumferential directions of concentric circles surrounding the center point of the view window, from the circular arc-like contour line, which has been selected, and a tilted component extracting layer 124' for extracting all of contour line components, which are tilted at s predetermined angle with respect to circumferential directions of concentric circles surrounding the center point of the view window, from the radial contour line, which has been selected. The neural network is also constituted of an azimuth vector detecting layer 125 for detecting the azimuths and intensities, which represent azimuth vectors of the candidate for the predetermined object image with respect to the contours of the group of the concentric circles surrounding the center point of the view window, from the tilted components of the circular arc-like contour line, which have been extracted, and an azimuth vector detecting layer 125' for detecting the azimuths and intensities, which represent azimuth vectors of the candidate for the predetermined object image with respect to the contours of the group of the concentric circles surrounding the center point of the view window, from the tilted components of the radial contour line, which have been extracted. The neural network is additionally constituted of an azimuth vector composing layer 126 for composing an azimuth vector from the detected azimuths and intensities of the components of the circular arc-like contour line, and an azimuth vector composing layer 126' for composing an azimuth vector from the detected azimuths and intensities of the components of the radial contour line. The neural network further has a travel vector output layer 127 for determining a vector for the travel of the view window from the azimuth vectors which have been composed. Specifically, the input layer 120 corresponds to the a- or a'-layer of the neural network shown in FIG. 28 or FIG. 38 for determining the vector for the travel of the view window in the complex-log mapped plane. Also, the contour line detecting layers 121 and 121' correspond respectively to the c1- or c1'-layer and the c2- or c2'-layer of the neural network shown in FIG. 28 or FIG. 38. Additionally, the and point detecting layer 122 corresponds to the d- or d'-layer of the neural network shown in FIG. 28 or FIG. 38. Further, the interactive connection layers 123 and 123' correspond respectively to the e1- or e1'-layer and the e2- or e2'-layer of the neural network shown in FIG. 28 or FIG. 38. Also, the tilted component extracting layers 124 and 124' correspond respectively to the f1- or f1'-layer and the f2- or f2'-layer of the neural network shown in FIG. 28 or FIG. 38. Additionally, the azimuth vector detecting layers 125 and 125' correspond respectively to the g1- or g1'-layer and the g2- or g2'-layer of the neural network shown in FIG. 28 or FIG. 38. Further, the azimuth vector composing layers 126 and 126' correspond respectively to the h1- or h1'-layer and the h2- or h2'-layer of the neural network shown in FIG. 28 or FIG. 38, and the travel vector output-layer 127 corresponds to the i- or i'-layer of the neural network shown in FIG. 28 or FIG. 38.

Figure 67A:
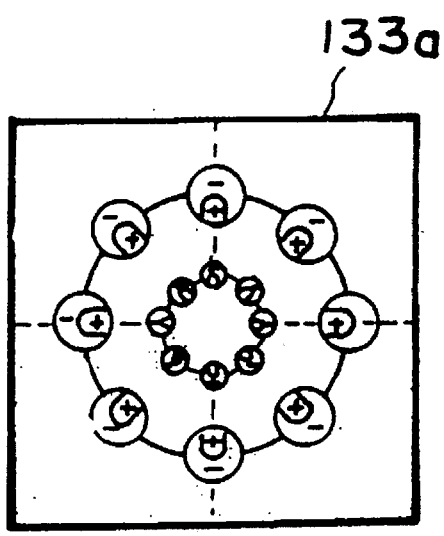
FIGS. 67A and 67B are explanatory views showing synaptic weights patterns for detecting and points of radial lines in the third embodiment of the method for extracting an object image in accordance with the present invention.
Figure 67B:
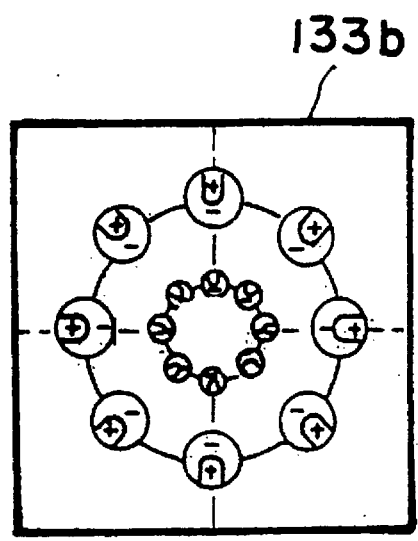
Figure 68:
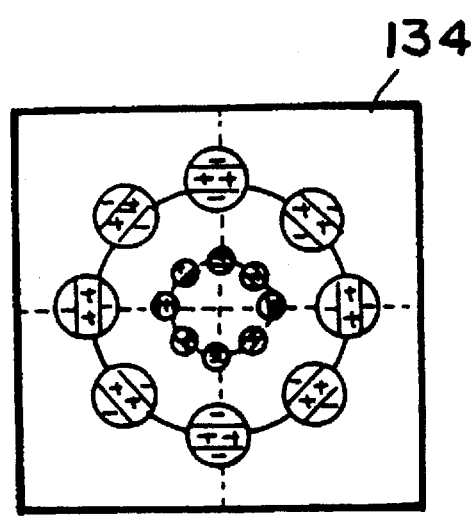
FIG. 68 is an explanatory view showing synaptic weights patterns for detecting predicted contour lines of a candidate for a predetermined object image, which lines extend in the annular direction, in the third embodiment of the method for extracting an object image in accordance with the present invention.

First, in the input layer 120, part of an image falling in the region inside of the view window having a predetermined size is cut out and fetched from the outer world. (Alternatively, the signal representing the image 42 shown in FIG. 26 is fed into the input layer 120.) Information representing the image fetched by the input layer 120 is fed into the contour line detecting layers 121 and 121', which detect circular arc-like contour lines and radial contour lines. For the purposes of detecting the circular arc-like contour lines and radial contour lines, the weights of the synaptic connections from the input layer 120 to the contour line detecting layers 121 and 121' are distributed in the patterns shown in FIGS. 66A and 69A, respectively. Specifically, in the contour line detecting layer 121, a group of synaptic weights patterns 128 are arranged on concentric circles surrounding the center point of the view window such that the synaptic weights patterns can appropriately detect circular arc-like contour lines. The group of the synaptic weights patterns 128 have sizes such that the range of the connections may become narrower at a region closer to the center point of the view window. Also, in the contour line detecting layer 121', a group of synaptic weights patterns 128' are arranged on concentric circles such that the synaptic weights patterns can appropriately detect contour lines, which extend radially from the center point of the view window. As in the group of the synaptic weights patterns 128, the group of the synaptic weights patterns 128' have sizes such that the range of the connections may become narrower at a region closer to the center point of the view window. Changing the range of connections in accordance with the distance to the center point of the view window corresponds to the nonlinear, logarithmic transformation of the radial distance in the aforesaid first embodiment wherein the transformation with the complex-log mapping is carried out. In cases where a candidate for the predetermined object image is blocked by a different body located on the foreground side, and points of the radial contour lines occur at the boundary between the candidate for the predetermined object image and the different body located on the foreground side. In the end point detecting layer 122, such end points of the radial contour lines are extracted from the pattern received from the contour line detecting layer 121', in which the radial contour lines have been extracted. In order to detect end points, the convolution is carried out on the contour lines pattern, which has been obtained in the contour line detecting layer 121', by using synaptic weights patterns shown in FIGS. 67A and 67B. In this case, the end points of the contour lines heading away from the center point of the view window are detected by a group of synaptic weights patterns 133a. Also, the end points of the contour lines heading towards the center point of the view window are detected by a group of synaptic weights patterns 133b. A signal representing the pattern of the end points of the contour lines extending in the radial direction, which end points have been detected in the end point detecting layer 122 in the manner described above, is transmitted to the interactive connection layer 123 through a group of synaptic weights patterns 134 shown in FIG. 68 as a signal, which represents a predicted contour line of the candidate for the predetermined object image along the annular direction. In this manner, the circular arc-like contour lines, the predicted contour line, and the radial contour lines are detected. Thereafter, in the interactive connection layers 123 and 123', a continuous circular arc-like contour line and a continuous radial contour line are selected.

Figures 66A, 66B:
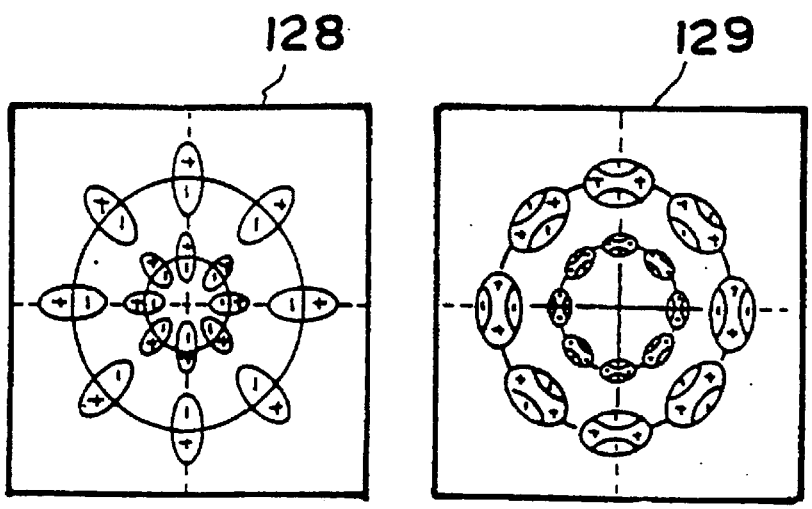
FIGS. 66A, 66B, 66C, and 66D are explanatory views showing weights of synaptic connections between layers of the neural network, which is employed in the third embodiment of the method for extracting an object image in accordance with the present invention.

The weights of the synaptic connections in the interactive connection layer 123 are distributed in the pattern shown in FIG. 66B. Specifically, a group of synaptic weights patterns 129 are arranged so as to surround the center point Q of the view window. With the group of synaptic weights patterns 129, contour lines extending in the circumferential direction cooperate with one another, and contour lines, which have a high level of continuity in the circumferential direction and have a high intensity, are emphasized. As a result, contour lines, which were broken in the circumferential direction due to the background, or the like, become continuous. Also, contour lines extending in the radial direction compete with the contour lines, which have a high level of continuity in the circumferential direction and have a high intensity. The contour lines extending in the radial direction are thus inhibited and erased by inhibitory signals corresponding to the contour lines extending in the circumferential direction.

The weights of the synaptic connections in the interactive connection layer 123' are distributed in the pattern shown in FIG. 69B. Specifically, a group of synaptic weights patterns 129' are arranged so as to surround the center point Q of the view window. With the group of synaptic weights patterns 129', contour lines extending in the radial direction cooperate with one another, and contour lines, which have a high level of continuity in the radial direction and have a high intensity, are emphasized. As a result, contour lines, which were broken in the radial direction due to the background, or the like, become continuous. Also, contour lines extending in the circumferential direction compete with the contour lines, which have a high level of continuity in the radial direction and have a high intensity. The contour lines extending in the circumferential direction are thus inhibited and erased by inhibitory signals corresponding to the contour lines extending in the radial direction.

Thereafter, in the tilted component extracting layers 124 and 124', all of the contour line components, which are tilted at a predetermined angle with respect to the contours of the group of the concentric circles surrounding the center point of the view window, are extracted from the contour lines, which have been selected.

Figures 66C, 66D:
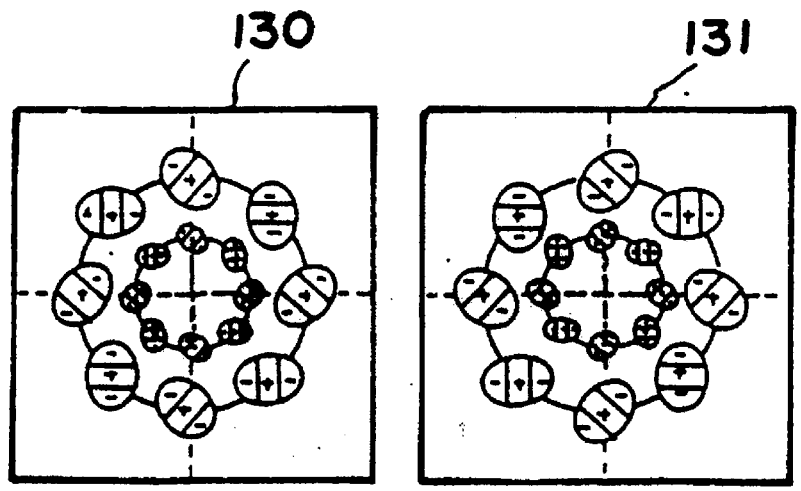

The weights of the syneptic connections from the interactive connection layer 123 to the tilted component extracting layer 124 are designed such that the synaptic weights in tilted component extracting layers 124a and 124b may be distributed in the patterns shown in FIGS. 66C and 66D. A group of synaptic weights patterns 130 for detecting a contour line shown in FIG. 66C are tilted upwards to the right at predetermined angles +α and −α with respect to the circumferential directions of a group of concentric circles, which surround the center point of the view window. Also, a group of synaptic weights patterns 131 for detecting a contour line shown in FIG. 66D are tilted upwards to the left at predetermined angles +α and −α with respect to the circumferential directions of a group of concentric circles, which surround the center point of the view window. The group of the synaptic weights patterns 130 for detecting a contour line and the group of the synaptic weights patterns 131 for detecting a contour line have sizes such that the range of the connections may become narrower at a region closer to the center point of the view window. The group of the synaptic weights patterns 130 for detecting a contour line and the group of the synaptic weights patterns 131 for detecting a contour line detect the components of the circular arc-like contour line of the candidate for the predetermined object image, which are tilted at the predetermined angle with respect to the directions along the circumferences around the center point of the view window. For example, in cases where a circular candidate 132 for the predetermined object image is present at the position shown in FIG. 70A or FIG. 70B, of the components of the contour line of the candidate 132 for the predetermined object image, which line has been selected by the interactive connection layer 123, the component tilted upwards to the right is detected by a synaptic weights pattern 130a contained in the group of the synaptic weights patterns 130 for detecting a contour line. Also, the component tilted upwards to the left is detected by a synaptic weights pattern 131a contained in the group of the synaptic weights patterns 131 for detecting a contour line. From the azimuths and the intensities of the tilted components which have thus been detected, the azimuth and the intensity of the component tilted upwards to the right are detected in an azimuth vector detecting layer 125a. Also, the azimuth and the intensity of the components tilted upwards to the left are detected in an azimuth vector detecting layer 125b. Thereafter, in the azimuth vector composing layer 126, an azimuth vector is composed from the azimuths and the intensities, which have been detected by the azimuth vector detecting layers 125a and 125b. Information representing the azimuth vector, which has thus been composed, is transmitted to the travel vector output layer 127 and fed out as the information representing the vector for the travel of the view window.

Figures 71A, 71B:
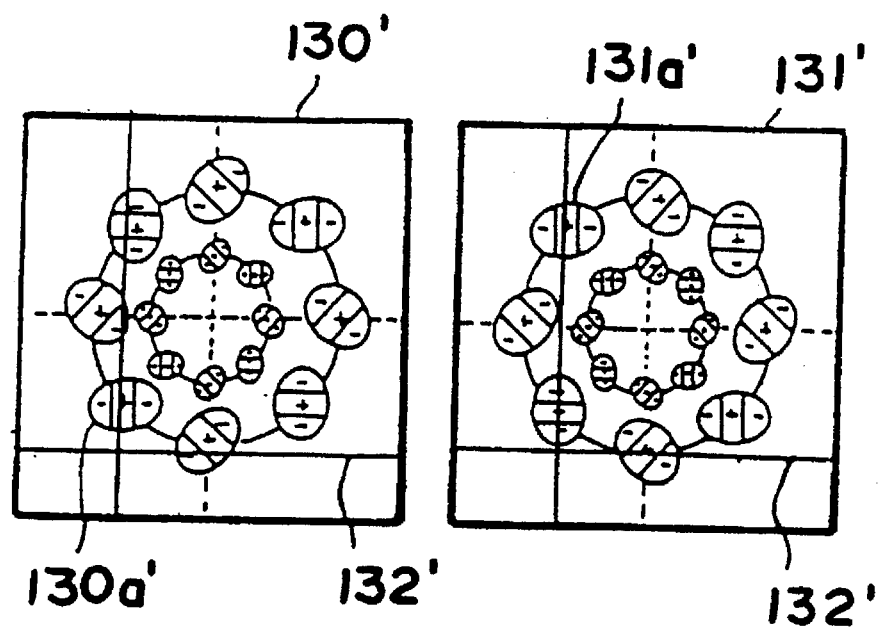
FIGS. 71A and 71B are explanatory views showing how a difference in position between the center point of a view window and a candidate for a predetermined object image is detected by causing the center point of the view window to travel towards a point of intersection of contour lines of the candidate for the predetermined object image in the third embodiment of the method for extracting an object image in accordance with the present invention.

The weights of the synaptic connections from the interactive connection layer 123' to the tilted component extracting layer 124' are designed such that the synaptic weights in tilted component extracting layers 124a' and 124b' may be distributed in the patterns shown in FIGS. 69C and 69D. A group of synaptic weights patterns 130' for detecting a contour line shown in FIG. 69C are tilted upwards to the left at predetermined angles $+\alpha'$ and $-\alpha'$ with respect to the circumferential directions of a group of concentric circles, which surround the center point of the view window. Also, a group of synaptic weights patterns 131' for detecting a contour line shown in FIG. 69D are tilted upwards to the right at predetermined angles $+\alpha'$ and $-\alpha'$ with respect to the circumferential directions of a group of concentric circles, which surround the center point of the view window. The group of the synaptic weights patterns 130' for detecting a contour line and the group of the synaptic weights patterns 131' for detecting a contour line have sizes such that the range of the connections may become narrower at a region closer to the center point of the view window. The group of the synaptic weights patterns 130' for detecting a contour line and the group of the synaptic weights patterns 131' for detecting a contour line detect the components of the radial contour line of the candidate for the predetermined object image, which are tilted at the predetermined angle with respect to the directions along the circumferences around the center point of the view window. For example, in cases where a point of intersection of contour lines of a candidate 132' for the predetermined object image is present at the position shown in FIG. 71A or FIG. 71B, of the components of the contour lines of the candidate 132' for the predetermined object image, which lines have been selected by the interactive connection layer 123', the component tilted upwards to the left is detected by a synaptic weights pattern 130a' contained in the group of the synaptic weights patterns 130' for detecting a contour line. Also, the component tilted upwards to the right is detected by a synaptic weights pattern 131a' contained in the group of the synaptic weights patterns 131' for detecting a contour line. Of the azimuths and the intensities of the tilted components which have thus been detected, the azimuth and the intensity of the component tilted upwards to the left are detected in an azimuth vector detecting layer 125a'. Also, the azimuth and the intensity of the component tilted upwards to the right are detected in an azimuth vector detecting layer 125b'. Thereafter, in the azimuth vector composing layer 126', an azimuth vector is composed from the azimuths and the intensities, which have been detected by the azimuth vector detecting layers 125a' and 125b'. Information representing the azimuth vector, which has thus been composed, is transmitted to the travel vector output layer 127 and fed out as the information representing the vector for the travel of the view window.

The vectors for the travel of the view window, which have been composed in the azimuth vector composing layers 126 and 126', will be different from each other, depending on the circumstances under which the center point of the view window is placed. However, as in the aforesaid first embodiment of the method for extracting an object image in accordance with the present invention, when the outputs representing the two types of the vectors for the travel of the view window are utilized in a well-balanced manner in the travel vector output layer 127, the view window can be moved to a predetermined position regardless of the circumstances under which the center point of the view window is placed.

At the same time as when the vector for the travel of the view window is calculated from the movement of the candidate for the predetermined object image and the vector for the travel of the view window is calculated from contour line of the candidate for the predetermined object image, a vector for the travel of the view window is also calculated from the color of the candidate for the predetermined object image.

Figure 72:
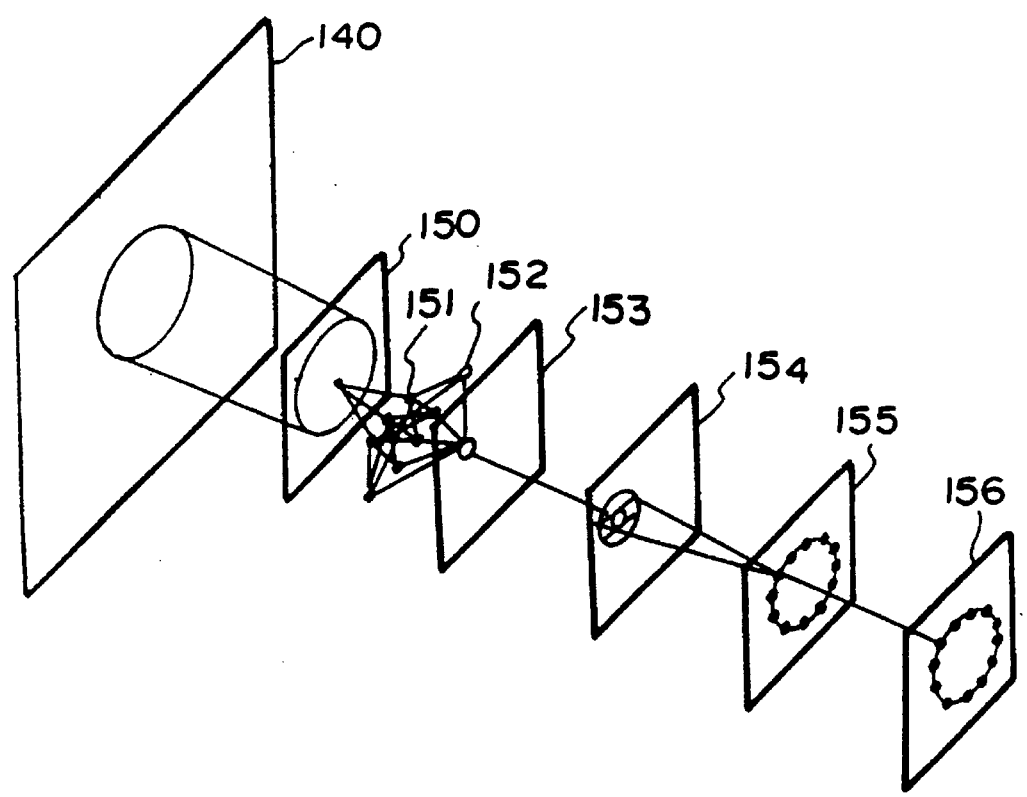
FIG. 72 is an explanatory view showing an example of a neural network for extracting a candidate for a predetermined object image by causing the center point of a view window to travel towards the center point of the candidate for the predetermined object image in the third embodiment of the method for extracting an object image in accordance with the present invention.

FIG. 72 is an explanatory view showing an example of a neural network for extracting a candidate for a predetermined object image by moving the center point of a view window to the center point of the candidate for the predetermined object image in this embodiment of the method for extracting an object image in accordance with the present invention. The neural network shown An FIG. 72 is constituted of a plurality of neuron layers. Specifically, the neural network is constituted of an input layer 150 for cutting out an image part, which falls within the region of a view window having a predetermined size, from a given image 140. The neural network is also constituted of layers 151, 152, and 153 for detecting regions approximately coinciding in color with the candidate for the predetermined object image in the cut-out image and detecting degrees of coincidence in color between the regions and the candidate for the predetermined object image, and an interactive connection layer 154 for selecting a color region having a predetermined size and a predetermined intensity. The neural network is additionally constituted of an azimuth vector detecting layer 155 for detecting the azimuth and the distance of the selected color region, and a travel vector output layer 156 for composing a vector from the detected azimuth and the detected distance and generating an output representing a vector for the travel of the view window.

Specifically, the input layer 150 corresponds to the a"-layer of the neural network shown in FIG. 43 for determining the vector for the travel of the view window in the complex-log mapped plane. Also, the layers 151, 152, and 153 correspond to the c"-, d"-, and e"-layers of the neural network shown in FIG. 43. Additionally, the interactive connection layer 154 corresponds to the f"-layer of the neural network shown in FIG. 43. Further, the azimuth vector detecting layer 155 corresponds to the g"-layer of the neural network shown in FIG. 43. Also, the travel vector output layer 156 corresponds to the i"-layer of the neural network shown in FIG. 43.

First, in the input layer 150, part of an image falling in the region inside of the view window having a predetermined size is cut out and fetched from the outer world. Information representing the image fetched by the input layer 150 is fed into the layers 151, 152, and 153, which detect regions approximately coinciding in color with the candidate for the predetermined object image. By the layers 151, 152, and 153, the regions approximately coinciding in color with the candidate for the predetermined object image are detected, and the degrees of coincidence in color between the detected regions and the candidate for the predetermined object image are detected. Thereafter, in the interactive connection layer 154, groups of neurons falling within the regions having high degrees of coincidence in color with the candidate for the predetermined object image are selected. Thereafter, a group of the neurons falling within the region, which has the shape and the size most appropriate for the candidate for the predetermined object image, are extracted from the selected groups of the neurons falling within the regions having high degrees of coincidence in color with the candidate for the predetermined object image.

Figure 73:
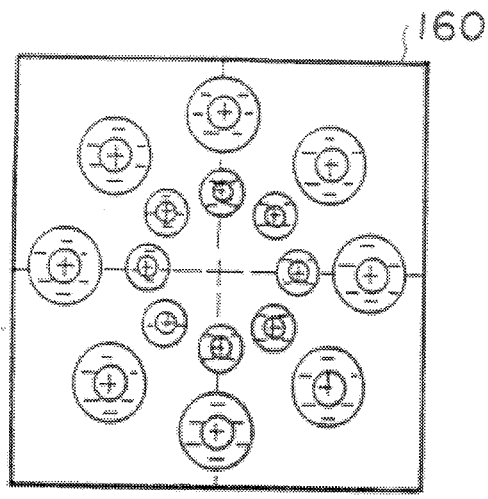
FIG. 73 is en explanatory view showing weights of synaptic connections in a layer of the neural network, which is employed for causing the center point of a view window to travel towards a region approximately coinciding in color with a candidate for a predetermined object image in the third embodiment of the method for extracting an object image in accordance with the present invention.

In the interactive connection layer 154, the weights of the interactive synaptic connections for selecting the color region having a predetermined size and a predetermined intensity are set as shown in FIG. 73. As illustrated in FIG. 73, a group of synaptic weights patterns 160 for detecting a group of the neurons exhibiting a high degree of coincidence in color with the candidate for the predetermined object image are set such that the range of the connections may become narrower at a region closer to the center point of the view window. With the group of the synaptic weights patterns 160, a group of the neurons exhibiting a high degree of coincidence in color with the candidate for the predetermined object image are detected. Thereafter, an azimuth vector is composed from the azimuth and the distance, which have been detected by the azimuth vector detecting layer 155. Information representing the azimuth vector, which has thus been composed, is transmitted to the travel vector output layer 156 and fed out as the information representing the vector for the travel of the view window.

In the manner described above, the three types of the vectors for the travel of the view window are obtained from the neural network, wherein the vector for the travel of the view window is calculated from the contour line of the candidate for the predetermined object image, the neural network, wherein the vector for the travel of the view window is calculated from the movement of the candidate for the predetermined object image, and the neural network, wherein the vector for the travel of the view window is calculated from the color of the candidate for the predetermined object image. Thereafter, these three types of the vectors for the travel of the view window are combined with one another in a manner suitable for the candidate for the predetermined object image, which is to be found. In this manner, an ultimate vector for the travel of the view window is determined. The view window is caused to travel towards the candidate for the predetermined object image in accordance with the ultimately determined vector for the travel of the view window.

The view window is caused to travel in the manner described above, and the center point of the view window reaches the center point of the candidate for the predetermined object image. Thereafter, as in the aforesaid embodiment of the method for extracting an object image in accordance with the present invention, the candidate for the predetermined object image is normalized and cut out. Information representing the cut-out candidate for the predetermined object image is fed into the judgment means. The judgment means makes a judgment as to whether the candidate for the predetermined object image is or is not the predetermined object image.

In the aforesaid third embodiment of the method for extracting an object image in accordance with the present invention, as in the first embodiment, the annealing process, or the like, for the neural network may be employed in order to give thermal fluctuations to the outputs of the neurons and thereby to prevent the view window from stopping at a minute minimum point in the image. In such cases, the characteristics represented by Formula (7) may be imparted to the outputs of the neurons of the tilted component extracting layers 124 and 124' of the neural network employed in the third embodiment. Also, as in the first embodiment, the characteristics represented by Formula (8) may be imparted to the vector for the travel of the view window, which vector is obtained from the travel vector output layer 127. The inertia term may thus be added, and the view window may thereby be prevented from stopping at a minute minimum point.

Figure 74:
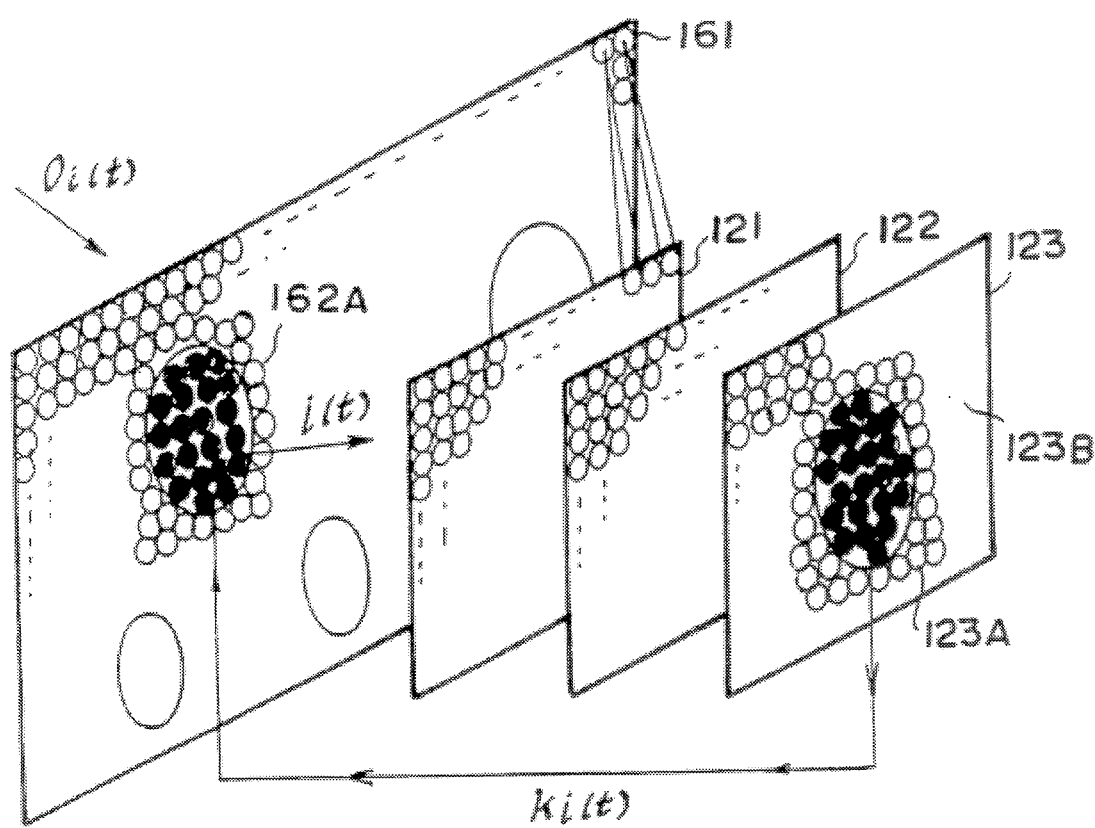
FIG. 74 is an explanatory view showing how a process for preventing re-extraction is carried out in the third embodiment of the method for extracting an object image in accordance with the present invention.

Additionally, in the third embodiment of the method for extracting an object image in accordance with the present invention, the term of fatigue of the neural network may be introduced, or the masking process, or the like, may be carried out such that the candidate for the predetermined object image, which candidate has once been extracted, may not again extracted. For example, the retinal neuron layer described above is located before the input layer of the neural network employed in the third embodiment. The characteristics represented by Formula (9) are given to the neurons of the retinal neuron layer. As illustrated in FIG. 74, ki(t) is set at 1 for the neurons falling within a region 123A of the interactive connection layer 123 employed in this embodiment, which region corresponds to the side inward from the contour line of the candidate for the predetermined object image, the contour line having been emphasized in the interactive connection layer 123. Also, ki(t) is set at 0 for the neurons falling within a region of the interactive connection layer 123, which region corresponds to the side outward from the contour line of the candidate for the predetermined object image, the contour line having been emphasized in the interactive connection layer 123. In this manner, fatigue accumulates only in the neurons of a retinal neuron layer 161, which fall in a region 162A corresponding to the side inward from the face image serving as the candidate for the predetermined object image. Therefore, according to Formula (9), the neurons, which fall in the region corresponding to the side outward from the candidate for the predetermined object image, do not fatigue, and the inputs into these neurons can be directly taken as the outputs therefrom. However, the neurons, which fall in the region corresponding to the side inward from the candidate for the predetermined object image, accumulate their fatigue. Therefore, when the neurons, which fall in the region corresponding to the side inward from the candidate for the predetermined object image, receive inputs, the outputs of these neurons reduce due to the aforesaid term of fatigue. Because of the reduction in the outputs, signals from the neurons corresponding to the region inside of the candidate for the predetermined object image are not transmitted from the retinal neuron layer 161 to the next layer. Therefore, the view window can travel to a next candidate for the predetermined object image, and the next candidate for the predetermined object image can thereby be extracted. As for the fatigue, as described above, by the appropriate setting of the values of ki(t) and tf, in cases where a certain neuron receives an input at all times, the output of this neuron repeats an increase and a decrease with the passage of time. If the value of tf is set at infinity, a neuron, which has once been excited, will not again be excited, and therefore the same candidate for the predetermined object image, which has once been extracted, will not again be extracted.

Further, as in the first embodiment of the method for extracting an object image in accordance with the present invention, thermal fluctuations may be given to the input-output transfer characteristics of the neurons of the tilted components extracting layers 124 and 124' by using the annealing process, or the term of fatigue may be introduced into the retinal neuron layers. In this manner, from the state in which the view window stopped, the view window may be caused to travel again to the predetermined direction.

As in the second embodiment of the method for extracting an object image in accordance with the present invention, the vectors for the travel of the view window, which have been determined by the third embodiment, may be taken as gradient vectors of the potential field, and a map of the potential field may thereby be created. The candidate for the predetermined object image may then be extracted in accordance with the minimum point in the map.

In the aforesaid embodiments of the method for extracting an object image in accordance with the present invention, a candidate for the predetermined object image is extracted, and then a judgment is made as to whether the extracted candidate for the predetermined object image is or is not the predetermined object image. Alternatively, after a candidate for the predetermined object image has been extracted, the extracted candidate for the predetermined object image may be taken as the predetermined object image and utilized during the learning operations of the neural network. The candidate for the predetermined object image has been normalized and has a strong probability of being the predetermined object image. Therefore, the learning operations of the neural network can be carried out efficiently.

Also, in the aforesaid embodiments of the method for extracting an object image in accordance with the present invention, neural networks are used to extract the candidate for the predetermined object image. The neural networks need not necessarily be employed, and any of other techniques may be utilized for this purpose.

In the aforesaid embodiments, wherein the vector for the travel of the view window or the gradient vector of the potential field (these two types of vectors will hereinbelow be referred to as the vector for the travel of the view window, or the like) is calculated from the movement of the candidate for the predetermined object image, the in-plane parallel movement of the image is detected in the Cartesian plane. Also, the movement in the radial or in-plane rotating direction is detected after the image is transformed with the complex-log mapping. However, transformation with the complex-log mapping need not necessarily be carried out during the detection of the image movement, and the image movement may be detected in the Cartesian plane. Also, the in-plane parallel movement of the image may be detected after the image is transformed with the complex-log mapping. Additionally, in the aforesaid embodiments, wherein the vector for the travel of the view window, or the like, is calculated from the movement of the candidate for the predetermined object image, the three types of image movements in the in-plane parallel direction, in the radial direction, and in the in-plane rotating direction are detected. In cases where the image movement is constant (e.g., when the image moves only in the in-plane parallel direction), only one type of movement (e.g., only the in-plane parallel movement) may be detected.

Also, in the aforesaid embodiments of the method for extracting an object image in accordance with the present invention, neural networks are utilized for all steps from the cutting out of the image part, which falls within the region inside of the view window, to the travel of the view window. Also, neural networks are utilized for the process for preventing re-extraction of the same candidate for the predetermined object image, for the addition of thermal fluctuations, and for the introduction of the term of fatigue. However, the neural networks need not necessarily be utilized for all steps, and a neural network may be used in at least one step during the extraction of the object image. Also, the cutting out of the candidate for the predetermined object image may be carried out by using a neural network.

Additionally, in the aforesaid embodiments of the method for extracting an object image in accordance with the present invention, the human face image or the yacht image is extracted. The method for extracting an object image in accordance with the present invention is also applicable when other types of predetermined object images are extracted. In such cases, any object image can be extracted efficiently in the same manner as that in the extraction of the human face image or the yacht image by using a neural network during the extraction and carrying out the learning operations of the neural network in a manner suitable for the object image to be extracted.

Further, the method for extracting an object image in accordance with the present invention is applicable not only when a candidate for the predetermined object image is extracted from a still image, in which a human face image, or the like, is embedded, but also when a moving candidate for the predetermined object image is followed up. In such cases, the view window may be caused to travel as in the aforesaid embodiments, and the moving candidate for the predetermined object image may thereby be followed up. Thereafter, the candidate for the predetermined object image may be extracted, and a judgment may be made as to whether the moving candidate for the predetermined object image is or is not the predetermined object image.

Moreover, in the aforesaid embodiments of the method for extracting an object image in accordance with the present invention, the ultimate vector for the travel of the view window, or the like, is determined by composing the three types of the vectors for the travel of the view window, or the like, which have been calculated from the three types of features, i.e., the movement, the contour line, and the color of the candidate for the predetermined object image. Alternatively, the vector for the travel of the view window, or the like, may be determined from the contour line and the color of the candidate for the predetermined object image. As another alternative, the vector for the travel of the view window, or the like, may be determined from the movement and the contour line of the candidate for the predetermined object image. As a further alternative, the vector for the travel of the view window, or the like, may be determined from the movement and the color of the candidate for the predetermined object image. As a final alternative, the vector for the travel of the view window, or the like, may be determined from only one of the movement, the contour line, and the color of the candidate for the predetermined object image.

Also, in the aforesaid embodiments of the method for extracting an object image in accordance with the present invention, the process for preventing re-extraction, the introduction of the term of fatigue, the addition of thermal fluctuations, and the like, are carried out only on the neural network for determining the vector for the travel of the view window in accordance with the contour line of the candidate for the predetermined object image. The process for preventing re-extraction, the introduction of the term of fatigue, the addition of thermal fluctuations, and the like, may also be carried out on the neural network for determining the vector for the travel of the view window in accordance with the color of the candidate for the predetermined object image and the neural network for determining the vector for the travel of the view window in accordance with the movement of the candidate for the predetermined object image.

An embodiment of the method for detecting a gradient of a contour line field in accordance with the present invention will be described hereinbelow.

Figure 75:
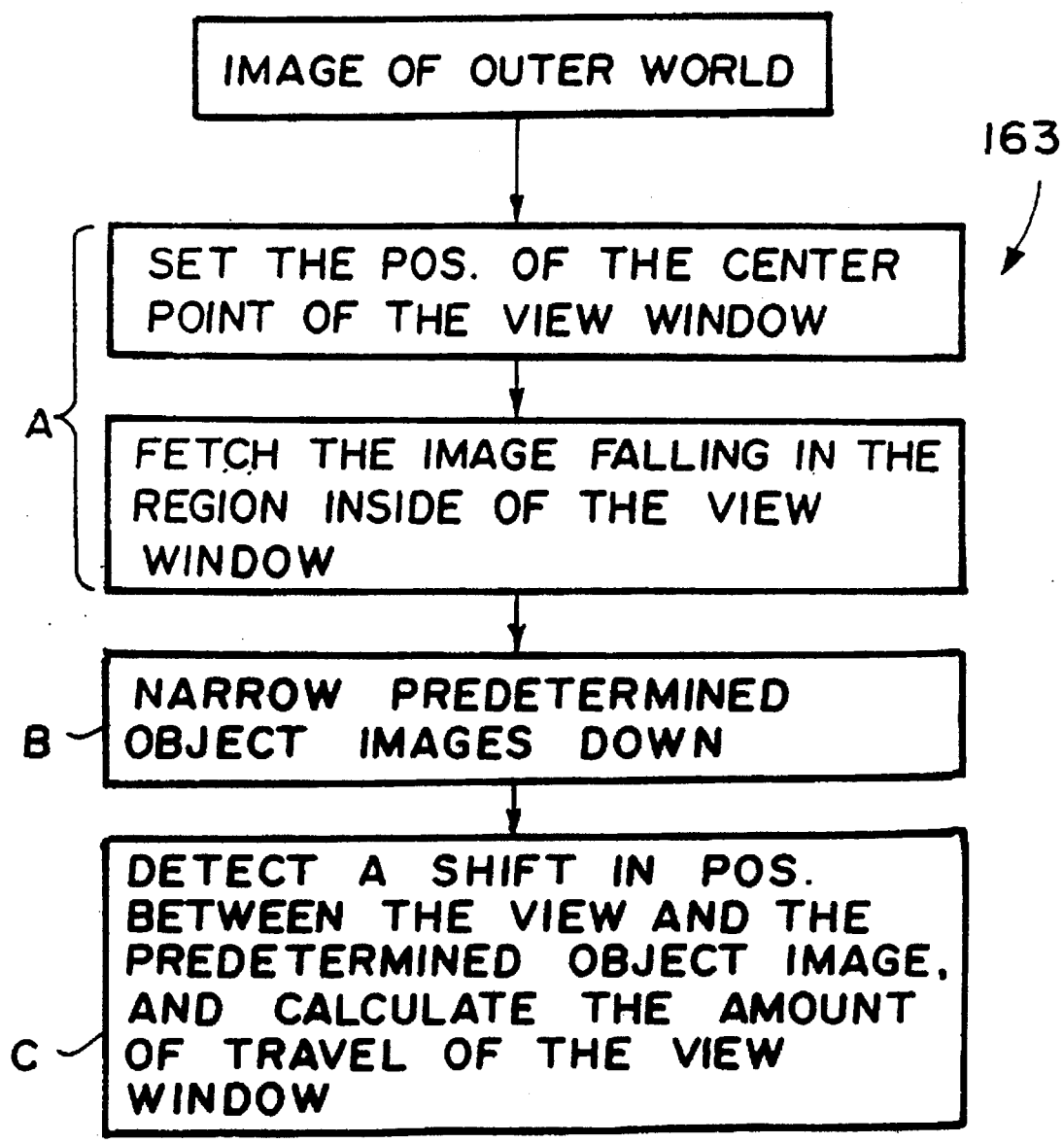
FIG. 75 is a block diagram showing a fundamental concept behind the method for detecting a gradient of a contour line field in accordance with the present invention.

FIG. 75 is a bloom diagram showing a fundamental concept behind the method for detecting a gradient of a contour line field in accordance with the present invention.

As illustrated in FIG. 75, this embodiment is constituted of a neural network processing unit 163, in which a gradient vector of a contour line field is detected by using a neural network.

First, in a step A in the neural network processing unit 163, the position of the center point of a view window is set in an image, and part of the image falling in the region inside of the view window is fetched from the image. Thereafter, in a step B, in cases where a plurality of object images have been detected in the fetched image, they are narrowed down, and an object image, which is most likely to be the predetermined object image, is thereby selected. In a step C, a shift in position between the view window and the predetermined object image is detected, and the amount, in which the view window is to travel, is calculated. Specifically, in the step C, the gradient vector of the contour line field is calculated.

The neural network employed in the neural network processing unit 163 may be constituted in the same manner as that in the neural network, which is shown in FIG. 28 and which calculates the vector for the travel of the view window from the contour line of the candidate for the predetermined object image. In this embodiment of the method for detecting a gradient of a contour line field in accordance with the present invention, the gradient vector of the contour line field is calculated by composing a vector from the azimuth vectors, which are detected in the h1- and h2-layers of the neural network shown in FIG. 28. In such cases, the magnitude and the direction of the aforesaid vector for the travel of the view window represent the magnitude and the direction of the gradient vector of the contour line field.

Alternatively, the gradient vector of the contour line field may be determined by using the neural network, which is shown in FIG. 65 and which determines the vector for the travel of the view window in the Cartesian plane.

In cases where the gradient vector of the contour line field is regarded as the vector for the travel of the view window, the view window can be caused to travel towards the center point of the object image in the same manner as that in the embodiment, which has already been described above. In cases where the gradient vector of the contour line field is regarded as the gradient vector of the potential field, a map of the potential field can be created in the manner described above.

It is also possible to find the center of gravity on the object image by appropriately composing a vector from the aforesaid azimuth vectors and thereby calculating the gradient vector of the contour line field.

Additionally, if the gradient of a field intersecting perpendicularly to the gradient vector of the contour line field is calculated, the direction along the contour line of the object image can be detected, and the view window can thereby be caused to travel along the contour line of the object image.

Further, if a portion of the image, at which the gradient vector of the contour line field is large, or information existing at the direction, to which the field sinks, is detected, only effective information can be detected selectively, and the image information can thereby be compressed. Specifically, in cases where the contour line field takes on the form of a conical field such that the field may sink towards the center point of the object image surrounded by the contour line, the image information can be compressed while the information concerning the side inward from the contour line is kept at a high quality. In cases where the contour line field is such that it sinks towards the position of the contour line itself, the image information can be compressed while the priority is being given to the contour line information.

At a portion of the image, at which the contour line field is not gradient, there is no important contour line information that gives a gradient of the field. At a portion of the image, at which the contour line field is largely gradient, there is important contour line information that gives the large gradient of the field. Therefore, compression of the image information can be carried out in the manner described above. The direction, to which the field sinks, indicates the side inward from the contour line. In general, the side inward from the contour line ie referred to as the "surface," and the side outward from the contour line is referred to as the "ground." The "surface" is regarded as the target, and the "ground" is regarded as the background. In most cases, the side inward from the contour line is more important than the side outward from the contour line. Therefore, it should be thought that the information corresponding to the portion, at which the field is gradient, and the information corresponding to the position at the direction, to which the field sinks, are important and effective. By way of example, when the image information is compressed, the quality of the selected important information can thus be kept high.

The vector for the travel of the view window, which vector is determined from the color of the candidate for the predetermined object image in the manner described above, may be detected as a gradient vector of an object image color field. In such cases, like the gradient vector of the contour line field, the gradient vector of the object image color field can be utilized in a wide variety of image processes.

Also, the movement of the image determined by the neural network, which is shown in FIG. 4 and detects the movement of the image, may be detected as an image movement vector. In such cases, like the gradient vector of the contour line field and the gradient vector of the object image color field, the image movement vector can be utilized in a wide variety of image processes.

Embodiments of the method for extracting a contour line of an object image in accordance with the present invention will be described hereinbelow.

FIG. 76 is a block diagram showing a fundamental concept behind the method for extracting a contour line of an object image in accordance with the present invention. In the embodiments described below, a contour line of a human face image, which serves a candidate for a predetermined object image, is extracted from an image by using a neural network.

As illustrated in FIG. 76, each of the embodiments is constituted of a neural network processing unit 164, in which the candidate for the predetermined object image is searched by using a neural network and iterating travel of a view window.

First, in a step A in the neural network processing unit 164, the position of the center point of a view window is set in an image, and part of the image falling in the region inside of the view window is fetched from the image. Thereafter, in a step B, in cases where a plurality of contour lines of the candidate for the predetermined object image have been detected in the fetched image, they are narrowed down, and a contour line, which is most likely to be the contour line of the candidate for the predetermined object image, is thereby selected.

Figure 77:
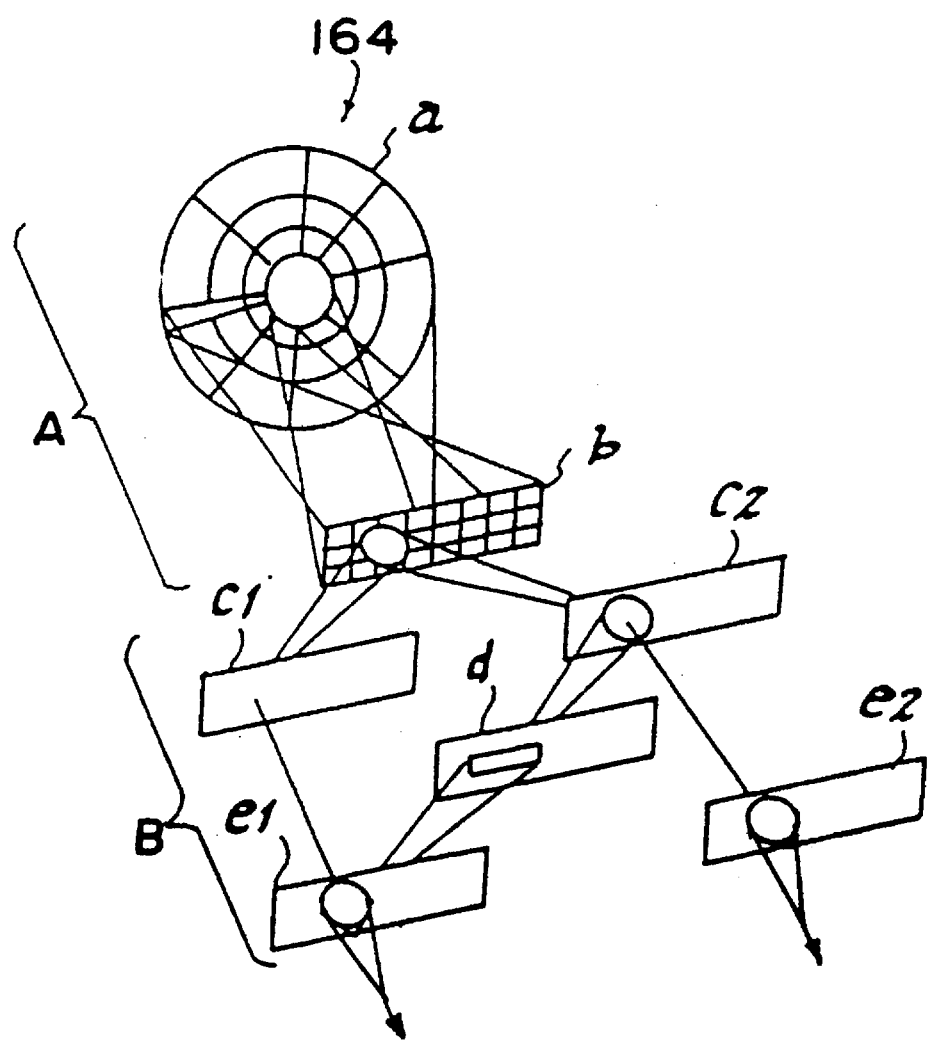
FIG. 77 is an explanatory view showing an example of a neural network for extracting a contour line of a candidate for a predetermined object image in a first embodiment of the method for extracting a contour line of an object image in accordance with the present invention.

FIG. 77 is an explanatory view showing an example of a neural network, which has the aforesaid functions and is employed in a first embodiment of the method for extracting a contour line of an object image in accordance with the present invention.

A signal, which represents part of an image of the outer world and which is obtained through the view window having a predetermined size, is fed into the neural network. Also, the output obtained from the neural network represents a contour line of a candidate for the predetermined object image, which candidate is embedded in the input image.

The basic structure of the neural network in this embodiment is of the layered type. However, the neurons in each of e1- and e2-layers are connected with each other in an interactive manner. Therefore, the neural network may also be referred to as a complex type. Also, in a back propagation model, which is popular as the layered type, every neuron in each layer is connected to every neuron in the adjacent layer. In contrast to the back propagation model, the neural network employed in this embodiment is of a local area limited connection type, in which the connections are effected only between those neurons which are located at corresponding positions in adjacent layers or between the neurons located in the vicinity of these corresponding neurons. Therefore, the number of the synapses between the layers can be reduced markedly, and the operation time can be kept short. Additionally, connections between the neurons in each interactive connection layer are effected only between those neurons the positions of which are close to one another. Such a local area limited connection structure is similar to the structure of the nervous circuit ranging from the retina of the human eye to the primary visual area of the brain.

The layers of the neural network employed in this embodiment have the functions described below. This neural network is divided into the two steps A, and B as illustrated in FIG. 76. As described above, in the step A, the position of the center point of the view window is set in the image, and part of the image in the region inside of the view window is fetched. The step A is constituted of an a-layer provided with the view window having a predetermined size, in which layer the image is cut out with the size of the view window and fed into the neural network, and a b-layer for transforming the input image with the complex-log mapping (logarithmic polar coordinate transformation). The step B for narrowing contour lines of a candidate for the predetermined object image down from the input image is constituted of a c1-layer for detecting lines of the candidate for the predetermined object image, which lines extend in the annular direction, and a c2-layer for detecting lines of the candidate for the predetermined object image, which lines extend in the radial direction. The step B is also constituted of a d-layer for detecting the end points of the lines extending in the radial direction, the e1-layer which is an interactive connection circuitry layer for selecting a line extending in the annular direction, and the e2-layer which is an interactive connection circuitry layer for selecting a line extending in the radial direction.

The neural network employed in this embodiment is identical with the structure from the a-layer to the e1- and e2-layers of the neural network, which is shown in FIG. 38 and is employed in the embodiment of the method for extracting an object image in accordance with the present invention.

With this embodiment of the method for extracting a contour line of an object image in accordance with the present invention, the competition and the cooperation are iterated in the e1- and e2-layers, and a contour line of the candidate for the predetermined object image is thereby formed. The formed contour line is then normalized and extracted.

How the contour line of the candidate for the predetermined object image is normalized will be described hereinbelow.

Figure 78A:
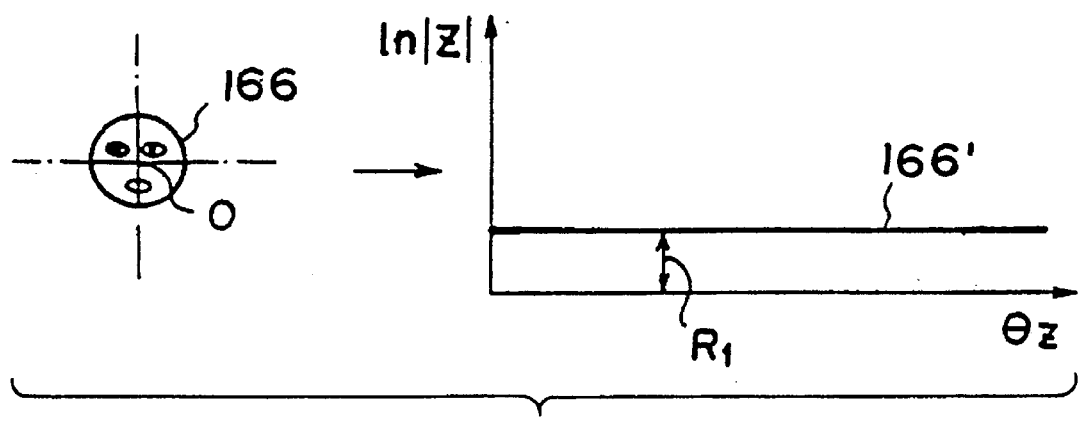
FIGS. 78A and 78B are explanatory views showing how large and small face images are transformed with the complex-log mapping.
Figure 78B:
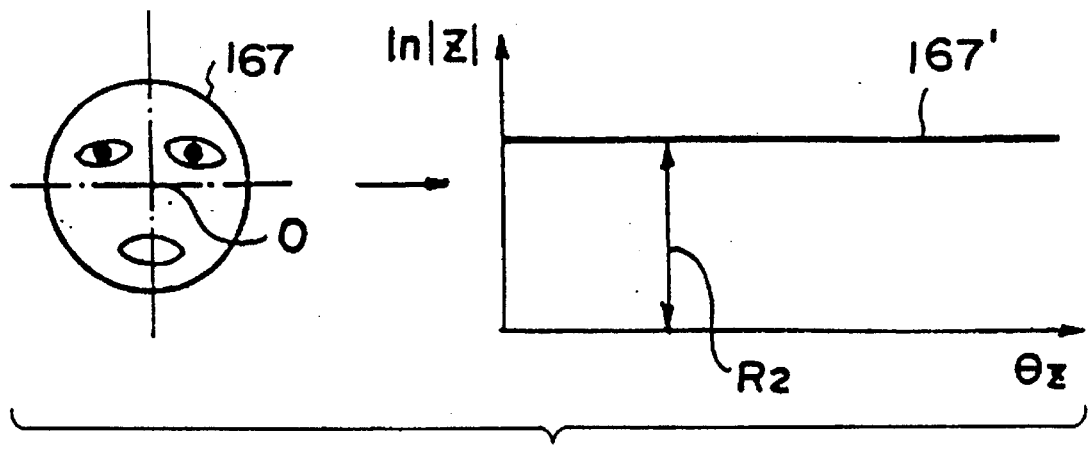

How the contour line of the candidate for the predetermined object image, which line is selected by the e1-layer, is normalized will be described hereinbelow. In the cases illustrated in FIGS. 78A and 78B, the center point O of the view window and the center point of the candidate for the predetermined object image coincide with each other. Specifically. the center point O of the view window and the center point of a small human face image 186 or a large human face image 167, which serves as the candidate for the predetermined object image, coincide with each other. In such cases, as indicated at the right parts of FIGS. 78A and 78B, with the complex-log mapping, the contour lines of the small face image 166 and the large face image 167 are transformed into straight lines 166' and 167', which are located respectively at distances R1 and R2 from the center point of the view window. Normalization is carried out by rendering the distances R1 and R2 approximately equal to each other. For these purposes, the process described below is carried out.

Figure 79:
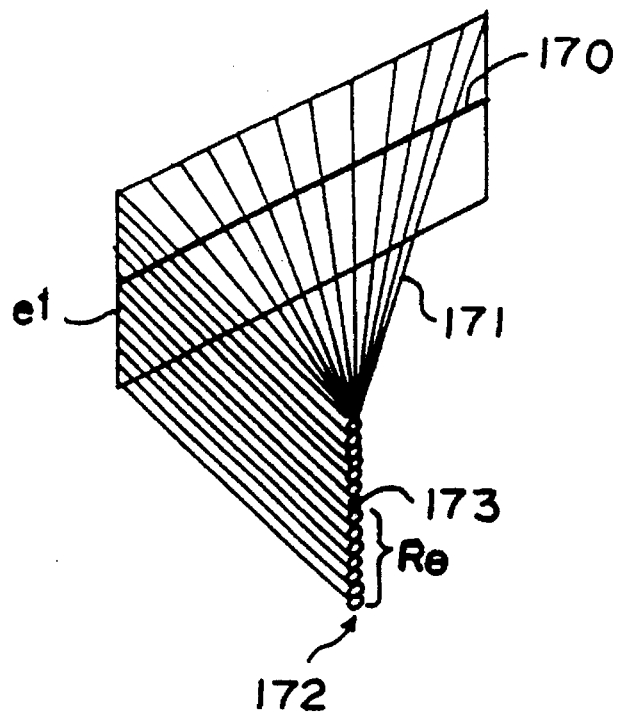
FIG. 79 is an explanatory view showing how a contour line of a candidate for a predetermined object image is normalized in the first embodiment of the method for extracting a contour line of an object image in accordance with the present invention.

FIG. 79 is en explanatory view showing how the normalization is carried out in this embodiment.

As illustrated in FIG. 79, in cases where the center point of the view window and the center point of the circular human face image coincide with each other, neurons 170 of the e1-layer of the neural network are excited which are located in the annular direction at approximately equal distances from the center point of the view window. Along each of the rows of the array of the neurons of the e1-layer, which rows regularly stand side by side in the radial direction, the outputs of the neurons arrayed in the annular direction are added to one another by synaptic connections 171. As a result, of the neurons 172 representing the sums of the additions, only the neuron 173, which is located at a distance R$\theta$ from the center point of the view window, generates an output. The distance R$\theta$ represents the distance from the center point of the human face image to the contour line. The distance R$\theta$ is transformed inversely to the complex-log mapping into a distance $\ln^{-1}R\theta$. An expansion and contraction factor k (=L/R$\theta$) is then found, with which the distance $\ln^{-1}R\theta$ having been obtained from the transformation inverse to the complex-log mapping can be normalized to a predetermined value L. When the contour line of the human face image, which serves as the candidate for the predetermined object image, is extracted in the Cartesian plane, the extraction is carried out such that contour lines of human face images having different sizes may become approximately the same size in accordance with the expansion and contraction factor k.

Figure 80:
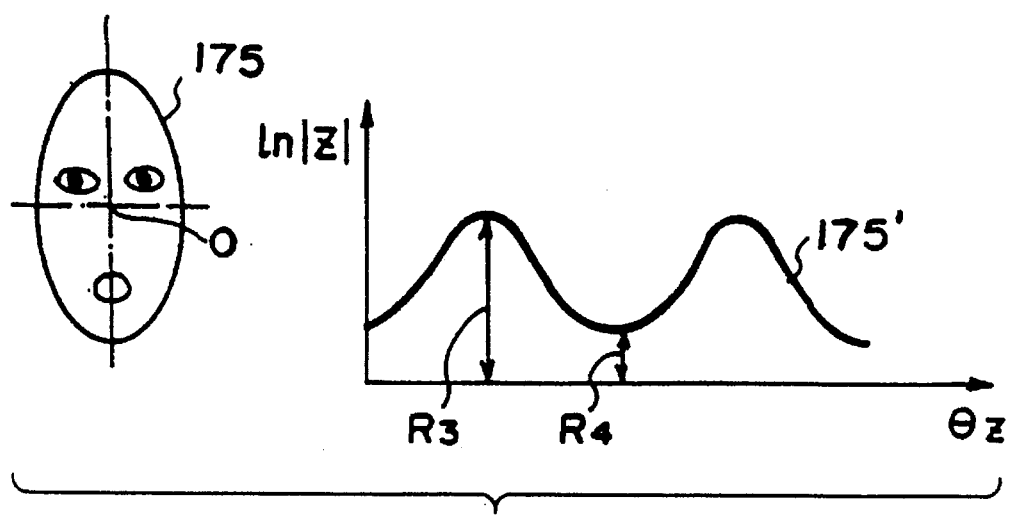
FIG. 80 is an explanatory view showing the results of transformation of a long face image with the complex-log mapping.

The shape of a human face varies for different persons. As illustrated in FIG. 80, in cases where the center point O of the view window and the center point of a long elliptic face image 175 coincide with each other, the contour line of the long face image 175 is transformed with the complex-log mapping into a curve 175'. The distance between the center point of the view window and the curve 175' varies in accordance with the angle with respect to the annular direction (in this example, the maximum value is R3, and the minimum value is R4). In such cases, an expansion and contraction factor k (=L/Rθ), with which the distance $\ln^{-1}R\theta$ having been obtained from the transformation inverse to the complex-log mapping can be normalized to the predetermined value L, is found for each angle with respect to the annular direction. When the contour line of the long face image 175, is extracted in the Cartesian plane, the extraction is carried out such that contour lines of human face images having different shapes and sizes may become approximately the same shape and approximately the same size in accordance with the expansion and contraction factor for each angle.

How the normalization is carried out in cases where an importance is attached to the output of the e2-layer will be described hereinbelow. As illustrated in FIG. 81A, in this case, the center point O of a view window 181 and a point of intersection T of contour lines of a candidate 180 for a predetermined object image coincide with each other. The point of intersection T of the contour lines constitute a portion of the candidate 180 for the predetermined object image. In order to extract such a portion, information concerning the size of the entire candidate 180 for the predetermined object image is required. Therefore, the balance of the output composition is temporarily changed such the importance may be attached to the output of the e1-layer, and the view window is thereby caused to travel until its center point O may coincides with the center point of the candidate 180 for the predetermined object image.

At this time, the center point O of the view window is already at a portion of the contour lines of the candidate 180 for the predetermined object image. Therefore, if the candidate 180 for the predetermined object image has a size such that it is completely accommodated in the view window 181, the view window 181 can be reliably caused by the searching to travel to the center point of the candidate 180 for the predetermined object image.

However, as shown in FIG. 81A, if the size of the candidate 180 for the predetermined object image is larger than the size of the view window 181, the center point O the view window 181 cannot travel to the center point of the candidate 180 for the predetermined object image. Whether the center point of the view window can accurately travel to the center point of the candidate for the predetermined object image can be known by investigating the states of excitation of the neurons of the e1-layer. Specifically, as illustrated in FIG. 81A, in cases where no neuron is excited above a predetermined threshold value in the e1-layer, it is judged that the entire candidate 180 for the predetermined object image is larger than the view window 181. In such cases, a signal for enlarging the region of the image of the outer world, which image is cut out by the a-layer, i.e., the view window 181, may be fed into the a-layer such that the entire candidate 180 for the predetermined object image can be found in the region inside of the view window 181. As illustrated in FIG. 81B, in cases where the entire candidate 180 for the predetermined object image comes into the region inside of an enlarged view window 181', the neurons of the e1-layer are excited, and the center point O of the view window 181' can travel towards the center point of the candidate 180 for the predetermined object image. In this manner, as shown in FIG. 81C, the neural network can cause the center point O of the view window 181' to travel towards the center point of the candidate 180 for the predetermined object image.

Thereafter, in the same manner as that described above, the size R5 of the candidate 180 for the predetermined object image is calculated from the distance between the center point O of the view window 181' and the contour line extending in the annular direction. Thereafter, as illustrated in FIG. 81D, the center point O of the view window is returned to the point of intersection T of the contour lines, which point was found previously. A region, which has its center point at the point of intersection T of the contour lines and has a predetermined size ratio to the size of the entire candidate 180 for the predetermined object image, (in this example, the region having a radius of $k \cdot \ln^{-1}R5$, where k represents the expansion and contraction factor) is extracted.

In the manner described above, the pattern representing the contour line of the face image, which serves as the candidate for the predetermined object image, is normalized and extracted.

As for the extraction of the contour line of the candidate for the predetermined object image, in cases where only a single candidate for the predetermined object image is embedded in a given image, the contour line of the candidate for the predetermined object image may be extracted directly. In an image 183 shown in FIG. 82, a human body image 182 is embedded on the foreground side of a signpost image 184. With the method for extracting a contour line of an object image in accordance with the present invention, even if both the contour line of a human face image 182a and the contour line of the signpost image 184 are to be extracted, as the contour line of the candidate for the predetermined object image, the contour line of the human face image 182a and the contour line of the signpost image 184 can be extracted independently of each other. How such extraction is carried out will be described hereinbelow.

Figure 82:
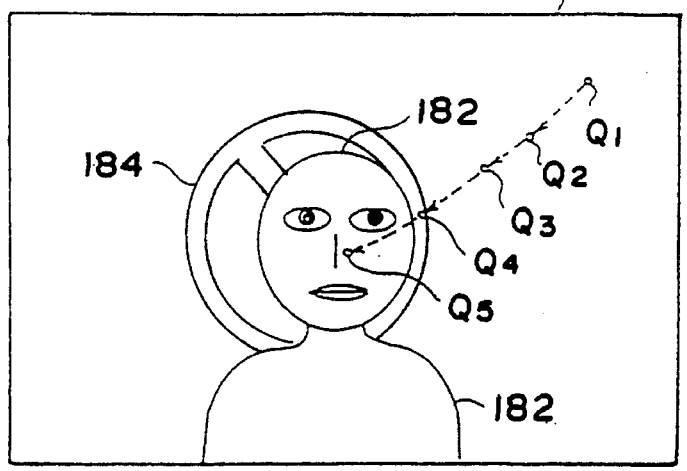
FIG. 82 is an explanatory view showing how the center point of a view window travels on an image of a human body and a signpost.
Figure 83A:
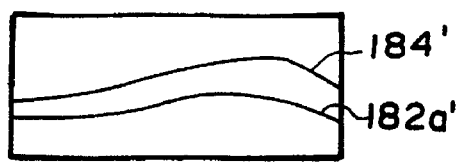
FIGS. 83A, 83B, 83C, and 83D are explanatory views showing how neurons corresponding to a region of a contour line of a candidate for a predetermined object image fatigue in an e1-layer in the first embodiment of the method for extracting a contour line of an object image in accordance with the present invention.
Figure 83B:

As illustrated An FIG. 82, the center point of the view window travels from a point Q1 towards the center point of the face image 182a, and ultimately stops at the center point of the face image 182a. In this state, as illustrated in FIG. 83A, two contour lines 182a' and 184' extending approximately in the annular direction are emphasized in the e1-layer. The neurons in the e1-layer are connected in the interactive manner with one another, and the weights of their connections are given by Formula (5). Therefore, the competition and the cooperation are effected between the contour line 182a' and the contour line 184', and the contour line 182a' of the face image, which line has a higher intensity than the contour line 184' of the signpost image, inhibits and erases the contour line 184'. As a result, as illustrated in FIG. 83B, only the contour line 182a' of the face image remains unerased. In this state, the human face image 182a shown in FIG. 82 is first extracted.

The characteristics represented by Formula (10) are given to the neurons of the e1-layer.

$$o_i(t+1) = \text{sigmoid}\left( i_i(t) + \sum_j W_{ij} \cdot i_j(t) - k_i \int_{t-t_f}^{i} o_i(t')dt' \right) \quad (10)$$

where oi(t) represents the output of an i-neuron at the time t, ii(t) represents the input from a different layer to the i-neuron at the time t, ij(t) represents the input to a j-neuron in the e1-layer at the time t, Wij represents the weights of the interactive connection between the i-neuron and the j-neuron in the e1-layer, ki represents an appropriate positive number, and tf represents an appropriate positive number.

Figure 83C:
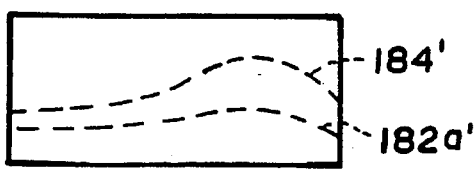
Figure 83D:

In Formula (10), the term of integration represents the term of accumulation of fatigue. With the term of integration, outputs of a certain neuron, which were generated within a predetermined period that goes back by the time tf from the time t, are integrated with respect to the time. The value of ki is set at 1 for the neurons of the e1-layer, which correspond to the contour line 182a' of the face image shown in FIG. 83B. The value of ki is set at 0 for the neurons corresponding to the other regions. In this manner, fatigue accumulates only in the neurons corresponding to the contour line 182a' of the face image. Specifically, according to Formula (10), the neurons, which correspond to the regions other than the contour line 182a' of the face image, do not fatigue, and the inputs into these neurons can be directly taken as the outputs therefrom. However, the neurons, which correspond to the contour line 182a' of the face image, accumulate their fatigue. Therefore, when the neurons, which correspond to the contour line 182a' of the face image, receive inputs, the outputs of these neurons reduce due to the aforesaid term of fatigue. Because of the reduction in the outputs, as illustrated in FIG. 83C, the outputs from the neurons, which correspond to the contour line 182a' of the face image, disappear. Therefore, as illustrated in FIG. 83D, the neurons corresponding to the contour line 184' of the signpost image, which line has been inhibited by the contour line 182a' of the face image, again generate their outputs. In the state shown in FIG. 83D, the contour line of the signpost image 184 shown in FIG. 82 is extracted.

With the passage of time, in the same manner as the neurons corresponding to the contour line 182a' of the face image, the neurons corresponding to the contour line 184' of the signpost image will accumulate their fatigue and show a reduction in their outputs. Also, the neurons corresponding to the contour line 182a' of the face image will again generates their outputs. In this embodiment, depending on the values of ki and tf in Formula (10), the generation of the outputs of the neurons, which correspond to the contour line 182a' of the face image, and the generation of the outputs of the neurons, which correspond to the contour line 184' of the signpost image, will be repeated alternately. If the value of tf in Formula (10) is set at infinity, a neuron, which has once been excited, will not again be excited, and therefore the contour line of the same candidate for the predetermined object image, which line has once been extracted, will not again be extracted.

A second embodiment of the method for extracting a contour line of an object image in accordance with the present invention will be described hereinbelow.

Figure 84:
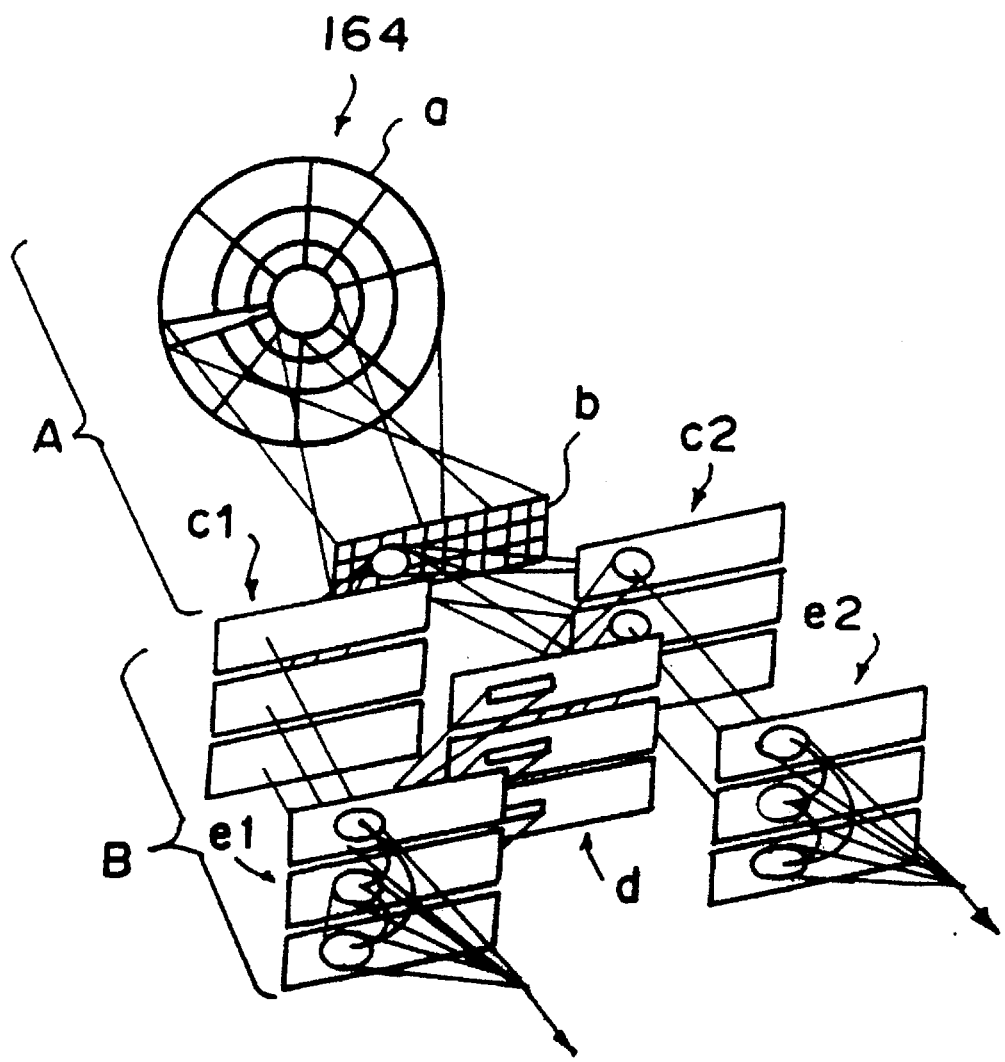
FIG. 84 is an explanatory view showing an example of a neural network for extracting a contour line of a candidate for a predetermined object image in a second embodiment of the method for extracting a contour line of an object image in accordance with the present invention.

FIG. 84 is an explanatory view showing an example of a neural network for carrying out the second embodiment of the method for extracting a contour line of an object image in accordance with the present invention.

With the second embodiment of the method for extracting a contour line of an object image in accordance with the present invention, in an a-layer, an image falling within the region inside of a view window is cut out. In a b-layer, the cut-out image is then transformed with the complex-log mapping into a complex-log mapped image. Thereafter, in each of c1- and c2-layers, convolutions are carried out on the complex-log mapped image, which has been obtained from the b-layer, by using a plurality of synaptic weights patterns for detecting contour lines, which patterns have sizes differing step-wise. In this manner, detection of a group of lines is carried out with each of the synaptic weights patterns.

Thereafter, in each of e1- and e2-layers, convolutions are carried out on respective groups of the lines, which groups have been detected with the respective synaptic weights patterns for detecting contour lines, by using a plurality of synaptic weights patterns for competition and cooperation, which have sizes corresponding to the sizes of the synaptic weights patterns for detecting contour lines. Groups of lines, each of which groups has been emphasized with each of the synaptic weights patterns for competition and cooperation, are then caused to compete and cooperate with one another. The lines are thus emphasized or erased, and the contour line of the candidate for the predetermined object image is thereby extracted.

Figure 85A:
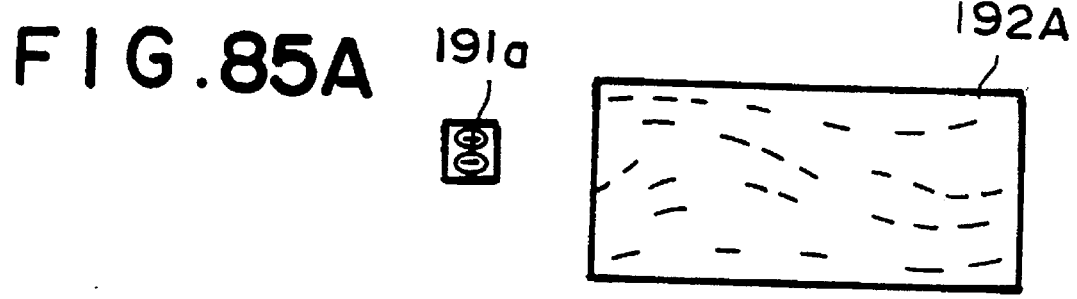
FIGS. 85A, 85B, and 85C are explanatory views showing how lines are extracted in a c1-layer in the second embodiment of the method for extracting a contour line of an object image in accordance with the present invention.
Figure 85B:
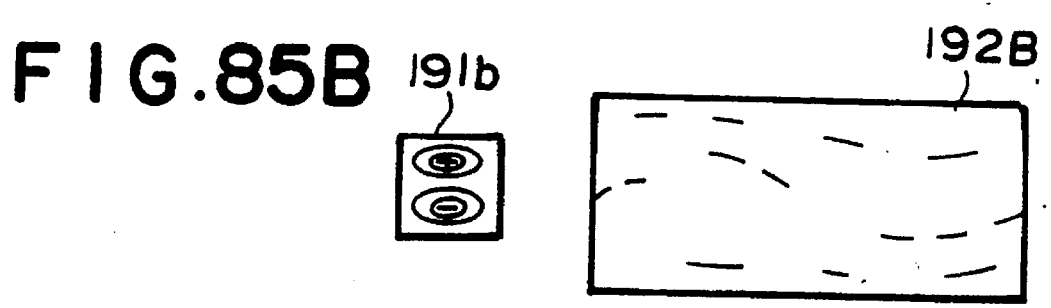
Figure 85C:
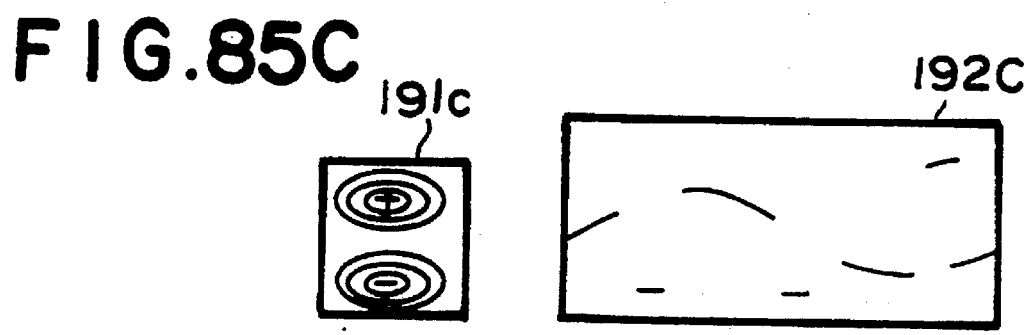

In the second embodiment of the method for extracting a contour line of an object image in accordance with the present invention, the cutting out of the image in the a-layer end the transformation with the complex-log mapping in the b-layer are carried out in the same manners as those in first embodiment of the method for extracting an object image in accordance with the present invention. In the c1-layer, convolutions are carried out on the complex-log mapped image, which has been obtained from the b-layer, by using three types of synaptic weights patterns 191a, 191b, and 191c for detecting contour lines, which are shown in FIGS. 85A, 85B, and 85C and have different sizes. Patterns 192A, 192B, and 192C are thereby obtained, which represent lines detected in accordance with the sizes of the synaptic weights patterns 191a, 191b, and 191c for detecting contour lines. By way of example, in cases where the human face image is embedded in the image, which was cut out in the a-layer, the lines, which are detected by the synaptic weights pattern 191a for detecting contour lines and are represented by the pattern 192A, contain lines of minute details, such as the eye patterns, the mouth pattern, and the ear patterns. On the other hand, the lines, which are detected by the synaptic weights pattern 191c for detecting contour lines and are represented by the pattern 192C, do not contain lines of such minute details, but contain only the lines constituting the contour line of the human face image or the contour line of a larger object.

Figure 86A:
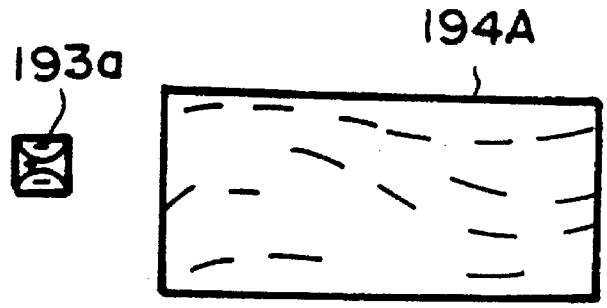
FIGS. 86A, 86B, and 86C are explanatory views showing how the lines compete and cooperate with one another in an e1-layer in the second embodiment of the method for extracting a contour line of an object image in accordance with the present invention.
Figure 86B:
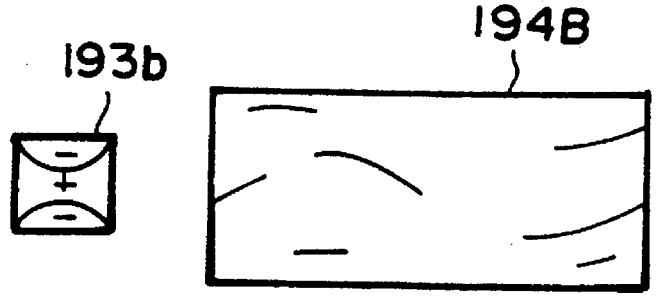
Figure 86C:
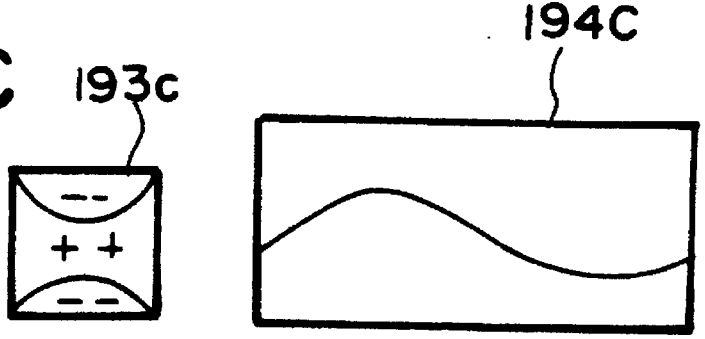

Thereafter, in the e1-layer, as illustrated in FIGS. 86A, 86B, and 86C, convolutions are carried out on the patterns 192A, 192B, and 192C by using synaptic weights patterns 193a, 193b, and 193c for competition and cooperation, which have sizes corresponding to the sizes of the synaptic weights patterns 191a, 191b, and 191c for detecting contour lines. As a result, the neurons corresponding to the broken lines in each of the patterns 192A, 192B, and 192C, which neurons are excited strongly and with a high level of continuity in the annular direction, cooperate with one another. In this manner, neurons adjacent to the neurons corresponding to the end points of these broken lines are sequentially excited in the annular direction, and the broken lines thereby become continuous in the annular direction. On the other hand, neurons, which are excited only weakly end with a low level of continuity in the annular direction, compete with and erased by the neurons, which are excited strongly and with a high level of continuity in the annular direction. In the case of the pattern 192A, the competition and the cooperation of the lines are effected within a small range in accordance with the size of the synaptic weights pattern 193a for competition and cooperation. Therefore, as indicated by a pattern 194A shown in FIG. 86A, fine lines are selected. In the case of the pattern 192B, the competition and the cooperation of the lines are effected within a range, which is broader than the synaptic weights pattern 193a for competition and cooperation, in accordance with the size of the synaptic weights pattern 193*b* for competition and cooperation. Therefore, lines as indicated by a pattern 194B shown in FIG. 86B are selected. When the convolution is carried out on the pattern 192C by using the synaptic weights pattern 193*c* for competition and cooperation, lines as indicated by a pattern 194C shown in FIG. 86C are selected.

Excitatory signals are transmitted mutually among the neurons corresponding to the patterns 194A, 194B, and 194C representing the lines. The competition and the cooperation progress favorably at the neurons, which are excited and work for corresponding positions in the patterns 194A, 194B, and 194C representing the lines. As a result, only the neurons, which are associated with the contour line of the candidate for the predetermined object image, continue to be excited. In this manner, the states of excitation of the neurons, which correspond to the patterns 194A, 194B, and 194C representing the lines, are obtained in arranged forms. The states of excitation of the neurons are put together, and the contour line of the candidate for the predetermined object image is thereby formed and extracted.

In the c2-layer, convolutions are carried out on the complex-log mapped image, which has been obtained from the b-layer, by using three types of synaptic weights patterns 195*a*, 195*b*, and 195*c* for detecting contour lines, which are shown in FIGS. 87A, 87B, and 87C and have different sizes. Patterns 196A, 196B, and 196C are thereby obtained, which represent lines detected in accordance with the sizes of the synaptic weights patterns 195*a*, 195*b*, and 195*c* for detecting contour lines. The lines, which are detected by the synaptic weights pattern 195*a* for detecting contour lines and are represented by the pattern 196A, contain lines of minute details of the image, which has been cut out in the a-layer. On the other hand, the lines, which are detected by the synaptic weights pattern 195*c* for detecting contour lines and are represented by the pattern 196C, do not contain lines of such minute details. In this manner, the range of extraction of the lines is larger in the order of the patterns 196A, 196B, and 196C.

Thereafter, in the e2-layer, as illustrated in FIGS. 88A, 88B, and 88C, convolutions are carried out on the patterns 196A, 196B, and 196C by using synaptic weights patterns 197*a*, 197*b*, and 197*c* for competition and cooperation, which have sizes corresponding to the sizes of the synaptic weights patterns 195*a*, 195*b*, and 195*c* for detecting contour lines. As a result, the neurons corresponding to the broken lines in each of the patterns 196A, 196B, and 196C, which neurons are excited strongly and with a high level of continuity in the radial direction, cooperate with one another. In this manner, neurons adjacent to the neurons corresponding to the end points of these broken lines are sequentially excited in the radial direction, and the broken lines thereby become continuous in the radial direction. On the other hand, neurons, which are excited only weakly and with a low level of continuity in the radial direction, compete with and erased by the neurons, which are excited strongly and with a high level of continuity in the radial direction. In the case of the pattern 196A, the competition end the cooperation of the lines are effected within a small range in accordance with the size of the synaptic weights pattern 197*a* for competition and cooperation. Therefore, as indicated by a pattern 198A shown in FIG. 88A, fine lines are selected. In the case of the pattern 196B, the competition and the cooperation of the lines are effected within a range, which is broader than the synaptic weights pattern 197*a* for competition and cooperation, in accordance with the size of the synaptic weights pattern 197*b* for competition and cooperation. Therefore, lines as indicated by a pattern 198B shown in FIG. 88B are selected. When the convolution ie carried out on the pattern 196C by using the synaptic weights pattern 197*c* for competition and cooperation, lines as indicated by a pattern 198C shown in FIG. 88C are selected.

Excitatory signals are transmitted mutually among the neurons corresponding to the patterns 198A, 198B, and 198C representing the lines. The competition and the cooperation progress favorably at the neurons, which are excited and work for corresponding positions in the patterns 198A, 198B, and 198C representing the lines. As a result, only the neurons, which are associated with the contour line of the candidate for the predetermined object image, continue to be excited. In this manner, the states of excitation of the neurons, which correspond to the patterns 198A, 198B, and 198C representing the lines, are obtained in arranged forms. The states of excitation of the neurons are put together, and the contour line of the candidate for the predetermined object image is thereby formed and extracted.

A third embodiment of the method for extracting a contour line of an object image in accordance with the present invention will be described hereinbelow.

In the third embodiment of the method for extracting a contour line of an object image in accordance with the present invention, the cut-out image, which fells within the region inside of the view window having the predetermined size, is not transformed with the complex-log mapping. The contour line of the candidate for the predetermined object image is extracted by using a neural network having the neurons, which are arrayed in the form of the Cartesian plane.

FIG. 89 is an explanatory view showing an example of a neural network for extracting a contour line of a candidate for a predetermined object image in the third embodiment of the method for extracting a contour line of an object image in accordance with the present invention. The neural network is constituted of an input layer 200 for cutting out an image, which falls within the region inside of a view window having a predetermined size, from a given image 199. The neural network is also constituted of a line detecting layer 201 for detecting circular arc-like lines from the cut-out image, and a line detecting layer 201' for detecting radial lines from the cut-out image. The neural network is additionally constituted of an end point detecting layer 202 for detecting end points of the radial lines. The neural network is further constituted of an interactive connection layer 203 for selecting a continuous, circular arc-like line, and an interactive connection layer 203' for selecting a continuous, radial line.

The neural network employed in this embodiment is identical with the structure from the input layer 120 to the interactive connection layers 123, 123' of the neural network, which is shown in FIG. 65 and is employed in the embodiment of the method for extracting an object image in accordance with the present invention.

With the third embodiment of the method for extracting a contour line of an object image in accordance with the present invention, the competition and the cooperation are iterated in interactive connection layers 203 and 203', and a contour line of the candidate for the predetermined object image is thereby formed. The formed contour line is then normalized and extracted.

The contour line of the candidate for the predetermined object image is selected in the manner described above. Thereafter, in the same manner as in the first and second embodiments of the method for extracting a contour line of an object image in accordance with the present invention, the contour line of the candidate for the predetermined object image is normalized and extracted.

Figure 90A:
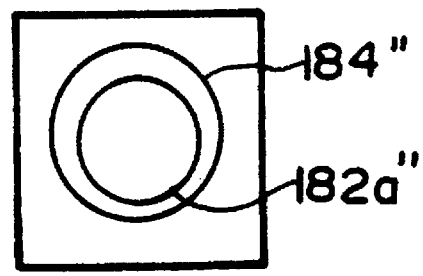
FIGS. 90A, 90B, 90C, and 90D are explanatory views showing how neurons corresponding to a region of a contour line of a candidate for a predetermined object image fatigue in an interactive connection layer in the third embodiment of the method for extracting a contour line of an object image in accordance with the present invention.
Figure 90B:
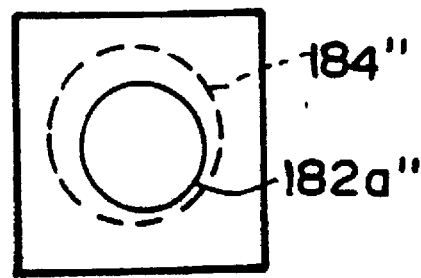
Figure 90C:
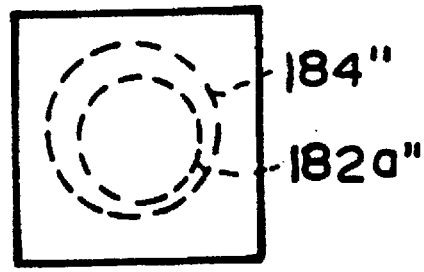
Figure 90D:
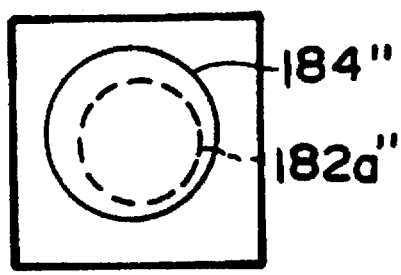

In the third embodiment of the method for extracting a contour line of an object image in accordance with the present invention, when the contour line of the candidate for the predetermined object image is extracted, the characteristics represented by Formula (10) are given to the neurons in the interactive connection layer 203. Therefore, as in the first and second embodiments of the method for extracting a contour line of an object image in accordance with the present invention, the contour line of the human face image 182a and the contour line of the signpost image 184 can be extracted independently of each other from the image shown in FIG. 82. For example, as illustrated in FIG. 90A, a pattern, in which a contour line 182a" of the face image and a contour line 184" of the signpost image have been emphasized, is obtained from the image shown in FIG. 82. In the same manner as that in the first and second embodiments of the method for extracting a contour line of an object image in accordance with the present invention, the competition and the cooperation are effected between the contour line 182a" of the face image and the contour line 184" of the signpost image, and the contour line 182a" of the face image, which line has a higher intensity than the contour line 184" of the signpost image. inhibits and erases the contour line 184". As a result, as illustrated in FIG. 90B, only the contour line 182a" of the face image remains unerased. In the state shown in FIG. 90B, the human face image 182a shown in FIG. 82 is first extracted. With the passage of time after the human face image 182a has been extracted, the neurons, which correspond to the contour line 182a" of the face image, accumulate their fatigue. Therefore, when the neurons, which correspond to the contour line 182a" of the face image, receive inputs, the outputs of these neurons reduce. Because of the reduction in the outputs, as illustrated in FIG. 90C, the outputs from the neurons, which correspond to the contour line 182a" of the face image, disappear. Therefore, as illustrated in FIG. 90D, the neurons corresponding to the contour line 184" of the signpost image, which line has been inhibited by the contour line 182a" of the face image, again generate their outputs. In the state shown in FIG. 90D, the contour line of the signpost image 184 shown in FIG. 82 is extracted.

The contour line of the candidate for the predetermined object image, which line has been extracted in the aforesaid first, second, or third embodiment of the method for extracting a contour line of an object image in accordance with the present invention, can be utilized in various fields of image processing in which the information representing the contour line is used. For example, the contour line may be utilized in a process for extracting the region surrounded by the contour line, and a process for determining the direction, to which a view window should travel, from the contour line and causing the view window to travel to the center point of a candidate for a predetermined object image. The contour line may also be utilized in a process for determining a gradient of a field of an image from the direction, to which a view window should travel.

In the aforesaid embodiments of the method for extracting a contour line of an object image in accordance with the present invention, the contour line of the human face image and the contour line of the signpost image are extracted independently of each other from the image, in which the human face image and the signpost image are embedded such that they may be completely superposed one upon the other. With the method for extracting a contour line of an object image in accordance with the present invention, contour lines of a plurality of candidates for predetermined object images can also be extracted independently of one another from an image, in which at least portions of the candidates for predetermined object images are superposed one upon another, e.g., from the image shown in FIG. 91, in which only certain portions of three human face images are superposed one upon another.

In cases where a contour line of a candidate for a predetermined object image is extracted from an image, in which nothing overlaps upon the candidate for the predetermined object image, the process for preventing the re-extraction need not necessarily be carried out for the extracted contour line of the candidate for the predetermined object image.

Also, in the aforesaid embodiments of the method for extracting a contour line of an object image in accordance with the present invention, neural networks are used to extract the contour line of the candidate for the predetermined object image. The neural networks need not necessarily be employed, and any of other techniques may be utilized for this purpose.

Additionally, in the aforesaid embodiments of the method for extracting a contour line of an object image in accordance with the present invention, the contour line of the human face image is extracted. The method for extracting a contour line of an object image in accordance with the present invention is also applicable when contour lines of other types of predetermined object images ere extracted. In such cases, a contour line of any object image can be extracted efficiently in the same manner as that in the extraction of the contour line of the human face image by using a neural network during the extraction and carrying out the learning operations of the neural network in a manner suitable for the object image to be extracted.

Further, in the aforesaid embodiments of the method for extracting a contour line of an object image in accordance with the present invention, the process for preventing the re-extraction is carried out by introducing the term of fatigue into the neural network. Alternatively, any of other processes may be employed, with which the contour line of the candidate for the predetermined object image, which line has already been extracted, can be prevented from being extracted again. For example, masking may be applied to the already extracted contour line of the candidate for the predetermined object image.

Also, in the aforesaid embodiments of the method for extracting a contour line of an object image in accordance with the present invention, neural networks are utilized for all steps from the cutting out of the image part, which falls within the region inside of the view window, to the extraction of the contour line of the candidate for the predetermined object image. However, the neural networks need not necessarily be utilized for all steps, and a neural network may be used in at least one step during the extraction of the contour line of the object image. Also, the extraction of the contour line of the candidate for the predetermined object image may be carried out by using a neural network.

What is claimed is:

1. A computer-implemented method for extracting and outputting an object image from an image signal, in which an extraction area for extraction of a candidate for a predetermined object image from an image is determined, the method for extracting an object image comprising the steps of:

i) inputting and storing in memory an image signal containing the candidate object for a predetermined object image, and causing the center point of only one view window, which has a predetermined size smaller than the entire input image signal, to travel to a position of said candidate for the predetermined object image;

ii) determining and extracting said extraction area in accordance with one of the size, the shape, and the size and shape of said candidate for the predetermined object image, the center point of said view window being taken as a reference during the determination of said extraction area; and iii) determining if the predetermined object image is extracted and setting the size of said view window if the predetermined object image is determined not to be extracted, and determining the movement of the center point of the view window based on image data in the extracted area; and iv) outputting an image signal containing said extracted object image.

2. A method for extracting an object image as defined in claim 1 wherein the extraction of said candidate for the predetermined object image is carried out by using a neural network.

3. A method for extracting an object image as defined in claim 1 wherein the position of a detected contour line, which position is taken in the radial direction, is detected with respect to the center point of said view window, and the size of said view window is changed in accordance with the detected position of said contour line, which position is taken in the radial direction.

4. A method for extracting an object image as defined in claim 3 wherein the position of said detected contour line, which position is taken in the radial direction, is detected with respect to the center point of said view window, and the magnitude of a vector for a travel of said view window is changed in accordance with the detected position of said contour line, which position is taken in the radial direction.

5. A method for extracting an object image as defined in claim 1 wherein, after said candidate for the predetermined object image has been extracted, a process for preventing re-extraction of said candidate for the predetermined object image, is carried out on a region in said image, from which region said candidate for the predetermined object image has been extracted.

6. A method for extracting an object image as defined in claim 5 wherein said process for preventing re-extraction is carried out by using a neural network.

7. A method for extracting an object image as defined in claim 5 wherein said process for preventing re-extraction is carried out with masking.

8. A method for extracting an object image as defined in claim 5 wherein the extraction of said candidate for the predetermined object image is carried out by using a neural network, and said process for preventing re-extraction is carried out by introducing a term of fatigue into the neural network.

9. A computer-implemented method for extracting and outputting an object image from an input image signal, in which an extraction area for extraction of a candidate for a predetermined object image from an image is determined, the method for extracting an object image comprising the steps of:

i) inputting and storing in memory an image signal containing the candidate object for a predetermined object image, and cutting out an image, which falls in a region inside of a view window having a predetermined size, from said image, ii) detecting a contour line of said candidate for the predetermined object image, which line extends in a predetermined direction, from said cut-out image, said contour line comprised of one or more components, iii) extracting all of components of said detected contour line, which are tilted at a predetermined angle with respect to circumferential directions of concentric circles surrounding the center point of said view window, from said detected contour line of said candidate for the predetermined object image, iv) detecting azimuths and intensities of said extracted components with respect to the center point of said view window, the azimuths and the intensities being detected as azimuth vectors, v) composing a vector from said azimuth vectors, a vector for a travel of said view window being thereby determined, vi) causing the center point of said view window to travel in accordance with said vector for the travel of said view window, vii) determining an extraction area in accordance with one of the size, the shape, and the size and shape of said candidate for the predetermined object image, the center point of said view window, which has thus been caused to travel, being taken as a reference during the determination of said extraction area, and viii) extracting and outputting said extraction area as an image signal.

10. A method for extracting an object image as defined in claim 9 wherein a neural network is employed in order to carry out at least a single step selected from the group consisting of the cutting out of said image, the detection of said contour line, the extraction of said components of said contour line, which are tilted at the predetermined angle, the detection of said azimuth vectors, the vector composition from said azimuth vectors, the travel of the center point of said view window, and the determination of said extraction area.

11. A method for extracting an object image as defined in claim 9 wherein the detection of said contour line of said candidate for the predetermined object image, which line extends in the predetermined direction, is carried out after said cut-out image has been transformed with complex-log mapping into a complex-log mapped image by taking the center point of said view window as a pole of mapping, the extraction of said components of said detected contour line is carried out by extracting all of contour line components, which are tilted at a predetermined angle with respect to an annular direction in the complex-log mapped plane, from the contour line, which has been detected in said complex-log mapped image, and said azimuth vectors are detected by detecting azimuths and intensities of the extracted contour line components in said complex-log mapped plane.

12. A method for extracting an object image as defined in claim 11 wherein the transformation with the complex-log mapping is carried out by using a neural network.

13. A method for extracting an object image as defined in claim 9 wherein, after a plurality of contour lines are detected from said cut-out image, of the detected contour lines, contour lines having a high level of continuity in approximately the same direction as said predetermined direction and/or contour lines having a high intensity are caused to cooperate with one another and are thereby emphasized, said contour lines having a high level of continuity and/or said contour lines having a high intensity and contour lines having a low level of continuity in approximately the same direction as said predetermined direction and/or contour lines having a low intensity are caused to compete with each other, whereby said contour lines having a low level of continuity and/or said contour lines having a low intensity are erased, and from an emphasized contour line, which has been formed by the emphasis of said contour lines having a high level of continuity and/or said contour lines having a high intensity, all of components of said emphasized contour line, which are tilted at a predetermined angle with respect to circumferential directions of concentric circles surrounding the center point of said view window, are extracted.

14. A method for extracting an object image as defined in claim 13 wherein a neural network is employed in order to carry out at least a single step selected from the group consisting of the emphasis and the erasing of the plurality of said detected contour lines and the extraction of said components of said emphasized contour line, which are tilted at the predetermined angle.

15. A method for extracting an object image as defined in claim 9 wherein, during the vector composition from said azimuth vectors, phase shifts at predetermined angles are applied to said azimuth vectors.

16. A method for extracting an object image as defined in claim 9 wherein, during the vector composition from said azimuth vectors, weights are applied to said azimuth vectors in accordance with distances between the center point of said view window and said components of said contour line.

17. A method for extracting an object image as defined in claim 9 wherein, during the vector composition from said azimuth vectors, phase shifts at predetermined angles are applied to said azimuth vectors, and weights are applied to said azimuth vectors in accordance with distances between the center point of said view window and said components of said contour line.

18. A method for extracting an object image as defined in claim 9 wherein thermal fluctuations are added to said vector for the travel of said view window, whereby the center point of said view window is prevented from stopping at a position other than the position of said candidate for the predetermined object image on said image during the travel of the center point of said view window towards the position of said candidate for the predetermined object image on said image.

19. A method for extracting an object image as defined in claim 18 wherein the composition of said vector for the travel of said view window is carried out by using a neural network, and said thermal fluctuations are added to the output of said neural network with an annealing process.

20. A method for extracting an object image as defined in claim 9 wherein an inertia term is added to said vector for the travel of said view window, whereby the center point of said view window is prevented from stopping at a position other than the position of said candidate for the predetermined object image on said image during the travel of the center point of said view window towards the position of said candidate for the predetermined object image on said image.

21. A method for extracting an object image as defined in claim 9 wherein the position of said detected contour line, which position is taken in the radial direction, is detected with respect to the center point of said view window, and the size of said view window is changed in accordance with the detected position of said contour line, which position is taken in the radial direction.

22. A method for extracting an object image as defined in claim 9 wherein, after said candidate for the predetermined object image has been extracted, a process for preventing re-extraction of said candidate for the predetermined object image, is carried out on a region in said image, from which region said candidate for the predetermined object image has been extracted.

23. A computer-implemented method for extracting and outputting an object image from an input image signal, in which an extraction area for extraction of a candidate for a predetermined object image from an image is determined, the method for extracting an object image comprising the steps of:

i) inputting and storing in memory an image signal containing the candidate object for a predetermined object image, and cutting out an image, which falls in a region inside of a view window having a predetermined size, from said image, ii) extracting a region, which approximately coincides in color with said candidate for the predetermined object image, from said cut-out image, iii) detecting an azimuth and a distance of said extracted region with respect to the center point of said view window, iv) generating a vector for a travel of said view window according to said azimuth and said distance, v) causing the center point of said view window to travel in accordance with said vector for the travel of said view window, vi) determining an extraction area in accordance with one of the size, the shape, and the size and shape of said candidate for the predetermined object image, the center point of said view window, which has thus been caused to travel, being taken as a reference during the determination of said extraction area, and v) extracting and outputting said extraction area as an image signal.

24. A method for extracting an object image as defined in claim 23 wherein a neural network is employed in order to carry out at least a single step selected from the group consisting of the cutting out of said image, the extraction of said region, the detection of said azimuth and said distance, the detection of said vector for the travel of said view window, the travel of the center point of said view window, and the determination of said extraction area.

25. A method for extracting an object image as defined in claim 23 wherein at least a single step selected from the group consisting of the extraction of said region, the detection of said azimuth and said distance, and the detection of said vector for the travel of said view window is carried out on a complex-log mapped plane in which the center point of said view window is taken as a pole of mapping.

26. A method for extracting an object image as defined in claim 25 wherein the transformation with the complex-log mapping is carried out by using a neural network.

27. A method for extracting an object image as defined in claim 23 wherein, of a plurality of regions approximately coinciding in color with said candidate for the predetermined object image, regions, which exhibit a high degree of coincidence in color with said candidate for the predetermined object image and are located at positions close to one another, are caused to cooperate with each other and are thereby emphasized, a region, which exhibits a high degree of coincidence in color with said candidate for the predetermined object image, and a region, which exhibits a low degree of coincidence in color with said candidate for the predetermined object image and is located at a position spaced apart from said region exhibiting a high degree of coincidence in color with said candidate for the predetermined object image, are caused to compete with each other, said region, which exhibits a low degree of coincidence in color with said candidate for the predetermined object image, being thereby erased, regions, which exhibit a high degree of coincidence in color with said candidate for the predetermined object image and are located at positions spaced apart from each other, are caused to compete with each other, a region exhibiting a high degree of coincidence in color with said candidate for the predetermined object image, which region has a size and a shape appropriate for the region to be selected, is kept unerased, whereas a region exhibiting a high degree of coincidence in color with said candidate for the predetermined object image, which region has a size and a shape inappropriate for the region to be selected, is erased, whereby a region, which is most appropriate in the region inside of said view window, is selected as a predetermined object image region, and an azimuth and a distance of said selected object image region are detected with respect to the center point of said view window.

28. A method for extracting an object image as defined in claim 27 wherein, during the emphasis and the erasing, weights are applied to azimuth vectors, which are obtained from azimuths and distances of the plurality of said regions approximately coinciding in color with said candidate for the predetermined object image, in accordance with distances between the center point of said view window and the plurality of said regions.

29. A method for extracting an object image as defined in claim 27 wherein a neural network is employed in order to carry out the emphasis and the erasing of the plurality of said regions approximately coinciding in color with said candidate for the predetermined object image.

30. A method for extracting an object image as defined in claim 23 wherein thermal fluctuations are added to said vector for the travel of said view window, whereby the center point of said view window is prevented from stopping at a position other than the position of said candidate for the predetermined object image on said image during the travel of the center point of said view window towards the position of said candidate for the predetermined object image on said image.

31. A method for extracting an object image as defined in claim 23 wherein an inertia term is added to said vector for the travel of said view window, whereby the center point of said view window is prevented from stopping at a position other than the position of said candidate for the predetermined object image on said image during the travel of the center point of said view window towards the position of said candidate for the predetermined object image on said image.

32. A method for extracting an object image as defined in claim 23 wherein the position of said detected contour line, which position is taken in the radial direction, is detected with respect to the center point of said view window, and the size of said view window is changed in accordance with the detected position of said contour line, which position is taken in the radial direction.

33. A method for extracting an object image as defined in claim 23 wherein, after said candidate for the predetermined object image has been extracted, a process of preventing re-extraction of said candidate for the predetermined object image, is carried out on a region in said image, from which region said candidate for the predetermined object image has been extracted.

34. A computer-implemented method for extracting and outputting an object image from an input image signal, in which an extraction area for extraction of a candidate for a predetermined object image from an image is determined, the method for extracting an object image comprising the steps of:

i) inputting and storing in memory an image signal containing the candidate object for a predetermined object image, setting a view window, which has a predetermined size, on said image stored in memory, cutting out a plurality of images, which fall in a region inside of said view window, at a plurality of times having a predetermined time difference therebetween, detecting contour lines of object images, which are embedded in the plurality of said cut-out images, calculating the difference between corresponding ones of said detected contour lines, and detecting a movement of said image in an in-plane parallel direction in the region inside of said view window, the movement being detected from said calculated difference, ii) detecting contour lines of object images, which are embedded in the plurality of said cut-out images, said contour lines extending in a radial direction with respect to the center point of said view window, calculating the difference between corresponding ones of said detected contour lines extending in the radial direction, and detecting a movement of said image in an in-plane rotating direction in the region inside of said view window, the movement being detected from said calculated difference, iii) detecting contour lines of said object images, which are embedded in the plurality of said cut-out images, said contour lines extending in an annular direction, calculating the difference between corresponding ones of said detected contour lines extending in the annular direction, and detecting a movement of said image in the radial direction in the region inside of said view window, the movement being detected from said calculated difference, iv) compensating for contour line components related to a movement of a background in said cut-out images, which fall in the region inside of said view window, in accordance with said detected movement of said image in the in-plane parallel direction, in the in-plane rotating direction, and/or in the radial direction, a plurality of images, in which the components of the movement of the background have been compensated for, being thereby obtained, v) calculating the difference between the plurality of said cut-out images, in which the contour line components related to the movement of the background have been compensated for, a contour line of an object, which shows a movement different from the movement of the background, being thereby detected, vi) extracting all of components of said detected contour line of said object showing a movement different from the movement of the background, which are tilted at a predetermined angle with respect to circumferential directions of concentric circles surrounding the center point of said view window, from said detected contour line of said object showing a movement different from the movement of the background, vii) detecting azimuths and intensities of said extracted components of said detected contour line of said object, which shows the movement different from the movement of the background, with respect to the center point of said view window, the azimuths and the intensities being detected as azimuth vectors, viii) composing a vector from said azimuth vectors, a vector for a travel of said view window being thereby determined, ix) causing the center point of said view window to travel in a direction heading towards said object in accordance with said vector for the travel of said view window, and x) determining an extraction area, from which the candidate for the predetermined object image showing a movement with respect to the background is to be extracted, in accordance with one of the size, the shape, and the size and shape of said object, the center point of said view window, which has thus been caused to travel, being taken as a reference during the determination of said extraction area; and xi) extracting and outputting said extraction area as an image signal.

35. A method for extracting an object image as defined in claim 34 wherein the detection of said contour lines of said object images, which are embedded in the plurality of said cut-out images, said contour lines extending in the radial direction with respect to the center point of said view window, and/or the detection of said contour lines of said object images, which are embedded in the plurality of said cut-out images, said contour lines extending in the annular direction, are carried out after said cut-out images are transformed with complex-log mapping into complex-log mapped images by taking the center point of said view window as a pole of mapping.

36. A method for extracting an object image as defined in claim 34 wherein the detection of said contour line of said object, which shows the movement different from the movement of the background, is carried out after an image representing said difference between the plurality of said images, in which the components of the movement of the background have been compensated for, has been transformed with complex-log mapping into a complex-log mapped image by taking the center point of said view window as a pole of mapping, the extraction of said components of said detected contour line of said object is carried out by extracting all of contour line components, which are tilted at a predetermined angle with respect to an annular direction in the complex-log mapped plane, from the contour line, which has been detected in said complex-log mapped image, and said azimuth vectors are detected by detecting azimuths and intensities of the extracted contour line components in said complex-log mapped plane.

37. A method for extracting an object image as defined in claim 34 wherein a neural network is employed in order to carry out at least a single step selected from the group consisting of the cutting out of the plurality of said images, which fall in a region inside of said view window, the detection of the movement of said image in the in-plane parallel direction in the region inside of said view window, the detection of the movement of said image in the in-plane rotating direction in the region inside of said view window, the detection of the movement of said image in the radial direction in the region inside of said view window, the formation of the plurality of said images, in which the components of the movement of the background have been compensated for, the detection of said contour line of said object, which shows a movement different from the movement of the background, the extraction of said components of said contour line, which are tilted at the predetermined angle, the detection of said azimuth vectors, the vector composition from said azimuth vectors, the travel of the center point of said view window, and the determination of said extraction area.

38. A method for extracting an object image as defined in claim 34 wherein, after a plurality of contour lines of said object are detected, of the detected contour lines of said object, contour lines having a high level of continuity in approximately the same direction as a predetermined direction and/or contour lines having a high intensity are caused to cooperate with one another and are thereby emphasized, said contour lines having a high level of continuity and/or said contour lines having a high intensity and contour lines having a low level of continuity in approximately the same direction as said predetermined direction and/or contour lines having a low intensity are caused to compete with each other, whereby said contour lines having a low level of continuity and/or said contour lines having a low intensity are erased, and from an emphasized contour line, which has been formed by the emphasis of said contour lines having a high level of continuity and/or said contour lines having a high intensity, all of components of said emphasized contour line, which are tilted at a predetermined angle with respect to circumferential directions of concentric circles surrounding the center point of said view window, are extracted.

39. A method for extracting an object image as defined in claim 38 wherein a neural network is employed in order to carry out at least a single step selected from the group consisting of the emphasis and the erasing of the plurality of said detected contour lines of said object and the extraction of said components of said emphasized contour line, which are tilted at the predetermined angle.

40. A method for extracting an object image as defined in claim 34 wherein, during the vector composition from said azimuth vectors, phase shifts at predetermined angles are applied to said azimuth vectors.

41. A method for extracting an object image as defined in claim 34 wherein, during the vector composition from said azimuth vectors, weights are applied to said azimuth vectors in accordance with distances between the center point of said view window and said components of said contour line.

42. A method for extracting an object image as defined in claim 34 wherein, during the vector composition from said azimuth vectors, phase shifts at predetermined angles are applied to said azimuth vectors, and weights are applied to said azimuth vectors in accordance with distances between the center point of said view window and said components of said contour line.

43. A method for extracting an object image as defined in claim 34 wherein thermal fluctuations are added to said vector for the travel of said view window, whereby the center point of said view window is prevented from stopping at a position other than the position of said candidate for the predetermined object image on said image during the travel of the center point of said view window towards the position of said candidate for the predetermined object image on said image.

44. A method for extracting an object image as defined in claim 34 wherein an inertia term is added to said vector for the travel of said view window, whereby the center point of said view window is prevented from stopping at a position other than the position of said candidate for the predetermined object image on said image during the travel of the center point of said view window towards the position of said candidate for the predetermined object image on said image.

45. A method for extracting an object image as defined in claim 34 wherein the position of said detected contour line, which position is taken in the radial direction, is detected with respect to the center point of said view window, and the size of said view window is changed in accordance with the detected position of said contour line, which position is taken in the radial direction.

46. A method for extracting an object image as defined in claim 34 wherein, after said candidate for the predetermined object image has been extracted, a process for preventing re-extraction of said candidate for the predetermined object image, is carried out on a region in said image, from which region said candidate for the predetermined object image has been extracted.

47. A computer-implemented method for extracting and outputting an object image from an input image signal, in which an extraction area for extraction of a candidate for a predetermined object image from an image is determined, the method for extracting an object image comprising the steps of:
  i) inputting and storing in memory an image signal containing the candidate object for a predetermined object image, and cutting out a first image, which falls in a region inside of a view window having a predetermined size, from said image,
  ii) detecting a contour line of an object, which is embedded in said cut-out first image,
  iii) after a predetermined time has elapsed, cutting out a second image, which falls in the region inside of said view window, from said image,
  iv) detecting a contour line of an object, which is embedded in said cut-out second image,
  v) calculating the difference between said contour line, which has been detected from said first image, and said contour line, which has been detected from said second image,
  vi) detecting a movement of a background from said calculated difference,
  vii) subtracting said detected movement of said background from said image, an object, which shows a movement different from the movement of said background, being thereby detected,
  viii) recognizing said object, which shows a movement different from the movement of said background, as said candidate for the predetermined object image,
  ix) detecting a vector directed towards said candidate for the predetermined object image as a vector for a travel of the view window,
  x) causing the center point of said view window to travel in accordance with said vector the travel of said view window,
  xi) determining an extraction area in accordance with one of the size, the shape, and the size and shape of said candidate for the predetermined object image, the center point of said view window, which has thus been caused to travel, being taken as a reference during the determination of said extraction area, and
  xii) extracting and outputting said extraction area as an image signal.

48. A method for extracting an object image as defined in claim 47 wherein the detection of said contour lines from said first and second images are carried out after said cut-out first and second images have been transformed with complex-log mapping into complex-log mapped images by taking the center point of said view window as a pole of mapping.

49. A method for extracting an object image as defined in claim 47 wherein thermal fluctuations are added to said vector for the travel of said view window, whereby the center point of said view window is prevented from stopping at a position other than the position of said candidate for the predetermined object image on said image during the travel of the center point of said view window towards the position of said candidate for the predetermined object image on said image.

50. A method for extracting an object image as defined in claim 47 wherein an inertia term is added to said vector for the travel of said view window, whereby the center point of said view window is prevented from stopping at a position other than the position of said candidate for the predetermined object image on said image during the travel of the center point of said view window towards the position of said candidate for the predetermined object image on said image.

51. A method for extracting an object image as defined in claim 47 wherein the position of said detected contour line, which position is taken in the radial direction, is detected with respect to the center point of said view window, and the size of said view window is changed in accordance with the detected position of said contour line, which position is taken in the radial direction.

52. A method for extracting an object image as defined in claim 47 wherein, after said candidate for the predetermined object image has been extracted, a process for preventing re-extraction of said candidate for the predetermined object image, is carried out on a region in said image, from which region said candidate for the predetermined object image has been extracted.

53. A computer-implemented method for extracting and outputting an object image from an input image signal, in which an extraction area for extraction of a candidate for a predetermined object image from an image is determined, the method for extracting an object image comprising the steps of:
  i) inputting and storing in memory an image signal containing the candidate object for a predetermined object image, and cutting out an image, which falls in a region inside of a view window having a predetermined size, from said image,
  ii) detecting a contour line of said candidate for the predetermined object image, which line extends in a predetermined direction, from said cut-out image, said contour line comprised of one or more components,
  iii) extracting all of components of said detected contour line, which are tilted at a predetermined angle with respect to circumferential directions of concentric circles surrounding the center point of said view window, from said detected contour line of said candidate for the predetermined object image, iv) detecting azimuths and intensities of said extracted components with respect to the center point of said view window, the azimuths and the intensities being detected as first azimuth vectors, v) composing a vector from said first azimuth vectors, a first travel vector being thereby determined, vi) extracting a region, which approximately coincides in color with said candidate for the predetermined object image, from said cut-out image, vii) detecting an azimuth and a distance of said extracted region with respect to the center point of said view window, viii) detecting said azimuth and said distance as a second travel vector, ix) composing a vector from said first and second travel vectors, a vector for a travel of said view window being thereby determined, x) causing the center point of said view window to travel in accordance with said vector for the travel of said view window, and xi) determining an extraction area in accordance with one of the size, the shape, and the size and shape of said candidate for the predetermined object image, the center point of said view window, which has thus been caused by travel, being taken as a reference during the determination of said extraction area, and xii) extracting and outputting said extraction area as an image signal.

54. A method for extracting an object image as defined in claim 53 wherein the detection of said contour line of said candidate for the predetermined object image, which line extends in the predetermined direction, and the extraction of said region, which approximately coincides in color with said candidate for the predetermined object image, are carried out after said cut-out image has been transformed with complex-log mapping into a complex-log mapped image by taking the center point of said view window as a pole of mapping, the extraction of said components of said detected contour line is carried out by extracting all of contour line components, which are tilted at a predetermined angle with respect to an annular direction in the complex-log mapped plane, from the contour line, which has been detected in said complex-log mapped image, said first azimuth vectors are detected by detecting azimuths and intensities of the extracted contour line components in said complex-log mapped plane, and an azimuth and a distance of the extracted region in said complex-log mapped plane are detected.

55. A method for extracting an object image as defined in claim 53 wherein, after a plurality of contour lines are detected from said cut-out image, of the detected contour lines, contour lines having a high level of continuity in approximately the same direction as said predetermined direction and/or contour lines having a high intensity are caused to cooperate with one another and are thereby emphasized, said contour lines having a high level of continuity and/or said contour lines having a high intensity and contour lines having a low level of continuity in approximately the same direction as said predetermined direction and/or contour lines having a low intensity are caused to compete with each other, whereby said contour lines having a low level of continuity and/or said contour lines having a low intensity are erased, from an emphasized contour line, which has been formed by the emphasis of said contour lines having a high level of continuity and/or said contour lines having a high intensity, all of components of said emphasized contour line, which are tilted at a predetermined angle with respect to circumferential directions of concentric circles surrounding the center point of said view window, are extracted, of a plurality of regions approximately coinciding in color with said candidate for the predetermined object image, regions, which exhibit a high degree of coincidence in color with said candidate for the predetermined object image and are located at positions close to one another, are caused to cooperate with each other and are thereby emphasized, a region, which exhibits a high degree of coincidence in color with said candidate for the predetermined object image, and a region, which exhibits a low degree of coincidence in color with said candidate for the predetermined object image and is located at a position spaced apart from said region exhibiting a high degree of coincidence in color with said candidate for the predetermined object image, are caused to compete with each other, said region, which exhibits a low degree of coincidence in color with said candidate for the predetermined object image, being thereby erased, regions, which exhibit a high degree of coincidence in color with said candidate for the predetermined object image and are located at positions spaced apart from each other, are caused to compete with each other, a region exhibiting a high degree of coincidence in color with said candidate for the predetermined object image, which region has a size and a shape appropriate for the region to be selected, is kept unerased, whereas a region exhibiting a high degree of coincidence in color with said candidate for the predetermined object image, which region has a size and a shape inappropriate for the region to be selected, is erased, whereby a region, which is most appropriate in the region inside of said view window, is selected as a predetermined object image region, and an azimuth and a distance of said selected object image region are detected with respect to the center point of said view window.

56. A method for extracting an object image as defined in claim 53 wherein, during the vector composition from said first azimuth vector and/or during the detection of said azimuth and said distance of said extracted region, phase shifts at predetermined angles are applied to said azimuth vectors.

57. A method for extracting an object image as defined in claim 53 wherein, during the vector composition from said first azimuth vectors and/or during the detection of said azimuth end said distance of said extracted region, weights are applied to said azimuth vectors in accordance with distances between the center point of said view window and said components of said contour line and/or said region.

58. A method for extracting an object image as defined in claim 53 wherein, during the vector composition from said first azimuth vectors and/or during the detection of said azimuth and said distance of said extracted region, phase shifts at predetermined angles are applied to said azimuth vectors, and weights are applied to said azimuth vectors in accordance with distances between the center point of said view window and said components of said contour line and/or said region.

59. A method for extracting an object image as defined in claim 53 wherein thermal fluctuations are added to said vector for the travel of said view window, whereby the center point of said view window is prevented from stopping at a position other than the position of said candidate for the predetermined object image on said image during the travel of the center point of said view window towards the position of said candidate for the predetermined object image on said image.

60. A method for extracting an object image as defined in claim 53 wherein an inertia term is added to said vector for the travel of said view window, whereby the center point of said view window is prevented from stopping at a position other than the position of said candidate for the predetermined object image on said image during the travel of the center point of said view window towards the position of said candidate for the predetermined object image on said image.

61. A method for extracting an object image as defined in claim 53 wherein the position of said detected contour line, which position is taken in the radial direction, is detected with respect to the center point of said view window, and the size of said view window is changed in accordance with the detected position of said contour line, which position is taken in the radial direction.

62. A method for extracting an object image as defined in claim 53 wherein, after said candidate for the predetermined object image has been extracted, a process for preventing re-extraction of said candidate for the predetermined object image, is carried out on a region in said image, from which region said candidate for the predetermined object image has been extracted.

63. A computer-implemented method for extracting and outputting an object image from an input image signal, in which an extraction area for extraction of a candidate for a predetermined object image from an image is determined, the method for extracting an object image comprising the steps of:

i) inputting and storing in memory an image signal containing the candidate object for a predetermined object image, setting a view window, which has a predetermined size, on said image stored in memory, said image being an image including a movement, cutting out a plurality of images, which fall in a region inside of said view window, at a plurality of times having a predetermined time difference therebetween, and detecting a contour line of said candidate for the predetermined object image, which line extends in a predetermined direction, from one of the plurality of said cut-out images, ii) extracting all of components of said detected contour line, which are tilted at a predetermined angle with respect to circumferential directions of concentric circles surrounding the center point of said view window, from said detected contour line of said candidate for the predetermined object image, iii) detecting azimuths and intensities of said extracted components with respect to the center point of said view window, the azimuths and the intensities being detected as first azimuth vectors, iv) composing a vector from said first azimuth vectors, a first travel vector being thereby determined, v) detecting contour lines of object images, which are embedded in the plurality of said cut-out images, calculating the difference between corresponding ones of said detected contour lines, and detecting a movement of said image in an in-plane parallel direction in the region inside of said view window, the movement being detected from said calculated difference, vi) detecting contour lines of object images, which are embedded in the plurality of said cut-out images, said contour lines extending in a radial direction with respect to the center point of said view window, calculating the difference between corresponding ones of said detected contour lines extending in the radial direction, and detecting a movement of said image in an in-plane rotating direction in the region inside of said view window, the movement being detected from said calculated difference, vii) detecting contour lines of said object images, which are embedded in the plurality of said cut-out images, said contour lines extending in an annular direction, calculating the difference between corresponding ones of said detected contour lines extending in the annular direction, and detecting a movement of said image in the radial direction in the region inside of said view window, the movement being detected from said calculated difference, viii) compensating for components of a movement of a background in said cut-out images, which fall in the region inside of said view window, in accordance with said detected movement of said image in the in-plane parallel direction, in the in-plane rotating direction, and/or in the radial direction, a plurality of images, in which the components of the movement of the background have been compensated for, being thereby obtained, ix) calculating the difference between the plurality of said cut-out images, in which the contour line components related to the movement of the background have been compensated for, a contour line of an object, which shows a movement different from the movement of the background, being thereby detected, x) extracting all of components of said detected contour line of said object showing a movement different from the movement of the background, which are tilted at a predetermined angle with respect to circumferential directions of concentric circles surrounding the center point of said view window, from said detected contour line of said object showing a movement different from the movement of the background, xi) detecting azimuths and intensities of said extracted components of said detected contour line of said object, which shows the movement different from the movement of the background, with respect to the center point of said view window, the azimuths and the intensities being detected as second azimuth vectors, xii) composing a vector from said second azimuth vectors, a second travel vector being thereby determined, xiii) composing a vector from said first and second travel vectors, a vector for a travel of said view window being thereby determined, xiv) causing the center point of said view window to travel in accordance with said vector for the travel of said view window, and xv) determining an extraction area in accordance with one of the size, the shape, and the size and shape of said candidate for the predetermined object image, the center point of said view window, which has thus been caused to travel, being taken as a reference during the determination of said extraction area; and xvi) extracting and outputting said extraction area as an image signal.

64. A method for extracting an object image as defined in claim 63 wherein the detection of said contour lines of said object images, which are embedded in the plurality of said cut-out images, said contour lines extending in the radial direction with respect to the center point of said view window, and/or the detection of said contour lines of said object images in an annular direction are carried out after said cut-out images have been transformed with complex-log mapping into complex-log mapped images by taking the center point of said view window as a pole of mapping, the detection of said contour line of said candidate for the predetermined object image, which line extends in the predetermined direction, is carried out after said one of the plurality of said cut-out images has been transformed with complex-log mapping into a complex-log mapped image by taking the center point of said view window as a pole of mapping, the extraction of said components of said detected contour line of said object, which shows a movement different from the movement of the background, and the extraction of said components of said detected contour line of said candidate for the predetermined object image, which line extends in the predetermined direction, are carried out by extracting all of contour line components, which are tilted at a predetermined angle with respect to an annular direction in the complex-log mapped plane, from the contour lines, which have been detected in the corresponding complex-log mapped images, and said first azimuth vectors and said second azimuth vectors are detected by detecting azimuths and intensities of the extracted contour line components in said complex-log mapped plane.

65. A method for extracting an object image as defined in claim 63 wherein, after a plurality of contour lines are detected during the detection of said first azimuth vectors and/or during the detection of said second azimuth vectors, of the detected contour lines, contour lines having a high level of continuity in approximately the same direction as said predetermined direction and/or contour lines having a high intensity are caused to cooperate with one another and are thereby emphasized, said contour lines having a high level of continuity and/or said contour lines having a high intensity and contour lines having a low level of continuity in approximately the same direction as said predetermined direction and/or contour lines having a low intensity are caused to compete with each other, whereby said contour lines having a low level of continuity and/or said contour lines having a low intensity are erased, and from an emphasized contour line, which has been formed by the emphasis of said contour lines having a high level of continuity and/or said contour lines having a high intensity, all of components of said emphasized contour line, which are tilted at a predetermined angle with respect to circumferential directions of concentric circles surrounding the center point of said view window, are extracted.

66. A method for extracting an object image as defined in claim 63 wherein, during the vector composition from said azimuth vectors, phase shifts at predetermined angles are applied to said azimuth vectors, and weights are applied to said azimuth vectors in accordance with distances between the center point of said view window and said components of said contour line.

67. A method for extracting an object image as defined in claim 63 wherein thermal fluctuations are added to said vector for the travel of said view window, whereby the center point of said view window is prevented from stopping at a position other than the position of said candidate for the predetermined object image on said image during the travel of the center point of said view window towards the position of said candidate for the predetermined object image on said image.

68. A method for extracting an object image as defined in claim 63 wherein an inertia term is added to said vector for the travel of said view window, whereby the center point of said view window is prevented from stopping at a position other than the position of said candidate for the predetermined object image on said image during the travel of the center point of said view window towards the position of said candidate for the predetermined object image on said image.

69. A method for extracting an object image as defined in claim 63 wherein the position of said detected contour line, which position is taken in the radial direction, is detected with respect to the center point of said view window, and the size of said view window is changed in accordance with the detected position of said contour line, which position is taken in the radial direction.

70. A method for extracting an object image as defined in claim 63 wherein, after said candidate for the predetermined object image has been extracted, a process for preventing re-extraction of said candidate for the predetermined object image, is carried out on a region in said image, from which region said candidate for the predetermined object image has been extracted.

71. A computer-implemented method for extracting and outputting an object image from an input image signal, in which an extraction area for extraction of a candidate for a predetermined object image from an image is determined, the method for extracting an object image comprising the steps of:

i) inputting and storing in memory an image signal containing the candidate object for a predetermined object image, setting a view window, which has a predetermined size, on said image stored in memory, said image being an image including a movement, cutting out a plurality of images, which fall in a region inside of said view window, at a plurality of times having a predetermined time difference therebetween, and detecting a contour line of said candidate for the predetermined object image, which line extends in a predetermined direction, from one of the plurality of said cut-out images, ii) extracting all of components of said detected contour line, which are tilted at a predetermined angle with respect to circumferential directions of concentric circles surrounding the center point of said view window, from said detected contour line of said candidate for the predetermined object image, iii) detecting azimuths and intensities of said extracted components with respect to the center point of said view window, the azimuths and the intensities being detected as first azimuth vectors, iv) composing a vector from said first azimuth vectors, a first travel vector being thereby determined, v) detecting contour lines of object images, which are embedded in the plurality of said cut-out images, calculating the difference between corresponding ones of said detected contour lines, and detecting a movement of said image in an in-plane parallel direction in the region inside of said view window, the movement being detected from said calculated difference, vi) detecting contour lines of object images, which are embedded in the plurality of said cut-out images, said contour lines extending in a radial direction with respect to the center point of said view window, calculating the difference between corresponding ones of said detected contour lines extending in the radial direction, and detecting a movement of said image in an in-plane rotating direction in the region inside of said view window, the movement being detected from said calculated differences, vii) detecting contour lines of said object images, which are embedded in the plurality of said cut-out images, said contour lines extending in an annular direction, calculating the difference between corresponding ones of said detected contour lines extending in the annular direction, and detecting a movement of said image in the radial direction in the region inside of said view window, the movement being detected from said calculated difference, viii) compensating for contour line components of a movement of a background in said cut-out images, which fall in the region inside of said view window, in accordance with said detected movement of said image in the in-plane parallel direction, in the in-plane rotating direction, and/or in the radial direction, a plurality of images, in which the components of the movement of the background have been compensated for, being thereby obtained, ix) calculating the difference between the plurality of said cut-out images, in which the contour line components related to the movement of the background have been compensated for, a contour line of an object, which shows a movement different from the movement of the background, being thereby detected, x) extracting all of components of said detected contour line of said object showing a movement different from the movement of the background, which are tilted at a predetermined angle with respect to circumferential directions of concentric circles surrounding the center point of said view window, from said detected contour line of said object showing a movement different from the movement of the background, xi) detecting azimuths and intensities of said extracted components of said detected contour line of said object, which shows the movement different from the movement of the background, with respect to the center point of said view window, the azimuths and the intensities being detected as second azimuth vectors, xii) composing a vector from said second azimuth vectors, a second travel vector being thereby determined, xiii) extracting a region, which approximately coincides in color with said candidate for the predetermined object image, from one of the plurality of said cut-out images, xiv) detecting an azimuth and a distance of said extracted region with respect to the center point of said view window, xv) detecting said azimuth and said distance as a third travel vector, xvi) composing a vector from said first, second, and third travel vectors, a vector for a travel of said view window being thereby determined, xvii) causing the center point of said view window to travel in accordance with said vector for the travel of said view window, and xviii) determining an extraction area in accordance with one of the size, the shape, and the size and shape of said candidate for the predetermined object image, the center point of said view window, which has thus been caused to travel, being taken as a reference during the determination of said extraction area; and xix) extracting and outputting said extraction area as an image signal.

72. A method for extracting an object image as defined in claim 71 wherein the detection of said contour lines of said object images, which are embedded in the plurality of said cut-out images, said contour lines extending in the radial direction with respect to the center point of said view window, and/or the detection of said contour lines of said object images in an annular direction are carried out after said cut-out images have been transformed with complex-log mapping into complex-log mapped images by taking the center point of said view window as a pole of mapping, the detection of said contour line of said candidate for the predetermined object image, which line extends in the predetermined direction, and the extraction of said region, which approximately coincides in color with said candidate for the predetermined object image, are carried out after said one of the plurality of said cut-out images has been transformed with complex-log mapping into a complex-log mapped image by taking the center point of said view window as a pole of mapping, the extraction of said components of said detected contour line of said object, which shows a movement different from the movement of the background, and the extraction of said components of said detected contour line of said candidate for the predetermined object image, which line extends in the predetermined direction, are carried out by extracting all of contour line components, which are tilted at a predetermined angle with respect to an annular direction in the complex-log mapped plane, from the contour lines, which have been detected in the corresponding complex-log mapped images, and said first azimuth vectors and said second azimuth vectors are detected by detecting azimuths and intensities of the extracted contour line components in said complex-log mapped plane, and an azimuth and a distance of said extracted region in said complex-log mapped plane are detected.

73. A method for extracting an object image as defined in claim 71 wherein, after a plurality of contour lines are detected during the detection of said first azimuth vectors and/or during the detection of said second azimuth vectors, of the detected contour lines, contour lines having a high level of continuity in approximately the same direction as said predetermined direction and/or contour lines having a high intensity are caused to cooperate with one another and are thereby emphasized, said contour lines having a high level of continuity and/or said contour lines having a high intensity and contour lines having a low level of continuity in approximately the same direction as said predetermined direction and/or contour lines having a low intensity are caused to compete with each other, whereby said contour lines having a low level of continuity and/or said contour lines having a low intensity are erased, and from an emphasized contour line, which has been formed by the emphasis of said contour lines having a high level of continuity and/or said contour lines having a high intensity, all of components of said emphasized contour line, which are tilted at a predetermined angle with respect to circumferential directions of concentric circles surrounding the center point of said view window, are extracted, of a plurality of regions approximately coinciding in color with said candidate for the predetermined object image, regions, which exhibit a high degree of coincidence in color with said candidate for the predetermined object image and are located at positions close to one another, are caused to cooperate with each other and are thereby emphasized, a region, which exhibits a high degree of coincidence in color with said candidate for the predetermined object image, and a region, which exhibits a low degree of coincidence in color with said candidate for the predetermined object image and is located at a position spaced apart from said region exhibiting a high degree of coincidence in color with said candidate for the predetermined object image, are caused to compete with each other, said region, which exhibits a low degree of coincidence in color with said candidate for the predetermined object image, being thereby erased, regions, which exhibit a high degree of coincidence in color with said candidate for the predetermined object image and are located at positions spaced apart from each other, are caused to compete with each other, a region exhibiting a high degree of coincidence in color with said candidate for the predetermined object image, which region has a size and a shape appropriate for the region to be selected, is kept unerased, whereas a region exhibiting a high degree of coincidence in color with said candidate for the predetermined object image, which region has a size and a shape inappropriate for the region to be selected, is erased, whereby a region, which is most appropriate in the region inside of said view window, is selected as a predetermined object image region, and an azimuth and a distance of said selected object image region are detected with respect to the center point of said view window.

74. A method for extracting an object image as defined in claim 73 wherein a neural network is employed in order to carry out at least a single step selected from the group consisting of the emphasis and the erasing of the plurality of said detected contour lines, the extraction of said components of said emphasized contour line, which are tilted at the predetermined angle, and the emphasis and the erasing of the plurality of said extracted regions.

75. A method for extracting an object image as defined in claim 71 wherein, during the vector composition from said first azimuth vectors or said second azimuth vectors, phase shifts at predetermined angles are applied to said azimuth vectors.

76. A method for extracting an object image as defined in claim 71 wherein, during the vector composition from said azimuth vectors or said second azimuth vectors and/or during the detection of said azimuth and said distance of said extracted region, weights are applied to said azimuth vectors in accordance with distances between the center point of said view window and said components of said contour line and/or said region.

77. A method for extracting an object image as defined in claim 71 wherein, during the vector composition from said azimuth vectors, phase shifts at predetermined angles are applied to said azimuth vectors, and weights are applied to said azimuth vectors in accordance with distances between the center point of said view window and said components of said contour line and/or said region.

78. A method for extracting an object image as defined in claim 71 wherein thermal fluctuations are added to said vector for the travel of said view window, whereby the center point of said view window is prevented from stopping at a position other than the position of said candidate for the predetermined object image on said image during the travel of the center point of said view window towards the position of said candidate for the predetermined object image on said image.

79. A method for extracting an object image as defined in claim 71 wherein an inertia term is added to said vector for the travel of said view window, whereby the center point of said view window is prevented from stopping at a position other than the position of said candidate for the predetermined object image on said image during the travel of the center point of said view window towards the position of said candidate for the predetermined object image on said image.

80. A method for extracting an object image as defined in claim 71 wherein the position of said detected contour line, which position is taken in the radial direction, is detected with respect to the center point of said view window, and the size of said view window is changed in accordance with the detected position of said contour line, which position is taken in the radial direction.

81. A method for extracting an object image as defined in claim 71 wherein, after said candidate for the predetermined object image has been extracted, a process for preventing re-extraction of said candidate for the predetermined object image, is carried out on a region in said image, from which region said candidate for the predetermined object image has been extracted.

82. A computer-implemented method for extracting and outputting an object image from an input image signal, in which an extraction area for extraction of a candidate for a predetermined object image from an image is determined, the method for extracting an object image comprising the steps of:
i) inputting and storing in memory an image signal containing the candidate object for a predetermined object image, and cutting out a first image, which falls in a region inside of a view window having a predetermined size, from said image,
ii) detecting a contour line of an object, which is embedded in said cut-out first image, said contour line comprised of one or more components,
iii) after a predetermined time has elapsed, cutting out a second image, which falls in the region inside of said view window, from said image,
iv) detecting a contour line of an object, which is embedded in said cut-out second image, v) calculating the difference between said contour line, which has been detected from said first image, and said contour line, which has been detected from said second image, vi) detecting a movement of a background from said calculated difference, vii) subtracting said detected movement of said background from said image, an object, which shows a movement different from the movement of said background, being thereby detected, viii) recognizing said object, which shows a movement different from the movement of said background, as said candidate for the predetermined object image, ix) detecting a vector directed towards said candidate for the predetermined object image as a first travel vector, x) detecting a contour line of said candidate for the predetermined object image, which line extends in a predetermined direction, from said cut-out first image, xi) extracting all of components of said detected contour line, which are tilted at a predetermined angle with respect to circumferential directions of concentric circles surrounding the center point of said view window, from said detected contour line of said candidate for the predetermined object image, xii) detecting azimuths and intensities of said extracted components with respect to the center point of said view window, the azimuths and the intensities being detected as second azimuth vectors, xiii) composing a vector from said second azimuth vectors, a second travel vector being thereby determined, xiv) extracting a region, which approximately coincides in color with said candidate for the predetermined object image, from said cut-out first image, xv) detecting an azimuth and a distance of said extracted region with respect to the center point of said view window, xvi) detecting said azimuth and said distance as a third travel vector, xvii) composing a vector from said first, second, and third travel vectors, a vector for a travel of said view window being thereby determined, xviii) causing the center point of said view window to travel in accordance with said vector for the travel of said view window, xiv) determining an extraction area in accordance with one of the size, the shape, and the size and shape of said candidate for the predetermined object image, the center point of said view window, which has thus been caused to travel, being taken as a reference during the determination of said extraction area, and xv) extracting and outputting said extraction area as an image signal.

83. A method for extracting an object image as defined in claim 82 wherein the detection of said contour line of said candidate for the predetermined object image, which line extends in the predetermined direction, and the extraction of said region, which approximately coincides in color with said candidate for the predetermined object image, are carried out after said cut-out first image has been transformed with complex-log mapping into a complex-log mapped image by taking the center point of said view window as a pole of mapping, the extraction of said components of said detected contour line is carried out by extracting all of contour line components, which are tilted at a predetermined angle with respect to an annular direction in the complex-log mapped plane, from the contour line, which has been detected in said complex-log mapped image, said second azimuth vectors are detected by detecting azimuths and intensities of the extracted contour line components in said complex-log mapped plane, and an azimuth and a distance of the extracted region in said complex-log mapped plane are detected.

84. A method for extracting an object image as defined in claim 82 wherein, after a plurality of contour lines are detected from said cut-out image, of the detected contour lines, contour lines having a high level of continuity in approximately the came direction as said predetermined direction and/or contour lines having a high intensity are caused to cooperate with one another and are thereby emphasized, said contour lines having a high level of continuity and/or said contour lines having a high intensity and contour lines having a low level of continuity in approximately the same direction as said predetermined direction and/or contour lines having a low intensity are caused to compete with each other, whereby said contour lines having a low level of continuity and/or said contour lines having a low intensity are erased, and from an emphasized contour line, which has been formed by the emphasis of said contour lines having a high level of continuity and/or said contour lines having a high intensity, all of components of said emphasized contour line, which are tilted at a predetermined angle with respect to circumferential directions of concentric circles surrounding the center point of said view window, are extracted.

85. A method for extracting an object image as defined in claim 82 wherein, during the vector composition from said first azimuth vectors and/or during the vector composition from said second azimuth vectors, phase shifts at predetermined angles are applied to said azimuth vectors.

86. A method for extracting an object image as defined in claim 82 wherein, during the vector composition from said first and/or second azimuth vectors and/or during the detection of said azimuth and said distance of said extracted region, weights are applied to said azimuth vectors in accordance with distances between the center point of said view window and said components of said contour line and/or said region.

87. A method for extracting an object image as defined in claim 82 wherein, during the vector composition from said azimuth vectors and/or during the detection of said azimuth and said distance of said extracted region, phase shifts at predetermined angles are applied to said azimuth vectors, and weights are applied to said azimuth vectors in accordance with distances between the center point of said view window and said components of said contour line and/or said region.

88. A computer-implemented method for extracting and outputting an object image from an input image signal comprising the steps of:

inputting and storing in memory an image signal containing the candidate object for a predetermined object image, cutting out an object image from said image stored in memory, which falls in a region inside of a view window having a predetermined size, composing a vector for a travel of said view window from said cut-out image, causing the center point of said view window to travel in accordance with said vector for the travel of said view window, judging whether a candidate for a predetermined object image is or is not contained in the image falling within the region inside of said view window when the center point of said view window stopped, extracting said candidate for the predetermined object image in cases where it is judged that said candidate for the predetermined object image is contained in the image falling within the region inside of said view window, and extracting and outputting said extraction area as an image signal, transferring the center point of said view window to a different position on said image after one of either said candidate for the predetermined object image has been extracted and it is judged that no candidate for the predetermined object image is contained in the image falling within the region inside of said view window, and thereafter, from the position to which the center point of said view window has been transferred, iteratively performing the steps of composing said vector for the travel of said view window, moving the center point of said view window, judging if said candidate for a predetermined object image is contained within the view window, and cutting out said candidate for a predetermined object image.

89. A method for extracting an object as defined in claim 88 wherein a neural network is employed in order to carry out at least a single step selected from the group consisting of the cutting out of said image, the composition of said vector for the travel of said view window, the travel of the center point of said view window, the judgment, the extraction of said candidate for the predetermined object image, and said transfer of the center point of said view window.

90. A method for extracting an object image as defined in claim 88 wherein, in cases where the center point of said view window stopped at a position in said image, at which no candidate for a predetermined object image is located, the center point of said view window is caused to transfer in an arbitrary direction.

91. A method for extracting an object image as defined in claim 88 wherein, in cases where the center point of said view window stopped on a contour line of said candidate for the predetermined object image, the center point of said view window is caused to transfer along said contour line.

92. A method for extracting an object image as defined in claim 88 wherein, after said candidate for the predetermined object image has been extracted, a process for preventing re-extraction of said candidate for the predetermined object image, is carried out on a region in said image, from which region said candidate for the predetermined object image has been extracted.

93. A method for extracting an object image as defined in claim 92 wherein said process for preventing re-extraction is carried out with masking.

94. A method for extracting an object image as defined in claim 92 wherein the extraction of said candidate for the predetermined object image is carried out by using a neural network, and said process for preventing re-extraction is carried out by introducing a term of fatigue into characteristics of neurons of the neural network.

95. A method for extracting an object image as defined in claim 88 wherein the composition of said vector for the travel of said view window is carried out by using a neural network, and the transfer of the center point of said view window is carried out by utilizing an annealing process in the neural network.

96. A method for extracting an object image as defined in claim 88 wherein the composition of said vector for the travel of said view window is carried out by using a neural network, and the transfer of the center point of said view window is carried out by introducing a term of fatigue into the characteristics of neurons of the neural network.

97. An apparatus for extracting and outputting an object image, comprising:

means for inputting an image signal representing an image;

search means for searching the image for a predetermined object image, by moving a view window which has a size smaller than the image to a portion of the image according to a view window locating signal, detecting a characteristic of said portion of the image, and determining and outputting a travel vector signal for moving a center point of said only one view window based on said detected characteristic; and stop state judgement means, which receives said travel vector signal, for determining if said view window is stopped based on said travel vector, generating said view window locating signal if said view window is stopped, determining if a candidate object image is contained within the portion of the image corresponding to the view window if said view window is stopped and extracting said candidate object image, setting the size of said view window if the candidate object image is not contained within the portion of the image corresponding to the view window, and outputting a signal representing said extracted candidate object image.

98. The apparatus as recited in claim 97, wherein said detected characteristic of the portion of the image for determining the travel vector is one of a contour line, a color, and a movement of the image object.

99. The apparatus as recited in claim 97, wherein said detected characteristic of the portion of the image for determining the travel vector is a combination of a contour line, a color, and a movement of the image object.

100. The apparatus as recited in claim 97, wherein said search means is a neural network apparatus.

* * * * *